United States Patent [19]
Tsuchida et al.

[11] Patent Number: 5,157,550
[45] Date of Patent: Oct. 20, 1992

[54] VARI-FOCAL LENS SYSTEM

[75] Inventors: Hirofumi Tsuchida; Norihiko Aoki; Hiroshi Matsuzaki, all of Tokyo, Japan

[73] Assignee: Olympus Optical Co., Ltd., Tokyo, Japan

[21] Appl. No.: 603,327

[22] Filed: Oct. 25, 1990

[30] Foreign Application Priority Data

| Oct. 26, 1989 | [JP] | Japan | 1-277173 |
| Oct. 27, 1989 | [JP] | Japan | 1-278582 |
| Nov. 17, 1989 | [JP] | Japan | 1-297620 |

[51] Int. Cl.⁵ .............................................. G02B 15/14
[52] U.S. Cl. .................................. 359/686; 359/684; 359/653; 359/654; 359/689
[58] Field of Search ............... 350/432, 423, 427, 450; 359/676, 740, 683, 686, 689, 682, 652, 653, 654, 715, 716

[56] References Cited

U.S. PATENT DOCUMENTS 4,687,302 8/1987 Ikemori et al. .................. 350/427
4,842,386 6/1989 Kitagishi et al. .................. 350/413

FOREIGN PATENT DOCUMENTS 58-102208 6/1983 Japan.
58-153913 9/1983 Japan.
63-292106 11/1988 Japan.
64-40913 2/1989 Japan.
1-191820 8/1989 Japan.

Primary Examiner—Bruce Y. Arnold
Assistant Examiner—David R. Parsons
Attorney, Agent, or Firm—Cushman, Darby & Cushman

[57] ABSTRACT

A vari-focal lens system comprising, in the order from the object side, a first lens unit having a negative refractive power, a second lens unit having a positive refractive power, a third lens unit having a positive refractive power, a fourth lens unit having a positive refractive power and an aperture stop arranged on the image side of said third lens unit, using at least one radial GRIN lens, axial GRIN lens or aspherical surface, and having a high vari-focal ratio and a wide field angle at the wide position.

51 Claims, 72 Drawing Sheets

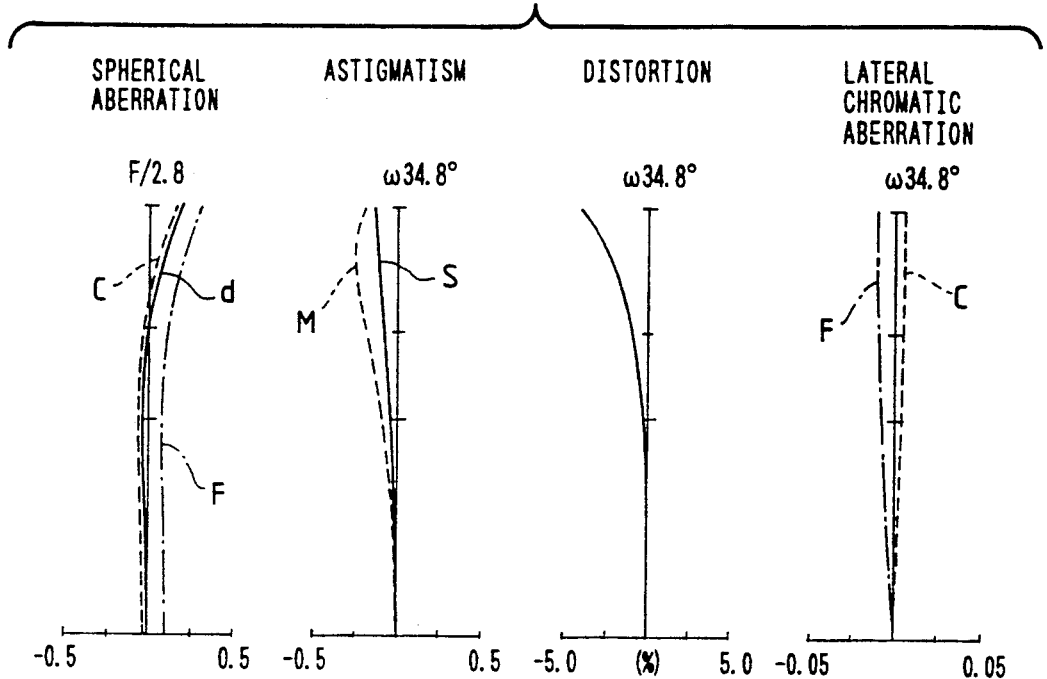
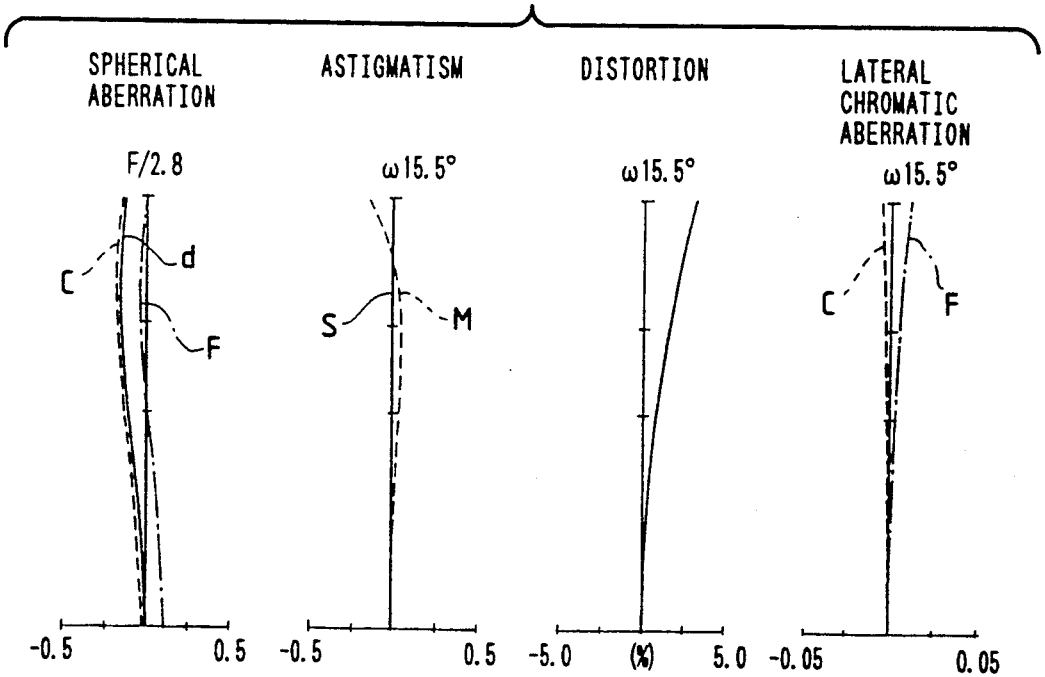

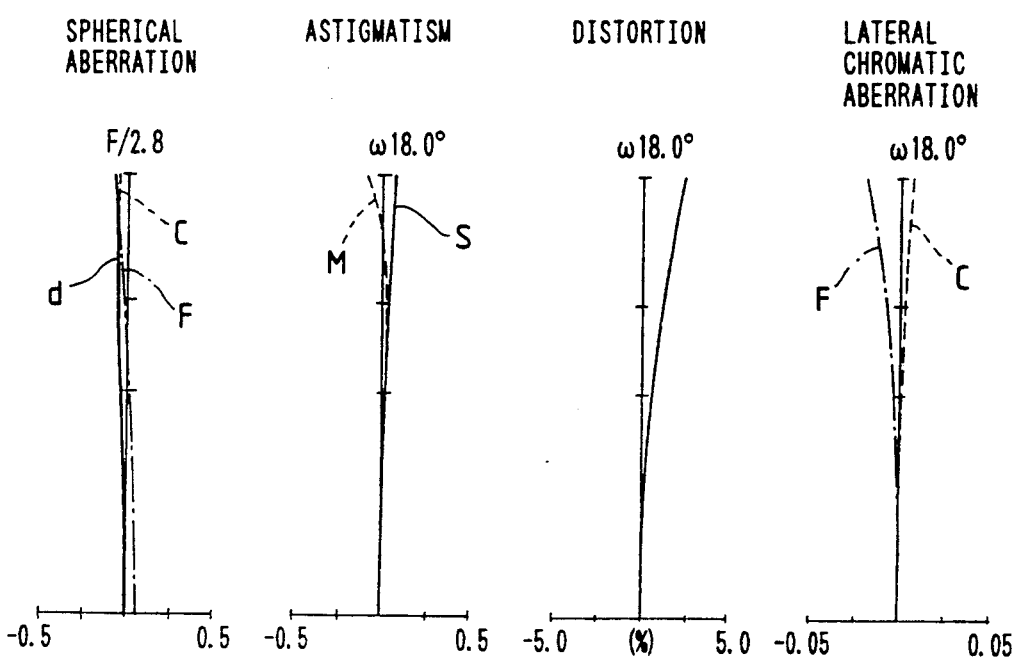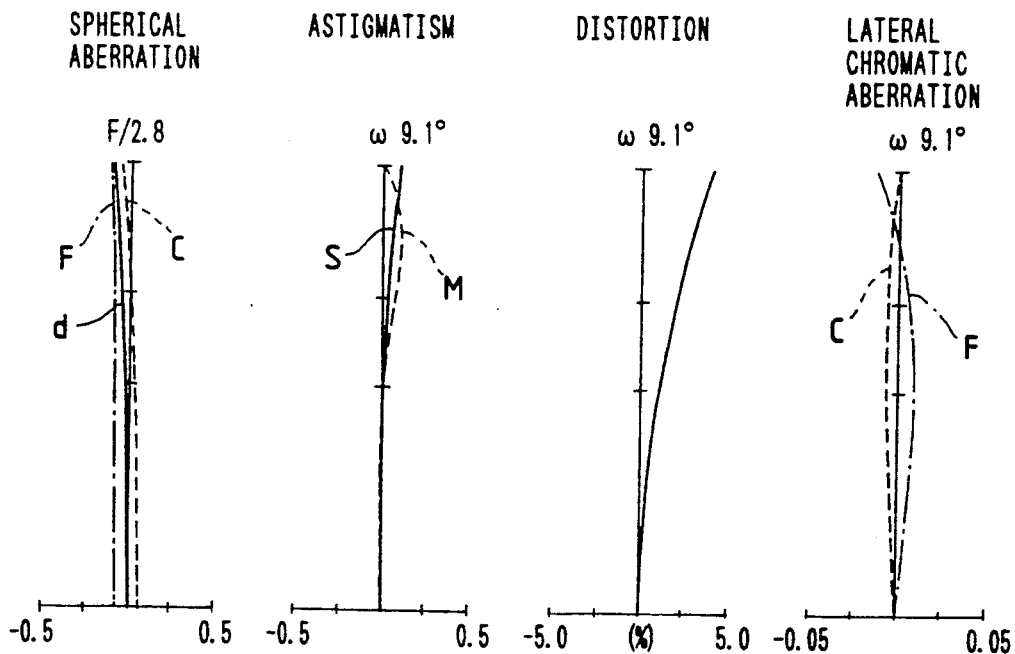

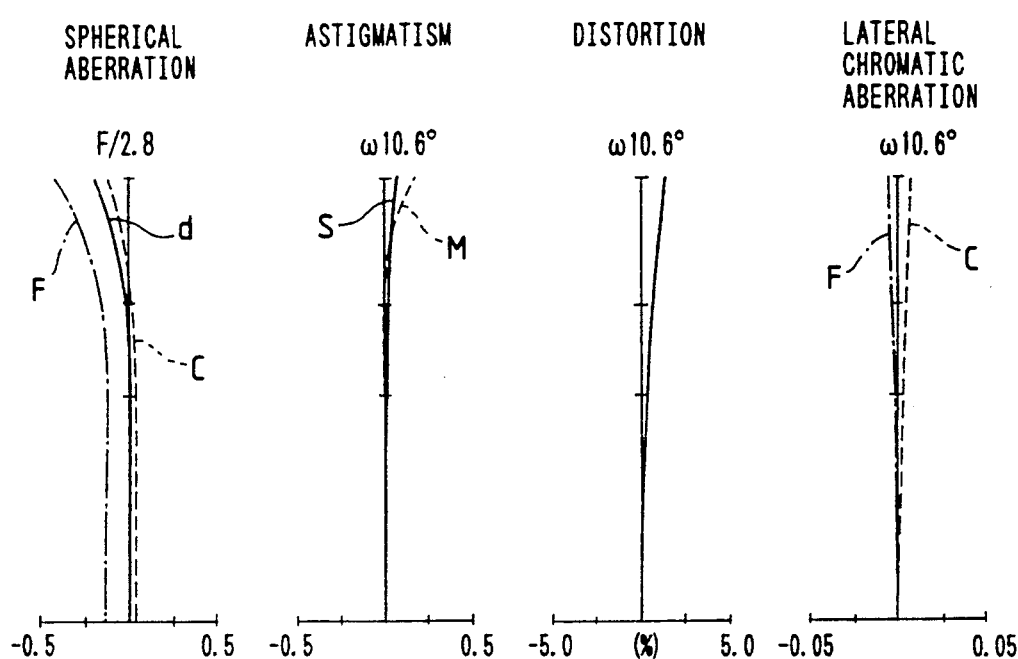
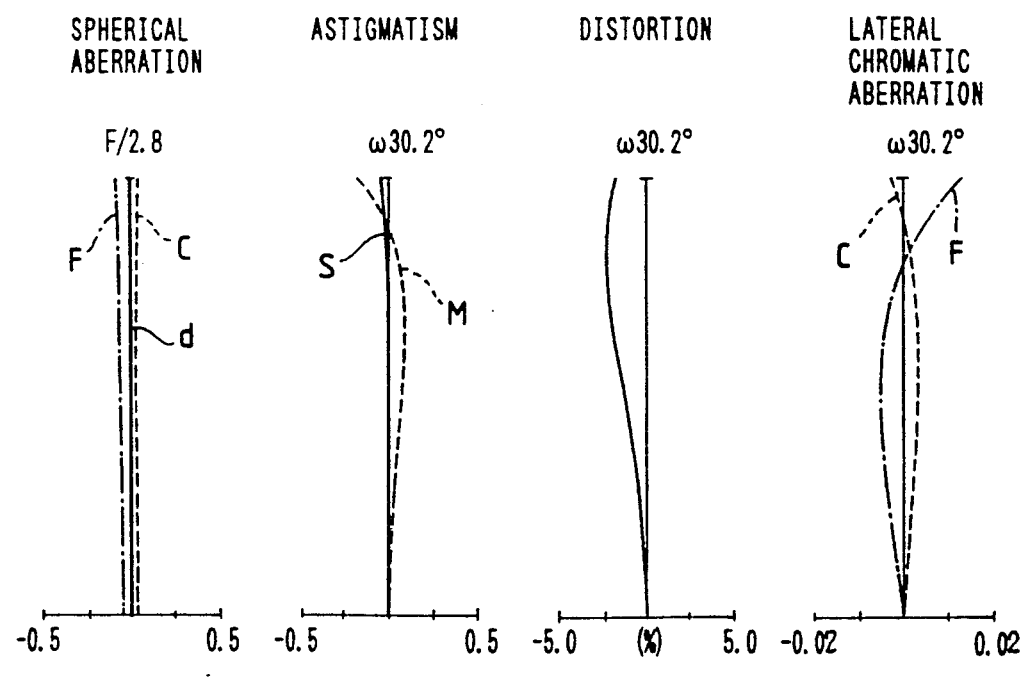

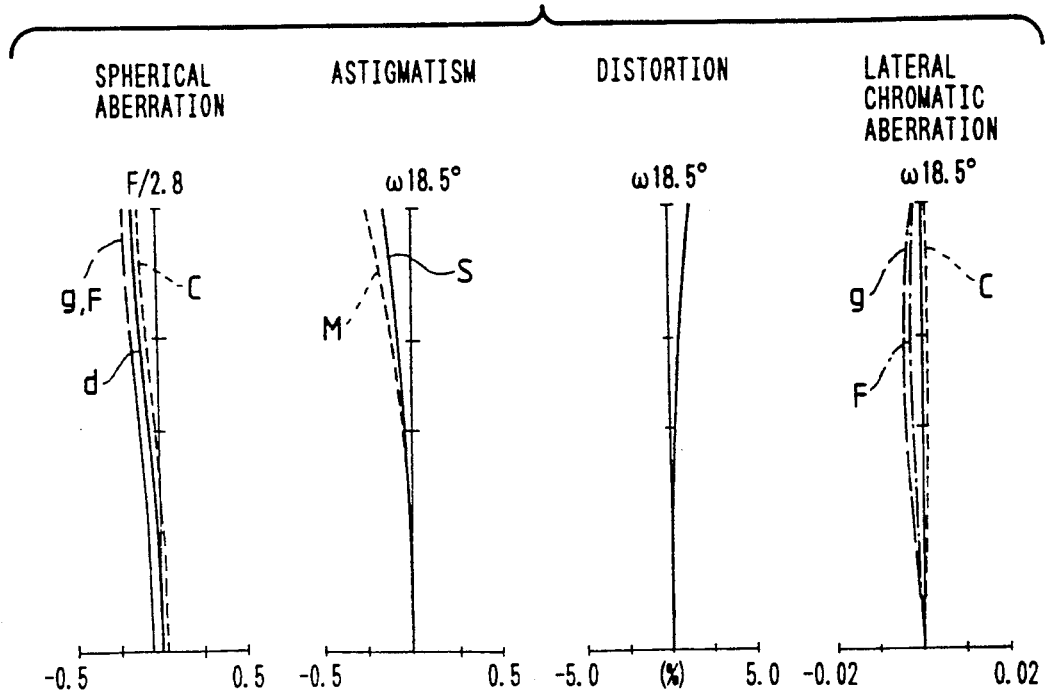
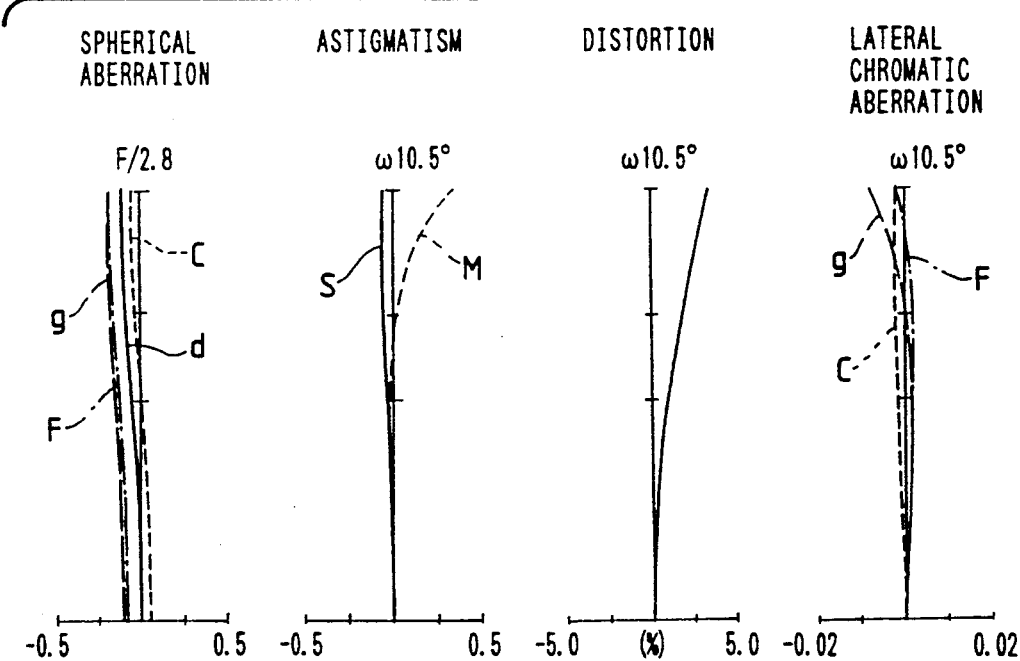

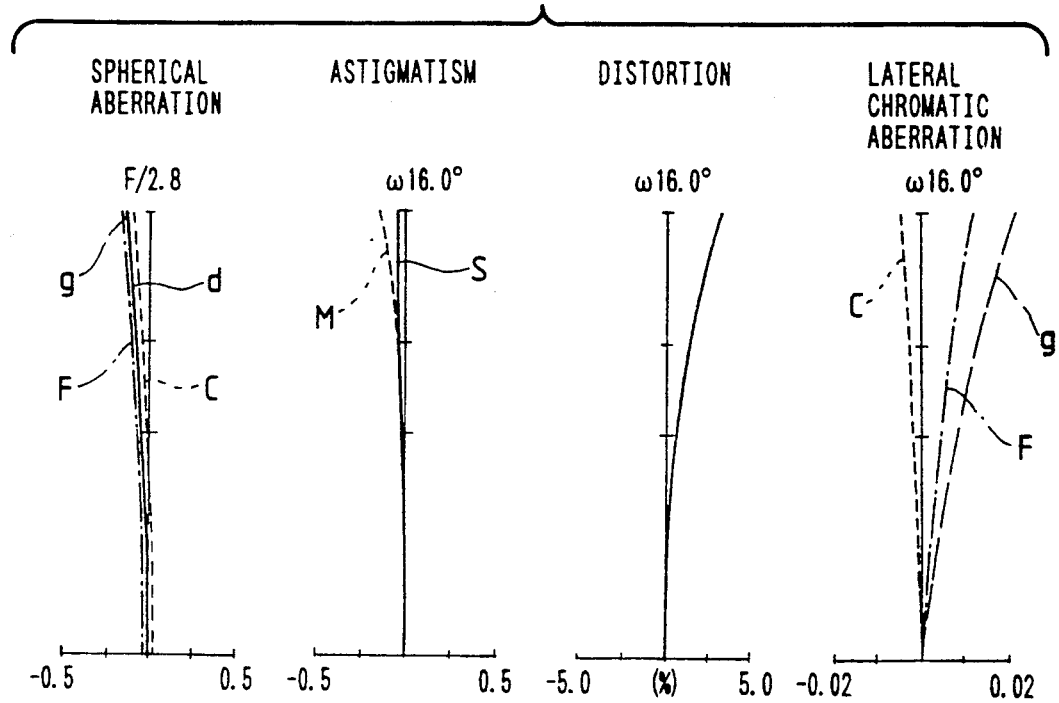
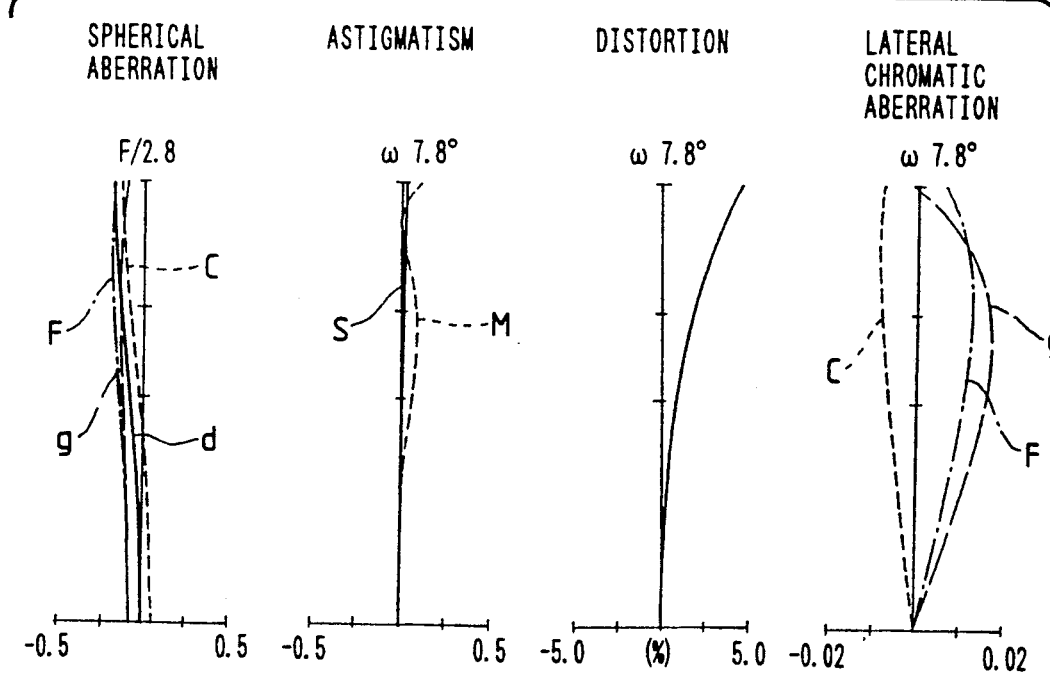

VARI-FOCAL LENS SYSTEM

BACKGROUND OF THE INVENTION a) Field of the Invention

The present invention relates to a vari-focal lens system for cameras, especially vide cameras.

b) Description of the Prior Art

The lens systems currently used with domestic video cameras are mostly designed for specifications of zooming ratios of 6 to 10 and aperture ratios of F/1.2 to F/2.0. This is because these specifications are most convenient for designing the lens systems and suited for satisfying customers' demands.

Each of these lens systems is generally composed of four lens units as exemplified by those disclosed by Japanese Patents Kokai Publication No. Sho 58-102208 and No. Sho 58-153913.

Such a vari-focal lens system is generally composed, in the order from the object side, of a first lens unit which has a positive refractive power, is kept fixed for variation of focal length and has a focusing function, a second lens unit which has a negative refractive power and is movable for variation of focal length and has a vari-focal function, a third lens unit which has a function to correct displacement of image surface caused by variation of focal length, an aperture stop, and a fourth lens unit which has a positive refractive power, is always kept fixed and has an imaging function.

This type of vari-focal lens system comprising the four lens units is suited for enhancing vari-focal ratio and enlarging aperture size. However, due to the fact that the first lens unit has the positive refractive power, the vari-focal lens system is unsuited for widening field angle and can have field angles thereof are limited to approximately 50° at maximum at the wide position thereof.

The vari-focal lens systems which are currently placed on the market and composed of four lens units have small field angles which do not permit satisfactory photography indoors. Accordingly, users of these lens systems desire vari-focal lens systems having wider field angles.

On the other hand, vari-focal lens systems each composed of two lens units are available as lens systems having wide field angles. Each of these vari-focal lens systems generally consists, in the order from the object side, of a first lens unit having a negative refractive power and a second lens unit having a positive refractive power, and is adapted so as to vary focal length thereof by moving these lens units while varying an airspace reserved therebetween.

Further, this vari-focal lens system in which the negative lens unit is arranged before the positive lens unit is suited for widening the field angle thereof, but unsuited for enhancing vari-focal ratio and enlarging aperture size thereof, and generally has a vari-focal ratio on the order of 2.

Furthermore, in the vari-focal lens system composed of the two lens units, an aperture stop is arranged in the second lens unit and generally moved together with the second lens unit for varying focal length. The aperture stop movable with the lens unit is undesirable since it complicates structure of a lens barrel and increase manufacturing cost of the lens system.

As vari-focal lens systems for video cameras which are designed for wide field angles, there are known the lens systems disclosed by Japanese Patent Kokai Publication No. Sho 63-292106 and Japanese Patent Kokoku Publication No. Hei 1-191820.

The former vari-focal lens system is composed of three lens units. Since this vari-focal lens system adopts an aperture stop which is moved together with the second lens unit, it is undesirable in that the lens barrel has a complicated structure and F number thereof is varied by variation of focal length.

The latter vari-focal lens system is composed of three lens units which are moved for varying focal length, comprises an aperture stop which is fixed between the second lens unit and the third lens unit, and has a vari-focal ratio of 2 to 3 which is not sufficiently satisfactory.

Moreover, as another example of the vari-focal lens system each consisting of three lens units, there is known the lens system proposed by Japanese Patent Kokoku Publication No. Sho 64-40913. This lens system has a vari-focal ratio a little lower than 3 which is neither sufficiently satisfactory. In addition, this vari-focal lens system has a field angle of 45° at maximum at the wide position thereof, and cannot be said as a wide field angle lens system.

As is understood from the foregoing description, the conventional vari-focal lens systems have a common defect that field angles are narrow at the wide position when vari-focal ratios are high, or vari-focal ratios are low when field angles are wide at the wide position.

SUMMARY OF THE INVENTION

A primary object of the present invention is to provide a vari-focal lens system which has a high vari-focal ratio and a wide field angle at the wide position thereof.

Another object of the present invention is to provide a vari-focal lens system which has an aperture ratio on the order of F/2 to 4, a field angle on the order of 60° to 70° at the wide position thereof and a vari-focal ratio on the order of 3 to 5.

A further object of the present invention is to provide a vari-focal lens system which uses an aperture stop kept stationary for variation of focal length and has an F number remaining unchanged by variation of focal length.

A still further object of the present invention is to provide a vari-focal lens system suited for use with video cameras.

The vari-focal lens system according to the present invention comprises, in the order from the object side, a first lens unit having a negative refractive power, a second lens unit, a third lens unit and a fourth lens unit which have positive refractive powers respectively, and an aperture stop arranged on the image side of said third lens unit.

In one design mode of the vari-focal lens system according to the present invention, at least one of the lens elements composing said vari-focal lens system is designed as a graded refractive index lens which has a refractive index distribution in the direction perpendicular to the optical axis (the so-called radial GRIN lens).

In another design mode of the vari-focal lens system according to the present invention, at least one of the lens elements composing said vari-focal lens system is designed as graded refractive index lens which has a refractive index distribution in the direction along the optical axis (the so-called axial GRIN lens).

In a third design mode of the vari-focal lens system according to the present invention, the first lens unit, the fourth lens unit and the aperture stop are kept stationary on the optical axis for variation of focal length.

In a forth design mode of the vari-focal lens system according to the present invention, at least one of the lens elements composing said vari-focal lens system is designed as an aspherical lens element.

The other features and advantages of the present invention will be apparent from the following detailed description and the embodiments shown in the accompanying drawings.

First, description will be made on the first design mode wherein at least one radial GRIN lens element is used in the vari-focal lens system according to the present invention.

The graded refractive index lens element having the refractive index distribution in the direction perpendicular to the optical axis is referred to as a radial GRIN lens element and has a refractive index distribution expressed by the following formula (i):

$$N(h) = N_0 + N_1 h^2 + N_2 h^4 + N_3 h^6 + \ldots \quad (i)$$

wherein the reference symbol $N_0$ represents the refractive index of the lens element as measured on the optical axis thereof, the reference symbol h designates the distance as measured from the optical axis to the lens portion of interest in the radial direction, the reference symbol $N(h)$ denotes the refractive index of the lens element as measured at a point located at the radial distance of h from the optical axis, and the reference symbols $N_1$, $N_2$, $N_3$, ... represent the refractive index distribution constants of the second, fourth, sixth, ... orders.

The radial GRIN lens element has a refractive power of the medium thereof, can have a radius of curvature which is larger or smaller than that of a homogenous lens element having the same refractive power as that of the radial GRIN lens element, and permits correcting aberrations by utilizing the radius of curvature. Further, the radial GRIN lens element is usable for correcting chromatic aberration by itself when it is designed so as to have refractive indices which are different dependently on wavelengths.

Since the vari-focal lens system according to the present invention comprises the negative lens unit at the foremost position, variation of the focal length thereof is performed by moving the second lens unit and the third lens unit which have the positive refractive powers. Therefore, a high vari-focal ratio can be obtained by moving the second lens unit and the third lens unit for a long distance but, in such a case, the vari-focal lens system as a whole will have a long total length. In order to obtain a high vari-focal ratio while moving the said lens units for a short distance, it will sufficient to strengthen the refractive powers of the second lens unit and the third lens unit. In such a case, however, these lens units will produce remarkable aberrations, which cannot be corrected without increasing the number of the lens elements composing the vari-focal lens system, thereby making it impossible to obtain the high vari-focal ratio after all.

The radial GRIN lens element has the refractive power of the medium thereof as described above. When a positive lens element has a refractive index distribution wherein the medius thereof has a positive refractive power, for example, it has a total refractive power stronger than that of a homogenous lens element having the same radius of curvature as that of the radial GRIN lens element.

By adopting the composition described above and using the radial GRIN lens element, the present invention has succeeded in providing a vari-focal lens system accomplishing the above-mentioned objects. It is especially desirable to use the radial GRIN lens element in the second lens unit or the third lens unit. In order to obtain a high vari-focal ratio while maintaining the total length of the vari-focal lens system within an adequate range, it is desirable to use at least one radial GRIN lens element satisfying the following condition (1) in the second lens unit or the third lens unit:

$$-1.0 < N_{1p} f_w^2 < 0 \quad (2)$$

wherein the reference symbol $N_{1p}$ represents the distribution coefficient of the second order for the d-line of the radial GRIN lens element used in the second lens unit or the third lens unit, and the reference symbol $f_w$ designates the focal length of the vari-focal lens system as a whole at the wide position thereof.

If the lower limit of the condition (1) is exceeded, the medium of the radial GRIN lens element will produce too large an influence and the offaxial aberrations will undesirably be aggravated especially at the tele position. If the upper limit of the condition (1) is exceeded, in contrast, the refractive power of surface will be too strong for obtaining the positive refractive power required for the above-mentioned radial GRIN lens element and produce too remarkable aberrations, thereby making it impossible to correct the aberrations favorably in the vari-focal lens system as a whole while maintaining a high vari-focal ratio.

Since the vari-focal lens system according to the present invention comprises a large number of lens units which have strong refractive powers and arranged on the image side, spherical aberration is undercorrected over the entire range from the wide position to the tele position. This is mainly due to the influence produced by the fourth lens unit which largely refracts especially the marginal ray. Therefore, it is possible to favorably correct the spherical aberration over the entire range from the wide position to the tele position by adopting at least one radial GRIN lens element in the fourth lens unit so as to cancel the undercorrected spherical aberration with the positive spherical aberration to be produced by the correcting terms of the refractive index distribution of the medium or the surface of said GRIN lens element. For this purpose, it is desirable to design the radial GRIN lens element to be adopted in the fourth lens unit so as to satisfy the following condition (2):

$$|N_{1(4)}| f_w^2 < 1.0 \quad (2)$$

wherein the reference symbol $N_{1(4)}$ represents the value of the distribution coefficient of the second order $N_1$ for the d-line of the radial GRIN lens element adopted in the fourth lens unit.

If the lower limit of the condition (2) is exceeded, it will be impossible to correct the spherical aberration over the entire range from the wide position to the tele position.

Further, since the vari-focal lens system according to the present invention has a wide field angle which is at least 60° at the wide position, negative distortion is produced especially at the wide position. This distortion is produced mainly by the first lens unit having the negative refractive power. In order to correct this distortion, it is sufficient to strengthen positive refractive power or weaken negative refractive power in the first lens unit. In such a case, however, the negative refractive power of the first lens unit is weakened, thereby making it impossible to obtain a sufficiently wide field angle at the wide position. It is effective for correcting the distortion to use a radial GRIN lens element in the first lens unit.

It is generally desirable for a vari-focal lens system that the total length, location of aperture stop and F number of the lens system are not changed by varying the focal length of the lens system, though it is difficult in such a case to correct aberrations in the lens system.

In order to obtain a wide field angle, the vari-focal lens system according to the present invention is designed on the basis of the fundamental composition of the conventional vari-focal lens system composed of two negative and positive lens units, i.e., by using the first lens unit having the negative refractive power and the second through the fourth lens units having as a whole a positive refractive power.

Generally speaking, vari-focal lens systems having total lengths unvaried by variation of focal lengths thereof facilitate vari-focal operations and are practically attracting more demands.

Further, in lens systems for video cameras, aperture stops are driven by motors through stop driving mechanisms which are heavier than those for photographic cameras. Accordingly, it is desirable that the aperture stops are not moved for variation of focal length.

In order to satisfy all the requirements in such a vari-focal lens system composed of four lens units as that according to the present invention, it is therefore desirable that the first lens unit, the aperture stop and the fourth lens unit are always kept fixed regardless of variation of focal length.

In order to keep the first lens unit in a lens system composed of four lens units, it is sufficient to design the system composed of the second lens unit through the fourth lens unit as a relay system which maintains a constant distance between the virtual image formed by the first lens unit taken as an object point and the image point of said system. Further, in order to obtain a high vari-focal ratio with the aperture stop and the fourth lens unit kept fixed respectively, it is necessary to move the second lens unit and the third lens unit for variation of focal length, and to impart strongly positive refractive powers to these lens units.

In the lens system having the composition described above, the imaging magnification of the system composed of the second lens unit through the fourth lens unit has a small absolute value at the wide position and a large absolute value at the tele position. Therefore, the principal point of the system composed of the second lens unit through the fourth lens unit is shifted forward as the vari-focal lens system is zoomed from the wide position to the tele position thereof. However, since the aperture stop is fixed in the system composed of the second lens unit through the fourth lens unit, the aperture stop is apart farther from the principal point of said system as the vari-focal lens system is zoomed from the wide position to the tele position. As a result, the entrance pupil is farther from the vari-focal lens system at the tele position thereof, whereby the offaxial rays become higher and the offaxial aberrations can hardly be correctable at the tele position. Furthermore, when the vari-focal lens system has a constant F number, the incident light bundle is thicker at the tele position than that at the wide position, thereby making it also difficult to correct the axial aberrations. In order to obtain a high vari-focal ratio in a vari-focal lens system having such a composition as that of the lens system according to the present invention without locating the entrance pupil for from the lens system at the tele position thereof, i.e., without aggravating the aberrations at the tele position, it is required to strengthen the refractive powers of the second lens unit and the third lens unit or prolong the displacement distance of these lens units. When the displacement distance of these lens unit for variation of focal length is prolonged, however, the entrance pupil becomes farther from the lens system at the tele position thereof. When the refractive powers of the lens units are strengthened, in contrast, the aberrations are produced in larger amounts and cannot be corrected without increasing the number of the lens elements composing the vari-focal lens system. Increase in the number of the lens elements will thicken the second lens unit and the third lens unit, thereby locating the entrance pupil farther at the tele position and making it difficult to correct the aberrations.

On the other band, a vari-focal lens system having a total length, a location of aperture stop and an F number which are varied by variation of focal length may be desired in certain fields of application. Such variable total length, location of aperture stop, F number, etc. enhance flexibility for lens design and make it easy to design a lens system which can accomplish the objects of the present invention.

In case of a lens system for video cameras, however, it is desirable to keep an aperture stop fixed since it is heavy as described above.

Whether or not the total length and F number of the lens system are variable, it is desirable, for correcting the aberrations more favorably with the aperture stop kept fixed, to design the lens system so as to satisfy the following conditions (3) and (4):

$$-0.6 < \beta < -0.2 \tag{3}$$

$$0 < f_w/f_4 < 0.5 \tag{4}$$

wherein the reference symbol $\beta$ represents the imaging magnification of the system composed of the second lens unit, the third lens unit and the fourth lens unit, the reference symbol $f_w$ designates the focal length of the vari-focal lens system as a whole at the wide position thereof, and the reference symbol $f_4$ denotes the focal length of the fourth lens unit.

If the lower limit of the condition (3) is exceeded, the imaging magnification of the system composed of the second lens unit through the fourth lens unit will be negative and has a large value at the tele position, whereby the principal point of this system is shifted toward the object point. Accordingly, the entrance pupil will be too far and the offaxial aberrations will be aggravated at the tele position.

If the upper limit of the condition (3) is exceeded, the negative refractive power of the first lens unit will be strengthened, thereby making it impossible to correct the aberrations produced by the first lens unit, especially the negative distortion at the wide position.

The condition (4) defines the refractive power of the fourth lens unit. If the lower limit of the condition (4) is exceeded, the marginal ray will be too high on the second lens unit and the third lens unit, thereby making it difficult to correct aberrations at the tele position. If the upper limit of the condition (4) is exceeded, the fourth lens unit will have too strong a refractive power and produce remarkable aberrations which can hardly be corrected.

When the above-mentioned condition (3) is satisfied, the first lens unit has strongly negative power and produces remarkable offaxial aberrations, especially negative distortion at the wide position. In order to prevent the aberrations from being aggravated as described above, it is effective to design at least one of the surfaces in the first lens unit as an aspherical surface which has negative refractive power weakened as the portions thereof are farther from the optical axis.

When the intersection between the aspherical surface and the optical axis is taken as the origin, the optical axis is taken as the x axis, and the direction perpendicular to the optical axis is taken as the y axis, the shape of this aspherical surface is expressed by the following formula (ii):

$$x = \frac{y^2/r}{1 + \sqrt{1 - p(y/r)^2}} + \sum_{i=2}^{n} A_{2i} y^{2i} \qquad (ii)$$

wherein the reference symbol $r$ represents the radius of curvature on the aspherical surface in contact with the aspherical surface on the optical axis (reference sphere), the reference symbol $p$ designates the conical constant and the reference symbol $A_{2i}$ denotes the aspherical surface coefficient.

It is desirable that the aspherical surface to be used in the first lens unit satisfies the following condition (5):

$$\Sigma |\Delta x_1|/h < 0.4 \quad (y = y_{EC}) \qquad (5)$$

wherein the reference symbol $\Delta x_1$ represents the departure of the aspherical surface from the reference sphere as measured along the optical axis, the reference symbol $h$ designates the maximum image height, the reference symbol $y$ denotes the height of the surface portion of interest as measured from the optical axis and the reference symbol $y_{EC}$ represents the height, as measured on the aspherical surface, of the principal ray having the maximum field angle at the wide position. Further, $\Sigma |\Delta x_1|$ means the total sum of the absolute values of $\Delta x_1$'s of all aspherical surfaces used in the first lens units.

If the condition (5) is not satisfied, distortion will be overcorrected and coma will undesirably be increased.

Further, in order to arrange an optical member such as an optical low pass filter between the final surface and the image surface of the vari-focal lens system according to the present invention, it is required to design the lens system so as to have a sufficiently long back focal length. For this reason, it is desirable to locate the rear principal point of the vari-focal lens system as a whole at a position as close to the image surface as possible.

In the vari-focal lens system according to the present invention, the lens component arranged right after the aperture stop is designed as a meniscus lens component concave toward the object side so as to reserve a sufficiently long back focal length of the lens system while maintaining the influence on the offaxial aberrations at a low level. In addition, this meniscus lens component may be a cemented doublet which has a meniscus shape as a whole.

It is desirable to design this meniscus lens component so as to satisfy the following condition (6):

$$0.1 < r_a/r_b < 2.0 \qquad (6)$$

wherein the reference symbols $r_a$ and $r_b$ represent the radii of curvature on the most object side surface and the most image side surface of said meniscus lens component.

If the upper limit of the condition (6) is exceeded, the most object side surface of said meniscus lens component will not refract the axial ray outward and the rear principal point of the vari-focal lens system is shifted toward the object side, thereby making it impossible to obtain a sufficiently long back focal length. If the lower limit of the condition (6) is exceeded, in contrast, the symmetry of the lens surfaces with regard to the aperture stop will be degraded, the offaxial aberrations will be aggravated and the spherical aberration will be undercorrected.

In the next place, description will be made on the second design mode wherein the vari-focal lens system according to the present invention comprises at least one axial GRIN lens element.

Since an axial GRIN lens element has a refractive index distribution in the direction along the optical axis, its refractive index varies in the radial direction on the surface thereof when it has a curvature. By selecting an adequate refractive index distribution, it is therefore possible to diversify the behaviors of the rays passing through an axial GRIN lens element as compared with those of the rays passing through a homogenous lens element and correct various types of aberrations with the axial GRIN lens element.

Out of graded refractive index lens elements, the axial GRIN lens element is more advantageous in that it can be manufactured more easily than the radial GRIN lens element. Further, the axial GRIN lens element can have a larger diameter in practical manufacturing than the radial GRIN lens element and is effectively usable at a location at which rays are high.

The present invention has selected the above-described composition in order to obtain a vari-focal lens system which has a wide field angle and a high vari-focal ratio. Speaking concretely, the negative refractive power is imparted to the first lens unit for obtaining wide field angle, and the refractive powers of the first, second, third and fourth lens units are strengthened, for obtaining a high vari-focal ratio. However aberrations are aggravated by imparting the strong refractive powers to the first through the fourth lens units. In order to correct these aberrations, it is effective to use an axial GRIN lens element. By using an axial GRIN lens element in a lens system it is possible to refract rays in more directions on a surface thereof having a refractive index distribution than on a surface of the homogenous lens element, and enhance aberration correcting capability of the lens system. Owing to this enhancement in the aberration correcting capability, the axial GRIN lens element serves to lessen the shares of the aberration correcting burden on the other lens elements, and therefore permits obtaining a lens system which has a wide field angle and a high vari-focal ratio.

When a point located at a certain distance of $x_0$ as measured from the vertex of the axial GRIN lens element along the optical axis is taken as a standard point, the axial GRIN lens element has a refractive index distribution toward the object side or the image side which is expressed by the following formula (iii) or (iv):

$$\left.\begin{array}{l} N(x) = N_0 \; (x \leq x_0) \\ N(x) = N_0 + N_1(x - x_0) + N_2(x - x_0)^2 + \\ \qquad N_3(x - x_0)^3 + \ldots (x \geq x_0) \end{array}\right\} \quad \text{(iii)}$$

$$\left.\begin{array}{l} N(x) = N_0 \; (x \geq x_0) \\ N(x) = N_0 + N_1(x - x_0) + N_2(x - x_0)^2 + \\ \qquad N_3(x - x_0)^3 + \ldots (x \leq x_0) \end{array}\right\} \quad \text{(iv)}$$

wherein the reference symbol $N_0$ represents the refractive index as measured at the standard point, the reference symbols $N_1, N_2, N_3, \ldots$ designate the refractive index distribution coefficients of the first order, the second order, the third order, ..., and the reference symbol x denotes the distance as measured from the vertex to the point of interest in the direction along the optical axis.

The above-mentioned formula (iii) applies to a case where the refractive index is distributed from the standard point toward the image side, whereas the formula (iv) applies to another case where refractive index is distributed from the standard point toward the object side.

Another means usable for accomplishing the objects of the present invention is an aspherical surface which has an aberration correcting capability similar to that of the axial GRIN lens element.

An aspherical surface has an aberration correcting capability which is similar to that of the axial GRIN lens element.

The axial GRIN lens element has a temperature stability higher than that of the plastic aspherical lens elements which are currently used widely, i.e., has lens characteristics hardly varied by temperature variation, can have a large diameter, does not require an expensive molding die unlike the aspherical lens elements, and is suited for production in a small quantity.

Now, description will be made on the vari-focal lens system according to the present invention in the design mode comprising axial GRIN lens component.

When at least one axial GRIN lens component is to be used in the first lens unit of the vari-focal lens system according to the present invention, it is possible to effectively correct aberrations by selecting a GRIN lens component having a surface which has negative refractive power weakened as the surface portions are farther from the optical axis. In order to allow the vari-focal lens system to have a large field angle, the first lens unit must have a strongly negative refractive power, which produce distortion especially at the wide position of the vari-focal lens system. In order to correct this distortion, it is preferable to use an axial GRIN lens component.

Since the offaxial ray is high on the first lens unit especially at the wide position, the first lens unit must have a large diameter. It is therefor effective to use, in the first lens unit, an axial GRIN lens component which can easily be manufactured.

It is desirable that the axial GRIN lens component to be used in the first lens unit satisfies the following condition (7):

$$|N_{1(1)} f_w| < 0.1 \quad (7)$$

wherein the reference symbol $N_{1(1)}$ represents the distribution coefficient of the first order for the d-line of the axial GRIN lens component to be used in the first lens unit, and the reference symbol $f_w$ designates the focal length of the vari-focal lens system as a whole at the wide position thereof.

The distribution coefficient of the first order $N_1$ has a close relation to determination of a profile of refractive index distribution and the aberrations to be produced by the axial GRIN lens component are largely varied dependently on the value of $N_1$. An axial GRIN lens component used in the first lens unit is effective for correcting distortion. When $N_1$ has a value exceeding the range defined by the condition (7), distortion will be unbalanced with the other aberrations or overcorrected and coma will undesirably be increased.

Further, when an attempt is made to reduce the F number of the vari-focal lens system according to the present invention, the second and third lens units produce spherical aberration. In order to correct this spherical aberration, it is desirable to use an axial GRIN lens component having a surface whose positive refractive power is weakened as the surface portions are farther from the optical axis. Speaking more concretely, it is desirable to use at least one axial GRIN lens component satisfying the condition (8) shown below as a positive lens component arranged in the second lens unit or the third lens unit. Further, since the offaxial rays are high in these lens units at the tele position and these lens units must have large diameters, it is effective to use an axial GRIN lens element which can easily be manufactured even when it has a large diameter. From this viewpoint also, it is desirable to arrange an axial GRIN lens component satisfying the following condition (8) in either of the second lens unit or the third lens unit:

$$|N_{2(23)} f_w| < 0.5$$

wherein the reference symbol $N_{1(23)}$ represents the distribution coefficient of the first order for the d-line of the axial GRIN lens component used in the second lens unit or the third lens unit.

The condition (8) defines, like the condition (5), the distribution coefficient $N_1$ and is required for correcting aberrations. If $N_1$ has a value large enough to allow the upper limit of the condition (8) to be exceeded, spherical aberration will undesirably be over-corrected.

Further, it is effective for correcting spherical aberration and coma to use an axial GRIN lens component satisfying the following condition (9) in the fourth lens unit:

$$|N_{1(4)} f_w| < 1.0 \quad (9)$$

wherein the reference symbol $N_{1(4)}$ represents the distribution coefficient of the first order of the axial GRIN lens component to be used in the fourth lens unit.

If the condition (9) is not satisfied, spherical aberration will be overcorrected at the wide position and the tele position, and the axial GRIN lens component will have too large a difference in refractive index, whereby the spherical aberration will be unbalanced with the other aberrations and especially coma will undesirably be increased.

Then, description will be made on the third design mode of the vari-focal lens system according to the present invention wherein at least one aspherical surface is used in any one of the lens units.

When aspherical surface is to be arranged in the first lens unit, it is possible to correct aberrations by using at least one aspherical surface which has such a shape as to lower negative refractive index as the surface portions are farther from the optical axis.

In order to design the vari-focal lens system so as to have a wide field angle, it is necessary to strengthen the negative refractive power of the first lens unit. When the strengthening of the negative refractive power of the first lens unit is apt to produce the offaxial aberrations, especially distortion at the wide position. In order to correct these aberrations, it is effective to use the aspherical surface described above. It is desirable to design this aspherical surface so as to satisfy the following condition (10):

$$\Sigma|\Delta x_1|/h<0.4 \quad (y=y_{EC}) \tag{10}$$

wherein the reference $\Delta x_1$ represents the departure of the aspherical surface from the reference sphere thereof, the reference symbol h designates the maximum image height, the reference symbol y denotes the height as measured from the optical axis to a surface portion of interest and the reference symbol $y_{EC}$ represents the height, as measured on the aspherical surface, of the principal ray having the maximum field angle.

The condition (10) defines the departure of the aspherical surface from the reference sphere thereof on which variations of aberrations are largely dependent.

Use of the aspherical surface in the first lens unit is effective for correcting distortion. If the condition (10) is not satisfied, distortion will be over-corrected and coma will undesirably be increased.

When an attempt is made to reduce the F number of the vari-focal lens system according to the present invention, spherical aberration is produced in the second lens unit and/or the third lens unit at the tele position of the lens system. In order to correct this spherical aberration, it is desirable to use, in at least either of these lens units, an aspherical surface having positive refractive power which is weakened as the surface portions are farther from the optical axis.

It is desirable that the aspherical surface to be used in the second lens unit or the third lens unit satisfies the following condition (11):

$$\Sigma|\Delta x_{23}|/h<0.05 \quad (y=y_{EC}) \tag{11}$$

wherein the reference symbol $\Delta x_{23}$ represents the departure of said aspherical surface from the reference sphere thereof, the reference symbol h designates the maximum image height, the reference symbol y denotes the height as measured from the optical axis to the surface portion of interest and the reference symbol $y_{EC}$ represents the height, as measured on said aspherical surface, of the principal ray having the maximum field angle at the wide position.

The condition (11) defines the departure of the aspherical surface used in the first lens unit or the third lens unit from the reference sphere thereof. If the upper limit of the condition (11) is exceeded, spherical aberration will be overcorrected.

Further, it is effective for correcting spherical aberration and coma to use an aspherical surface satisfying the condition (12) shown below in the fourth lens unit. It is desirable that the aspherical surface to be used in the fourth lens unit has such a shape as to weaken positive refractive power as the surface portions are farther from the optical axis:

$$\Sigma|\Delta x_4|/h<0.1 \quad (y=y_{EC}') \tag{12}$$

wherein the reference symbol $\Delta x_4$ represents the departure of said aspherical surface from the reference sphere thereof, the reference symbol h designates the maximum image height, the reference symbol y denotes the height as measured from the optical axis to the surface portion of interest and the reference symbol $y_{EC}'$ represents the height of the axial marginal ray as measured on the aspherical surface.

The condition (12) defines the departure of the aspherical surface to be used in the fourth lens unit from the reference sphere thereof. If the condition (12) is not satisfied, spherical aberration will be overcorrected over the entire range from the wide position to the tele position and said departure will be too large, thereby unbalancing the aberrations other than spherical surface and especially increasing coma undesirably.

Since the axial GRIN lens component has the function which is similar to that of the aspherical surface, it is possible to replace them with each other within a certain limited range. However, it is practically necessary to use them in separate ways respectively taking into consideration the manufacturing characteristics thereof. When a lens component is to have a large diameter, for example, it is more convenient to select an axial GRIN lens component which can be manufactured simply by polishing a spherical surface than an aspherical lens component which requires delicate technique for shaping the surface thereof. When a large difference in refractive index is required for an axial GRIN lens component, in contrast, it is more convenient to use an aspherical lens component.

Even for the vari-focal lens system described above which is composed of four negative, positive, positive and positive lens units, and has favorable optical performance or aberrations corrected by using at least one axial GRIN lens component or aspherical surface, it is difficult to fix total length, location of the aperture stop and F number of the vari-focal lens system. When the location of the aperture stop is fixed, it is desirable even for the vari-focal lens system according to the present invention to satisfy the conditions (3) and (4) which have already been mentioned above and shown below once again:

$$-0.6<\beta<-0.2 \tag{3}$$

$$0<f_w/f_4<0.5 \tag{4}$$

Further, in order to prolong back focal length of the vari-focal lens system, it is desirable to design the lens component arranged after the aperture stop so as to have a meniscus shape concave toward the aperture stop. In addition, it is desirable to design this meniscus lens component so as to satisfy the condition (6) which has been mentioned above and shown below once again:

$$0.1 < r_a/r_b < 2.0 \quad (6)$$

The vari-focal lens system according to the present invention which is composed of the four lens units and comprises at least one radial GRIN lens component, axial GRIN lens component or aspherical surface can be focused by displacing the lens system as a whole or only the first lens unit. Further, the vari-focal lens system can also be focused by displacing the fourth lens unit or some of the lens components arranged in the fourth lens unit.

The focusing mode to displace the first lens unit has a feature that displacement distance for focusing remains unchanged by variation of focal length. However, this focusing mode has defects that the lens unit to be displaced for focusing is heavy and that rays are vignetted by displacement of the lens unit.

The focusing mode to displace the fourth lens unit has a feature that the lens unit or the lens component to be displaced for focusing is light or load for focusing is light. Accordingly, the focusing mode to displace the fourth lens unit is effective for accelerating focusing speed when an autofocus mechanism is to be used in combination with the vari-focal lens system.

An F number (aperture ratio) of a vari-focal lens system is generally changed by displacing a lens unit arranged after an aperture stop for varying focal length of the lens system. Though the F number can be kept constant by varying diameter of the aperture stop along with variation of focal length, such a measure will require a mechanism for varying the diameter of the aperture stop and result in enhancement of manufacturing cost.

Further, in order to keep a total length of a vari-focal lens system unchanged by variation of focal length, it is necessary to keep the first lens unit fixed.

In order to keep unchanged the total length, the diameter of the aperture stop and the F number of the vari-focal lens system composed of the four lens units, it is sufficient to arrange the aperture stop after the third lens unit, and fix the first lens unit, the fourth lens unit and the aperture stop.

In order to obtain a wide field angle, the vari-focal lens system according to the present invention is designed on the basis of the fundamental composition comprising two negative and positive lens units as already described above and illustrated in FIG. 114. Speaking concretely of the vari-focal lens system composed of the four lens units, the first lens unit has the negative refractive power, whereas the second through the fourth lens units (II, III and IV) have a positive refractive power as a whole. In order to fix the first lens unit (I) in this lens system, it is sufficient to design the second through the fourth lens units so as to relay a virtual image I for a constant distance as measured from the virtual image I to an image I' thereof. Further, since the second through the fourth lens units have the positive refractive power as a whole, it is desirable, for fixing the fourth lens unit and obtain a high vari-focal effect while maintaining the strongly positive refractive power of the second through the fourth lens units, to impart positive refractive powers to the second lens unit and the third lens unit respectively.

Since the absolute value of the imaging magnification of the system composed of the second through the fourth lens units is small at the wide position but large at the tele position as is seen from FIG. 114, the principal point of the system composed of the second through the fourth lens units is shifted forward as the vari-focal lens system is zoomed from the wide position to the tele position. When the aperture stop is fixed at a location close to the fourth lens unit in the lens system as described above, the aperture stop is apart far backward from the principal point of the system composed of the second through the fourth lens units at the tele position. Since such a lens system has an entrance pupil located far therefrom at the tele position, it will be difficult to correct aberrations at the tele position. In addition, the principal point of the system composed of the second through the fourth lens units is shifted forward, whereby fixing F number of the lens system will enhance height of the marginal ray at the tele position and make it difficult to correct aberrations at the tele position.

In order to correct these aberrations, it is necessary to design vari-focal lens system so as to satisfy the following conditions (13) and (14):

$$-0.6 < \beta_{234} < -0.2 \quad (13)$$

$$-0.1 < f_w/f_4 < 0.5 \quad (14)$$

wherein the reference symbol $\beta_{234}$ represents the magnification of the system composed of the second through the fourth lens units at the wide position, the reference symbol $f_w$ designates the focal length of the vari-focal lens system as a whole and the reference symbol $f_4$ denotes the focal length of the fourth lens unit.

If the lower limit of the condition (13) is exceeded, the system composed of the second through the fourth lens unit will have a negative value which is large in absolute, thereby shifting the principal point of this system forward, and the entrance pupil will be too far, thereby undesirably aggravating the offaxial aberrations at the tele position. Further, the marginal ray will be enhanced at the tele position, thereby undesirably aggravating spherical aberration and coma at the tele position.

If the upper limit of the condition (13) is exceeded, the first lens unit will have a strengthened negative refractive power and produce remarkable aberrations which can hardly be corrected.

The condition (14) defines the refractive power of the fourth lens unit.

If the lower limit of the condition (14) is exceeded, the marginal ray will be too high on the second lens unit and the third lens unit at the tele position, thereby making it difficult to correct aberrations at the tele position.

If the upper limit of the condition (14) is exceeded, the second lens unit and the third lens unit will have weakened positive refractive powers respectively, thereby lowering the vari-focal effect, and the fourth lens unit will produce aberrations in larger amounts.

Since the second lens unit and the third lens unit have high vari-focal functions in the vari-focal lens system according to the present invention, it is necessary to reduce the aberrations to be produced by these lens units. For this purpose, it is desirable to use, in the second lens unit or the third lens unit, a negative lens component satisfying the following condition (15):

$$\nu_n < 50$$

wherein the reference symbol $\nu_n$ represents the Abbe's number of said negative lens component.

If the condition (15) is not satisfied, chromatic aberration will be varied undesirably remarkably by variation of focal length.

When the vari-focal lens system having the composition described above is designed so as to satisfy the condition (15), the first lens unit has a strengthened negative refractive power and is apt to produce offaxial aberrations. In order to correct these offaxial aberrations, it is desirable to use, in the first lens unit, at least one aspherical surface having negative refractive power which is weakened as the surface portions are farther from the optical axis. The shape of this aspherical surface is also expressed by the formula (ii) described above.

It is desirable that the aspherical surface to be used in the first lens unit of the vari-focal lens system according to the present invention satisfies the following condition (16):

$$\Sigma |\Delta x_1|/h < 0.2 \quad (y = y_{EC}) \qquad (16)$$

wherein the reference symbol $\Delta x_1$ represents the departure of the aspherical surface from the reference sphere thereof, the reference symbol h designates the maximum image height, the reference symbol y denotes the height as measured from the optical axis to the surface portion of interest and the reference symbol $y_{EC}$ represents the height, on the aspherical surface, of the principal ray having the maximum field angle at the tele position. In addition, the reference symbol $\Sigma |\Delta x_1|$ represents the total sum of the absolute values of $\Delta x$'s of the aspherical surfaces used in the first lens unit.

If the condition (16) is not satisfied, distortion will be overcorrected and coma will undesirably be increased.

The vari-focal lens system according to the present invention can be focused, like an ordinary vari-focal lens system, by displacing only the first lens unit. Since the first lens unit has the negative refractive power in the vari-focal lens system according to the present invention, it allows less vignetting of rays and less variations of aberrations to be caused by displacing the first lens unit than a lens unit which comprises a first lens unit having a positive refractive power. This is because the rays are nearly parallel with the optical axis in the section right after they have passed through the first lens unit.

Further, the vari-focal lens system according to the present invention can be focused also by displacing the fourth lens unit or some of the lens components arranged therein. The focusing mode to displace the first lens unit has a feature that the displacement distance for focusing remains unchanged by variation of focal length, but has a defect that the lens unit to be displaced for focusing is heavy.

The focusing mode to displace the fourth lens unit has a feature that the lens unit to be displaced for focusing or the focusing load is light. This focusing mode is preferable for use with an autofocus mechanism since it permits accelerating focusing speed.

For the vari-focal lens system according to the present invention, it is desirable to determine the refractive power of the fourth lens unit within the range defined by the condition (14) as described above. It is possible, within this range, to design the fourth lens unit as a powerless lens unit. Further, it is also possible to omit the fourth lens unit in a special case.

When the fourth lens unit is omitted in the vari-focal lens system according to the present invention, the lens system comprises, in the order from the object side, the first lens unit having the negative refractive power, the second lens unit having the positive refractive power, the third lens unit having the positive refractive power and the aperture stop, and is adapted so as to perform variation of focal length by varying the airspaces reserved between the lens units with the first lens unit and the aperture stop kept fixed.

The description made above on the vari-focal lens system composed of the four lens units applies with nearly no modification to the vari-focal lens system composed of the three lens units. However, the omission of the fourth lens unit increases the heights of the marginal ray on the second lens unit and the third lens unit, thereby making it impossible to obtain a large aperture, but effective to reduce the number of lens elements composing the vari-focal lens system or manufacturing cost thereof.

It is desirable for the vari-focal lens system composed of the three lens units to satisfy the following conditions (17) and (18):

$$-0.6 < \beta_{23} < -0.2 \qquad (17)$$

$$\nu_n < 50 \qquad (18)$$

wherein the reference symbol $\beta_{23}$ represents the total imaging magnification of the second lens unit and the third lens unit, and the reference symbol $\nu_n$ designates the Abbe's number of at least one negative lens element arranged in the second lens unit or the third lens unit.

If the lower limit of the condition (17) is exceeded, the second lens unit and the third lens unit will have a total imaging magnification which is negative and has a large absolute value at the tele position, the principal point of the system composed of the second lens unit and the third lens unit will be shifted forward at the tele position, and the entrance pupil will be too far, thereby aggravating the offaxial aberrations at the tele position. Further, the marginal ray will be enhanced at the tele position, thereby undesirably aggravating spherical aberration and coma at the tele position.

If the upper limit of the condition (17) is exceeded, the first lens unit will have a strengthened negative refractive power and produce aberrations in larger amounts which cannot be corrected sufficiently.

If the condition (18) is not satisfied, chromatic aberration will undesirably be varied too remarkably.

Also in the vari-focal lens system composed of the three lens units, it is effective to use at least one aspherical surface for the reason which is quite the same as that described on the vari-focal lens system composed of the four lens units.

BRIEF DESCRIPTION OF THE DRAWINGS

FIG. 41 through FIG. 43 show curves visualizing aberartion characteristics of the Embodiment 5 of the present invention;

FIG. 50 through FIG. 52 show curves illustrating aberration characteristics of the Embodiment 8 of the present invention;

FIG. 53 through FIG. 55 show graphs illustrating aberration characteristics of the Embodiment 9 of the present invention;

FIG. 56 through FIG. 58 show curves illustrating aberration characteristics of the Embodiment 10 of the present invention;

FIG. 86 through FIG. 88 show graphs visualizing aberration characteristics of the Embodiment 20 of the present invention;

FIG. 92 through FIG. 94 show curves illustrating aberration characteristics of the Embodiment 22 of the present invention;

DETAILED DESCRIPTION OF THE PREFERRED EMBODIMENTS

Figure 1:
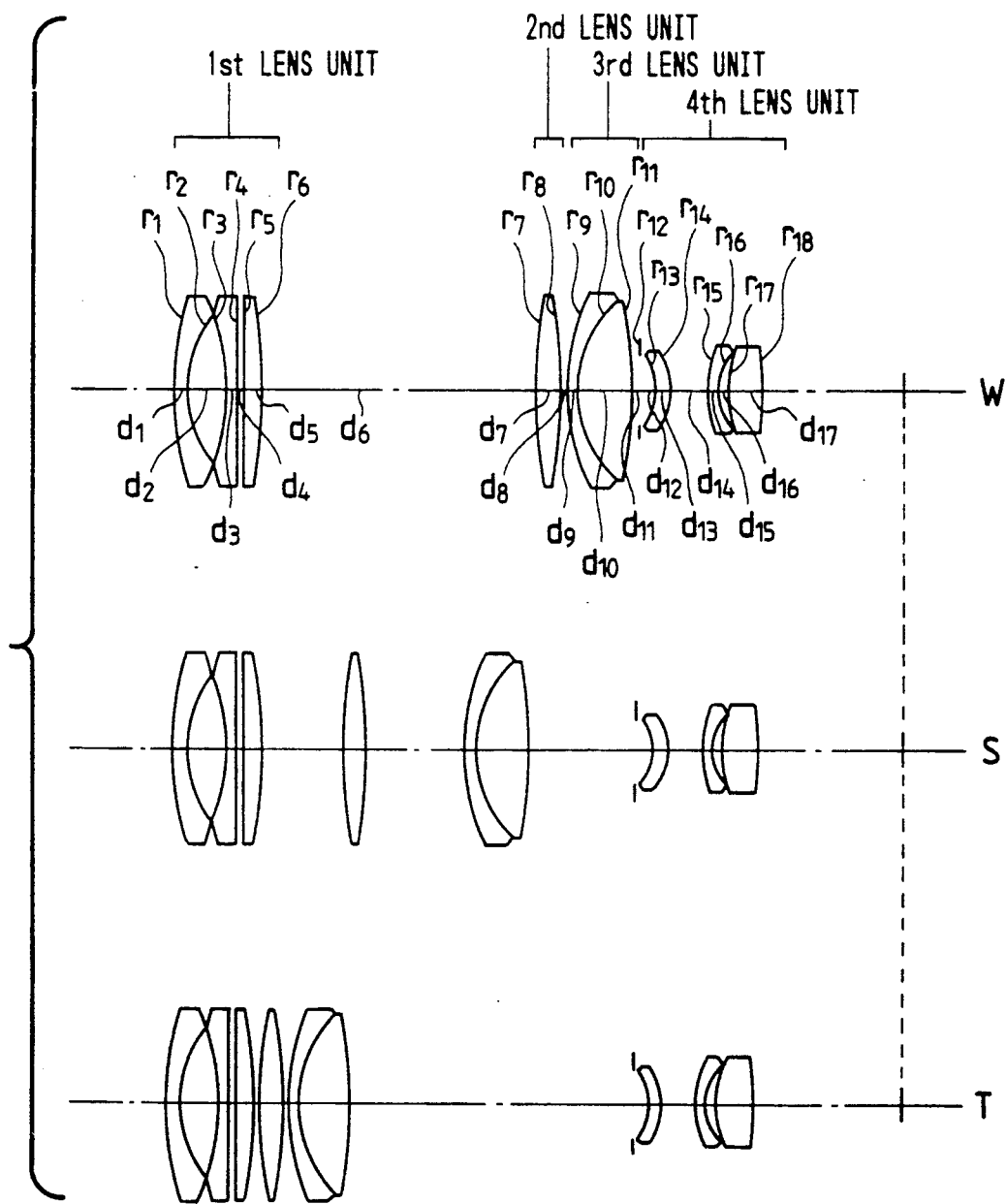
FIG. 1 through FIG. 28 show sectional views illustrating compositions of Embodiments 1 through 28 respectively of the vari-focal lens system according to the present invention.

Now, the present invention will be described more detailedly below with reference to the preferred embodiments illustrated in the accompanying drawings and given in the form of the following numerical data:

EMBODIMENT 1

$f = 7 \sim 28$ mm, F/2.8,
$2\omega = 62.1° \sim 15.5°$, maximum image height 4.0 mm $r_1 = 37.1060$
  $d_1 = 1.1017$   $n_1 = 1.69680$   $\nu_1 = 56.49$
$r_2 = 11.4099$ (aspherical surface)
  $d_2 = 3.7939$
$r_3 = -21.8892$
  $d_3 = 1.1034$   $n_2 = 1.69680$   $\nu_2 = 56.49$
$r_4 = -820.0071$
  $d_4 = 0.7349$
$r_5 = -3281.9987$
  $d_5 = 1.8017$ radial GRIN lens
$r_6 = -50.2140$
  $d_6 = D_1$ (variable)
$r_7 = 48.7137$
  $d_7 = 2.1621$   $n_4 = 1.72916$   $\nu_4 = 54.68$
$r_8 = -75.4351$
  $d_8 = D_2$ (variable)
$r_9 = 25.3157$
  $d_9 = 1.0000$   $n_5 = 1.80518$   $\nu_5 = 25.43$
$r_{10} = 12.8889$
  $d_{10} = 5.2047$   $n_6 = 1.69680$   $\nu_6 = 56.49$
$r_{11} = -57.1774$
  $d_{11} = D_3$ (variable)
$r_{12} = \infty$ (stop)
  $d_{12} = 1.6094$
$r_{13} = -5.4284$
  $d_{13} = 1.3157$   $n_7 = 1.72916$   $\nu_7 = 54.68$
$r_{14} = -6.3605$
  $d_{14} = 3.4949$
$r_{15} = 13.6586$ (aspherical surface)
  $d_{15} = 0.8002$   $n_8 = 1.78470$   $\nu_8 = 26.22$
$r_{16} = 5.9188$
  $d_{16} = 0.9758$
$r_{17} = 10.3754$
  $d_{17} = 3.5289$   $n_9 = 1.77250$   $\nu_9 = 49.66$
$r_{18} = -28.7996$ aspherical surface coefficient -continued (2nd surface)
$P = 1.0000, A_4 = -0.42810 \times 10^{-4}$
$A_6 = -0.19924 \times 10^{-6}, A_8 = -0.38654 \times 10^{-8}$
(15th surface)
$P = 1.0000, A_4 = 0.39447 \times 10^{-3}$
$A_6 = 0.55540 \times 10^{-5}, A_8 = 0.24268 \times 10^{-6}$

| f | 7 | 14 | 28 |
|---|---|----|----|
| $D_1$ | 26.678 | 8.031 | 0.504 |
| $D_2$ | 0.804 | 9.775 | 0.502 |
| $D_3$ | 0.800 | 10.477 | 27.276 | radial GRIN lens

|  | $N_0$ | $N_1$ | $N_2$ |
|---|-------|-------|-------|
| d line | 1.80518 | $-0.91875 \times 10^{-5}$ | $0.10140 \times 10^{-5}$ |
| C line | 1.79610 | $-0.98228 \times 10^{-5}$ | $0.11050 \times 10^{-5}$ |
| F line | 1.82776 | $-0.77051 \times 10^{-5}$ | $0.80173 \times 10^{-6}$ |

$\beta = -0.392, f_w/f_4 = 0.219$
$\Sigma |\Delta x|/h = 0.0265, r_a/r_b = 0.854$

EMBODIMENT 2

$f = 7 \sim 28$ mm, F/2.8,
$2\omega = 62.1° \sim 15.5°$, maximum image height 4.0 mm $r_1 = 37.1206$
$\quad d_1 = 1.1017 \quad n_1 = 1.69680 \quad \nu_1 = 56.49$
$r_2 = 11.4530$ (aspherical surface)
$\quad d_2 = 3.7890$
$r_3 = -21.1381$
$\quad d_3 = 1.1034 \quad n_2 = 1.69680 \quad \nu_2 = 56.49$
$r_4 = -789.1964$
$\quad d_4 = 0.7384$
$r_5 = -3134.7036$
$\quad d_5 = 1.8017 \quad n_3 = 1.80518 \quad \nu_3 = 25.43$
$r_6 = -49.3024$
$\quad d_6 = D_1$ (variable)
$r_7 = 48.7609$
$\quad d_7 = 2.2958$ radial GRIN lens
$r_8 = -76.4592$
$\quad d_8 = D_2$ (variable)
$r_9 = 25.6297$
$\quad d_9 = 1.0000 \quad n_5 = 1.80518 \quad \nu_5 = 25.43$
$r_{10} = 12.7260$
$\quad d_{10} = 5.2047 \quad n_6 = 1.69680 \quad \nu_6 = 56.49$
$r_{11} = -53.9610$
$\quad d_{11} = D_3$ (variable)
$r_{12} = \infty$ (stop)
$\quad d_{12} = 1.6094$
$r_{13} = -5.4462$
$\quad d_{13} = 1.3173 \quad n_7 = 1.72916 \quad \nu_7 = 54.68$
$r_{14} = -6.3375$
$\quad d_{14} = 3.4934$
$r_{15} = 14.0512$ (aspherical surface)
$\quad d_{15} = 0.8002 \quad n_8 = 1.78470 \quad \nu_8 = 26.22$
$r_{16} = 5.8979$
$\quad d_{16} = 0.9728$
$r_{17} = 10.2265$
$\quad d_{17} = 3.9445 \quad n_9 = 1.77250 \quad \nu_9 = 49.66$
$r_{18} = -29.0317$ aspherical surface coefficient
(2nd surface)
$P = 1.0000, A_4 = -0.44582 \times 10^{-4}$
$A_6 = -0.19965 \times 10^{-6}, A_8 = -0.36764 \times 10^{-8}$
(15th surface)
$P = 1.0000, A_4 = 0.39811 \times 10^{-3}$
$A_6 = 0.70555 \times 10^{-5}, A_8 = 0.63900 \times 10^{-7}$

| f | 7 | 14 | 28 |
|---|---|----|----|
| $D_1$ | 26.541 | 8.003 | 0.504 |
| $D_2$ | 0.804 | 9.720 | 0.502 |
| $D_3$ | 0.800 | 10.422 | 27.139 | radial GRIN lens

|  | $N_0$ | $N_1$ | $N_2$ |
|---|-------|-------|-------|
| d line | 1.72916 | $-0.88401 \times 10^{-4}$ | $0.62785 \times 10^{-6}$ |
| D line | 1.72510 | $-0.90943 \times 10^{-4}$ | $0.66914 \times 10^{-6}$ |
| F line | 1.73844 | $-0.82469 \times 10^{-4}$ | $0.53149 \times 10^{-6}$ |

$N_{1p} \cdot f_w^2 = -0.433 \times 10^{-2}$
$\beta = -0.396, f_w/f_4 = 0.216$
$\Sigma |\Delta x|/h = 0.0264, r_a/r_b = 0.859$

EMBODIMENT 3

$f = 7 \sim 21$ mm, F/2.8,
$2\omega = 62.0° \sim 20.8°$, maximum image height 4.0 mm $r_1 = -346.3168$ (aspherical surface)
$\quad d_1 = 1.1017 \quad n_1 = 1.69680 \quad \nu_1 = 56.49$
$r_2 = 12.5159$
$\quad d_2 = 3.7467$
$r_3 = -25.4402$
$\quad d_3 = 1.1034 \quad n_2 = 1.69680 \quad \nu_2 = 56.49$
$r_4 = 105.9417$
$\quad d_4 = 0.7617$
$r_5 = 138.5318$
$\quad d_5 = 1.8017 \quad n_3 = 1.80518 \quad \nu_3 = 25.43$
$r_6 = -31.3951$
$\quad d_6 = D_1$ (variable)
$r_7 = 43.5604$
$\quad d_7 = 2.2251 \quad n_4 = 1.72916 \quad \nu_4 = 54.68$
$r_8 = 186.1387$
$\quad d_8 = D_2$ (variable)
$r_9 = 24.6967$
$\quad d_9 = 1.0000 \quad n_5 = 1.80518 \quad \nu_5 = 25.43$
$r_{10} = 13.7953$
$\quad d_{10} = 5.2047$ radial GRIN lens
$r_{11} = -38.8991$
$\quad d_{11} = D_3$ (variable)
$r_{12} = \infty$ (stop)
$\quad d_{12} = 1.6094$
$r_{13} = -5.4704$
$\quad d_{13} = 1.3256 \quad n_7 = 1.72916 \quad \nu_7 = 54.68$
$r_{14} = -6.2248$
$\quad d_{14} = 3.5472$
$r_{15} = -982.0483$
$\quad d_{15} = 0.8002 \quad n_8 = 1.78470 \quad \nu_8 = 26.22$
$r_{16} = 10.8908$
$\quad d_{16} = 1.3173$
$r_{17} = 18.2530$
$\quad d_{17} = 1.6961 \quad n_9 = 1.77250 \quad \nu_9 = 49.66$
$r_{18} = -13.7688$ aspherical surface coefficient
$P = 1.0000, A_4 = 0.54180 \times 10^{-4}$
$A_6 = -0.12424 \times 10^{-6}, A_8 = -0.14574 \times 10^{-9}$

| f | 7 | 12 | 21 |
|---|---|----|----|
| $D_1$ | 22.384 | 4.307 | 0.536 |
| $D_2$ | 1.873 | 10.599 | 1.376 |
| $D_3$ | 0.300 | 9.652 | 22.646 | radial GRIN lens

|  | $N_0$ | $N_1$ | $N_2$ |
|---|-------|-------|-------|
| d line | 1.69680 | $-0.48643 \times 10^{-4}$ | $0.82443 \times 10^{-6}$ |
| C line | 1.69303 | $-0.62004 \times 10^{-4}$ | $0.68251 \times 10^{-6}$ |
| F line | 1.70537 | $-0.17467 \times 10^{-4}$ | $0.11556 \times 10^{-5}$ |

$N_{1p} \cdot f_w^2 = -0.238 \times 10^{-2}$
$\beta = -0.382, f_w/f_4 = 0.262$
$\Sigma |\Delta x|/h = 0.0279, r_a/r_b = 0.879$

EMBODIMENT 4

$f = 6 \sim 18$ mm, F/2.8,
$2\omega = 70.5° \sim 23.9°$, maximum image height 4.0 mm $r_1 = -89.8524$
$\quad d_1 = 1.1017 \quad n_1 = 1.69680 \quad \nu_1 = 56.49$
$r_2 = 10.7856$ (aspherical surface)
$\quad d_2 = 4.4483$
$r_3 = -4994.8129$
$\quad d_3 = 1.1034 \quad n_2 = 1.69680 \quad \nu_2 = 56.49$
$r_4 = 101.8038$ -continued $r_5 = -57.3067$
$d_4 = 1.0000$
$d_5 = 1.8017$  $n_3 = 1.80518$  $\nu_3 = 25.43$
$r_6 = -28.5793$
$d_6 = D_1$ (variable)
$r_7 = 32.7861$
$d_7 = 2.2005$  $n_4 = 1.72916$  $\nu_4 = 54.68$
$r_8 = 129.2445$
$d_8 = D_2$ (variable)
$r_9 = 23.3425$
$d_9 = 1.0000$  $n_5 = 1.80518$  $\nu_5 = 25.43$
$r_{10} = 13.0179$
$d_{10} = 5.2047$  $n_6 = 1.69680$  $\nu_6 = 56.49$
$r_{11} = -60.6437$
$d_{11} = D_3$ (variable)
$r_{12} = \infty$ (stop)
$d_{12} = 1.6094$
$r_{13} = -4.9043$ (aspherical surface)
$d_{13} = 1.0024$  $n_7 = 1.72916$  $\nu_7 = 54.68$
$r_{14} = -6.9744$
$d_{14} = 2.3912$
$r_{15} = 102.9088$
$d_{15} = 2.4417$ radial GRIN lens
$r_{16} = -14.4377$ aspherical surface coefficient
(2nd surface)
$P = 1.0000, A_4 = -0.13802 \times 10^{-3}$
$A_6 = -0.17580 \times 10^{-6}, A_8 = -0.53772 \times 10^{-8}$
(13th surface)
$P = 1.0000, A_4 = 0.89510 \times 10^{-3}$
$A_6 = -0.19456 \times 10^{-4}, A_8 = 0.26833 \times 10^{-5}$

| f | 6 | 10 | 18 |
|---|---|---|---|
| $D_1$ | 20.993 | 6.188 | 1.256 |
| $D_2$ | 5.204 | 10.436 | 0.510 |
| $D_3$ | 0.763 | 10.337 | 25.194 | radial GRIN lens

| | $N_0$ | $N_1$ | $N_2$ |
|---|---|---|---|
| d line | 1.77250 | $-0.86409 \times 10^{-3}$ | $0.10426 \times 10^{-3}$ |
| C line | 1.76780 | $-0.95242 \times 10^{-3}$ | $0.10271 \times 10^{-3}$ |
| F line | 1.78336 | $-0.65799 \times 10^{-3}$ | $0.10788 \times 10^{-3}$ |

$|N_{1(4)}| \cdot f_w^2 = 0.311 \times 10^{-1}$
$\beta = -0.353, f_w/f_4 = 0.258$
$\Sigma|\Delta x|/h = 0.0933, r_a/r_b = 0.703$

EMBODIMENT 5

$f = 6 \sim 30$ mm, F/2.8,
$2\omega = 69.6° \sim 14.5°$, maximum image height 4.0 mm $r_1 = 30.7107$
$d_1 = 1.1017$  $n_1 = 1.69680$  $\nu_1 = 56.49$
$r_2 = 11.6112$ (aspherical surface)
$d_2 = 4.5999$
$r_3 = -27.9183$
$d_3 = 1.1034$  $n_2 = 1.69680$  $\nu_2 = 56.49$
$r_4 = 856.7966$
$d_4 = 0.7986$
$r_5 = -209.3451$
$d_5 = 1.8017$  $n_3 = 1.80518$  $\nu_3 = 25.43$
$r_6 = -61.3817$
$d_6 = D_1$ (variable)
$r_7 = 40.0794$
$d_7 = 2.2005$ radial GRIN lens 1
$r_8 = -688.2678$
$d_8 = D_2$ (variable)
$r_9 = 26.9091$
$d_9 = 1.0000$  $n_5 = 1.80518$  $\nu_5 = 25.43$
$r_{10} = 14.7047$
$d_{10} = 5.2047$  $n_6 = 1.69680$  $\nu_6 = 56.49$
$r_{11} = -53.9850$
$d_{11} = D_3$ (variable)
$r_{12} = \infty$ (stop)
$d_{12} = 1.6094$
$r_{13} = -5.4990$
$d_{13} = 1.3105$  $n_7 = 1.72916$  $\nu_7 = 54.68$
$r_{14} = -6.4900$ -continued $d_{14} = 2.7736$
$r_{15} = 12.9668$ (aspherical surface)
$d_{15} = 0.8002$  $n_8 = 1.78470$  $\nu_8 = 26.22$
$r_{16} = 6.0277$
$d_{16} = 1.1835$
$r_{17} = 10.5920$
$d_{17} = 2.4004$ radial GRIN lens 2
$r_{18} = -20.4772$ aspherical surface coefficient
(2nd surface)
$P = 1.0000, A_4 = -0.50209 \times 10^{-4}$
$A_6 = -0.10094 \times 10^{-6}, A_8 = -0.32970 \times 10^{-8}$
(15th surface)
$P = 1.0000, A_4 = 0.44808 \times 10^{-3}$
$A_6 = -0.13769 \times 10^{-4}, A_8 = 0.76060 \times 10^{-6}$

| f | 6 | 14 | 30 |
|---|---|---|---|
| $D_1$ | 33.888 | 7.011 | 0.504 |
| $D_2$ | 0.804 | 14.514 | 0.502 |
| $D_3$ | 0.800 | 13.967 | 34.486 | radial GRIN lens 1

| | $N_0$ | $N_1$ | $N_2$ |
|---|---|---|---|
| d line | 1.72916 | $-0.41256 \times 10^{-3}$ | $0.82721 \times 10^{-6}$ |
| C line | 1.72510 | $-0.41448 \times 10^{-3}$ | $0.85521 \times 10^{-6}$ |
| F line | 1.73844 | $-0.40809 \times 10^{-3}$ | $0.76187 \times 10^{-6}$ | radial GRIN lens 2

| | $N_0$ | $N_1$ | $N_2$ |
|---|---|---|---|
| d line | 1.77250 | $0.23466 \times 10^{-2}$ | $0.93255 \times 10^{-4}$ |
| C line | 1.76780 | $0.22933 \times 10^{-2}$ | $0.90057 \times 10^{-4}$ |
| F line | 1.78336 | $0.24710 \times 10^{-2}$ | $0.10072 \times 10^{-3}$ |

$N_{1p} \cdot f_w^2 = -0.149 \times 10^{-1}$
$|N_{1(4)}| \cdot f_w^2 = 0.845 \times 10^{-1}$
$\beta = -0.322, f_w/f_4 = 0.212$
$\Sigma|\Delta x|/h = 0.0846, r_a/r_b = 0.847$

EMBODIMENT 6

$f = 7 \sim 21$ mm, F/2.8,
$2\omega = 61.9° \sim 20.8°$, maximum image height 4.0 mm $r_1 = -207.8680$
$d_1 = 1.0057$  $n_1 = 1.69680$  $\nu_1 = 56.49$
$r_2 = 12.1165$
$d_2 = 3.7256$
$r_3 = -37.5005$ (aspherical surface)
$d_3 = 1.2666$  $n_2 = 1.69680$  $\nu_2 = 56.49$
$r_4 = 57.4633$
$d_4 = 0.8022$
$r_5 = -128.8034$
$d_5 = 1.8318$  $n_3 = 1.80518$  $\nu_3 = 25.43$
$r_6 = -23.7042$
$d_6 = D_1$ (variable)
$r_7 = 38.0670$
$d_7 = 2.2482$  $n_4 = 1.72916$  $\nu_4 = 54.68$
$r_8 = 153.3615$
$d_8 = D_2$ (variable)
$r_9 = 26.4604$
$d_9 = 5.1940$ radial GRIN lens
$r_{10} = -37.5290$
$d_{10} = D_3$ (variable)
$r_{11} = \infty$ (stop)
$d_{11} = 1.6094$
$r_{12} = -5.5369$
$d_{12} = 1.3210$  $n_6 = 1.72916$  $\nu_6 = 54.68$
$r_{13} = -6.2037$
$d_{13} = 3.5094$
$r_{14} = 306.4568$
$d_{14} = 0.8002$  $n_7 = 1.78470$  $\nu_7 = 26.22$
$r_{15} = 11.1446$
$d_{15} = 1.3010$
$r_{16} = 21.1471$
$d_{16} = 1.6961$  $n_8 = 1.77250$  $\nu_8 = 49.66$
$r_{17} = -15.1468$ aspherical surface coefficient
$P = 1.0000, A_4 = 0.70278 \times 10^{-4}$ -continued

| | $A_6 = 0.36792 \times 10^{-6}$, $A_8 = -0.29020 \times 10^{-8}$ | | |
|---|---|---|---|
| f | 7 | 12 | 21 |
| $D_1$ | 22.746 | 2.270 | 0.589 |
| $D_2$ | 3.359 | 15.780 | 1.453 |
| $D_3$ | 0.500 | 9.328 | 19.608 |

| | radial GRIN lens | | |
|---|---|---|---|
| | $N_0$ | $N_1$ | $N_2$ |
| d line | 1.69680 | $-0.36146 \times 10^{-4}$ | $0.17442 \times 10^{-5}$ |
| C line | 1.69303 | $-0.64370 \times 10^{-4}$ | $0.15450 \times 10^{-5}$ |
| F line | 1.70537 | $0.29711 \times 10^{-4}$ | $0.22089 \times 10^{-5}$ |

$N_{1p} \cdot f_w^2 = -0.177 \times 10^{-2}$
$\beta = -0.404$, $f_w/f_4 = 0.210$
$\Sigma|\Delta x|/h = 0.0204$, $r_a/r_b = 0.893$

EMBODIMENT 7

$f = 7 \sim 21$ mm, F/2.8,
$2\omega = 62.2° \sim 21.0°$, maximum image height 4.0 mm $r_1 = 139.2704$ (aspherical surface)
  $d_1 = 4.4000$   $n_1 = 1.72825$   $\nu_1 = 28.46$
$r_2 = -20.7046$
  $d_2 = 1.2049$   $n_2 = 1.72916$   $\nu_2 = 54.68$
$r_3 = 13.4437$
  $d_3 = D_1$ (variable)
$r_4 = 37.5049$
  $d_4 = 3.8033$   $n_3 = 1.72916$   $\nu_3 = 54.68$
$r_5 = -16.2306$
  $d_5 = 1.0000$   $n_4 = 1.80518$   $\nu_4 = 25.43$
$r_6 = -124.0325$
  $d_6 = D_2$ (variable)
$r_7 = 29.3692$
  $d_7 = 3.9000$   $n_5 = 1.69680$   $\nu_5 = 56.49$
$r_8 = -44.6011$
  $d_8 = D_3$ (variable)
$r_9 = \infty$ (stop)
  $d_9 = 2.7053$
$r_{10} = -5.1791$
  $d_{10} = 0.8119$   $n_6 = 1.80518$   $\nu_6 = 25.43$
$r_{11} = -7.1518$
  $d_{11} = 1.5738$ radial GRIN lens
$r_{12} = -6.0203$

| aspherical surface coefficient |
|---|
| $P = 1.0000$, $A_4 = 0.13273 \times 10^{-4}$ |
| $A_6 = 0.91628 \times 10^{-8}$, $A_8 = -0.13678 \times 10^{-9}$ |

| f | 7 | 12 | 21 |
|---|---|---|---|
| $D_1$ | 35.226 | 17.197 | 7.844 |
| $D_2$ | 0.800 | 7.565 | 0.811 |
| $D_3$ | 0.530 | 6.402 | 15.928 |

| | radial GRIN lens | | |
|---|---|---|---|
| | $N_0$ | $N_1$ | $N_2$ |
| d line | 1.77250 | $-0.61681 \times 10^{-2}$ | $-0.22401 \times 10^{-4}$ |
| C line | 1.76780 | $-0.61479 \times 10^{-2}$ | $-0.22829 \times 10^{-4}$ |
| F line | 1.78337 | $-0.62152 \times 10^{-2}$ | $-0.21402 \times 10^{-4}$ |

$|N_{1(4)}| \cdot f_w^2 = 0.302$
$\beta = -0.337$, $f_w/f_4 = 0.172$
$\Sigma|\Delta x|/h = 0.0360$, $r_a/r_b = 0.860$

EMBODIMENT 8

$f = 6 \sim 24$ mm, F/2.8,
$2\omega = 69.9° \sim 18.2°$, maximum image height 4.0 mm $r_1 = -150.2428$
  $d_1 = 1.2000$   $n_1 = 1.72916$   $\nu_1 = 54.68$
$r_2 = 12.9449$ (aspherical surface)
  $d_2 = 2.5028$
$r_3 = 38.8737$
  $d_3 = 5.4361$   $n_2 = 1.80518$   $\nu_2 = 25.43$
$r_4 = -20.1239$
  $d_4 = 1.0416$   $n_3 = 1.77250$   $\nu_3 = 49.66$ -continued $r_5 = 70.3603$
  $d_5 = D_1$ (variable)
$r_6 = 57.5209$
  $d_6 = 7.2517$   $n_4 = 1.72916$   $\nu_4 = 54.68$
$r_7 = -14.2287$
  $d_7 = 1.0000$   $n_5 = 1.80518$   $\nu_5 = 25.43$
$r_8 = -64.6672$
  $d_8 = D_2$ (variable)
$r_9 = 42.2352$
  $d_9 = 5.0191$   $n_6 = 1.72916$   $\nu_6 = 54.68$
$r_{10} = -29.1552$
  $d_{10} = 0.9025$   $n_7 = 1.80518$   $\nu_7 = 25.43$
$r_{11} = -46.6193$
  $d_{11} = D_3$ (variable)
$r_{12} = \infty$ (stop)
  $d_{12} = D_4$ (variable)
$r_{13} = -4.3521$
  $d_{13} = 3.0076$ radial GRIN lens
$r_{14} = -5.7088$

| aspherical surface coefficient |
|---|
| $P = 1.0000$, $A_4 = -0.60947 \times 10^{-4}$ |
| $A_6 = -0.14192 \times 10^{-6}$, $A_8 = -0.18155 \times 10^{-8}$ |

| f | 6 | 12 | 24 |
|---|---|---|---|
| $D_1$ | 33.044 | 11.647 | 2.640 |
| $D_2$ | 2.926 | 12.228 | 5.076 |
| $D_3$ | 0.800 | 12.895 | 29.055 |
| $D_4$ | 1.400 | 3.095 | 6.610 |

| | radial GRIN lens | | |
|---|---|---|---|
| | $N_0$ | $N_1$ | $N_2$ |
| d line | 1.72916 | $-0.63215 \times 10^{-2}$ | $0.11343 \times 10^{-4}$ |
| C line | 1.72510 | $-0.63392 \times 10^{-2}$ | $0.11916 \times 10^{-4}$ |
| F line | 1.73844 | $-0.62803 \times 10^{-2}$ | $0.10005 \times 10^{-4}$ |

$|N_{1(4)}| \cdot f_w^2 = 0.228$
$\beta = -0.297$, $f_w/f_4 = 0.215$
$\Sigma|\Delta x|/h = 0.174$, $r_a/r_b = 0.762$

EMBODIMENT 9

$f = 7 \sim 21$ mm, F/2.8,
$2\omega = 62.0° \sim 21.2°$, maximum image height 4.0 mm $r_1 = -112.6325$
  $d_1 = 1.0057$   $n_1 = 1.69680$   $\nu_1 = 56.49$
$r_2 = 12.1148$
  $d_2 = 3.6530$
$r_3 = -47.0492$ (aspherical surface)
  $d_3 = 1.1821$   $n_2 = 1.69680$   $\nu_2 = 56.49$
$r_4 = 35.1681$
  $d_4 = 0.9997$
$r_5 = -130.6409$
  $d_5 = 2.5481$   $n_3 = 1.84666$   $\nu_3 = 23.78$
$r_6 = -20.4926$
  $d_6 = D_1$ (variable)
$r_7 = 20.6117$
  $d_7 = 2.7824$   $n_4 = 1.72916$   $\nu_4 = 54.68$
$r_8 = 35.2827$
  $d_8 = D_2$ (variable)
$r_9 = 23.5329$
  $d_9 = 5.1967$ radial GRIN lens
$r_{10} = -54.6926$
  $d_{10} = D_3$ (variable)
$r_{11} = 11.2556$
  $d_{11} = 0.8050$   $n_6 = 1.80518$   $\nu_6 = 25.43$
$r_{12} = 8.1751$
  $d_{12} = 0.9000$
$r_{13} = \infty$ (stop)
  $d_{13} = 1.6094$
$r_{14} = -5.4331$
  $d_{14} = 1.3044$   $n_7 = 1.80518$   $\nu_7 = 25.43$
$r_{15} = -6.4290$
  $d_{15} = 3.2563$
$r_{16} = -264.2006$
  $d_{16} = 1.8071$   $n_8 = 1.77250$   $\nu_8 = 49.66$
$r_{17} = -16.1142$

| aspherical surface coefficient |

-continued $P = 1.0000, A_4 = 0.72141 \times 10^{-4}$
$A_6 = 0.39739 \times 10^{-6}, A_8 = -0.41865 \times 10^{-9}$

| f | 7 | 12 | 21 |
|---|---|---|---|
| $D_1$ | 27.662 | 1.000 | 0.500 |
| $D_2$ | 7.058 | 24.162 | 0.500 |
| $D_3$ | 0.500 | 8.936 | 16.441 |

| radial GRIN lens | | | |
|---|---|---|---|
| | $N_0$ | $N_1$ | $N_2$ |
| d line | 1.69680 | $-0.10464 \times 10^{-3}$ | $0.81316 \times 10^{-6}$ |
| C line | 1.69303 | $-0.14252 \times 10^{-3}$ | $0.59519 \times 10^{-6}$ |
| F line | 1.70537 | $-0.16248 \times 10^{-4}$ | $0.13217 \times 10^{-5}$ |

$N_{1p} \cdot f_w^2 = -0.513 \times 10^{-2}$
$\beta = -0.367, f_w/f_4 = 0.188$
$\Sigma|\Delta x|/h = 0.0462, r_a/r_b = 0.845$

EMBODIMENT 10

$f = 7 \sim 21$ mm, F/2.8,
maximum image height 4 mm, $2\omega = 60.3° \sim 20.8°$ $r_1 = 46.9906$
$\quad d_1 = 6.0000 \quad n_1 = 1.72825 \quad \nu_1 = 28.46$
$r_2 = -39.4736$
$\quad d_2 = 1.3540$ axial GRIN lens 1
$r_3 = 13.7635$
$\quad d_3 = D_1$ (variable)
$r_4 = 22.9879$
$\quad d_4 = 5.0000 \quad n_3 = 1.72916 \quad \nu_3 = 54.68$
$r_5 = -48.2345$
$\quad d_5 = 1.0000 \quad n_4 = 1.80518 \quad \nu_4 = 25.43$
$r_6 = 35.3085$
$\quad d_6 = D_2$ (variable)
$r_7 = 27.9698$
$\quad d_7 = 3.0000 \quad n_5 = 1.67790 \quad \nu_5 = 55.33$
$r_8 = -48.0615$
$\quad d_8 = D_3$ (variable)
$r_9 = \infty$ (stop)
$\quad d_9 = 2.0000$
$r_{10} = -4.4701$
$\quad d_{10} = 0.8166 \quad n_6 = 1.78470 \quad \nu_6 = 26.22$
$r_{11} = -8.0300$
$\quad d_{11} = 0.7144$
$r_{12} = -26.0759$
$\quad d_{12} = 1.5000$ axial GRIN lens
$r_{13} = -6.2173$

| f | 7 | 12 | 21 |
|---|---|---|---|
| $D_1$ | 33.114 | 7.504 | 6.093 |
| $D_2$ | 0.800 | 14.558 | 1.000 |
| $D_3$ | 1.000 | 12.852 | 27.822 |

| axial GRIN lens 1 | | | |
|---|---|---|---|
| standard point $x_0 = 0.3540$ | | | |
| | $N_0$ | $N_1$ | $N_2$ |
| d line | 1.72916 | $-0.70474 \times 10^{-2}$ | $-0.20092 \times 10^{-2}$ |
| C line | 1.72510 | $-0.70082 \times 10^{-2}$ | $-0.19980 \times 10^{-2}$ |
| F line | 1.73844 | $-0.71371 \times 10^{-2}$ | $-0.20348 \times 10^{-2}$ |

| axial GRIN lens 2 | | | |
|---|---|---|---|
| standard point $x_0 = 0$ | | | |
| | $N_0$ | $N_1$ | $N_2$ |
| d line | 1.70000 | $0.67521 \times 10^{-1}$ | $0.51583 \times 10^{-2}$ |
| C line | 1.69527 | $0.67065 \times 10^{-1}$ | $0.51235 \times 10^{-2}$ |
| F line | 1.71111 | $0.68593 \times 10^{-1}$ | $0.52402 \times 10^{-2}$ |

$|N_{1(1)} \cdot f_w| = 0.0493, |N_{1(4)} \cdot f_w| = 0.473$
$\beta = -0.234, f_w/f_4 = 0.411, r_a/r_b = 0.557$

EMBODIMENT 11

$f = 7 \sim 21$ mm, F/2.8,
maximum image height 4 mm, $2\omega = 60.0° \sim 20.6°$ $r_1 = 63.6298$
$\quad d_1 = 6.0000 \quad n_1 = 1.72825 \quad \nu_1 = 28.46$
$r_2 = -35.4513$
$\quad d_2 = 1.3540$ axial GRIN lens 1
$r_3 = 15.4008$
$\quad d_3 = D_1$ (variable)
$r_4 = 32.0886$
$\quad d_4 = 5.0000 \quad n_3 = 1.72916 \quad \nu_3 = 54.68$
$r_5 = -30.5394$
$\quad d_5 = 1.0000 \quad n_4 = 1.80518 \quad \nu_4 = 25.43$
$r_6 = 58.6554$
$\quad d_6 = D_2$ (variable)
$r_7 = 27.6425$
$\quad d_7 = 5.0000 \quad n_5 = 1.67790 \quad \nu_5 = 55.33$
$r_8 = -51.1308$
$\quad d_8 = D_3$ (variable)
$r_9 = 10.3960$
$\quad d_9 = 1.0000 \quad n_6 = 1.68893 \quad \nu_6 = 31.08$
$r_{10} = 11.9584$
$\quad d_{10} = 1.0000$
$r_{11} = \infty$ (stop)
$\quad d_{11} = 2.0000$
$r_{12} = -4.4818$
$\quad d_{12} = 0.8166 \quad n_7 = 1.78470 \quad \nu_7 = 26.22$
$r_{13} = -8.3167$
$\quad d_{13} = 0.7144$
$r_{14} = -17.9282$
$\quad d_{14} = 1.5000$ axial GRIN lens 2
$r_{15} = -5.8801$

| f | 7 | 12 | 21 |
|---|---|---|---|
| $D_1$ | 34.115 | 4.020 | 5.874 |
| $D_2$ | 0.800 | 18.300 | 1.000 |
| $D_3$ | 1.000 | 13.595 | 29.041 |

| axial GRIN lens 1 | | | |
|---|---|---|---|
| standard point $x_0 = 0.3540$ | | | |
| | $N_0$ | $N_1$ | $N_2$ |
| d line | 1.72916 | $-0.76779 \times 10^{-2}$ | $-0.18006 \times 10^{-2}$ |
| C line | 1.72510 | $-0.76352 \times 10^{-2}$ | $-0.17906 \times 10^{-2}$ |
| F line | 1.73844 | $-0.77756 \times 10^{-2}$ | $-0.18236 \times 10^{-2}$ |

| axial GRIN lens 2 | | | |
|---|---|---|---|
| standard point $x_0 = 0$ | | | |
| | $N_0$ | $N_1$ | $N_2$ |
| d line | 1.70000 | $0.73665 \times 10^{-1}$ | $0.52192 \times 10^{-2}$ |
| C line | 1.69527 | $0.73167 \times 10^{-1}$ | $0.51839 \times 10^{-2}$ |
| F line | 1.71111 | $0.74834 \times 10^{-1}$ | $0.53020 \times 10^{-2}$ |

$|N_{1(1)} \cdot f_w| = 0.0537, |N_{1(4)} \cdot f_w| = 0.516$
$\beta = -0.231, f_w/f_4 = 0.412, r_a/r_b = 0.539$

EMBODIMENT 12

$f = 7 \sim 21$ mm, F/2.8,
maximum image height 4.0 mm, $2\omega = 60.2° \sim 20.8°$ $r_1 = 46.3769$
$\quad d_2 = 6.0000 \quad n_1 = 1.72825 \quad \nu_1 = 28.46$
$r_2 = -37.6428$
$\quad d_2 = 1.3540$ axial GRIN lens
$r_3 = 13.7178$
$\quad d_3 = D_1$ (variable)
$r_4 = 22.0362$
$\quad d_4 = 5.0000 \quad n_3 = 1.72916 \quad \nu_3 = 54.68$
$r_5 = -45.7386$
$\quad d_5 = 1.0000 \quad n_4 = 1.80518 \quad \nu_4 = 25.43$
$r_6 = 35.8557$
$\quad d_6 = D_2$ (variable)
$r_7 = 28.1778$
$\quad d_7 = 3.0000 \quad n_6 = 1.67790 \quad \nu_6 = 55.33$
$r_8 = -51.7728$
$\quad d_8 = D_3$ (variable)
$r_9 = \infty$ (stop)
$\quad d_9 = 2.0000$
$r_{10} = -4.2722$
$\quad d_{10} = 0.8166 \quad n_6 = 1.78470 \quad \nu_6 = 26.22$
$r_{11} = -11.1936$
$\quad d_{11} = 0.7144$
$r_{12} = -104.6367$
$\quad d_{12} = 1.9000 \quad n_7 = 1.78590 \quad \nu_7 = 44.18$ -continued $r_{13} = -5.6656$ (aspherical surface)

aspherical surface coefficient

P = 1.0000, A = 0.41399 × 10$^{-3}$
$A_6 = 0.17776 \times 10^{-4}$, $A_8 = -0.13851 \times 10^{-6}$

| f | 7 | 12 | 21 |
|---|---|---|---|
| $D_1$ | 32.573 | 9.796 | 5.841 |
| $D_2$ | 0.800 | 12.191 | 1.000 |
| $D_3$ | 1.000 | 12.386 | 27.532 | axial GRIN lens
standard point $x_0 = 0.3540$

| | $N_0$ | $N_1$ | $N_2$ |
|---|---|---|---|
| d line | 1.72916 | $-0.70474 \times 10^{-2}$ | $-0.20092 \times 10^{-2}$ |
| C line | 1.72510 | $-0.70082 \times 10^{-2}$ | $-0.19980 \times 10^{-2}$ |
| F line | 1.73844 | $-0.71371 \times 10^{-2}$ | $-0.20348 \times 10^{-2}$ |

$|N_{1(1)} \cdot f_w| = 0.0493$
$\Sigma |\Delta x_4|/h = 0.00746$ (4th lens group)
$\beta = -0.233$, $f_w/f_4 = 0.433$, $r_a/r_b = 0.382$

EMBODIMENT 13

$f = 7 \sim 21$ mm, F/2.8,
maximum image height 4.0 mm, $2\omega = 60.1° \sim 20.7°$
$r_1 = 45.4307$
  $d_1 = 6.0000$   $n_1 = 1.72825$   $\nu_1 = 28.46$
$r_2 = -38.1429$
  $d_2 = 1.3540$ axial GRIN lens
$r_3 = 13.6862$
  $d_3 = D_1$ (variable)
$r_4 = 20.0152$
  $d_4 = 5.0000$   $n_3 = 1.72916$   $\nu_3 = 54.68$
$r_5 = -61.2722$
  $d_5 = 1.0000$   $n_4 = 1.80518$   $\nu_4 = 25.43$
$r_6 = 29.7032$
  $d_6 = D_2$ (variable)
$r_7 = 30.1905$ (aspherical surface)
  $d_7 = 3.0000$   $n_5 = 1.67790$   $\nu_5 = 55.33$
$r_8 = -45.0497$
  $d_8 = D_3$ (variable)
$r_9 = \infty$ (stop)
  $d_9 = 2.0000$
$r_{10} = -4.3103$
  $d_{10} = 0.8166$   $n_6 = 1.78470$   $\nu_6 = 26.22$
$r_{11} = -10.9014$
  $d_{11} = 0.7144$
$r_{12} = -87.0369$
  $d_{12} = 1.9000$   $n_7 = 1.78590$   $\nu_7 = 44.18$
$r_{13} = -5.6801$ (aspherical surface)
aspherical surface coefficient
(7th surface)
P = 1.000, $A_4 = -0.48707 \times 10^{-5}$
$A_6 = 0.21028 \times 10^{-7}$, $A_8 = -0.20524 \times 10^{-9}$
(13th surface)
P = 1.000, $A_4 = 0.40580 \times 10^{-3}$
$A_6 = 0.18535 \times 10^{-4}$, $A_8 = 0.13378 \times 10^{-6}$

| f | 7 | 12 | 21 |
|---|---|---|---|
| $D_1$ | 32.953 | 9.582 | 6.053 |
| $D_2$ | 0.800 | 12.600 | 1.000 |
| $D_3$ | 1.000 | 12.571 | 27.701 | axial GRIN lens
standard point $x_0 = 1$

| | $N_0$ | $N_1$ | $N_2$ |
|---|---|---|---|
| d line | 1.72916 | $-0.70474 \times 10^{-2}$ | $-0.20092 \times 10^{-2}$ |
| C line | 1.72510 | $-0.70082 \times 10^{-2}$ | $-0.19980 \times 10^{-2}$ |
| F line | 1.73844 | $-0.71371 \times 10^{-2}$ | $-0.20348 \times 10^{-2}$ |

$|N_{1(1)} \cdot f_w| = 0.0493$
$\Sigma |\Delta x_{23}|/h = 0.00918$ (3rd lens group)
$\Sigma |\Delta x_4|/h = 0.00690$ (4th lens group)
$\beta_w = -0.231$, $f_w/f_4 = 0.438$, $r_a/r_b = 0.395$

EMBODIMENT 14

$f = 7 \sim 21$ mm, F/2.8,
maximum image height 4.0 mm, $2\omega = 61.4° \sim 21.6°$
$r_1 = 45.2313$ (aspherical surface)
  $d_1 = 6.0000$   $n_1 = 1.72825$   $\nu_1 = 28.46$
$r_2 = -32.1770$
  $d_2 = 1.3540$   $n_2 = 1.72916$   $\nu_2 = 54.68$
$r_3 = 12.6990$
  $d_3 = D_1$ (variable)
$r_4 = 26.1911$
  $d_4 = 4.0000$   $n_3 = 1.72916$   $\nu_3 = 54.68$
$r_5 = -22.6847$
  $d_5 = 1.0000$ axial GRIN lens
$r_6 = 56.6806$
  $d_6 = D_2$ (variable)
$r_7 = 30.6945$
  $d_7 = 3.0000$   $n_5 = 1.67790$   $\nu_5 = 55.33$
$r_8 = -55.1529$
  $d_8 = D_3$ (variable)
$r_9 = \infty$ (stop)
  $d_9 = 1.5000$
$r_{10} = -4.7694$
  $d_{10} = 0.8166$   $n_6 = 1.78470$   $\nu_6 = 26.22$
$r_{11} = -6.5193$
  $d_{11} = 0.7144$
$r_{12} = -36.6465$
  $d_{12} = 1.5000$   $n_7 = 1.78590$   $\nu_7 = 44.18$
$r_{13} = -8.6012$
aspherical surface coefficient
P = 1.0000, $A_4 = 0.76357 \times 10^{-5}$
$A_6 = 0.17235 \times 10^{-7}$, $A_8 = -0.54672 \times 10^{-10}$

| f | 7 | 12 | 21 |
|---|---|---|---|
| $D_1$ | 35.671 | 14.997 | 8.933 |
| $D_2$ | 0.800 | 10.511 | 1.000 |
| $D_3$ | 1.000 | 11.963 | 27.539 | axial GRIN lens
standard point $x_0 = 0$

| | $N_0$ | $N_1$ | $N_2$ |
|---|---|---|---|
| d line | 1.80518 | $-0.62920 \times 10^{-1}$ | $-0.11847 \times 10^{-1}$ |
| C line | 1.79610 | $-0.62920 \times 10^{-1}$ | $-0.10311 \times 10^{-1}$ |
| F line | 1.82776 | $-0.62920 \times 10^{-1}$ | $-0.15665 \times 10^{-1}$ |

| | $N_3$ |
|---|---|
| d line | $-0.26885 \times 10^{-2}$ |
| C line | $-0.25023 \times 10^{-2}$ |
| F line | $-0.31517 \times 10^{-2}$ |

$\Sigma |\Delta x_1|/h = 0.0702$ (1st lens group)
$\beta_w = -0.264$, $f_w/f_4 = 0.319$, $r_a/r_b = 0.732$

EMBODIMENT 15

$f = 7 \sim 21$ mm, F/2.8,
maximum image height 4.0 mm, $2\omega = 61.2° \sim 21.0°$
$r_1 = 119.3354$ (aspherical surface)
  $d_1 = 5.0000$   $n_1 = 1.72825$   $\nu_1 = 28.46$
$r_2 = -23.5106$
  $d_2 = 1.3540$   $n_2 = 1.72916$   $\nu_2 = 54.68$
$r_3 = 13.3524$
  $d_3 = D_1$ (variable)
$r_4 = 36.0981$
  $d_4 = 4.0000$   $n_3 = 1.72916$   $\nu_3 = 54.68$
$r_5 = -22.6014$
  $d_5 = 1.0000$   $n_4 = 1.80518$   $\nu_4 = 25.43$
$r_6 = -202.3434$
  $d_6 = D_2$ (variable)
$r_7 = 56.8220$
  $d_7 = 3.0000$ axial GRIN lens
$r_8 = -35.3656$
  $d_8 = D_3$ (variable)
$r_9 = \infty$ (stop)
  $d_9 = 1.5000$
$r_{10} = -5.1585$
  $d_{10} = 0.8166$   $n_6 = 1.78470$   $\nu_6 = 26.22$
$r_{11} = -14.0411$
  $d_{11} = 0.7144$
$r_{12} = -27.4174$
  $d_{12} = 1.5000$   $n_7 = 1.78590$   $\nu_7 = 44.18$
$r_{13} = -6.0706$ (aspherical surface)
aspherical surface coefficient
(1st surface)
P = 1.0000, $A_4 = -0.49075 \times 10^{-7}$
$A_6 = 0.14549 \times 10^{-6}$, $A_8 = -0.45073 \times 10^{-9}$ (13th surface)
P = 1.0000, $A_4 = 0.31357 \times 10^{-3}$
$A_6 = 0.49270 \times 10^{-6}$, $A_8 = 0.26890 \times 10^{-6}$

| f | 7 | 12 | 21 |
|---|---|---|---|
| $D_1$ | 33.425 | 17.440 | 9.185 |
| $D_2$ | 0.800 | 7.608 | 1.000 |
| $D_3$ | 1.000 | 10.176 | 25.040 | axial GRIN lens
standard point $x_0 = 1.8$

| | $N_0$ | $N_1$ | $N_2$ |
|---|---|---|---|
| d line | 1.67790 | $0.45648 \times 10^{-2}$ | $-0.19451 \times 10^{-1}$ |
| C line | 1.67418 | $0.45648 \times 10^{-2}$ | $-0.19344 \times 10^{-1}$ |
| F line | 1.68643 | $0.45648 \times 10^{-2}$ | $-0.19696 \times 10^{-1}$ |

$|N_{1\,(1)} \cdot f_w| = 0.0320$
$\Sigma |\Delta x_1|/h = 0.0343$ (1st lens group)
$\Sigma |\Delta x_4|/h = 0.0151$ (4th lens group)
$\beta_w = -0.331$, $f_w/f_4 = 0.250$, $r_a/r_b = 0.367$

EMBODIMENT 16

$f = 7 \sim 21$ mm, F/2.8,
maximum image height 4.0 mm, $2\omega = 61.6° \sim 21.6°$
$r_1 = 64.9412$ (aspherical surface)
    $d_1 = 5.0000$  $n_1 = 1.72825$  $\nu_1 = 28.46$
$r_2 = -30.3723$
    $d_2 = 1.3540$  $n_2 = 1.72916$  $\nu_2 = 54.68$
$r_3 = 14.5954$
    $d_3 = D_1$ (variable)
$r_4 = 27.8206$
    $d_4 = 4.0000$  $n_3 = 1.72916$  $\nu_3 = 54.68$
$r_5 = -30.7390$
    $d_5 = 1.0000$  $n_4 = 1.80518$  $\nu_4 = 25.43$
$r_6 = -74.0377$
    $d_6 = D_2$ (variable)
$r_7 = 31.4645$
    $d_7 = 3.0000$  $n_5 = 1.67790$  $\nu_5 = 55.33$
$r_8 = -72.9945$
    $d_8 = D_3$ (variable)
$r_9 = \infty$ (stop)
    $d_9 = 1.5000$
$r_{10} = -5.1865$
    $d_{10} = 0.8166$  $n_6 = 1.78470$  $\nu_6 = 26.22$
$r_{11} = -7.4061$
    $d_{11} = 0.7144$
$r_{12} = -36.9740$
    $d_{12} = 1.5000$ axial GRIN lens
$r_{13} = -8.7238$
aspherical surface coefficient
(1st surface)
P = 1.0000, $A_4 = -0.83099 \times 10^{-5}$
$A_6 = 0.88654 \times 10^{-8}$, $A_8 = -0.58282 \times 10^{-10}$

| f | 7 | 12 | 21 |
|---|---|---|---|
| $D_1$ | 37.657 | 17.243 | 9.643 |
| $D_2$ | 0.800 | 9.981 | 1.000 |
| $D_3$ | 1.000 | 12.233 | 28.815 | axial GRIN lens
standard point $x_0 = 0$

| | $N_0$ | $N_1$ | $N_2$ |
|---|---|---|---|
| d line | 1.75000 | $0.51935 \times 10^{-1}$ | $-0.11741 \times 10^{-1}$ |
| C line | 1.74493 | $0.51671 \times 10^{-1}$ | $-0.11575 \times 10^{-1}$ |
| F line | 1.76191 | $0.52556 \times 10^{-1}$ | $-0.12130 \times 10^{-1}$ |

$|N_{1\,(4)} \cdot f_w| = 0.364$
$\Sigma |\Delta x_1|/h = 0.0547$ (1st lens group)
$\beta_w = -0.257$, $f_w/f_4 = 0.316$, $r_a/r_b = 0.700$

EMBODIMENT 17

$f = 6 \sim 24$ mm, F/2.8,
maximum image height 4.0 mm, $2\omega = 68.8° \sim 18.2°$
$r_1 = 200.0000$
    $d_1 = 1.2000$  $n_1 = 1.67790$  $\nu_1 = 50.72$
$r_2 = 14.4634$ (aspherical surface)
    $d_2 = 2.6000$
$r_3 = 30.7415$
    $d_3 = 5.6000$  $n_2 = 1.80518$  $\nu_2 = 25.43$
$r_4 = -26.8672$
    $d_4 = 1.2000$ axial GRIN lens
$r_5 = 22.1495$
    $d_5 = D_1$ (variable)
$r_6 = 25.0456$
    $d_6 = 4.8000$  $n_4 = 1.72916$  $\nu_4 = 54.68$
$r_7 = -12.1347$
    $d_7 = 1.0000$  $n_5 = 1.80518$  $\nu_5 = 25.43$
$r_8 = -99.6964$
    $d_8 = D_2$ (variable)
$r_9 = 25.5501$
    $d_9 = 4.5000$  $n_6 = 1.72916$  $\nu_6 = 54.68$
$r_{10} = -513.8671$
    $d_{10} = 2.0000$  $n_7 = 1.80518$  $\nu_7 = 25.43$
$r_{11} = -94.1939$
    $d_{11} = D_3$ (variable)
$r_{12} = \infty$ (stop)
    $d_{12} = 2.0000$
$r_{13} = -4.7723$
    $d_{13} = 1.0000$  $n_8 = 1.72342$  $\nu_8 = 37.95$
$r_{14} = 27.7170$
    $d_{14} = 1.8079$  $n_9 = 1.72916$  $\nu_9 = 54.68$
$r_{15} = -4.9528$ (aspherical surface)
aspherical surface coefficient
(2nd surface)
P = 1.0000, $A_4 = -0.30782 \times 10^{-4}$
$A_6 = -0.10420 \times 10^{-6}$
(15th surface)
P = 1.0000, $A_4 = 0.41922 \times 10^{-3}$
$A_6 = 0.33437 \times 10^{-4}$

| f | 6 | 12 | 24 |
|---|---|---|---|
| $D_1$ | 33.081 | 12.269 | 1.768 |
| $D_2$ | 1.000 | 3.000 | 1.000 |
| $D_3$ | 1.000 | 7.337 | 20.139 | axial GRIN lens
standard point $x_0 = 1$

| | $N_0$ | $N_1$ | $N_2$ |
|---|---|---|---|
| d line | 1.77250 | $-0.11294 \times 10^{-2}$ | $-0.13660 \times 10^{-1}$ |
| C line | 1.76780 | $-0.11294 \times 10^{-2}$ | $-0.13577 \times 10^{-1}$ |
| F line | 1.78336 | $-0.11294 \times 10^{-2}$ | $-0.13852 \times 10^{-1}$ |

$|N_{1\,(1)} \cdot f_w| = 0.00791$
$\Sigma |\Delta x_1|/h = 0.0904$ (1st lens group)
$\Sigma |\Delta x_4|/h = 0.00648$ (4th lens group)
$\beta_w = -0.320$, $f_w/f_4 = 0.193$, $r_a/r_b = 0.964$

EMBODIMENT 18

$f = 6 \sim 18$ mm, F/2.8,
maximum image height 4.0 mm, $2\omega = 69.0° \sim 24.4°$
$r_1 = 45.1995$ (aspherical surface)
    $d_1 = 5.0000$  $n_1 = 1.72825$  $\nu_1 = 28.46$
$r_2 = -56.3813$
    $d_2 = 1.3540$  $n_2 = 1.72916$  $\nu_2 = 54.68$
$r_3 = 10.5860$
    $d_3 = D_1$ (variable)
$r_4 = 23.7412$
    $d_4 = 4.0000$  $n_3 = 1.72916$  $\nu_3 = 54.68$
$r_5 = -28.1459$
    $d_5 = 1.0000$  $n_4 = 1.80518$  $\nu_4 = 25.43$
$r_6 = 95.2637$
    $d_6 = D_2$ (variable)
$r_7 = 48.6287$
    $d_7 = 3.0000$  $n_5 = 1.67790$  $\nu_5 = 55.33$
$r_8 = -29.3623$
    $d_8 = D_3$ (variable)
$r_9 = \infty$ (stop)
    $d_9 = D_4$ (variable)
$r_{10} = -5.3962$
    $d_{10} = 0.8166$  $n_6 = 1.78470$  $\nu_6 = 26.22$
$r_{11} = -6.9328$
    $d_{11} = 0.7144$
$r_{12} = -31.5541$
    $d_{12} = 1.5000$ axial GRIN lens
$r_{13} = -9.6134$
aspherical surface coefficient
P = 1.0000, $A_4 = 0.16853 \times 10^{-4}$
$A_6 = 0.11041 \times 10^{-7}$, $A_8 = 0.19056 \times 10^{-11}$

| f | 6 | 11 | 18 |
|---|---|---|---|
| $D_1$ | 36.361 | 12.290 | 8.715 |
| $D_2$ | 0.800 | 15.308 | 1.000 |

-continued

|  | D₃ | 1.000 | 9.565 | 19.590 |
|  | D₄ | 3.187 | 1.580 | 1.667 | axial GRIN lens
standard point $x_0 = 0$

|  | $N_0$ | $N_1$ | $N_2$ |
|---|---|---|---|
| d line | 1.70000 | $0.50000 \times 10^{-1}$ | $-0.80000 \times 10^{-2}$ |
| C line | 1.69527 | $0.49963 \times 10^{-1}$ | $-0.78805 \times 10^{-2}$ |
| F line | 1.71111 | $0.50088 \times 10^{-1}$ | $-0.82805 \times 10^{-2}$ |

$|N_{1\,(4)} \cdot f_w| = 0.301$
$\Sigma|\Delta x_1|/h = 0.154$ (1st lens group)
$\beta_w = -0.292$, $f_w/f_4 = 0.219$, $r_a/r_b = 0.778$

EMBODIMENT 19

$f = 6 \sim 18$ mm, F/2.8,
maximum image height 4.0 mm, $2\omega = 68.3° \sim 24.4°$ $r_1 = 46.8232$ (aspherical surface)
  $d_1 = 5.0000$  $n_1 = 1.72825$  $\nu_1 = 28.46$
$r_2 = -45.6696$
  $d_2 = 1.3540$  $n_2 = 1.72916$  $\nu_2 = 54.68$
$r_3 = 9.6789$
  $d_3 = D_1$ (variable)
$r_4 = 26.1667$
  $d_4 = 4.0000$  $n_3 = 1.72916$  $\nu_3 = 54.68$
$r_5 = -24.6812$
  $d_5 = 1.0000$  $n_4 = 1.80518$  $\nu_4 = 25.43$
$r_6 = 196.1382$
  $d_6 = D_2$ (variable)
$r_7 = 41.2393$
  $d_7 = 3.0000$  $n_5 = 1.67790$  $\nu_5 = 55.33$
$r_8 = -26.0810$
  $d_8 = D_3$ (variable)
$r_9 = \infty$ (stop)
  $d_9 = D_4$ (variable)
$r_{10} = -5.7850$
  $d_{10} = 0.8166$  $n_6 = 1.78470$  $\nu_6 = 26.22$
$r_{11} = -8.9533$
  $d_{11} = 0.7144$
$r_{12} = -20.5891$
  $d_{12} = 1.5000$  $n_7 = 1.78590$  $\nu_7 = 44.18$
$r_{13} = -7.7818$ (aspherical surface)
aspherical surface coefficient
(1st surface)
$P = 1.0000$, $A_4 = 0.20863 \times 10^{-4}$
$A_6 = 0.28936 \times 10^{-7}$, $A_8 = -0.39525 \times 10^{-10}$
(13th surface)
$P = 1.0000$, $A_4 = 0.12919 \times 10^{-3}$
$A_6 = -0.11835 \times 10^{-5}$, $A_8 = 0.20066 \times 10^{-6}$

| f | 6 | 11 | 18 |
|---|---|---|---|
| $D_1$ | 33.926 | 12.562 | 8.510 |
| $D_2$ | 0.800 | 11.082 | 1.000 |
| $D_3$ | 1.000 | 8.380 | 17.391 |
| $D_4$ | 3.351 | 1.502 | 1.925 |

$\Sigma|\Delta x_1|/h = 0.140$ (1st lens group)
$\Sigma|\Delta x_4|/h = 0.00138$ (4th lens group)
$\beta_w = -0.333$, $f_w/f_4 = 0.199$, $r_a/r_b = 0.646$

EMBODIMENT 20

$f = 7 \sim 21$ mm, F/2.8,
maximum image height 4 mm, $2\omega = 61.9° \sim 20.9°$ $r_1 = 44.5660$
  $d_1 = 1.2000$  $n_1 = 1.72916$  $\nu_1 = 54.68$
$r_2 = 21.0144$
  $d_2 = 1.9000$
$r_3 = 52.6896$
  $d_3 = 5.0000$  $n_2 = 1.80518$  $\nu_2 = 25.43$
$r_4 = -26.9346$
  $d_4 = 1.2000$  $n_3 = 1.77250$  $\nu_3 = 49.66$
$r_5 = 18.3715$ (aspherical surface)
  $d_5 = D_1$ (variable)
$r_6 = 30.3953$
  $d_6 = 3.8000$  $n_4 = 1.72916$  $\nu_4 = 54.68$
$r_7 = -39.8855$
  $d_7 = 1.0000$  $n_5 = 1.80518$  $\nu_5 = 25.43$
$r_8 = 294.7054$
  $d_8 = D_2$ (variable)
$r_9 = 31.1464$
  $d_9 = 5.2000$  $n_6 = 1.72916$  $\nu_6 = 54.68$
$r_{10} = -18.5539$
  $d_{10} = 1.0000$  $n_7 = 1.80518$  $\nu_7 = 25.43$
$r_{11} = -41.5452$
  $d_{11} = D_3$ (variable)
$r_{12} = \infty$ (stop)
  $d_{12} = 1.8000$
$r_{13} = -6.1842$
  $d_{13} = 1.0000$  $n_8 = 1.72342$  $\nu_8 = 37.95$
$r_{14} = -13.3193$
  $d_{14} = 0.2000$
$r_{15} = -28.3790$
  $d_{15} = 2.8000$  $n_9 = 1.72916$  $\nu_9 = 54.68$
$r_{16} = -7.0616$ (aspherical surface)
aspherical surface coefficient
(5th surface)
$P = 1.0000$, $A_4 = -0.82839 \times 10^{-5}$
$A_6 = -0.64078 \times 10^{-8}$
(16th surface)
$P = 1.0000$, $A_4 = 0.24487 \times 10^{-3}$
$A_6 = 0.41822 \times 10^{-5}$

| f | 7 | 12 | 21 |
|---|---|---|---|
| $D_1$ | 31.060 | 12.586 | 2.400 |
| $D_2$ | 0.600 | 11.469 | 8.654 |
| $D_3$ | 1.000 | 8.606 | 21.605 |

$\beta_{234} = -0.31$, $f_w/f_4 = 0.27$
$\Sigma|\Delta x_1|/h = 0.008$

EMBODIMENT 21

$f = 6 \sim 24$ mm, F/2.8,
maximum image height 4 mm, $2\omega = 70.3° \sim 18.2°$ $r_1 = 67.0952$
  $d_1 = 1.2000$  $n_1 = 1.72916$  $\nu_1 = 54.68$
$r_2 = 13.4535$ (aspherical surface)
  $d_2 = 2.6000$
$r_3 = 24.0199$
  $d_3 = 5.4000$  $n_2 = 1.80518$  $\nu_2 = 25.43$
$r_4 = -29.8765$
  $d_4 = 1.2000$  $n_3 = 1.77250$  $\nu_3 = 49.66$
$r_5 = 15.5623$ (aspherical surface)
  $d_5 = D_1$ (variable)
$r_6 = 44.8181$
  $d_6 = 4.8000$  $n_4 = 1.72916$  $\nu_4 = 54.68$
$r_7 = -16.8876$
  $d_7 = 1.0000$  $n_5 = 1.80518$  $\nu_5 = 25.43$
$r_8 = -54.3473$
  $d_8 = D_2$ (variable)
$r_9 = 28.3527$
  $d_9 = 5.2000$  $n_6 = 1.72916$  $\nu_6 = 54.68$
$r_{10} = -19.7121$
  $d_{10} = 1.0000$  $n_7 = 1.80518$  $\nu_7 = 25.43$
$r_{11} = -47.6410$
  $d_{11} = D_3$ (variable)
$r_{12} = \infty$ (stop)
  $d_{12} = 2.2000$
$r_{13} = -4.6298$
  $d_{13} = 1.0000$  $n_8 = 1.72342$  $\nu_8 = 37.95$
$r_{14} = -7.1322$
  $d_{14} = 2.0374$  $n_9 = 1.72916$  $\nu_9 = 54.68$
$r_{15} = -4.9321$ (aspherical surface)
aspherical surface coefficient
(2nd surface)
$P = 1.0000$, $A_4 = 0.55445 \times 10^{-5}$
$A_6 = 0.35160 \times 10^{-7}$
(5th surface)
$P = 1.0000$, $A_4 = -0.63693 \times 10^{-4}$
$A_6 = -0.27231 \times 10^{-6}$
(15th surface)
$P = 1.0000$, $A_4 = 0.42528 \times 10^{-3}$
$A_6 = 0.26975 \times 10^{-4}$

| f | 6 | 12 | 24 |
|---|---|---|---|
| $D_1$ | 30.180 | 10.932 | 2.400 |
| $D_2$ | 0.600 | 11.209 | 3.875 |
| $D_3$ | 1.000 | 9.639 | 25.505 |

$\beta_{234} = -0.36$, $f_w/f_4 = 0.19$ $\Sigma|\Delta x_1|/h = 0.064$

EMBODIMENT 22 f = 7~28 mm, F/2.8,
maximum image height 4 mm, 2ω = 62.3°~15.5°
$r_1 = 26.7650$
  $d_1 = 1.1000$   $n_1 = 1.69680$   $\nu_1 = 56.49$
$r_2 = 11.5080$ (aspherical surface)
  $d_2 = 4.000$
$r_3 = -21.9263$
  $d_3 = 1.1000$   $n_2 = 1.69680$   $\nu_2 = 56.49$
$r_4 = 17454.2482$
  $d_4 = 0.7000$
$r_5 = 329.6909$
  $d_5 = 1.7818$   $n_3 = 1.80518$   $\nu_3 = 25.43$
$r_6 = -65.4528$
  $d_6 = D_1$ (variable)
$r_7 = 55.6324$
  $d_7 = 2.4000$   $n_4 = 1.72916$   $\nu_4 = 54.68$
$r_8 = -65.1509$
  $d_8 = D_2$ (variable)
$r_9 = 23.9611$
  $d_9 = 1.0000$   $n_5 = 1.80518$   $\nu_5 = 25.43$
$r_{10} = 13.3441$
  $d_{10} = 5.2000$   $n_6 = 1.69680$   $\nu_6 = 56.49$
$r_{11} = -104.0234$
  $d_{11} = D_3$ (variable)
$r_{12} = \infty$ (stop)
  $d_{12} = 1.6000$
$r_{13} = -5.4348$
  $d_{13} = 1.3133$   $n_7 = 1.72916$   $\nu_7 = 54.68$
$r_{14} = -6.3666$
  $d_{14} = 3.5178$
$r_{15} = 12.9207$ (aspherical surface)
  $d_{15} = 0.8000$   $n_8 = 1.78470$   $\nu_8 = 26.22$
$r_{16} = 5.9133$
  $d_{16} = 0.9500$
$r_{17} = 9.8846$
  $d_{17} = 2.3498$   $n_9 = 1.77250$   $\nu_9 = 49.66$
$r_{18} = -30.7105$
aspherical surface coefficient
(2nd surface)
$P = 1.0000, A_4 = -0.32926 \times 10^{-4}$
$A_6 = 0.18308 \times 10^{-6}, A_8 = -0.34804 \times 10^{-8}$
(15th surface)
$P = 1.0000, A_4 = 0.36432 \times 10^{-3}$
$A_6 = 0.57100 \times 10^{-5}, A_8 = 0.32459 \times 10^{-6}$

| f | 7 | 14 | 28 |
|---|---|---|---|
| $D_1$ | 27.991 | 8.728 | 0.500 |
| $D_2$ | 0.800 | 10.083 | 0.500 |
| $D_3$ | 0.800 | 10.780 | 28.591 |

$\beta_{234} = -0.35, f_w/f_4 = 0.25$
$\Sigma|\Delta x_1|/h = 0.033$

EMBODIMENT 23 f = 7~21 mm, F/2.0,
Maximum image height 4 mm, 2ω = 61.4°~20.6°
$r_1 = 49.9638$
  $d_1 = 1.2084$   $n_1 = 1.69680$   $\nu_1 = 56.49$
$r_2 = 11.8087$ (aspherical surface)
  $d_2 = 3.8000$
$r_3 = -21.1186$
  $d_3 = 1.2297$   $n_2 = 1.69680$   $\nu_2 = 56.49$
$r_4 = -1339.3852$
  $d_4 = 1.0001$
$r_5 = -258.5732$
  $d_5 = 1.8669$   $n_3 = 1.80518$   $\nu_3 = 25.43$
$r_6 = -32.8734$
  $d_6 = D_1$ (variable)
$r_7 = 38.6070$
  $d_7 = 2.8220$   $n_4 = 1.72916$   $\nu_4 = 54.68$
$r_8 = -230.6438$
  $d_8 = D_2$ (variable)
$r_9 = 24.8829$
  $d_9 = 1.1163$   $n_5 = 1.80518$   $\nu_5 = 25.43$
$r_{10} = 12.2105$
  $d_{10} = 6.0000$   $n_6 = 1.69680$   $\nu_6 = 56.49$
$r_{11} = -74.5630$
  $d_{11} = D_3$ (variable)
$r_{12} = \infty$ (stop)
  $d_{12} = 2.8000$
$r_{13} = -5.3756$
  $d_{13} = 1.3696$   $n_7 = 1.72916$   $\nu_7 = 54.68$
$r_{14} = -6.2765$
  $d_{14} = 3.7000$
$r_{15} = 11.3897$ (aspherical surface)
  $d_{15} = 0.8000$   $n_8 = 1.78470$   $\nu_8 = 26.22$
$r_{16} = 5.6137$
  $d_{16} = 0.8000$
$r_{17} = 8.3643$
  $d_{17} = 2.2000$   $n_9 = 1.77250$   $\nu_9 = 49.66$
$r_{18} = -43.9605$
aspherical surface coefficient
(2nd surface)
$P = 1.0000, A_4 = -0.42509 \times 10^{-4}$
$A_6 = -0.26444 \times 10^{-6}, A_8 = -0.25545 \times 10^{-8}$
(15th surface)
$P = 1.0000, A_4 = 0.31173 \times 10^{-3}$
$A_6 = 0.90524 \times 10^{-5}, A_8 = 0.15060 \times 10^{-6}$

| f | 7 | 12 | 21 |
|---|---|---|---|
| $D_1$ | 22.761 | 7.905 | 0.800 |
| $D_2$ | 3.926 | 9.510 | 2.159 |
| $D_3$ | 0.800 | 10.072 | 24.528 |

$\beta_{234} = -0.36, f_w/f_4 = 0.31$
$\Sigma|\Delta x_1|/h = 0.030$

EMBODIMENT 24 f = 7~21 mm, F/2.8,
maximum image height 4 mm, 2ω = 61.4°~20.9°
$r_1 = 158.1643$ (aspherical surface)
  $d_1 = 5.4000$   $n_1 = 1.72825$   $\nu_1 = 28.46$
$r_2 = -18.9847$
  $d_2 = 1.3540$   $n_2 = 1.72916$   $\nu_2 = 54.68$
$r_3 = 14.4361$
  $d_3 = D_1$ (variable)
$r_4 = 23.7197$
  $d_4 = 5.0000$   $n_3 = 1.72916$   $\nu_3 = 54.68$
$r_5 = -20.9506$
  $d_5 = 1.0000$   $n_4 = 1.80518$   $\nu_4 = 25.43$
$r_6 = -2794.8349$
  $d_6 = D_2$ (variable)
$r_7 = 41.5540$
  $d_7 = 3.2000$   $n_5 = 1.67790$   $\nu_5 = 55.33$
$r_8 = -57.7970$
  $d_8 = D_3$ (variable)
$r_9 = \infty$ (stop)
  $d_9 = 4.5548$
$r_{10} = -4.0736$
  $d_{10} = 0.8000$   $n_6 = 1.78470$   $\nu_6 = 26.22$
$r_{11} = -7.8349$
  $d_{11} = 0.5306$
$r_{12} = -17.6719$
  $d_{12} = 1.9000$   $n_7 = 1.78590$   $\nu_7 = 44.18$
$r_{13} = -5.3395$ (aspherical surface)
aspherical surface coefficient
(1st surface)
$P = 1.0000, A_4 = 0.36146 \times 10^{-5}$
$A_6 = 0.89973 \times 10^{-7}, A_8 = -0.41081 \times 10^{-9}$
(13th surface)
$P = 1.0000, A_4 = 0.36158 \times 10^{-3}$
$A_6 = 0.10982 \times 10^{-4}, A_8 = 0.59604 \times 10^{-6}$

| f | 7 | 12 | 21 |
|---|---|---|---|
| $D_1$ | 28.945 | 14.886 | 6.417 |
| $D_2$ | 0.800 | 6.834 | 0.800 |
| $D_3$ | 1.000 | 9.025 | 23.528 |

$\beta_{234} = -0.32, f_w/f_4 = 0.37$
$\Sigma|\Delta x_1|/h = 0.026$

EMBODIMENT 25

$f = 7 \sim 21$ mm, F/4.0,
maximum image height 4 mm, $2\omega = 60.6° \sim 21.8°$
$r_1 = 14.3307$
　　　　$d_1 = 1.0000$　$n_1 = 1.77250$　$\nu_1 = 49.66$
$r_2 = 9.2878$
　　　　$d_2 = 3.4000$
$r_3 = 22.3754$ (aspherical surface)
　　　　$d_3 = 3.6000$　$n_2 = 1.80518$　$\nu_2 = 25.43$
$r_4 = 182.6498$
　　　　$d_4 = 1.0000$　$n_3 = 1.77250$　$\nu_3 = 49.66$
$r_5 = 9.6921$
　　　　$d_5 = D_1$ (variable)
$r_6 = 31.1842$
　　　　$d_6 = 2.8000$　$n_4 = 1.60311$　$\nu_4 = 60.70$
$r_7 = -94.2051$
　　　　$d_7 = D_2$ (variable)
$r_8 = 32.2391$
　　　　$d_8 = 1.0000$　$n_5 = 1.80518$　$\nu_5 = 25.43$
$r_9 = 12.4066$
　　　　$d_9 = 5.8000$　$n_6 = 1.69680$　$\nu_6 = 55.52$
$r_{10} = -21.7625$
　　　　$d_{10} = D_3$ (variable)
$r_{11} = \infty$ (stop)
　　　　$d_{11} = 3.0000$
$r_{12} = -5.9364$
　　　　$d_{12} = 1.6000$　$n_7 = 1.49216$　$\nu_7 = 57.50$
$r_{13} = -6.8832$
aspherical surface coefficient
$P = 1.0000$, $A_4 = 0.49237 \times 10^{-4}$
$A_6 = 0.51699 \times 10^{-6}$

| f | 6 | 12 | 21 |
|---|---|---|---|
| $D_1$ | 32.632 | 16.134 | 4.507 |
| $D_2$ | 0.600 | 11.893 | 12.940 |
| $D_3$ | 0.800 | 6.004 | 16.584 |

$\beta_{234} = -0.50$, $f_w/f_4 = -0.04$
$\Sigma|\Delta x_1|/h = 0.061$

EMBODIMENT 26

$f = 7 \sim 28$ mm, F/2.8,
maximum image height 4 mm, $2\omega = 62.3° \sim 15.6°$
$r_1 = 44.9788$
　　　　$d_1 = 1.0000$　$n_1 = 1.69680$　$\nu_1 = 56.49$
$r_2 = 12.8493$ (aspherical surface)
　　　　$d_2 = 4.0000$
$r_3 = -20.8212$
　　　　$d_3 = 1.0000$　$n_2 = 1.69680$　$\nu_2 = 56.49$
$r_4 = -858.0492$
　　　　$d_4 = 0.7000$
$r_5 = -60.4314$
　　　　$d_5 = 1.8000$　$n_3 = 1.80518$　$\nu_3 = 25.43$
$r_6 = -28.3267$
　　　　$d_6 = D_1$ (variable)
$r_7 = 92.1138$
　　　　$d_7 = 2.6000$　$n_4 = 1.72916$　$\nu_4 = 54.68$
$r_8 = -52.8923$
　　　　$d_8 = D_2$ (variable)
$r_9 = 21.7443$
　　　　$d_9 = 1.0000$　$n_5 = 1.80518$　$\nu_5 = 25.43$
$r_{10} = 12.7098$
　　　　$d_{10} = 5.6000$　$n_6 = 1.69680$　$\nu_6 = 56.49$
$r_{11} = -101.6235$
　　　　$d_{11} = D_3$ (variable)
$r_{12} = -5.8905$
　　　　$d_{12} = 1.3000$　$n_7 = 1.72916$　$\nu_7 = 54.68$
$r_{13} = -6.5936$
　　　　$d_{13} = 0.8000$
$r_{14} = \infty$ (stop)
　　　　$d_{14} = 5.0758$
$r_{15} = 9.7260$ (aspherical surface)
　　　　$d_{15} = 1.0000$　$n_8 = 1.78470$　$\nu_8 = 26.22$
$r_{16} = 5.2430$
　　　　$d_{16} = 0.9000$
$r_{17} = 8.2226$
　　　　$d_{17} = 2.4000$　$n_9 = 1.77250$　$\nu_9 = 49.66$
$r_{18} = 161.8048$
aspherical surface coefficient
(2nd surface)
$P = 1.0000$, $A_4 = -0.25160 \times 10^{-4}$
$A_6 = -0.42311 \times 10^{-6}$, $A_8 = 0.50898 \times 10^{-9}$
(15th surface)
$P = 1.0000$, $A_4 = 0.30929 \times 10^{-3}$
$A_6 = 0.18672 \times 10^{-4}$, $A_8 = -0.11931 \times 10^{-5}$

| f | 7 | 14 | 28 |
|---|---|---|---|
| $D_1$ | 27.898 | 7.991 | 0.600 |
| $D_2$ | 0.600 | 10.349 | 0.600 |
| $D_3$ | 1.600 | 11.758 | 28.898 |

$\beta_{234} = -0.38$, $f_w/f_4 = 0.20$
$\Sigma|\Delta x_1|/h = 0.027$

EMBODIMENT 27

$f = 7 \sim 21$ mm, F/4.0,
maximum image height 4 mm, $2\omega = 61.5° \sim 22.0°$
$r_1 = 15.8324$
　　　　$d_1 = 1.0000$　$n_1 = 1.77250$　$\nu_1 = 49.66$
$r_2 = 9.3824$
　　　　$d_2 = 3.4000$
$r_3 = 28.8811$ (aspherical surface)
　　　　$d_3 = 3.6000$　$n_2 = 1.80518$　$\nu_2 = 25.43$
$r_4 = -71.9406$
　　　　$d_4 = 1.0000$　$n_3 = 1.77250$　$\nu_3 = 49.66$
$r_5 = 12.5437$
　　　　$d_5 = D_1$ (variable)
$r_6 = 39.1309$
　　　　$d_6 = 2.8000$　$n_4 = 1.60311$　$\nu_4 = 60.70$
$r_7 = -59.5657$
　　　　$d_7 = D_2$ (variable)
$r_8 = 39.8143$
　　　　$d_8 = 1.0000$　$n_5 = 1.80518$　$\nu_5 = 25.43$
$r_9 = 13.3682$
　　　　$d_9 = 5.8000$　$n_6 = 1.69680$　$\nu_6 = 55.52$
$r_{10} = -21.5480$
　　　　$d_{10} = D_3$ (variable)
$r_{11} = -6.1515$
　　　　$d_{11} = 1.6000$　$n_7 = 1.49216$　$\nu_7 = 57.50$
$r_{12} = -6.7778$
　　　　$d_{12} = 1.0000$
$r_{13} = \infty$ (stop)
aspherical surface coefficient
$P = 1.0000$, $A_4 = 0.22391 \times 10^{-4}$
$A_6 = 0.55529 \times 10^{-6}$

| f | 7 | 12 | 21 |
|---|---|---|---|
| $D_1$ | 33.251 | 16.473 | 4.518 |
| $D_2$ | 0.600 | 12.040 | 12.967 |
| $D_3$ | 1.600 | 6.938 | 17.965 |

$\beta_{234} = -0.47$, $f_w/f_4 = -0.01$
$\Sigma|\Delta x_1|/h = 0.044$

EMBODIMENT 28

$f = 7 \sim 21$ mm, F/4.0,
maximum image height 4 mm, $2\omega = 61.3° \sim 21.8°$
$r_1 = 16.8825$
　　　　$d_1 = 1.0000$　$n_1 = 1.72916$　$\nu_1 = 54.68$
$r_2 = 7.4074$
　　　　$d_2 = 4.6000$
$r_3 = -38.8946$ (aspherical surface)
　　　　$d_3 = 1.0000$　$n_2 = 1.77250$　$\nu_2 = 49.66$
$r_4 = 28.4674$
　　　　$d_4 = 2.4000$　$n_3 = 1.80518$　$\nu_3 = 25.43$
$r_5 = -101.6261$ (aspherical surface)
　　　　$d_5 = D_1$ (variable)
$r_6 = 26.6577$
　　　　$d_6 = 2.8000$　$n_4 = 1.65844$　$\nu_4 = 50.86$
$r_7 = -661.1244$
　　　　$d_7 = D_2$ (variable)
$r_8 = 24.5819$ (aspherical surface)
　　　　$d_8 = 1.0000$　$n_5 = 1.80518$　$\nu_5 = 25.43$
$r_9 = 10.9050$
　　　　$d_9 = 6.0000$　$n_6 = 1.69680$　$\nu_6 = 56.49$
$r_{10} = -41.2706$
　　　　$d_{10} = D_3$ (variable)

-continued r₁₁ = ∞ (stop)
aspherical surface coefficient
(3rd surface)
P = 1.0000, A₄ = 0.10633 × 10⁻³
A₆ = 0.14749 × 10⁻⁵
(5th surface)
P = 1.0000, A₄ = 0.39726 × 10⁻⁴
A₆ = −0.59156 × 10⁻⁶
(8th surface)
P = 1.0000, A₄ = −0.95359 × 10⁻⁵
A₆ = 0.13027 × 10⁻⁶

| f | 7 | 12 | 21 |
|---|---|---|---|
| D₁ | 29.833 | 13.843 | 2.994 |
| D₂ | 0.600 | 10.846 | 10.210 |
| D₃ | 0.800 | 6.544 | 18.029 |

$\beta_{23} = -0.45$, $\Sigma|\Delta x_1|/h = 0.053$ wherein the reference symbols $r_1, r_2, \ldots$ represent the radii of curvature on the surfaces of the respective lens elements, the reference symbols $d_1, d_2, \ldots$ designates the thicknesses of the respective lens elements and the airspaces reserved therebetween, the reference symbols $n_1, n_2, \ldots$ denote the refractive indices of the respective lens elements, and the reference symbols $\nu_1, \nu_2, \ldots$ represent Abbe's numbers of the respective lens elements.

The Embodiment 1 has the composition illustrated in FIG. 1 wherein the lens component arranged on the most image side in the first lens unit is designed as a radial GRIN lens component. Further, the second surface is designed as an aspherical surface satisfying the condition (5) for favorably correcting the negative distortion at the wide position. Moreover, the total length, the location of the aperture stop and the F number of the Embodiment 1 remain unchanged by varying the focal length thereof.

Figure 29:
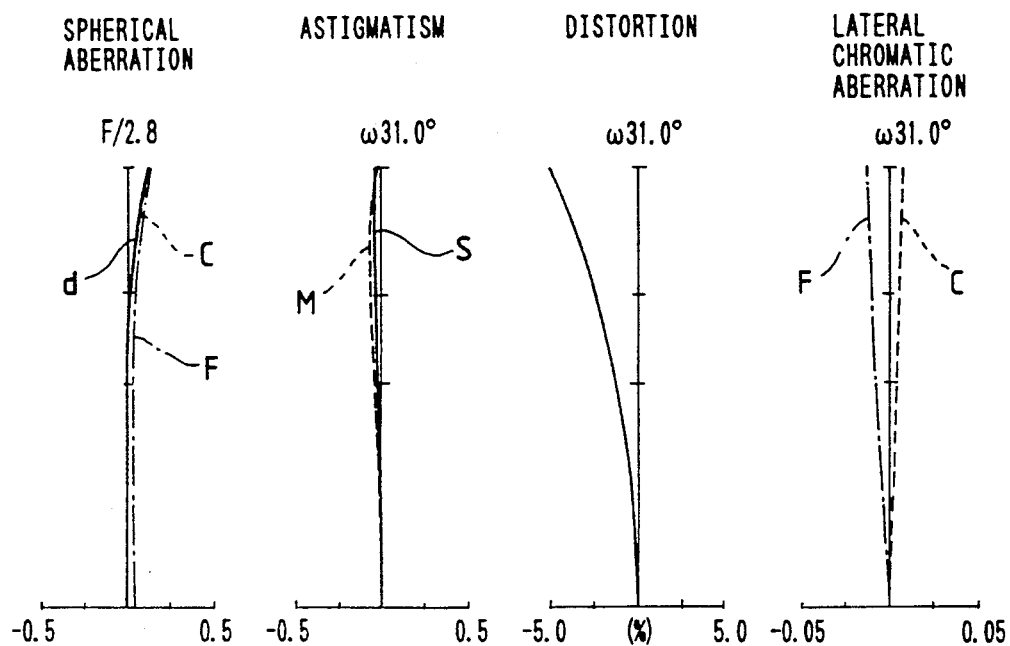
FIG. 29 through FIG. 31 show curves illustrating aberration characteristics of the Embodiment 1 of the present invention.
Figure 30:
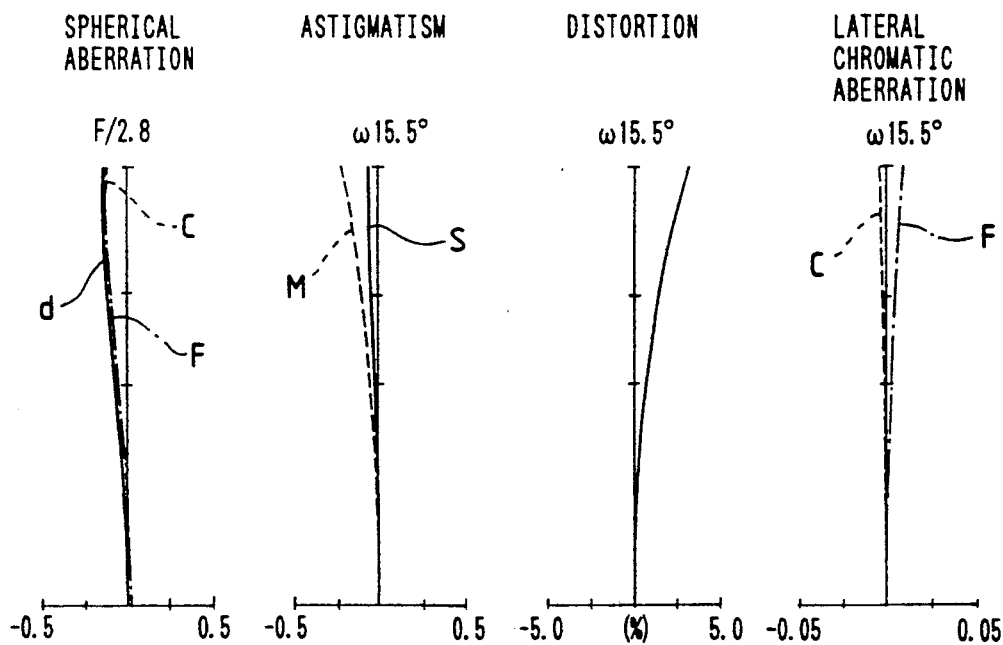
Figure 31:
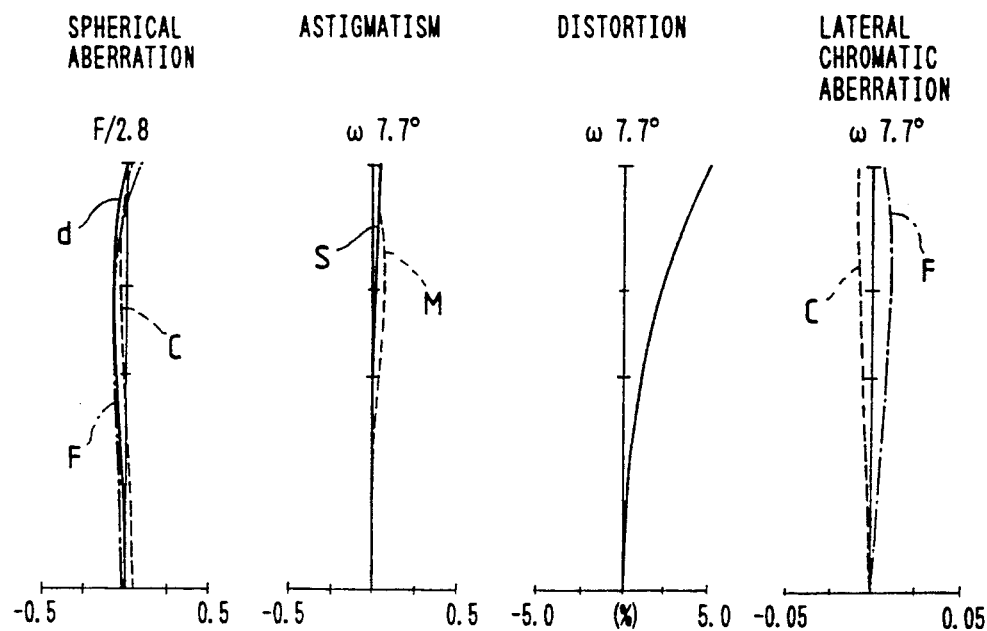

Aberration characteristics at the wide position, intermediate focal length and tele position of the Embodiment 1 are illustrated in FIG. 29, FIG. 30 and FIG. 31 respectively.

Figure 2:
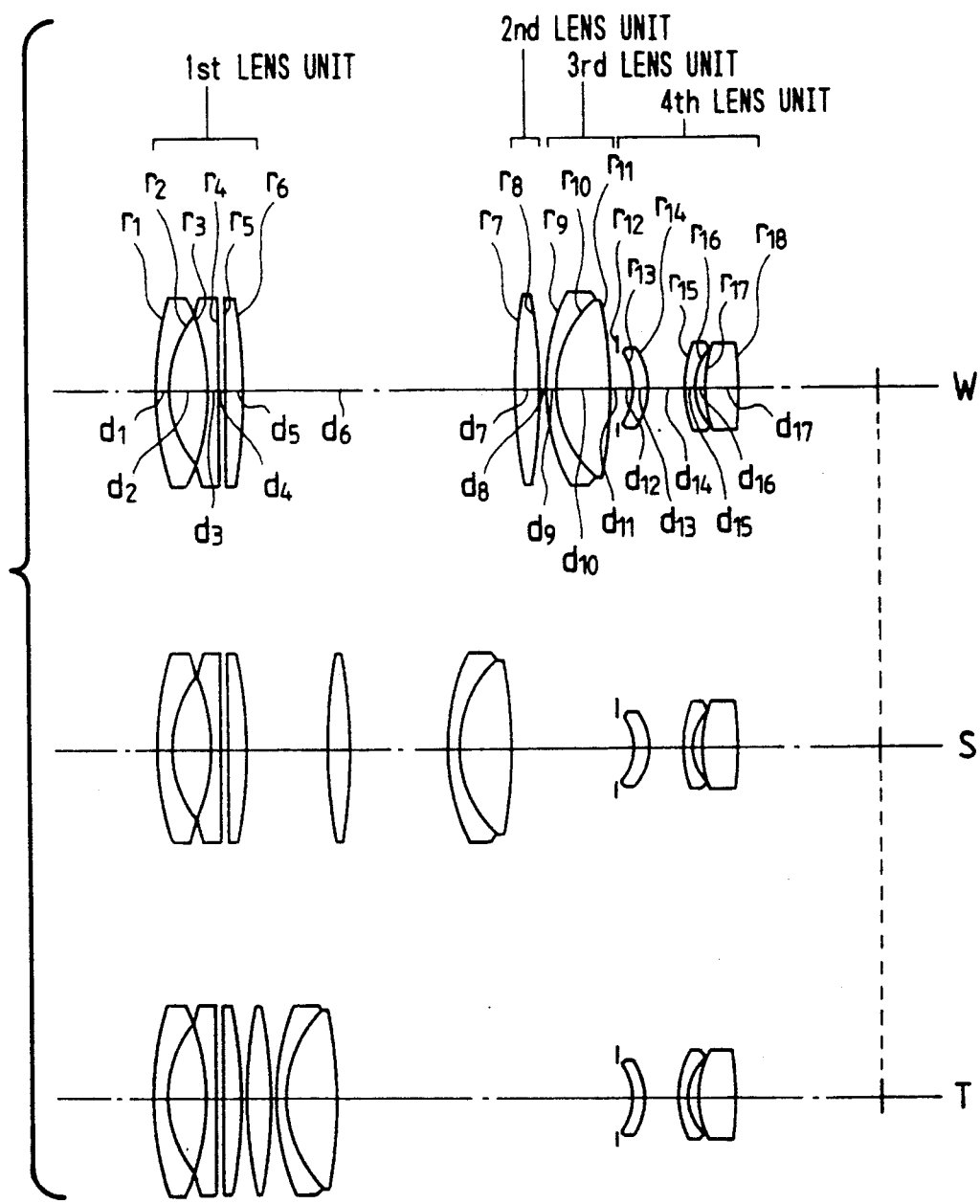

The Embodiment 2 has the composition illustrated in FIG. 2 wherein the second lens unit is composed only of a single radial GRIN lens component satisfying the condition (1) and the vari-focal lens system has a vari-focal ratio of 5. Also in the Embodiment 2, aberrations are favorably corrected by using an aspherical surface which is similar to that used in the Embodiment 1. Further, the Embodiment 2 also has a total length, a location of the aperture stop and an F number which are not varied by variation of focal length.

Figure 32:
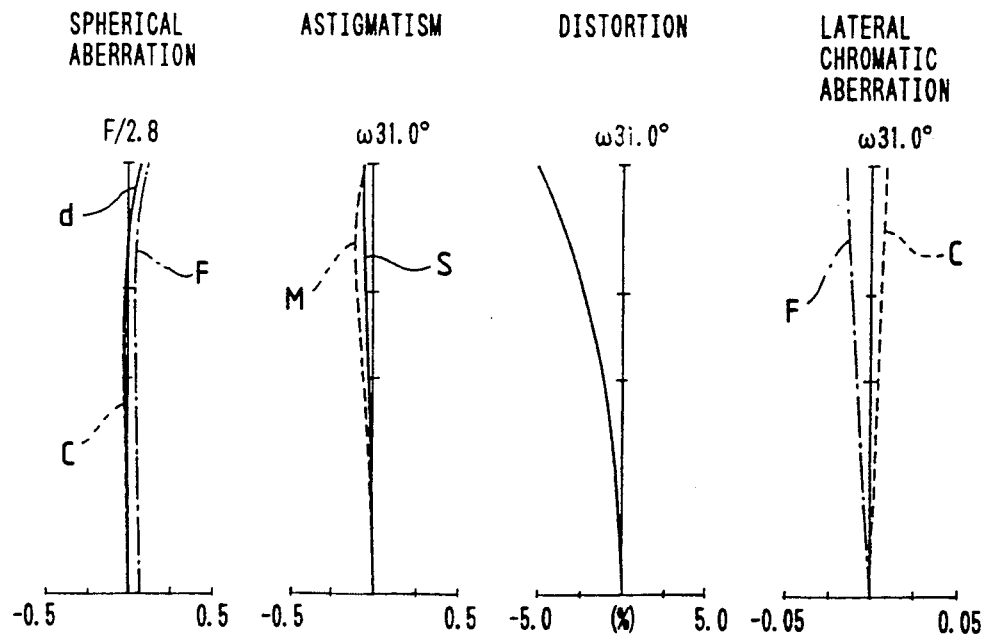
FIG. 32 through FIG. 34 show curves illustrating aberration characteristics of the Embodiment 2 of the present invention.
Figure 33:
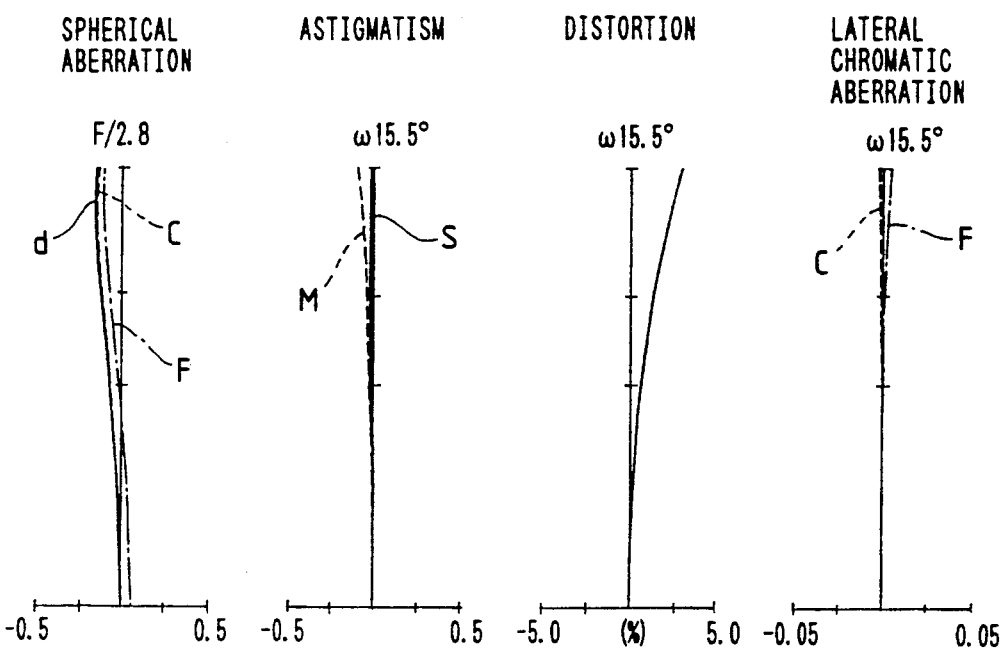
Figure 34:
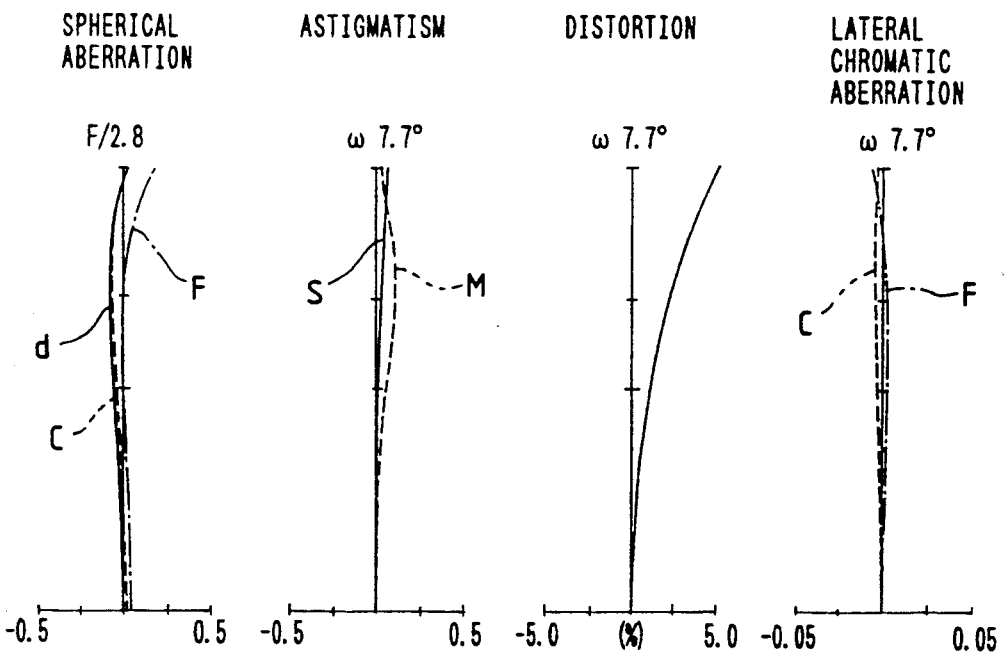

Aberration characteristics at the wide position, intermediate focal length and tele position of the Embodiment 2 are illustrated in FIG. 32, FIG. 33 and FIG. 34 respectively.

Figure 3:
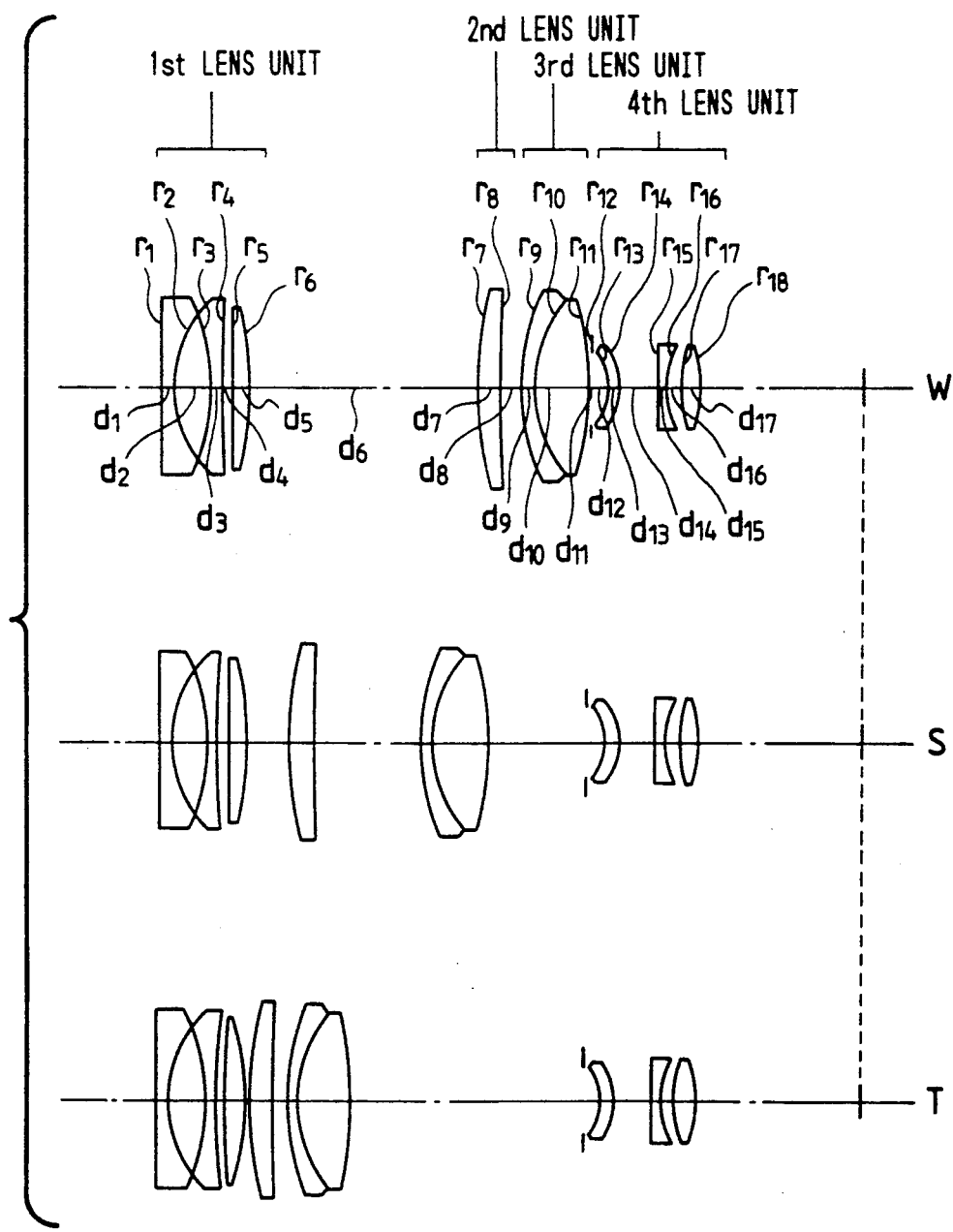

The Embodiment 3 has the composition shown in FIG. 3 wherein the positive lens element arranged in the third lens unit is designed as a radial GRIN lens element satisfying the condition (1). In the Embodiment 3, the negative distortion at the wide position is corrected by designing the first surface as an aspherical surface. Further, the total length, the location of the aperture stop and the F number of the Embodiment 3 are kept fixed.

Figure 35:
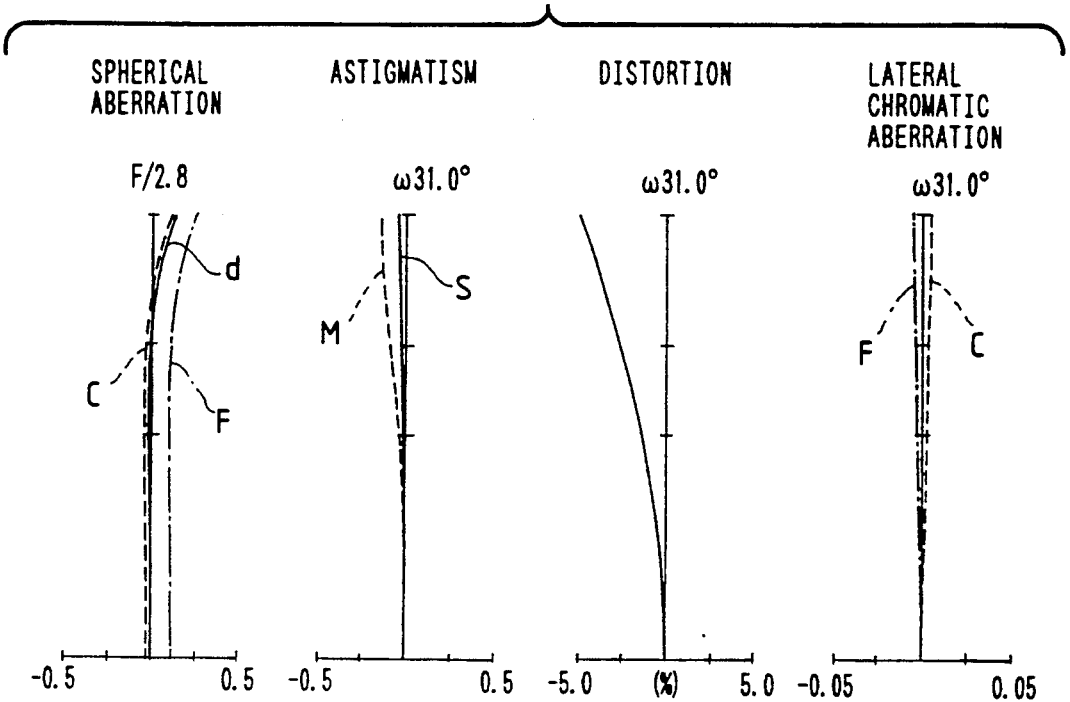
FIG. 35 through FIG. 37 show graphs illustrating aberration characteristics of the Embodiment 3 of the present invention.
Figure 36:
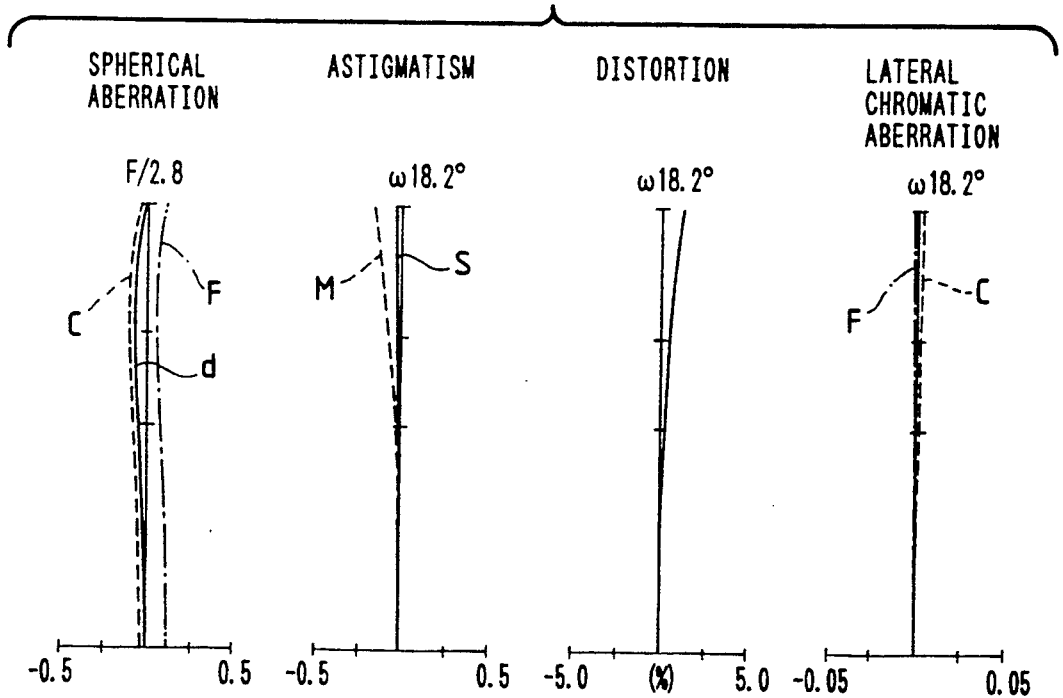
Figure 37:
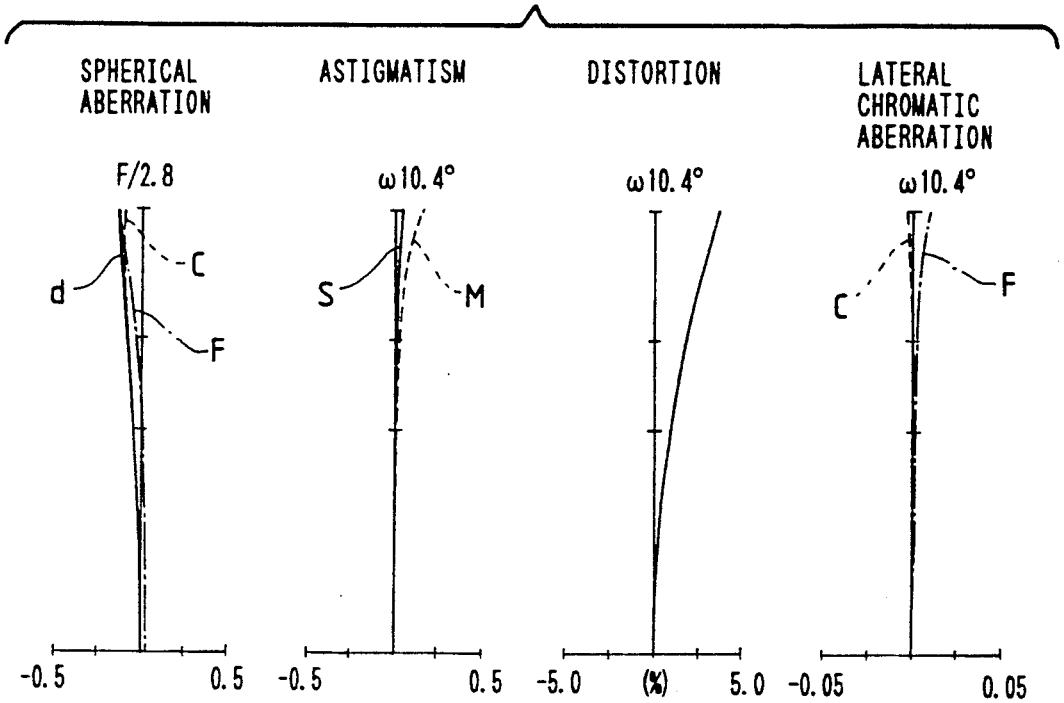

Aberration characteristics at the wide position, intermediate focal length and tele position of the Embodiment 3 are visualized in FIG. 35, FIG. 36 and FIG. 37 respectively.

Figure 4:
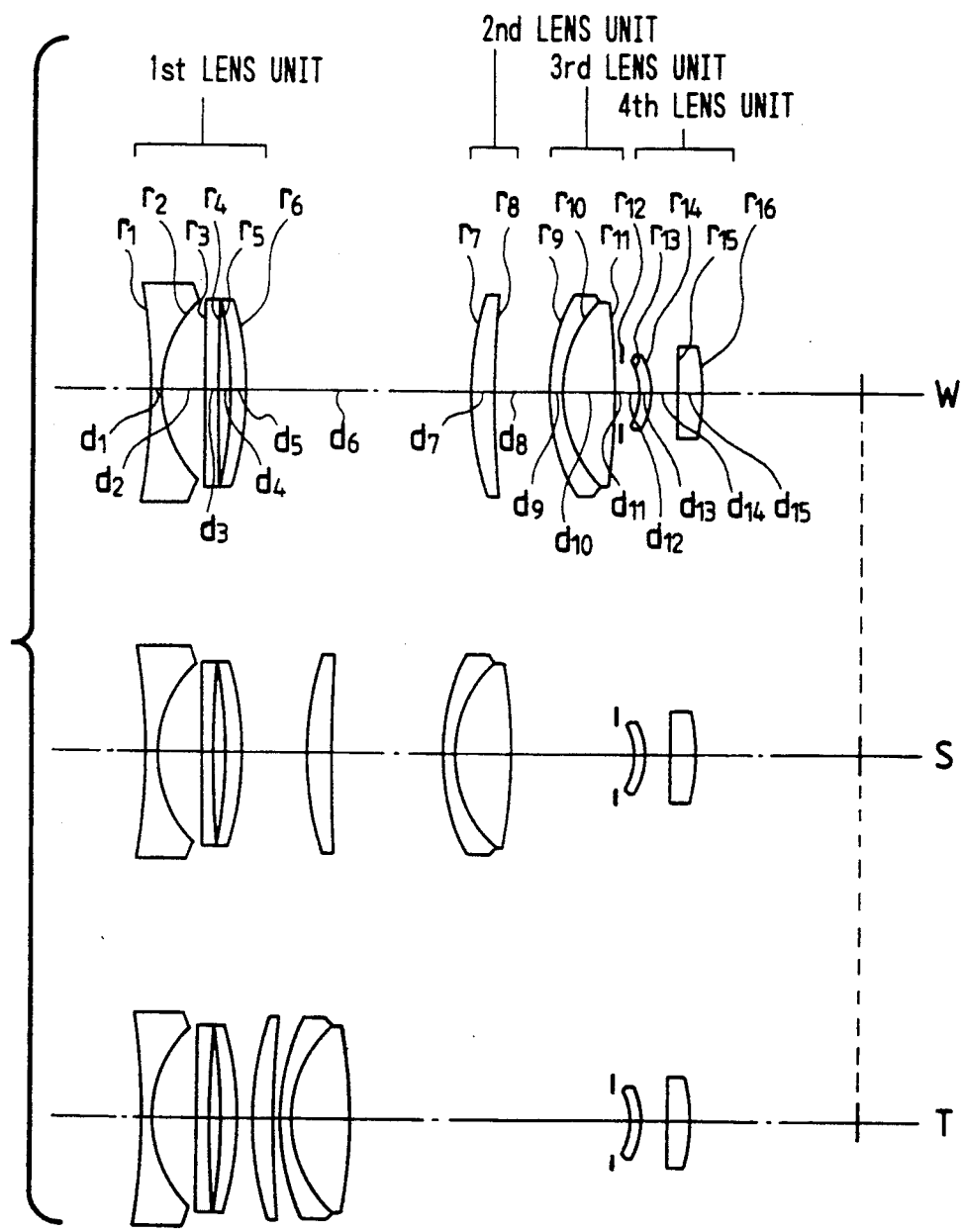

The Embodiment 4 has the composition shown in FIG. 4 wherein the lens component arranged on the most image side is designed as a radial GRIN lens component which has a positive refractive power and serves for favorably correcting spherical aberration over the entire range from the wide position to the tele position. Further, the Embodiment 4 has a field angle as wide as 70° at the wide position and adopts an aspherical surface as the second surface to favorably correct the negative distortion at the wide position. The total length, the location of the aperture stop and the F number of the Embodiment 4 are also kept fixed.

Figure 38:
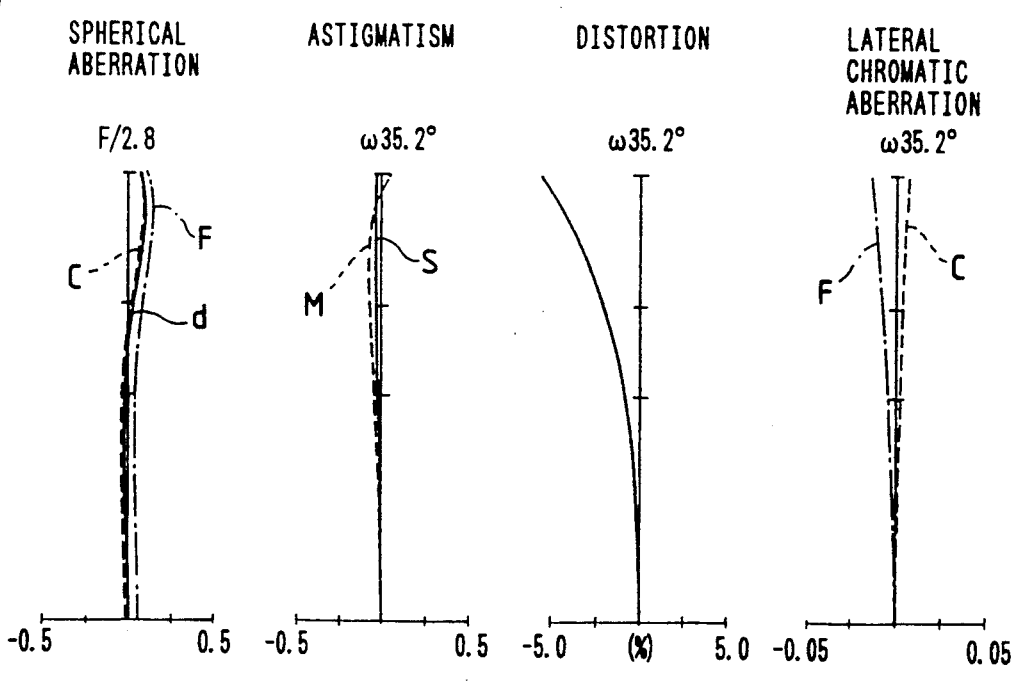
FIG. 38 through FIG. 40 show graphs illustrating aberration characteristics of the Embodiment 4 of the present invention.
Figure 39:
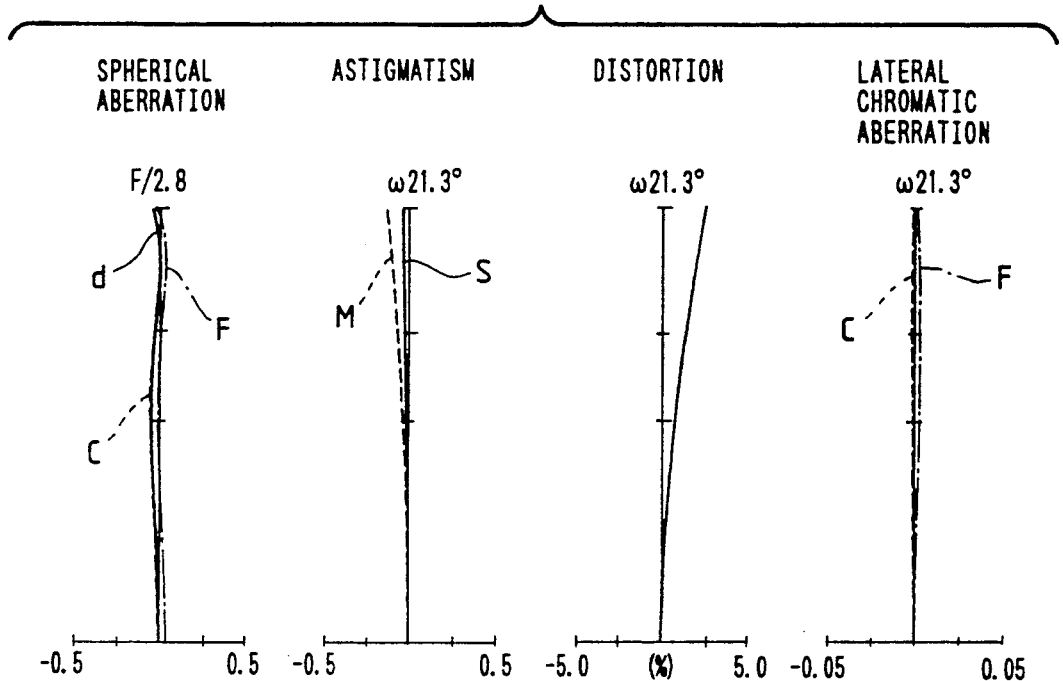
Figure 40:
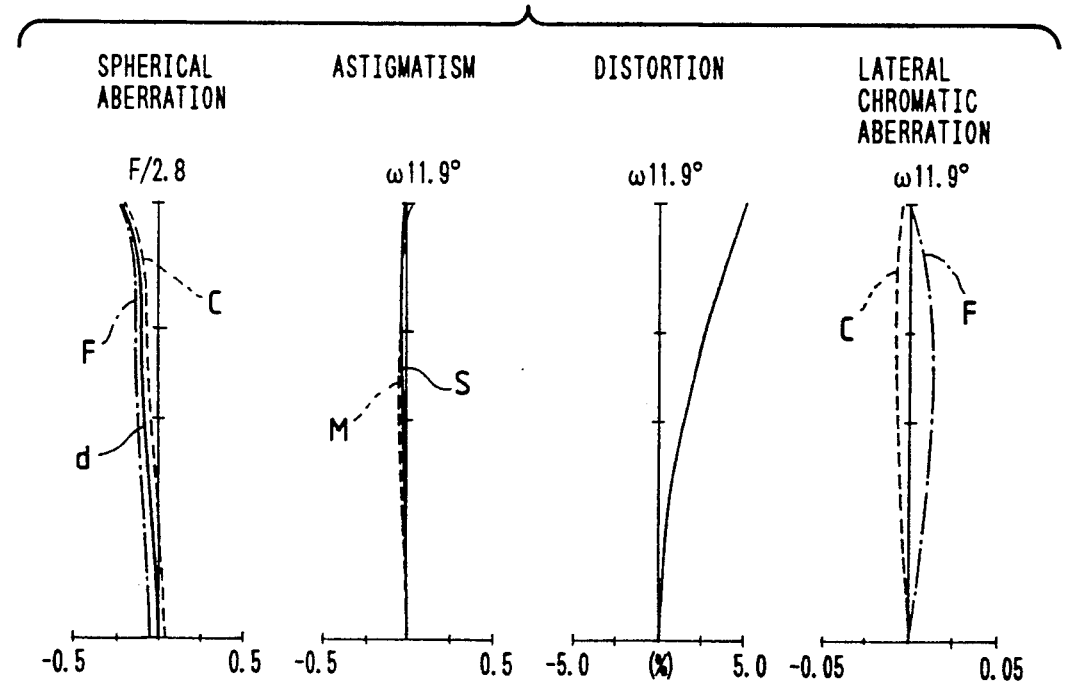

Aberration characteristics at the wide position, intermediate focal length and tele position of the Embodiment 4 are visualized in FIG. 38, FIG. 39 and FIG. 40 respectively.

Figure 5:
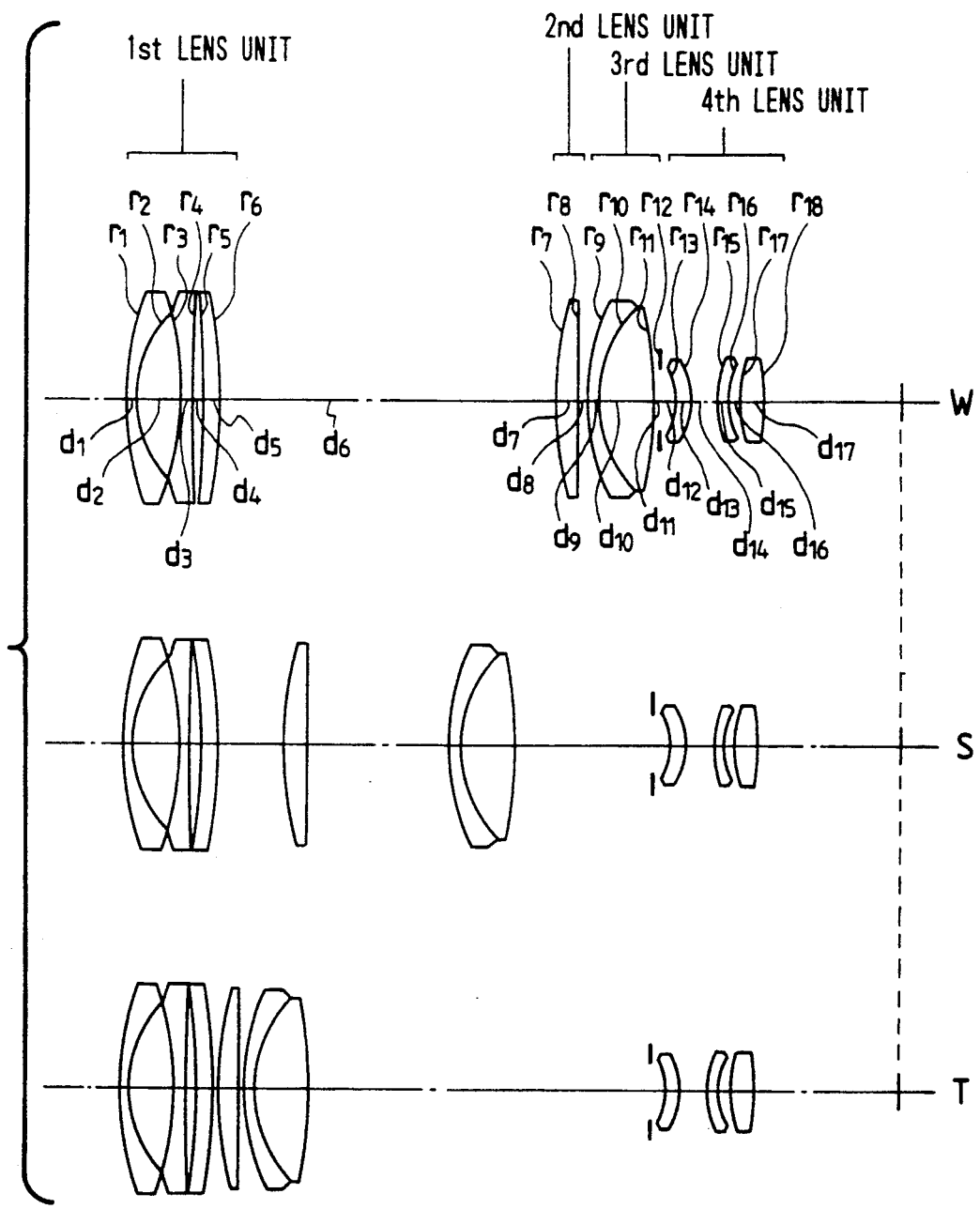

The Embodiment 5 has the composition illustrated in FIG. 5 wherein the second lens unit is composed only of a radial GRIN lens component satisfying the condition (1) and the lens component arranged on the most image side in the fourth lens unit is designed as a radial GRIN lens component satisfying the condition (2), a field angle of 70° at the wide position and a vari-focal ratio of 5.

The Embodiment 5 sues, as the second and fifth surfaces, aspherical surfaces for correcting aberrations favorably. The Embodiment 5 also has a total length, a location of the aperture stop and an F number which are invariable by variation of focal length.

Figure 43:
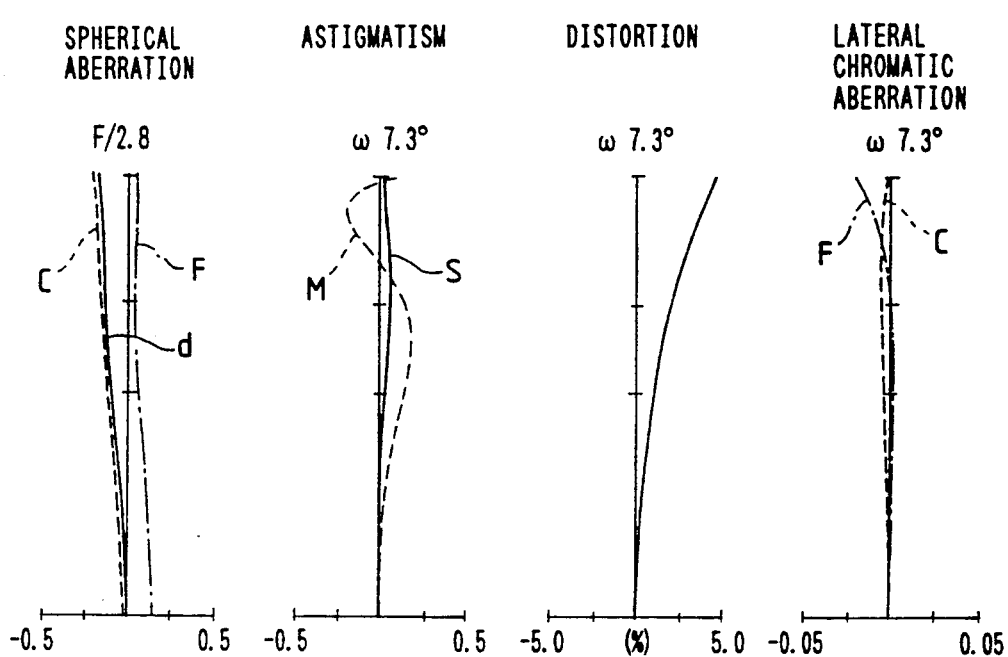

Aberration characteristics at the wide position, intermediate focal length and tele position of the Embodiment 5 are illustrated in FIG 41, FIG. 42 and FIG. 43 respectively.

Figure 6:
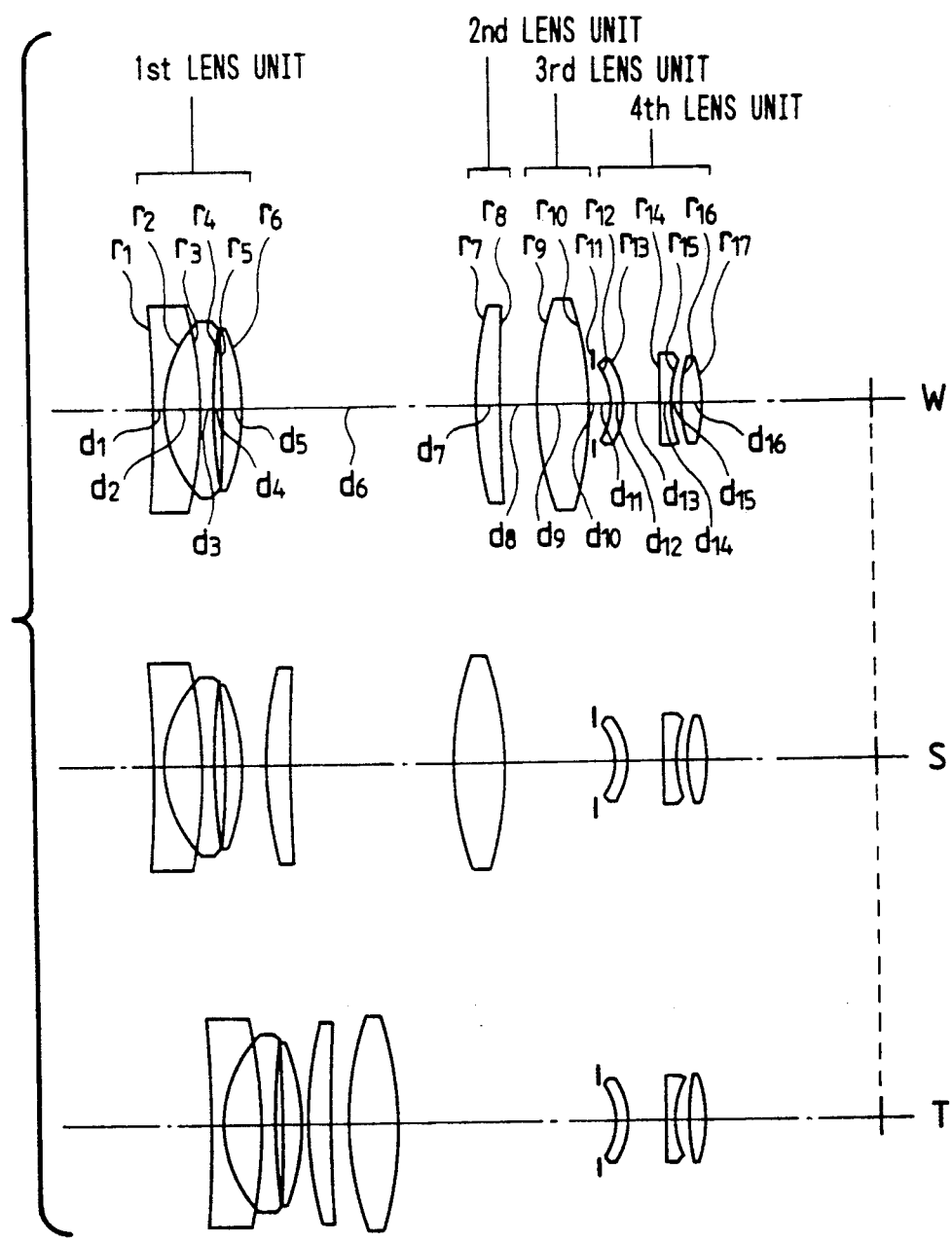

The Embodiment 6 has the composition shown in FIG. 6 wherein the third lens unit is composed only of a radial GRIN lens component satisfying the condition (1). In case of the Embodiment 6, the location of the aperture stop and F number are kept fixed, but the first lens unit is moved for variation of focal length so as to shorten the total length of the Embodiment 6.

Figure 44:
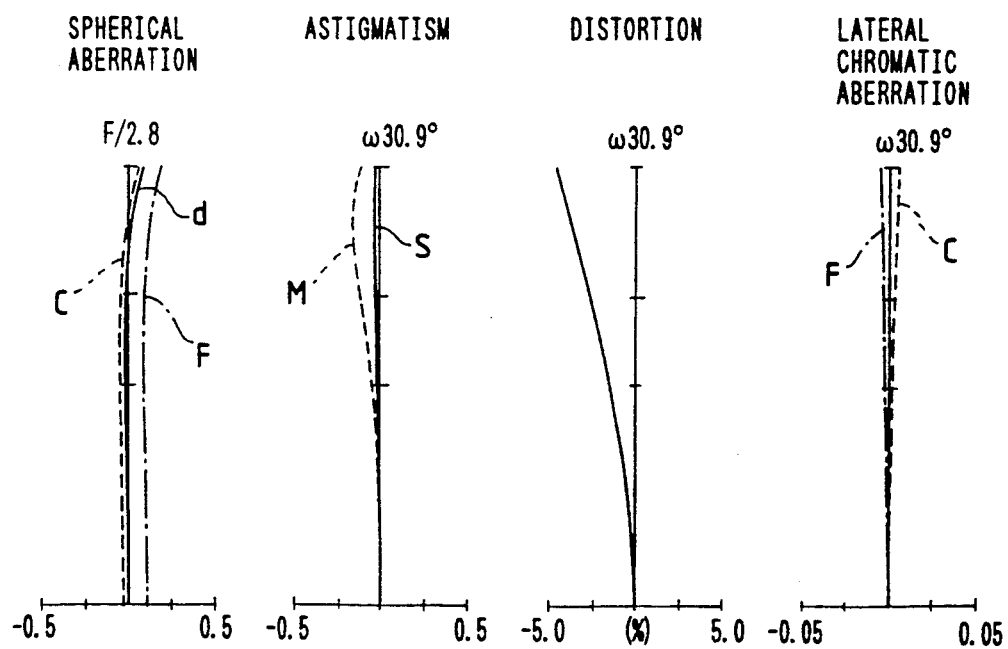
FIG. 44 through FIG. 46 show curves visualizing aberration characteristics of the Embodiment 6 of the present invention.
Figure 45:
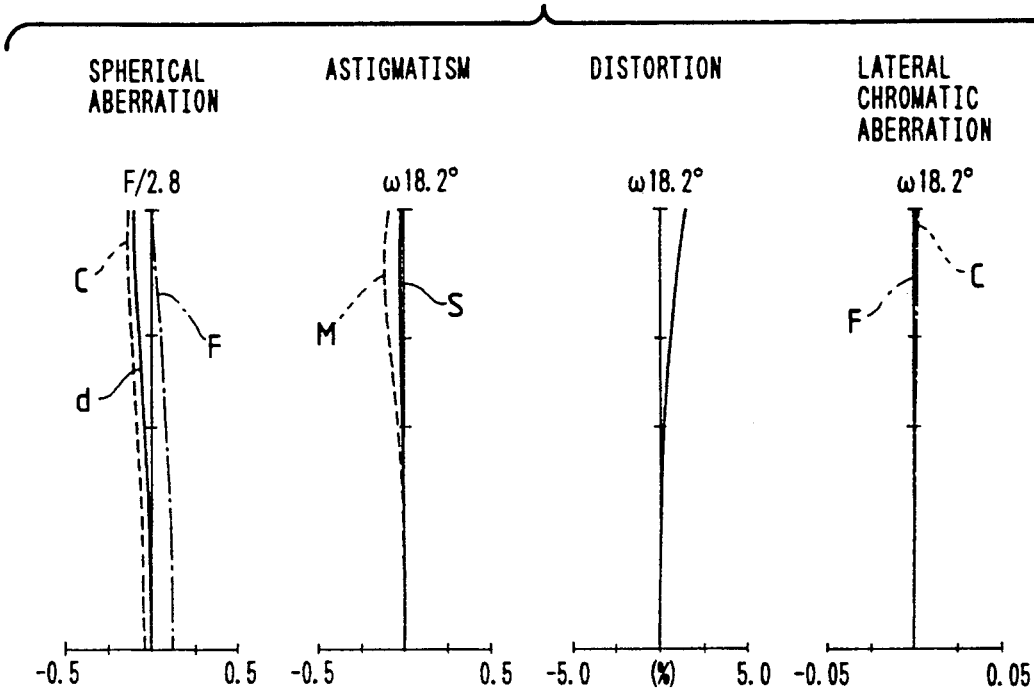
Figure 46:
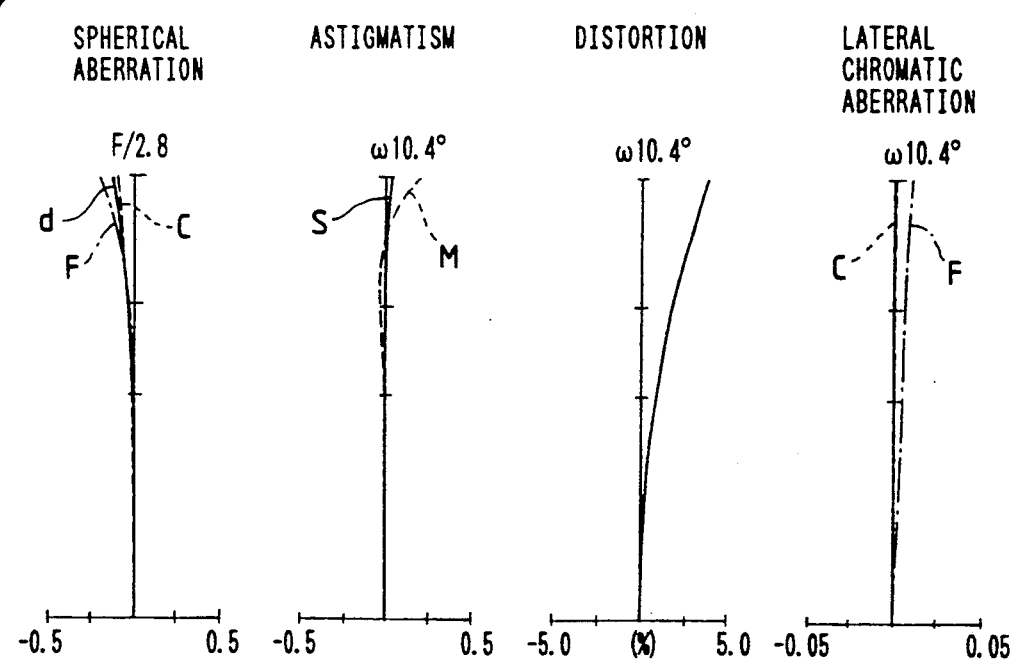

Aberration characteristics at the wide position, intermediate focal length and tele position of the Embodiment 6 are visualized in FIG. 44, FIG. 45 and FIG. 46 respectively.

Figure 7:
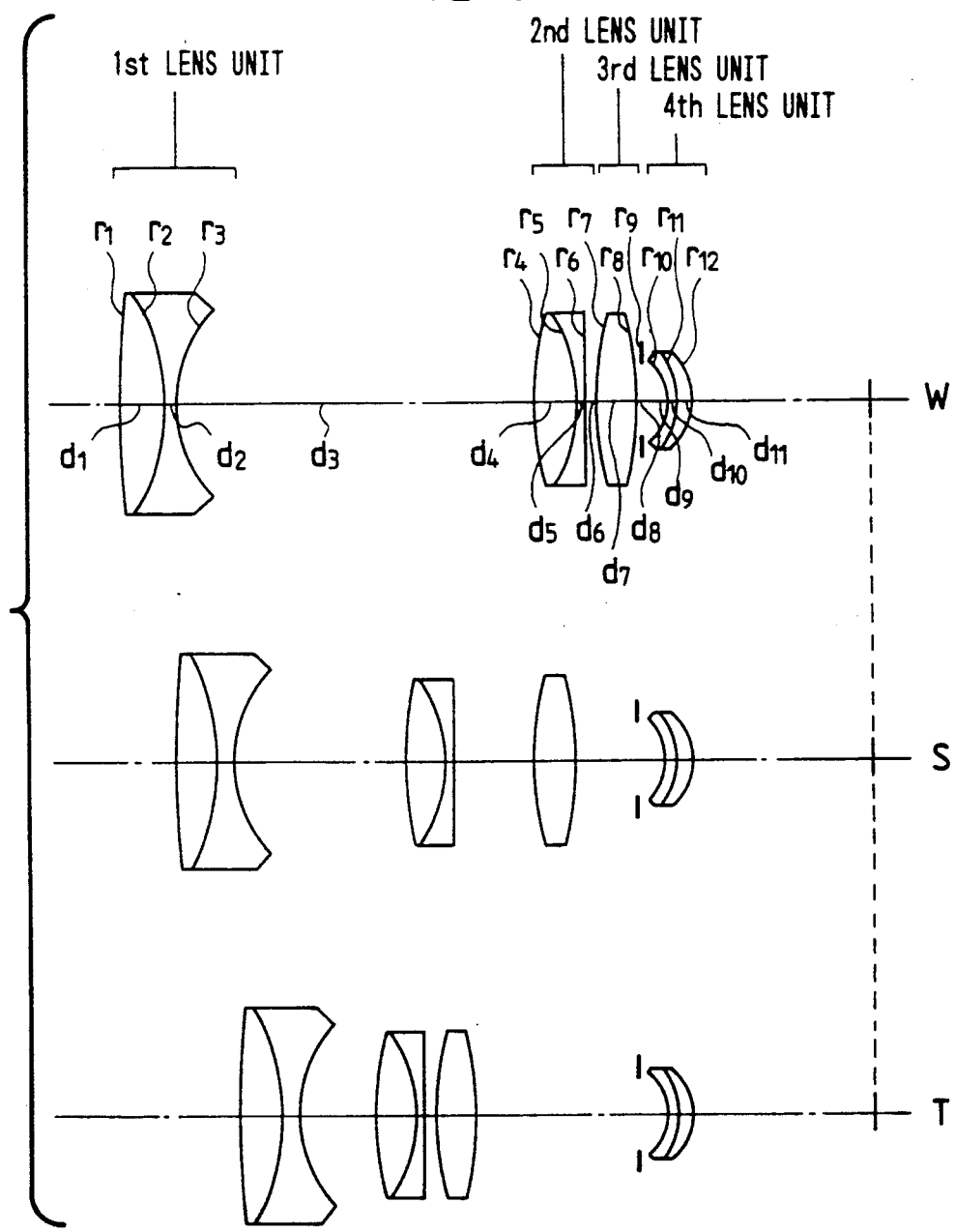

The Embodiment 7 has the composition illustrated in FIG. 7 wherein the lens component arranged on the most image side is a radial GRIN lens component which satisfies the condition (2) and designed as a cemented doublet for correcting spherical aberration of high orders. Further, the first surface is designed as an aspherical surface for correcting the negative distortion at the wide position. Furthermore, the first lens unit is moved for variation of focal length, thereby facilitating correction of aberrations and making it possible to compose the Embodiment 7 of seven lens elements. The F number is kept fixed.

Figure 47:
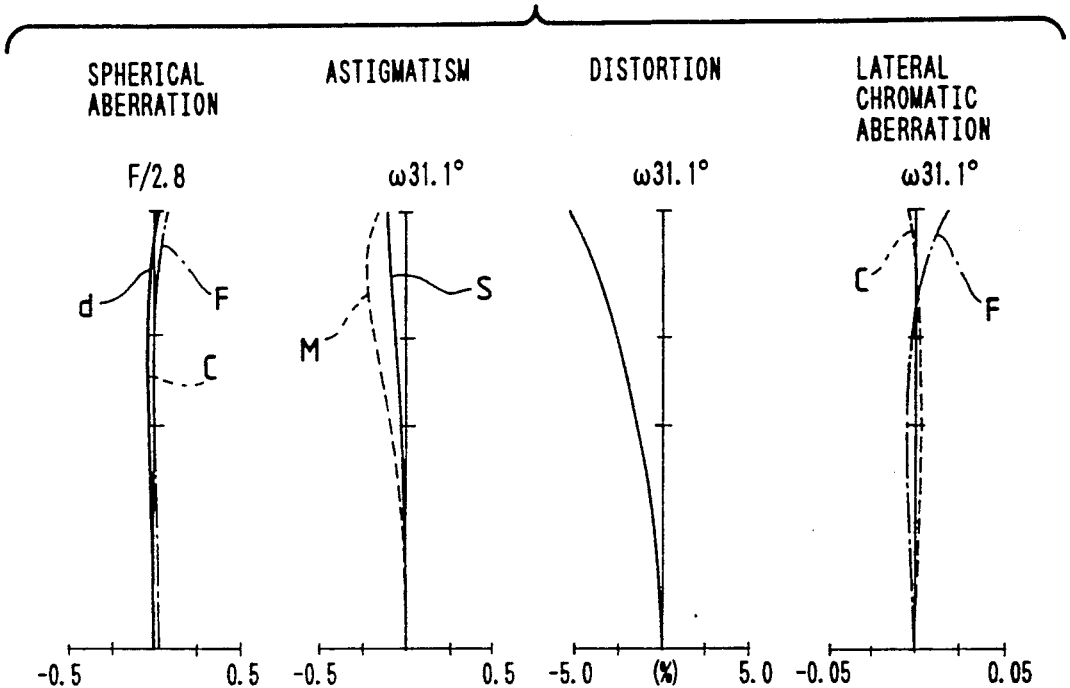
FIG. 47 through FIG. 49 show graphs visualizing aberration characteristics of the Embodiment 7 of the present invention.
Figure 48:
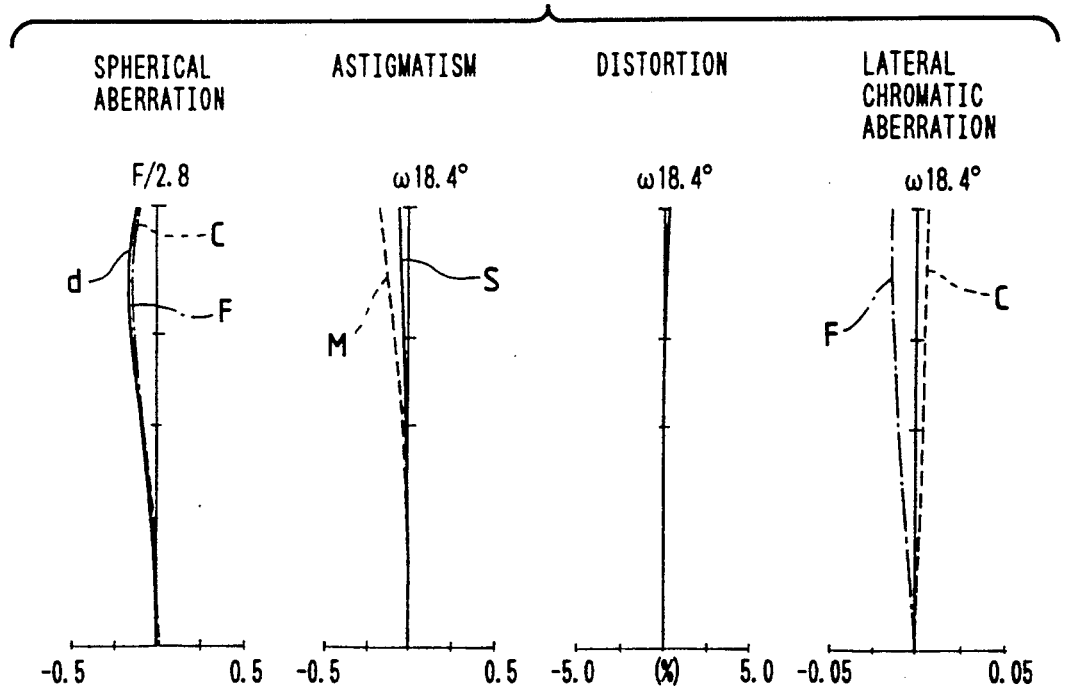
Figure 49:
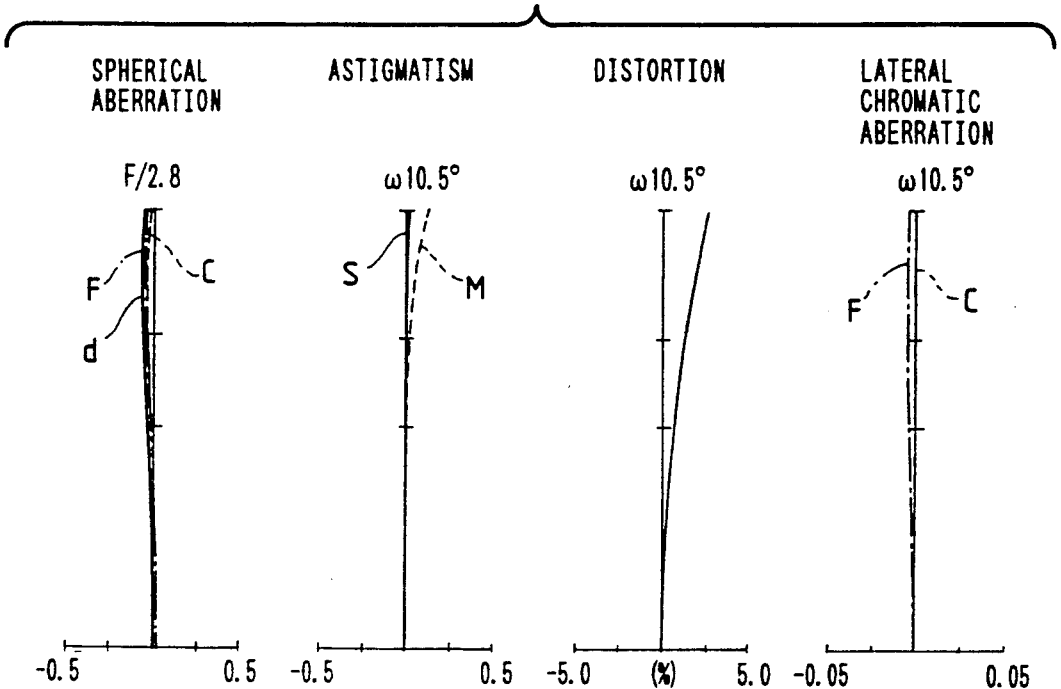

Aberration characteristics at the wide position, intermediate focal length and tele position of the Embodiment 7 are visualized in FIG. 47, FIG. 48 and FIG. 49 respectively.

Figure 8:
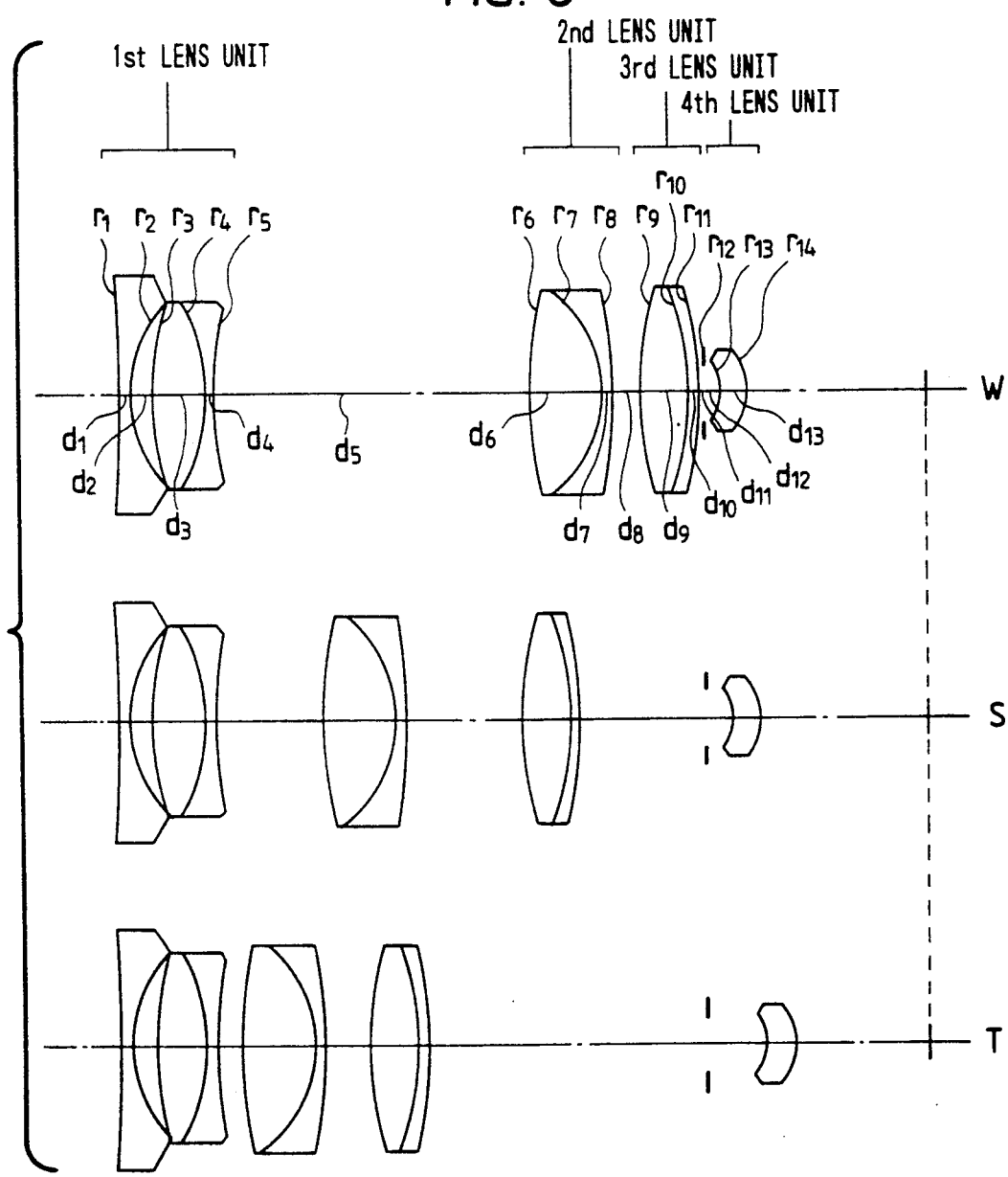

The Embodiment 8 has the composition shown in FIG. 8 wherein the fourth lens unit is composed of a single radial GRIN lens component satisfying the condition (2). Further, the aperture stop has a diameter which is varied along with variation of focal length in the Embodiment 8 for keeping the total length, the location of the aperture stop and the F number thereof fixed. If the diameter of the aperture stop is not varied along with variation of focal length, the F number of the Embodiment will be varied.

Figure 50:
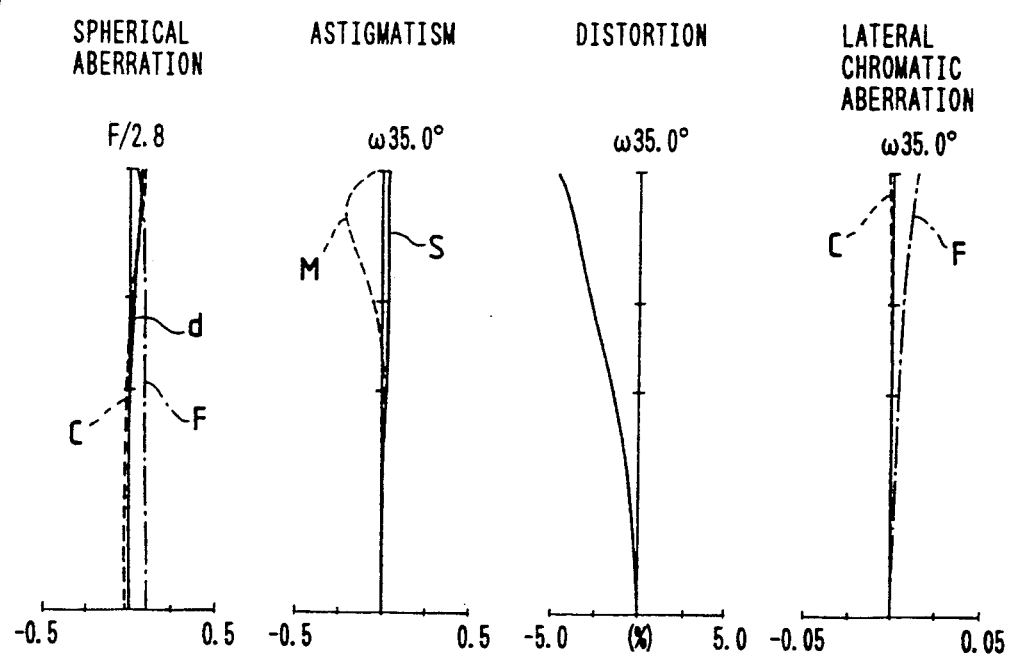

Aberration characteristics at the wide position, intermediate focal length and tele position of the Embodiment 8 are illustrated in FIG. 50, FIG. 51 and FIG. 52 respectively.

Figure 9:
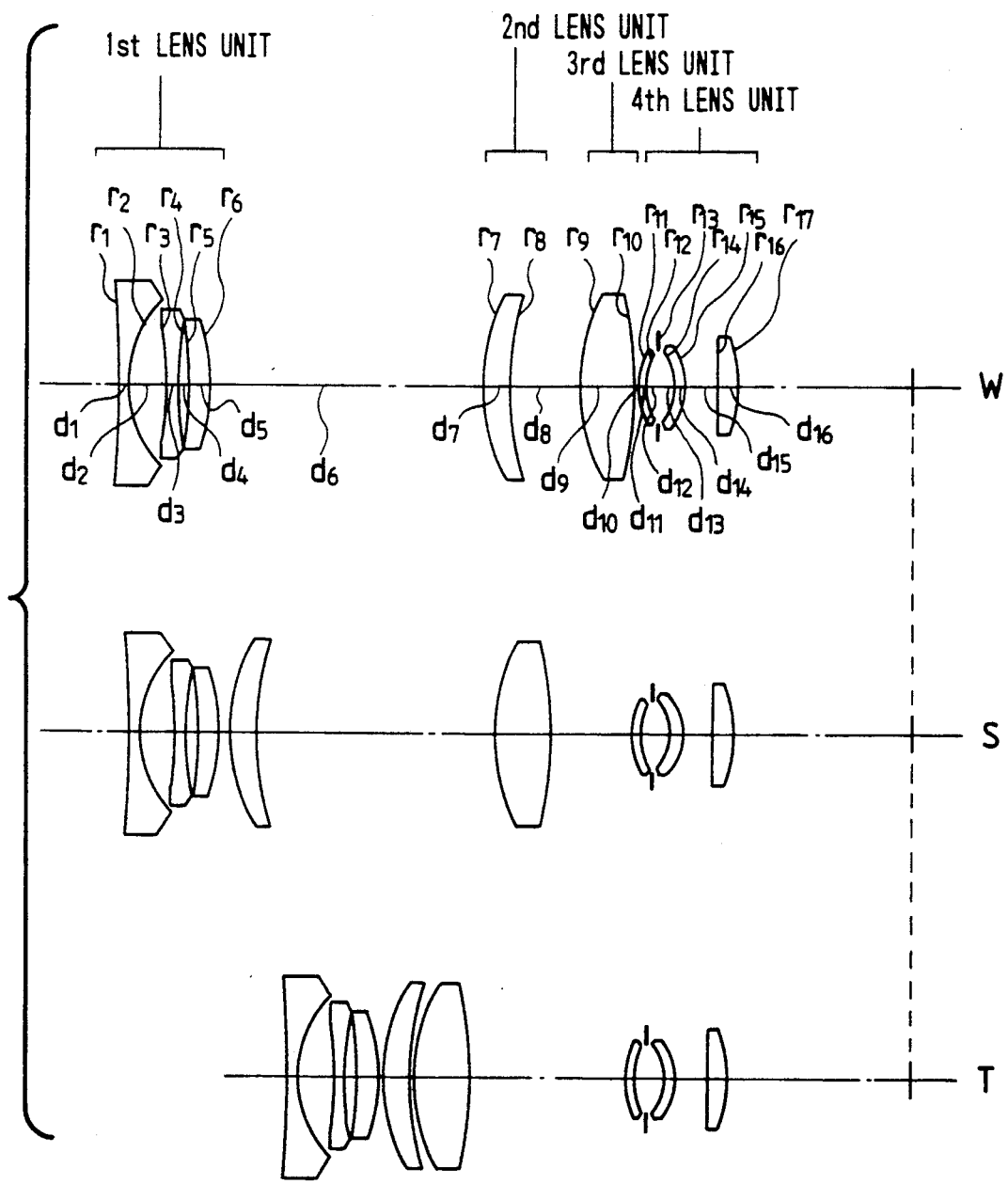

The Embodiment 9 has the composition shown in FIG. 9 wherein the third lens unit consists only of a single radial GRIN lens component satisfying the condition (1). In the Embodiment 9, the aperture stop is arranged in the fourth lens unit, and the lens components arranged on both the sides of the aperture stop are concentric with the aperture stop for obtaining an advantage for correction of the offaxial aberrations. The location of the aperture stop and F number are kept fixed for the Embodiment 9.

Figure 53:
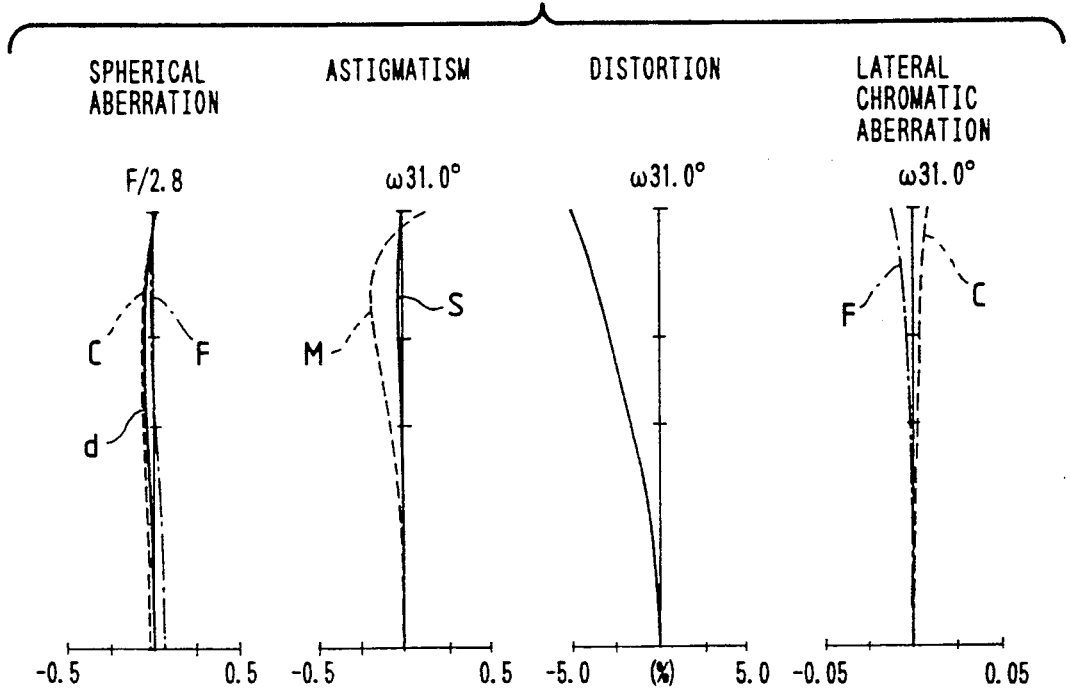
Figure 54:
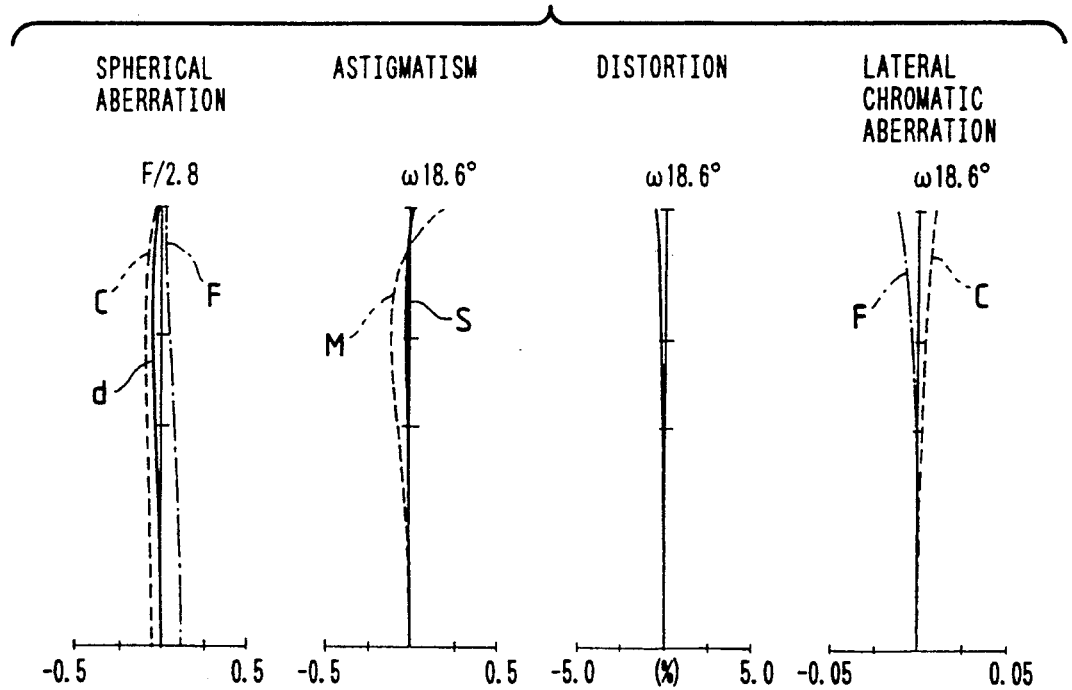

Aberration characteristics at the wide position, intermediate focal length and tele position of the Embodiment 9 are illustrated in FIG. 53, FIG. 54 and FIG. 55 respectively.

Figure 10:
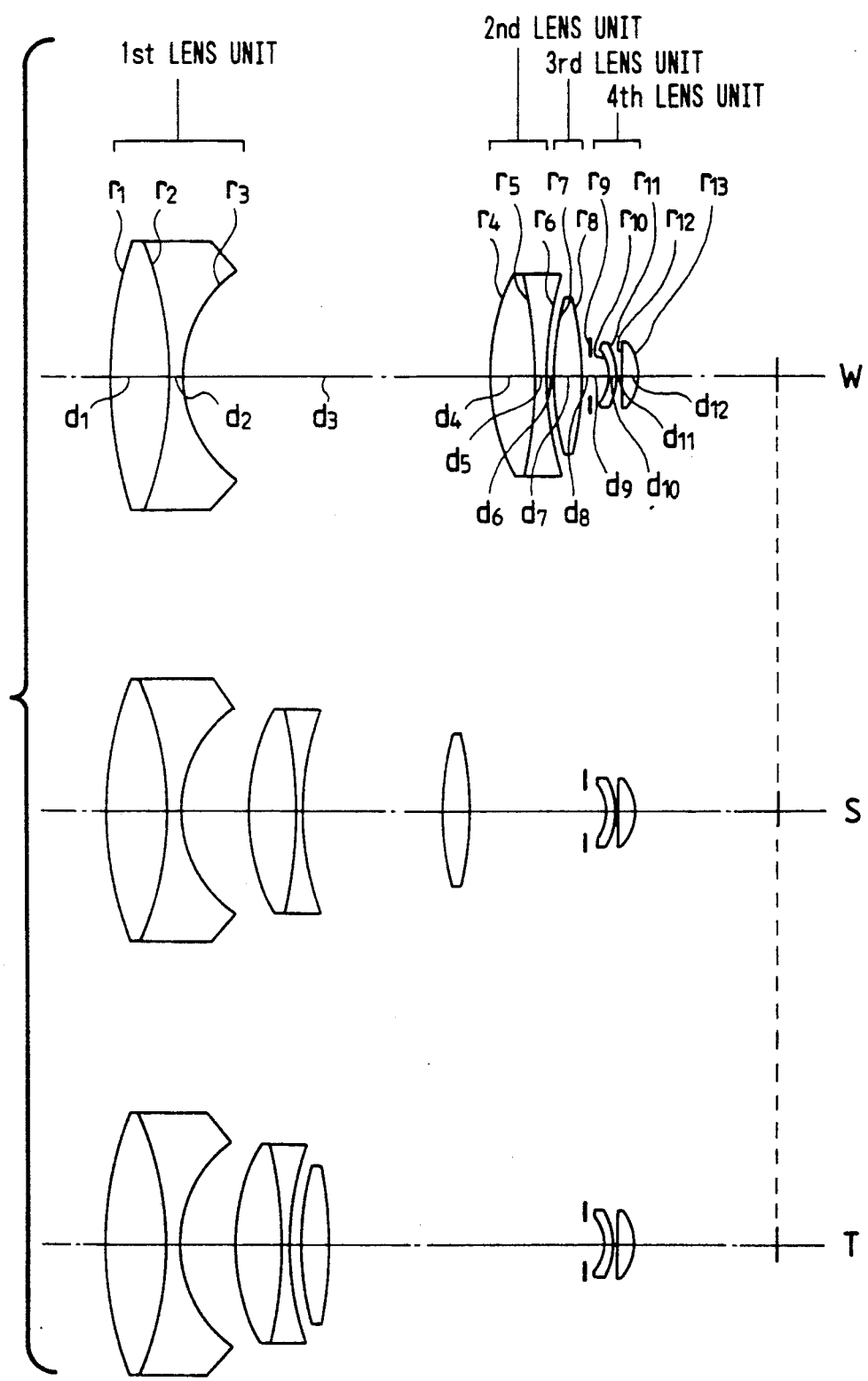

The Embodiment 10 has the composition shown in FIG. 10 wherein the lens element arranged on the most image side in the first lens unit is designed as an axial GRIN lens element which has a refractive index distribution satisfying the condition (7) and serves for correcting distortion at the wide position. Since the offaxial ray is high on the first lens unit, the vari-focal lens system has a large aperture and is not suited for using an aspherical surface therein. It is therefore effective to use an axial GRIN lens element in the first lens unit. The Embodiment 10 uses, as the lens component arranged on the most image side in the fourth lens unit, an axial GRIN lens component which satisfies the condition (9), and serves to favorably correct spherical aberration and coma at the wide position. The total length, the location of the aperture stop and the F number are fixed for the Embodiment 10.

Figure 57:
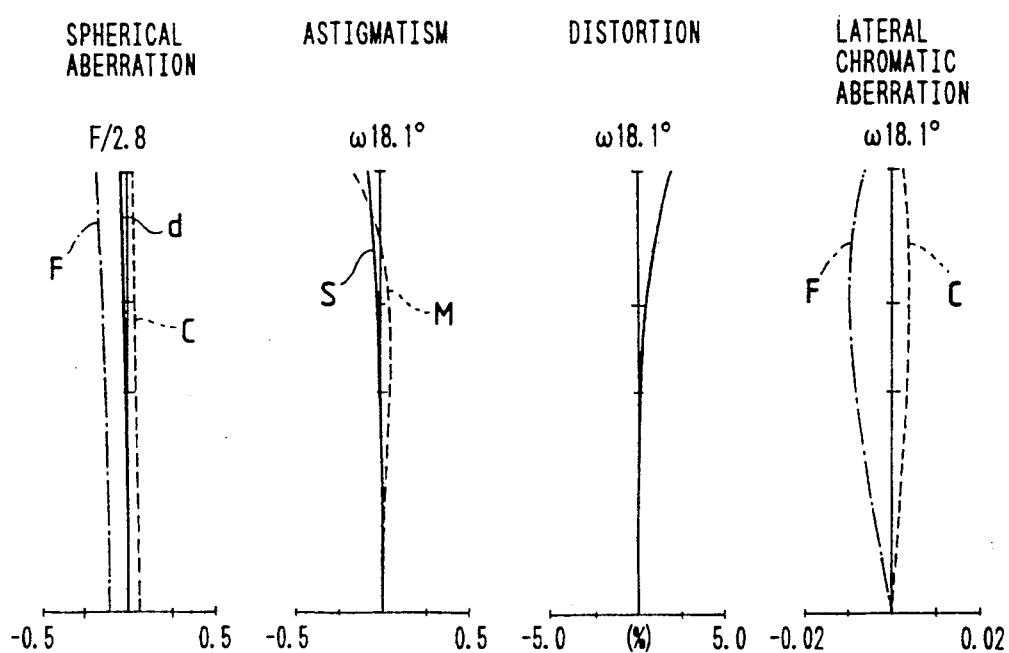
Figure 58:
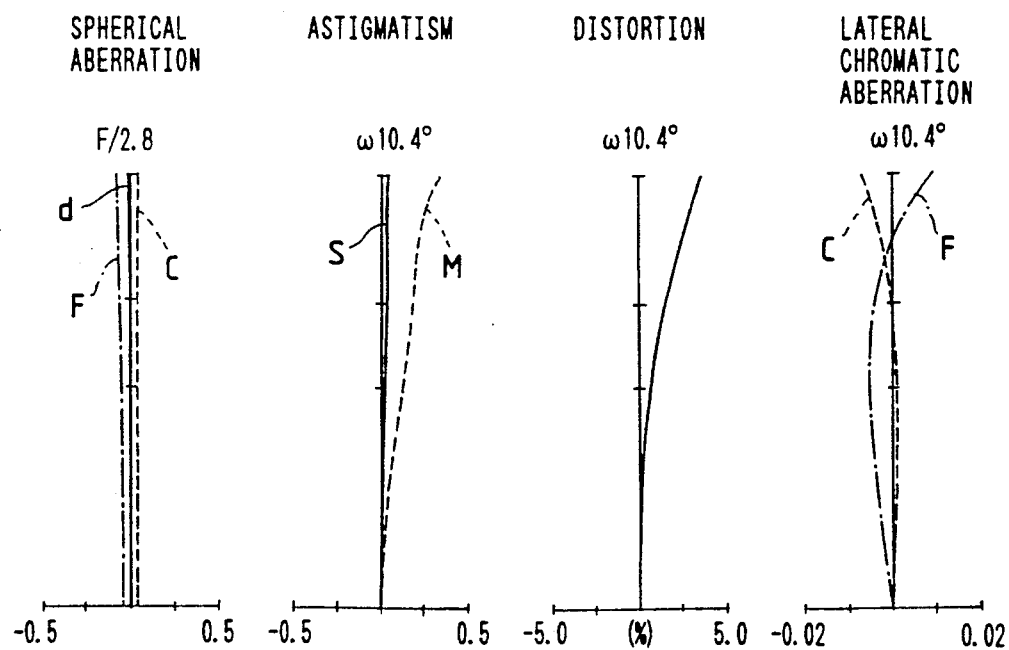

Aberration characteristics at the wide position, intermediate focal length and tele position of the Embodiment 10 are visualized in FIG. 56, FIG. 57 and FIG. 58 respectively.

Figure 11:
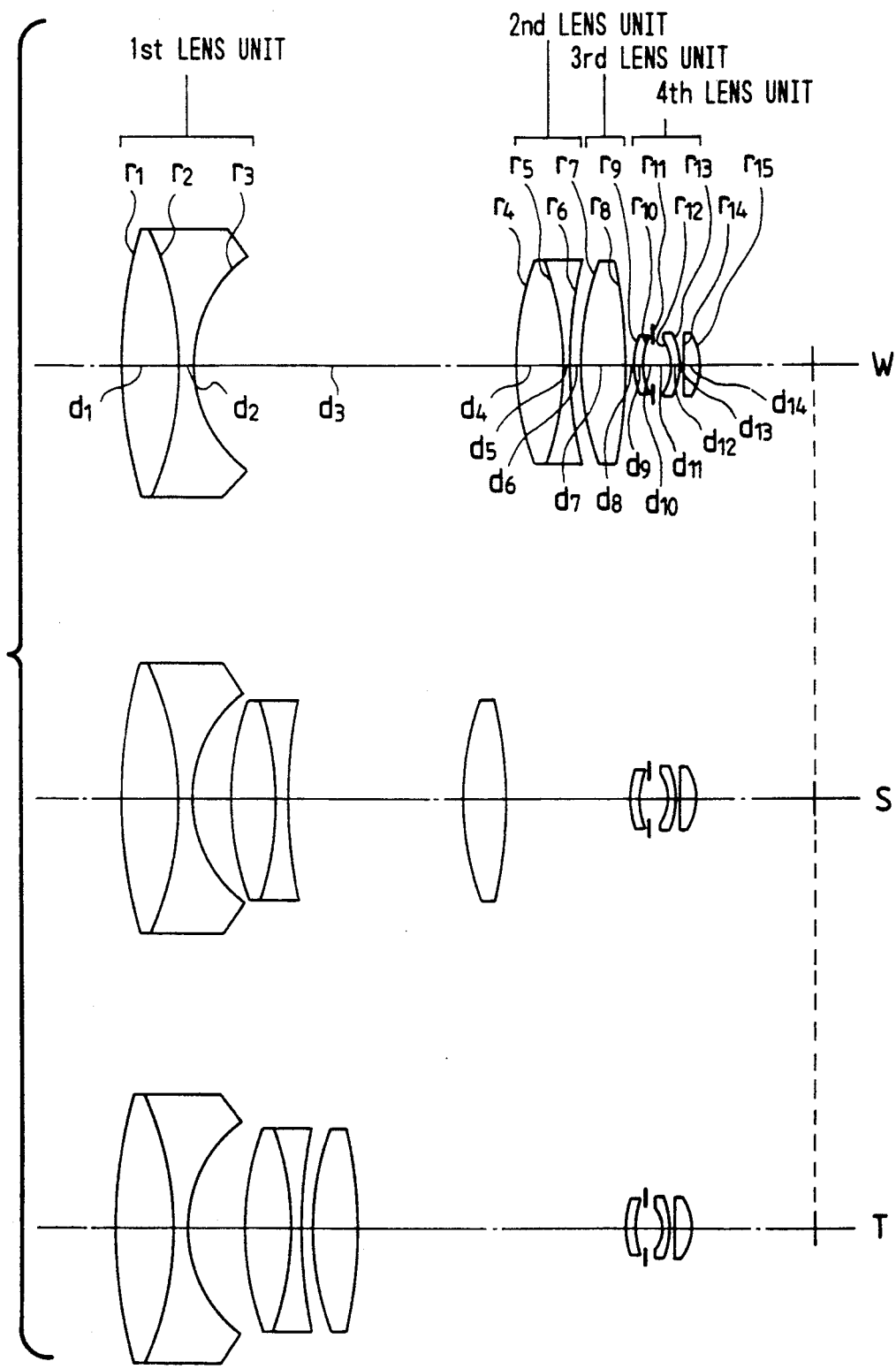

The Embodiment 11 has the composition illustrated in FIG. 11 wherein the lens element arranged on the most image side in the first lens unit is designed as an axial GRIN lens element which has a refractive index distribution on the image side surface thereof satisfying the condition (7) and serves for distortion, etc. at the wide position. Since the offaxial ray is high on the first lens unit, the vari-focal lens system has a large aperture and an aspherical surface is hardly usable in the vari-focal lens system. Therefore, it is effective to use the axial GRIN lens element in this embodiment. Further, the lens component arranged on the most image side in the fourth lens unit is designed as an axial GRIN lens component which satisfies the condition (9), and serves for favorably correct spherical aberration, astigmatism and coma at the wide position. In the Embodiment 11, the total length, the location of the aperture stop and the F number thereof are fixed, and the fourth lens unit comprises a lens component arranged before the aperture stop.

Figure 59:
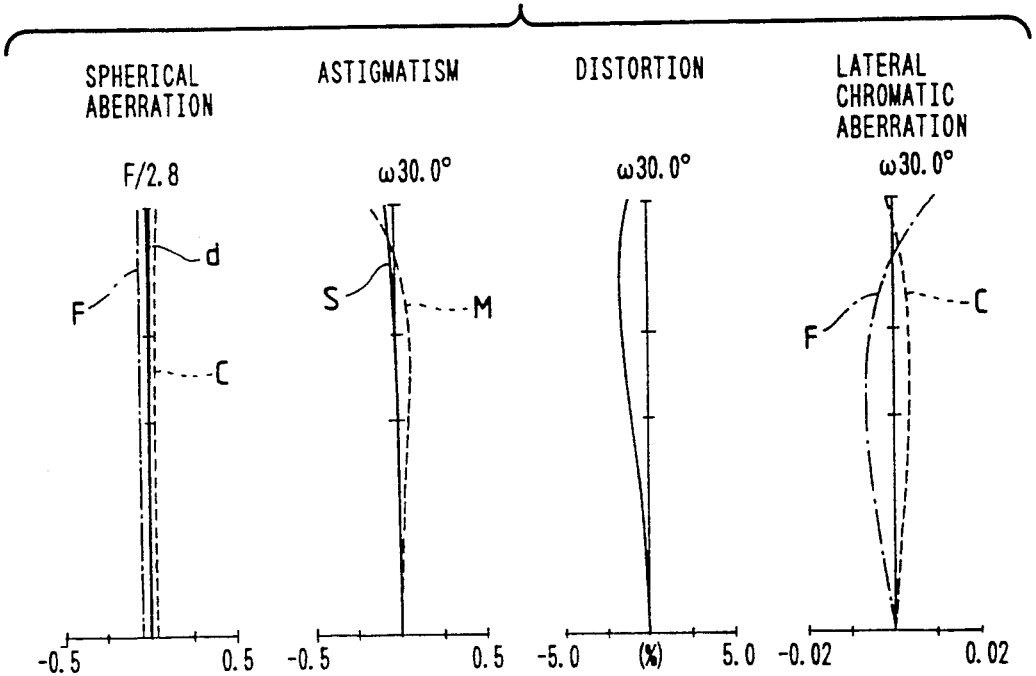
FIG. 59 through FIG. 61 show curves visualizing aberration characteristics of the Embodiment 11 of the present invention.
Figure 60:
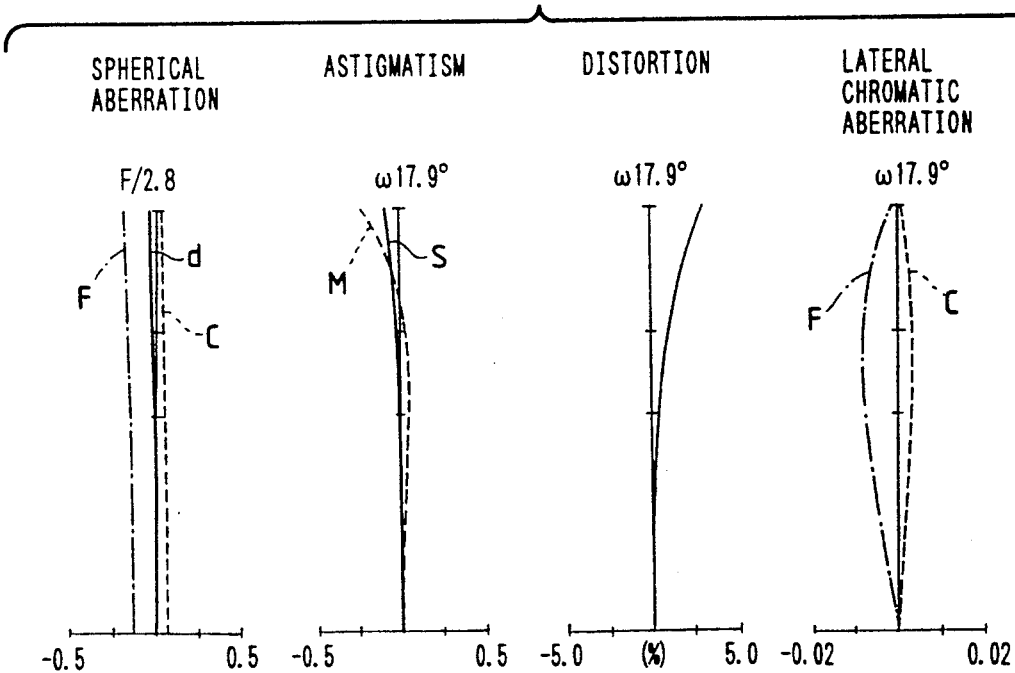
Figure 61:
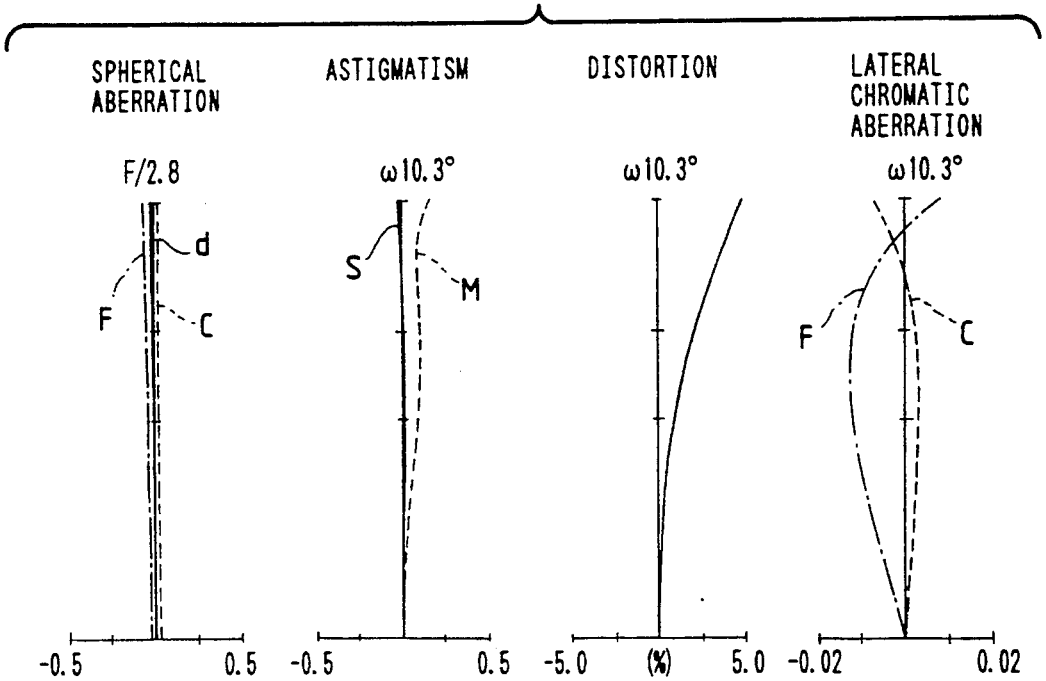

Aberration characteristics at the wide position, intermediate focal length and tele position of the Embodiment 11 are illustrated in FIG. 59, FIG. 60 and FIG. 61 respectively.

Figure 12:
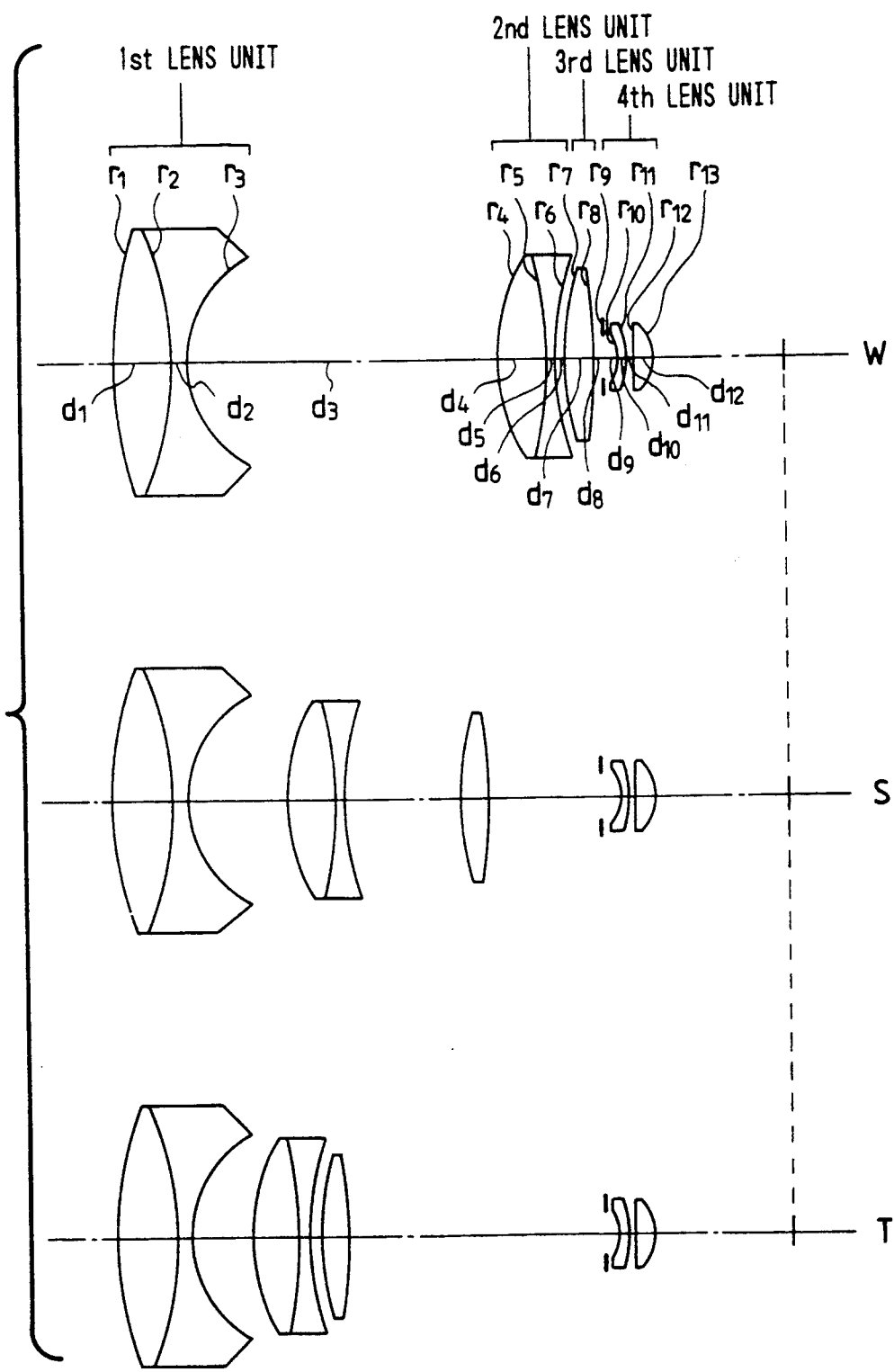

The Embodiment 12 has the composition illustrated in FIG. 12 wherein the lens element arranged in the most image side in the first lens unit is designed as an axial GRIN lens element which has a refractive index distribution on the image side surface thereof satisfying the condition (7) and serves for correcting distortion, etc. at the wide position. Further, the thirteenth surface (the surface located on the most image side) is designed as an aspherical surface which satisfies the condition (12) and serves for correcting spherical aberration, etc. over the entire range from the wide position to the tele position. The aspherical surface is adopted since a refractive index gradient will be too high in case where an axial GRIN lens component is used in the fourth lens unit. That is to say, the Embodiment 12 exemplifies a case where aberrations are corrected by using an aspherical surface in place of an axial GRIN lens component. Also in the Embodiment 12, the total length, the location of the aperture stop and F number of the vari-focal lens system are fixed.

Figure 62:
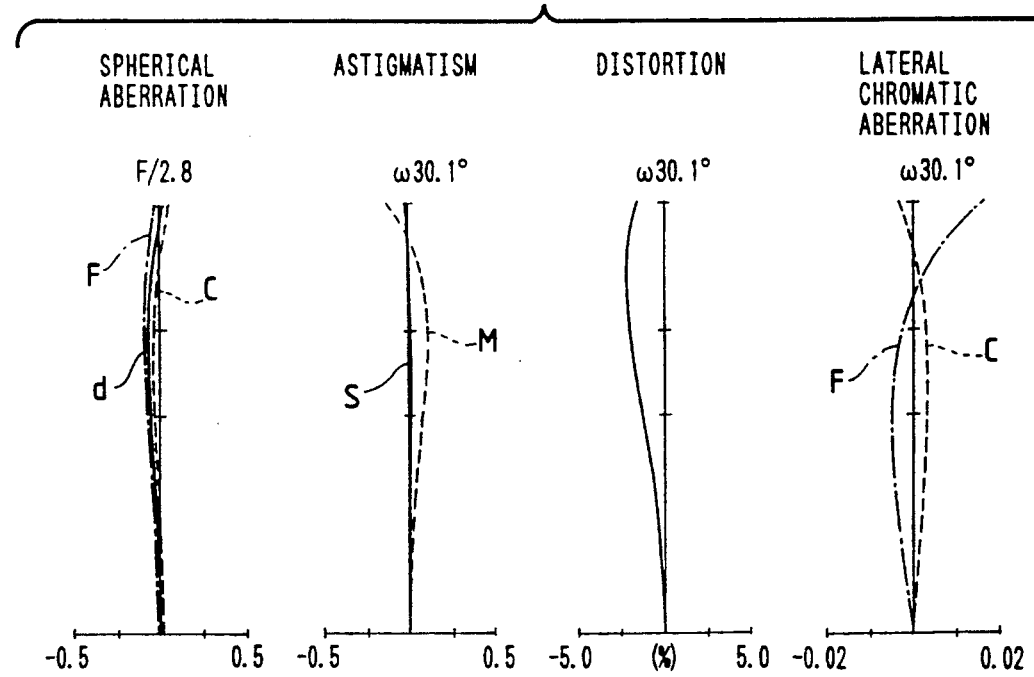
FIG. 62 through FIG. 64 show curves illustrating aberration characteristics of the Embodiment 12 of the present invention.
Figure 63:
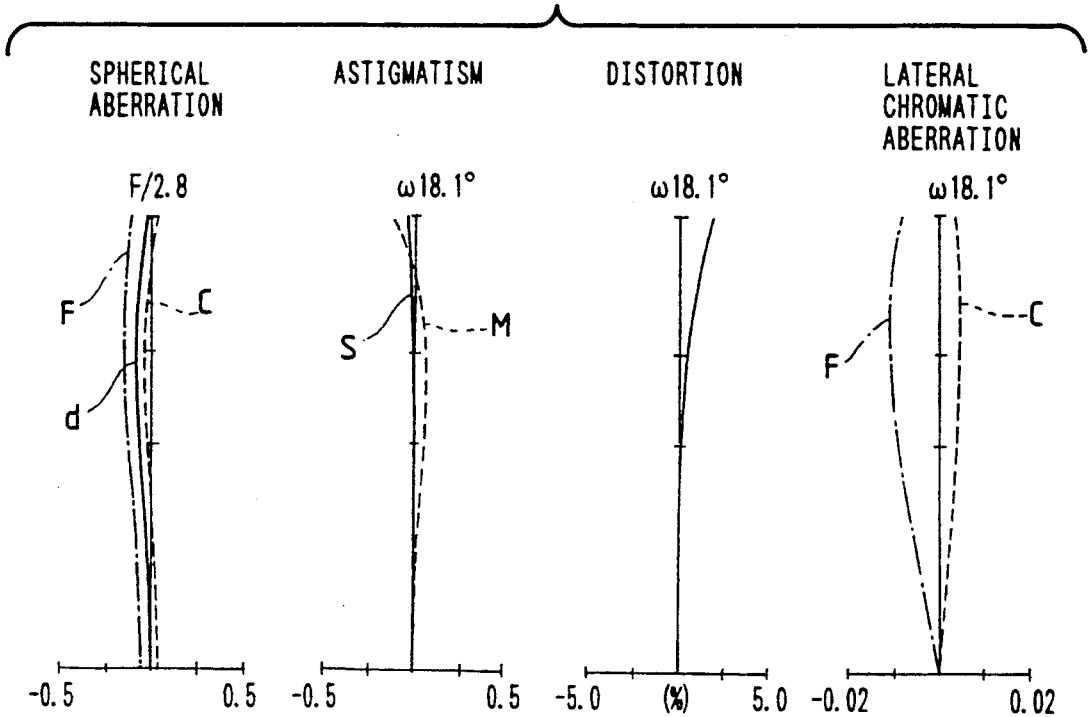
Figure 64:
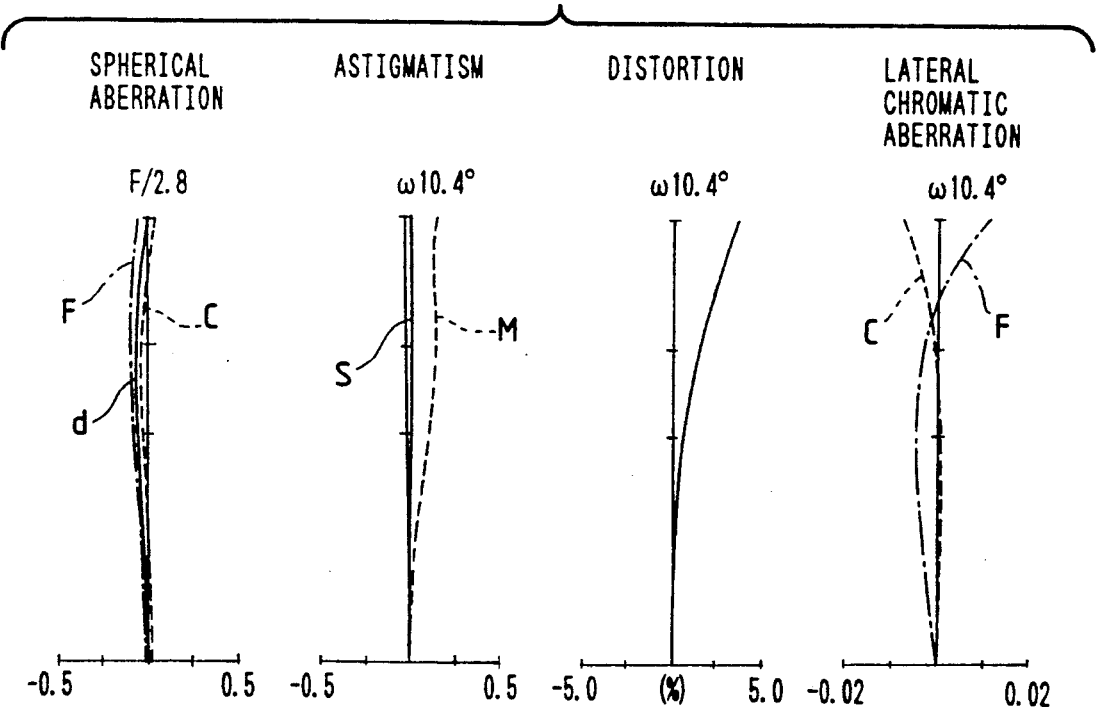

Aberration characteristics at the wide position, intermediate focal length and tele position of the Embodiment 12 are visualized in FIG. 62, FIG. 63 and FIG. 64 respectively.

Figure 13:
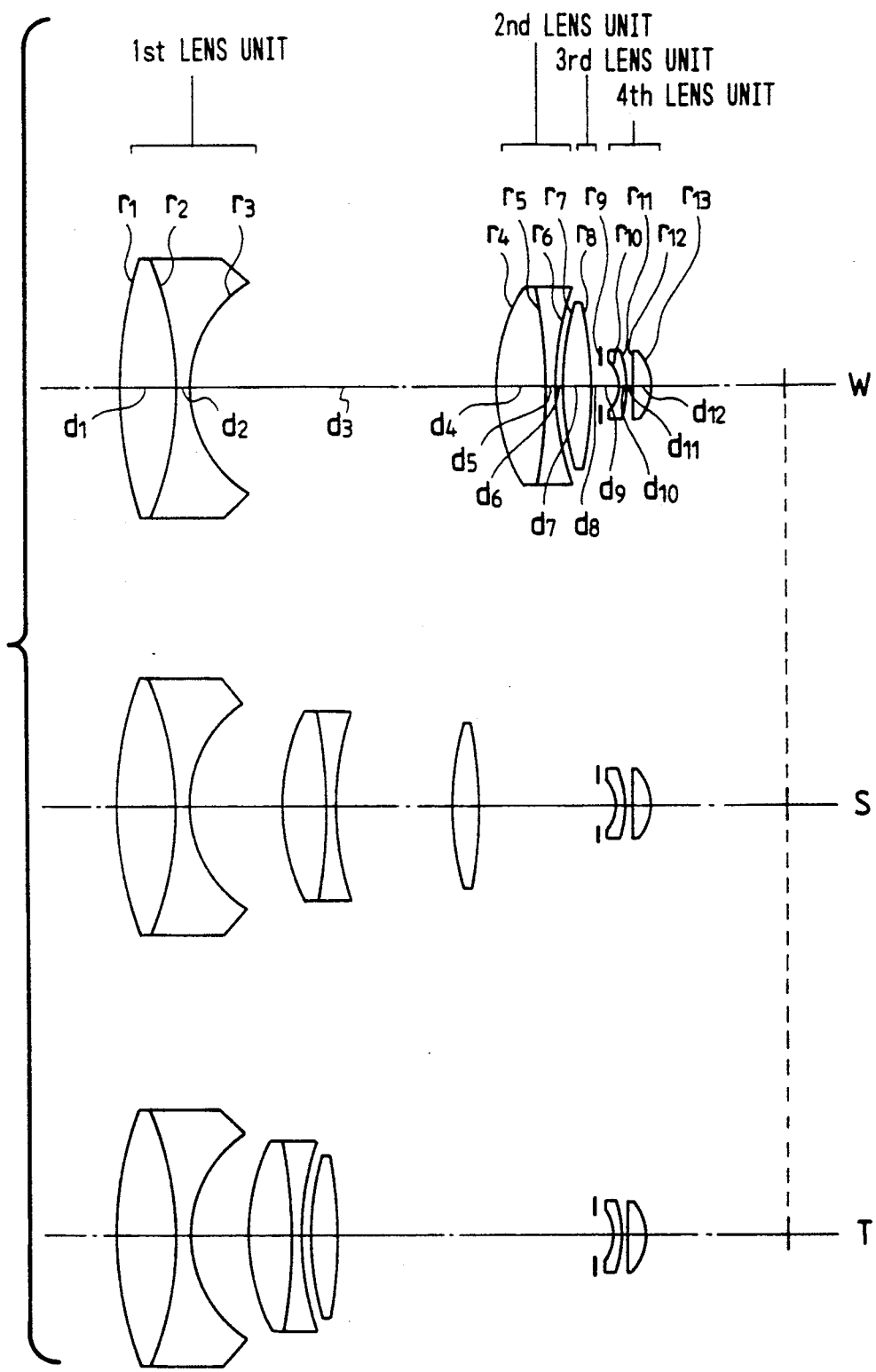

The Embodiment 13 has the composition illustrated in FIG. 13 wherein the lens element arranged on the most image side in the first lens unit is designed as an axial GRIN lens element which has a refractive index distribution on the image side surface thereof satisfying the condition (7) and serves for correcting distortion, etc. at the wide position. Further, the seventh surface ($r_7$) is designed as an aspherical surface which satisfies the condition (11) and serves for correcting spherical aberration at the tele position, whereas the thirteenth surface ($r_{13}$) is designed as an aspherical surface which satisfies the condition (12) and serves for correcting spherical aberration over the entire range from the wide position to the tele position. In the Embodiment 13 also, the total length, the location of the aperture stop and the F number of the vari-focal lens system are fixed.

Figure 65:
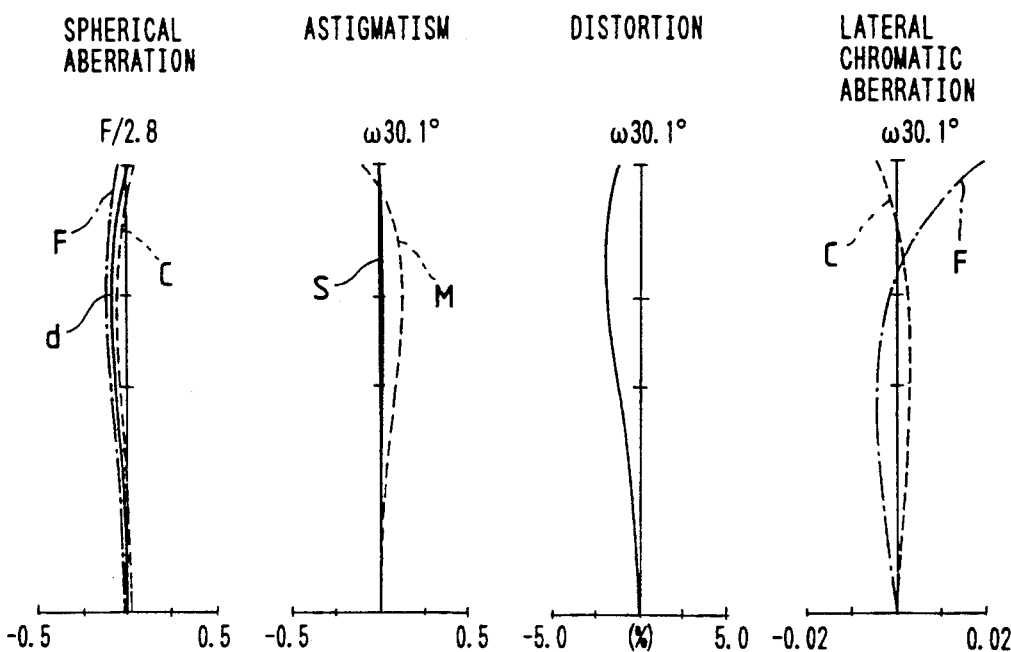
FIG. 65 through FIG. 67 show graphs visualizing aberration characteristics of the Embodiment 13 of the present invention.
Figure 66:
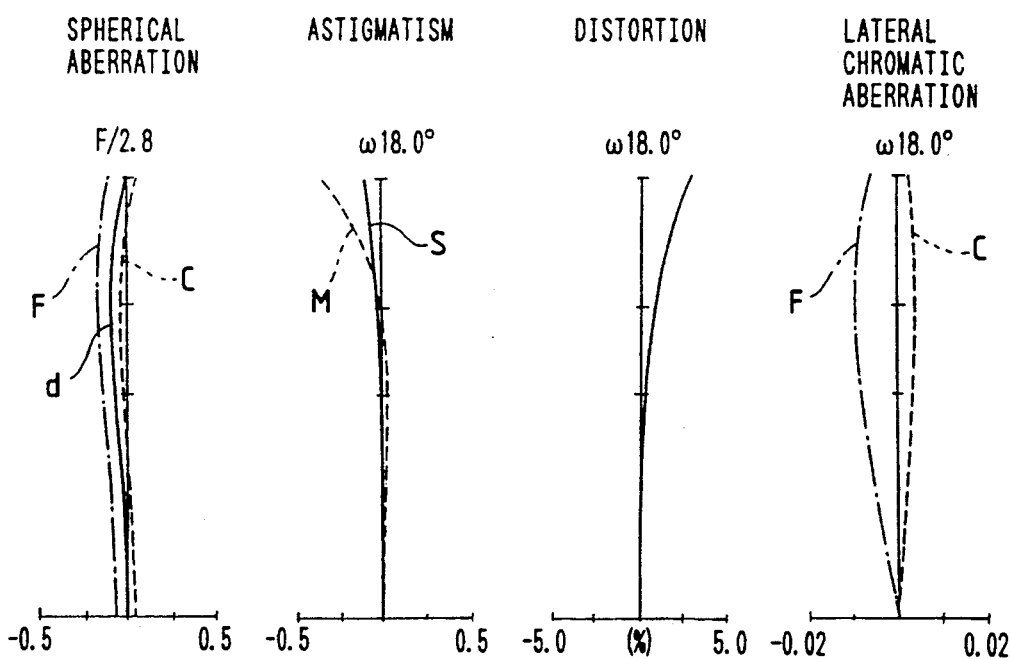
Figure 67:
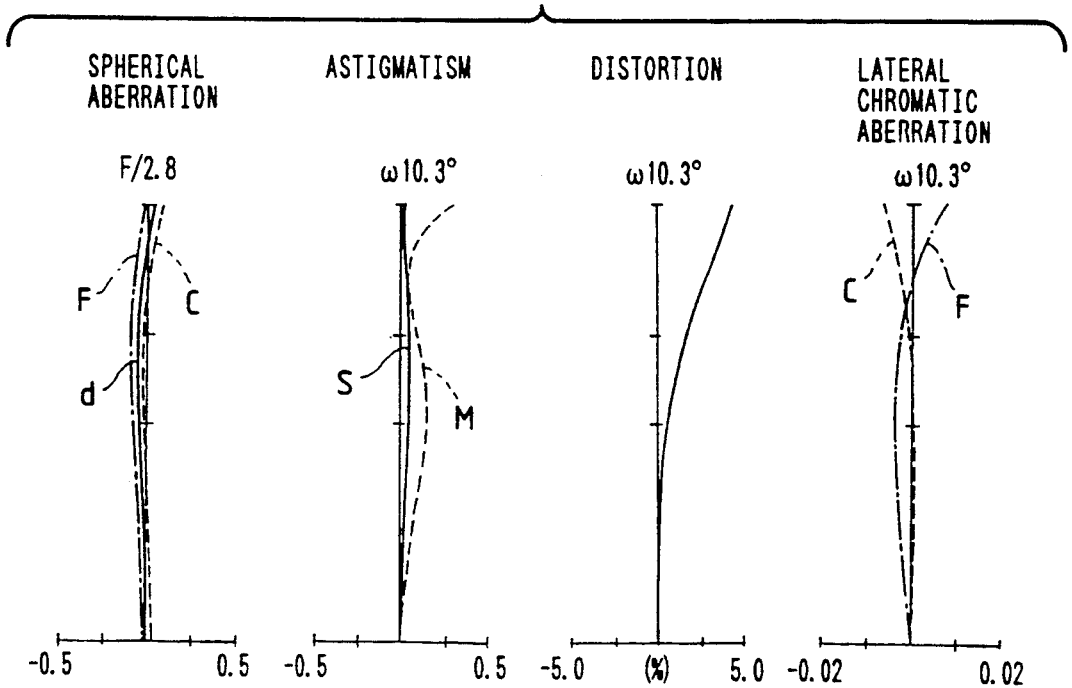

Aberration characteristics at the wide position, intermediate focal length and tele position of the Embodiment 13 are visualized in FIG. 65, FIG. 66 and FIG. 67 respectively.

Figure 14:
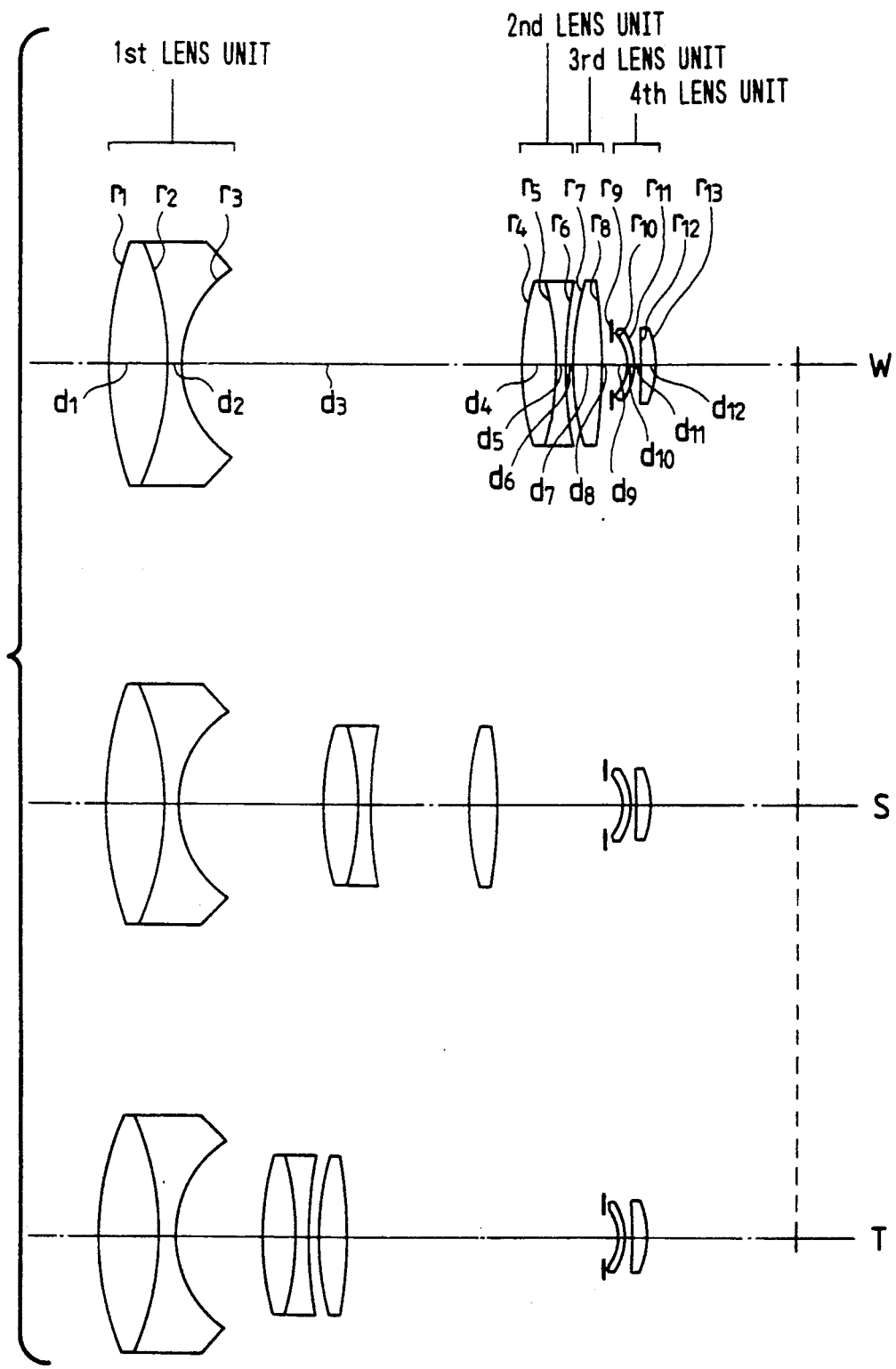

The Embodiment 14 has the composition shown in FIG. 14 wherein the lens element arranged on the most image side in the second lens unit is designed as an axial GRIN lens element which has a refractive index distribution on the image sdie surface thereof and serves for correcting distortion, etc. at the tele position. Further, the first surface ($r_1$) is designed as an aspherical surface which satisfies the condition (10) and serves for correcting distortion at the wide position.

In the Embodiment 14 also, the total length, the location of the aperture stop and the F number of the vari-focal lens system are kept fixed.

Figure 68:
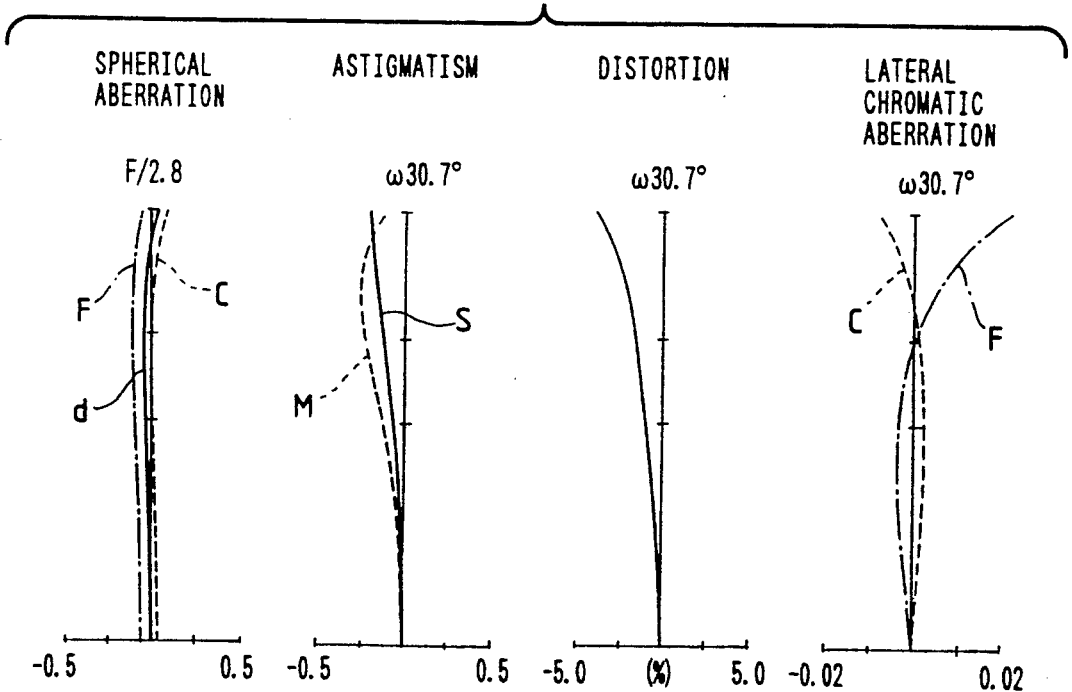
FIG. 68 through FIG. 70 show graphs visualizing aberration characteristics of the Embodiment 14 of the present invention.
Figure 69:
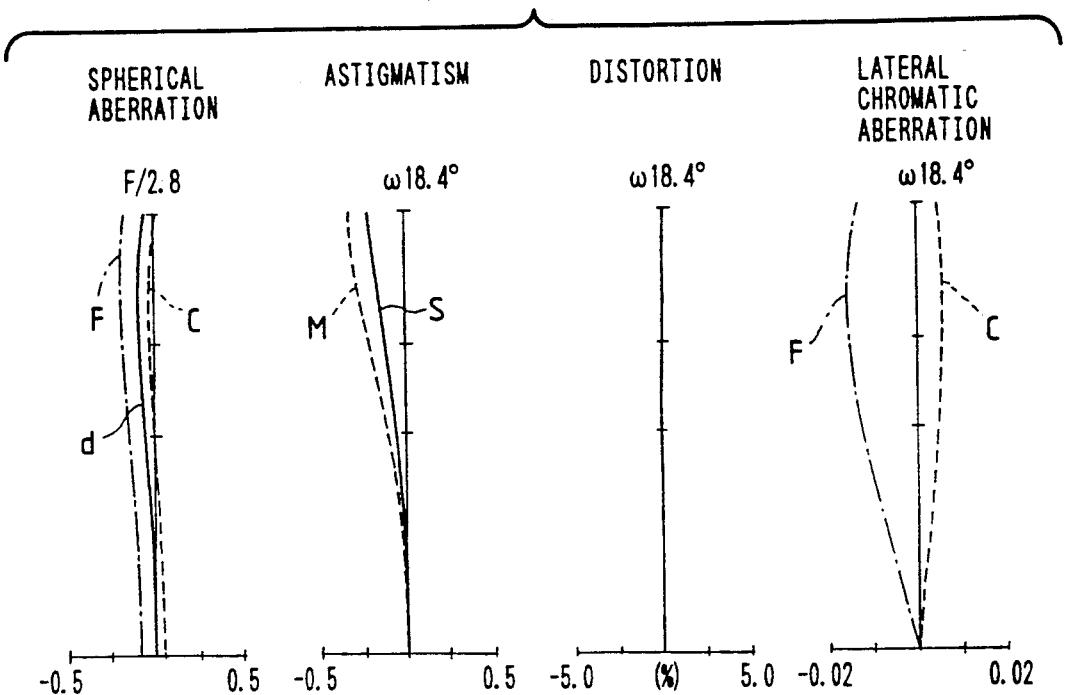
Figure 70:
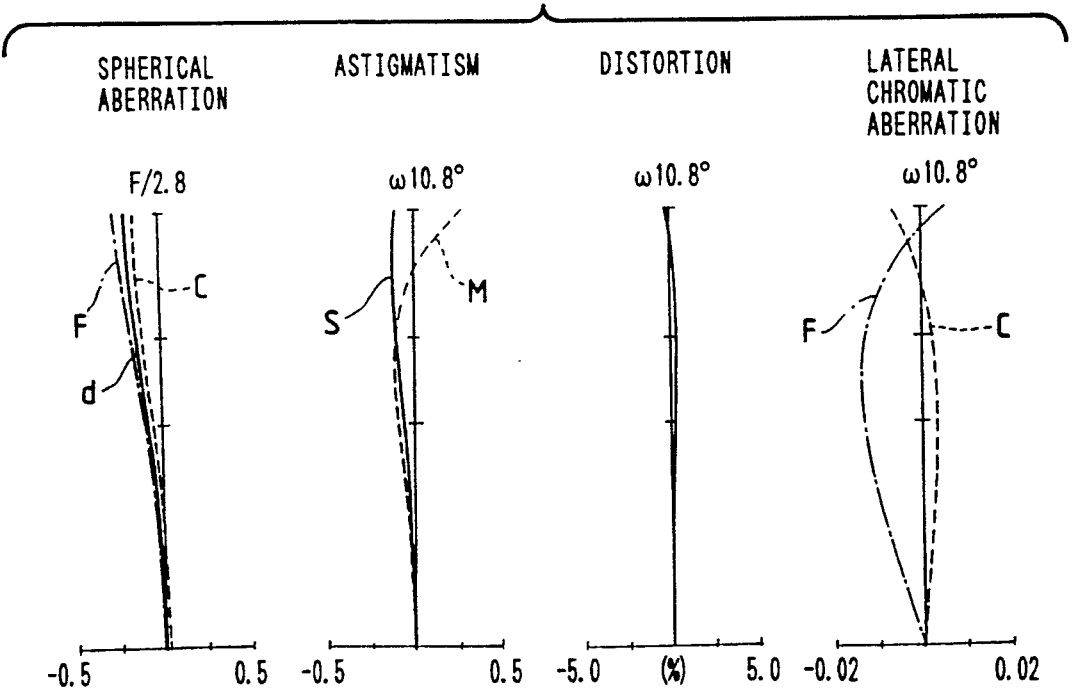

Aberration characteristics at the wide position, intermediate focal length and tele position of the Embodiment 14 are illustrated in FIG. 68, FIG. 69 and FIG. 70 respectively.

Figure 15:
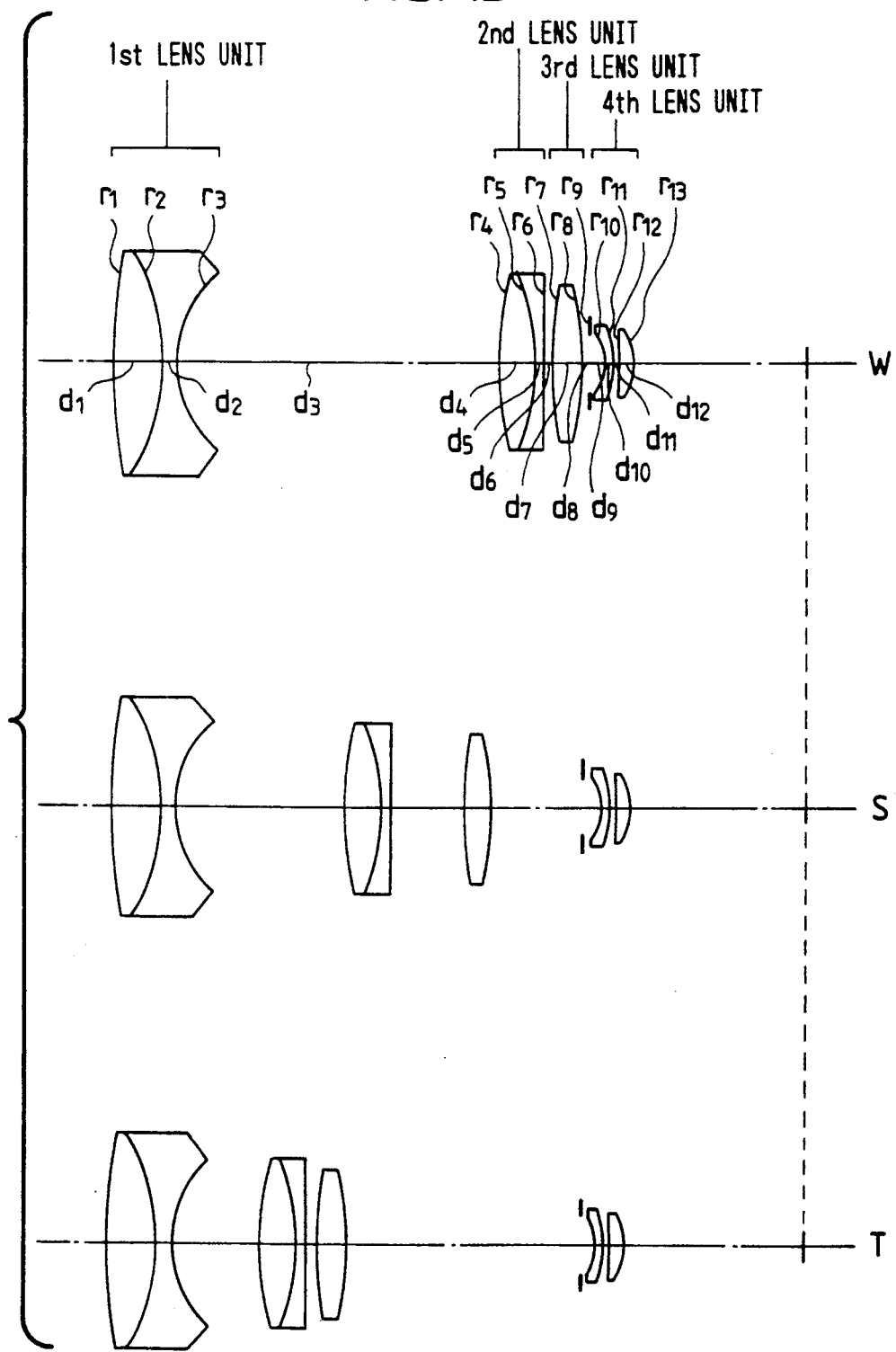

The Embodiment 15 has the composition shown in FIG. 15 wherein the third lens unit is designed as an axial GRIN lens component which has a refractive index distribution on the image side surface thereof satisfying the condition (8). Further, the first surface ($r_1$) is designed as an aspherical surface satisfying the condition (10). Further, the thirteenth surface ($r_{13}$) is designed as an aspherical surface satisfying the condition (12) and serving for correcting spherical aberration, etc. over the entire range from the wide position to the tele position. In the Embodiment 15 also, the total length, the location of the aperture stop and the F number are fixed for the vari-focal lens system.

Figure 71:
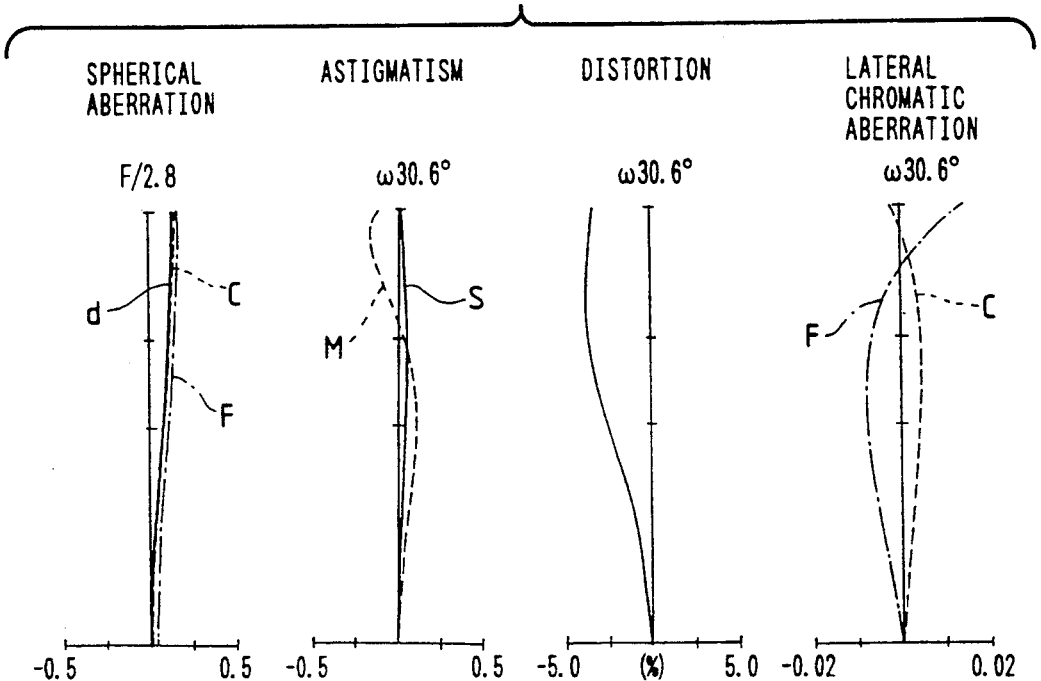
FIG. 71 through FIG. 73 show curves illustrating aberration characteristics of the Embodiment 15 of the present invention.
Figure 72:
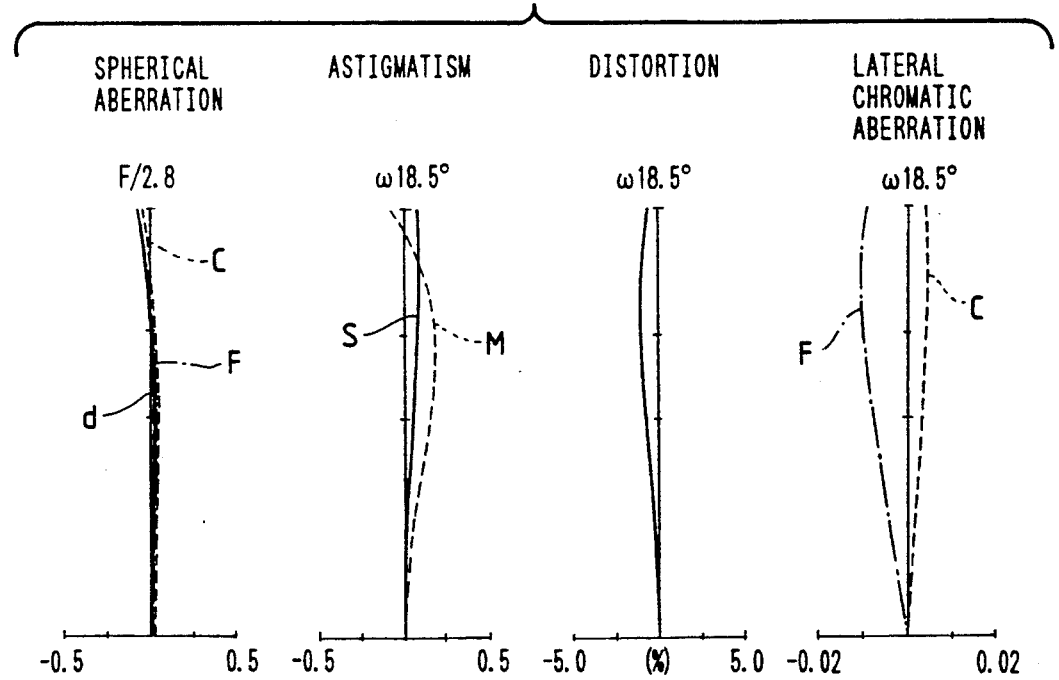
Figure 73:
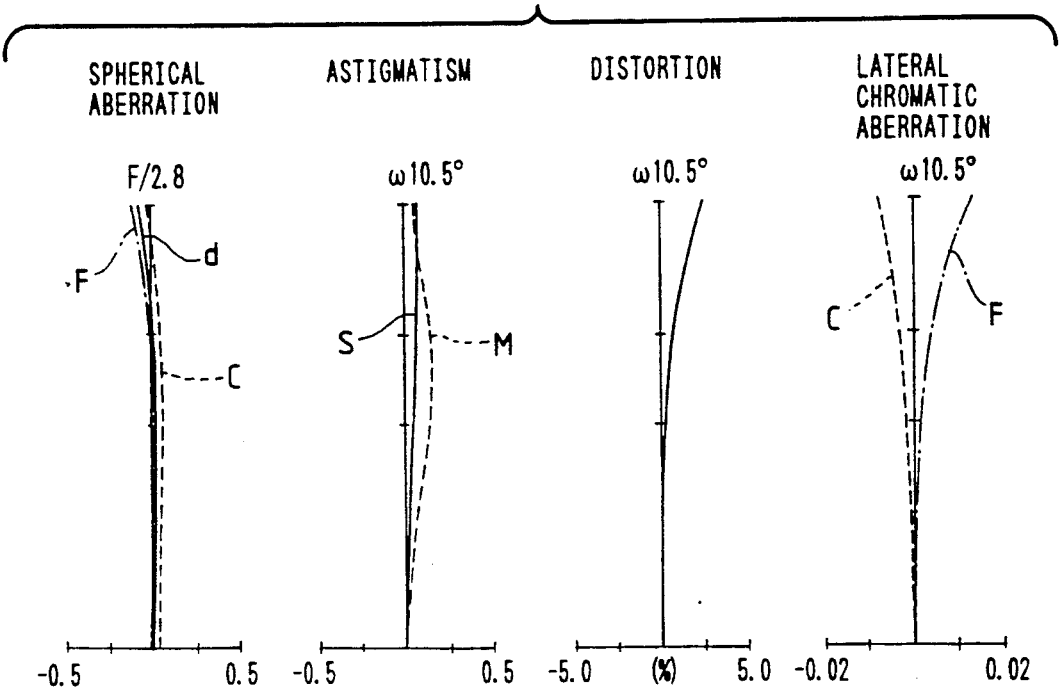

Aberration characteristics at the wide position, intermediate focal length and tele position of the Embodiment 15 are visualized in FIG. 71, FIG. 72 and FIG. 73 respectively.

Figure 16:
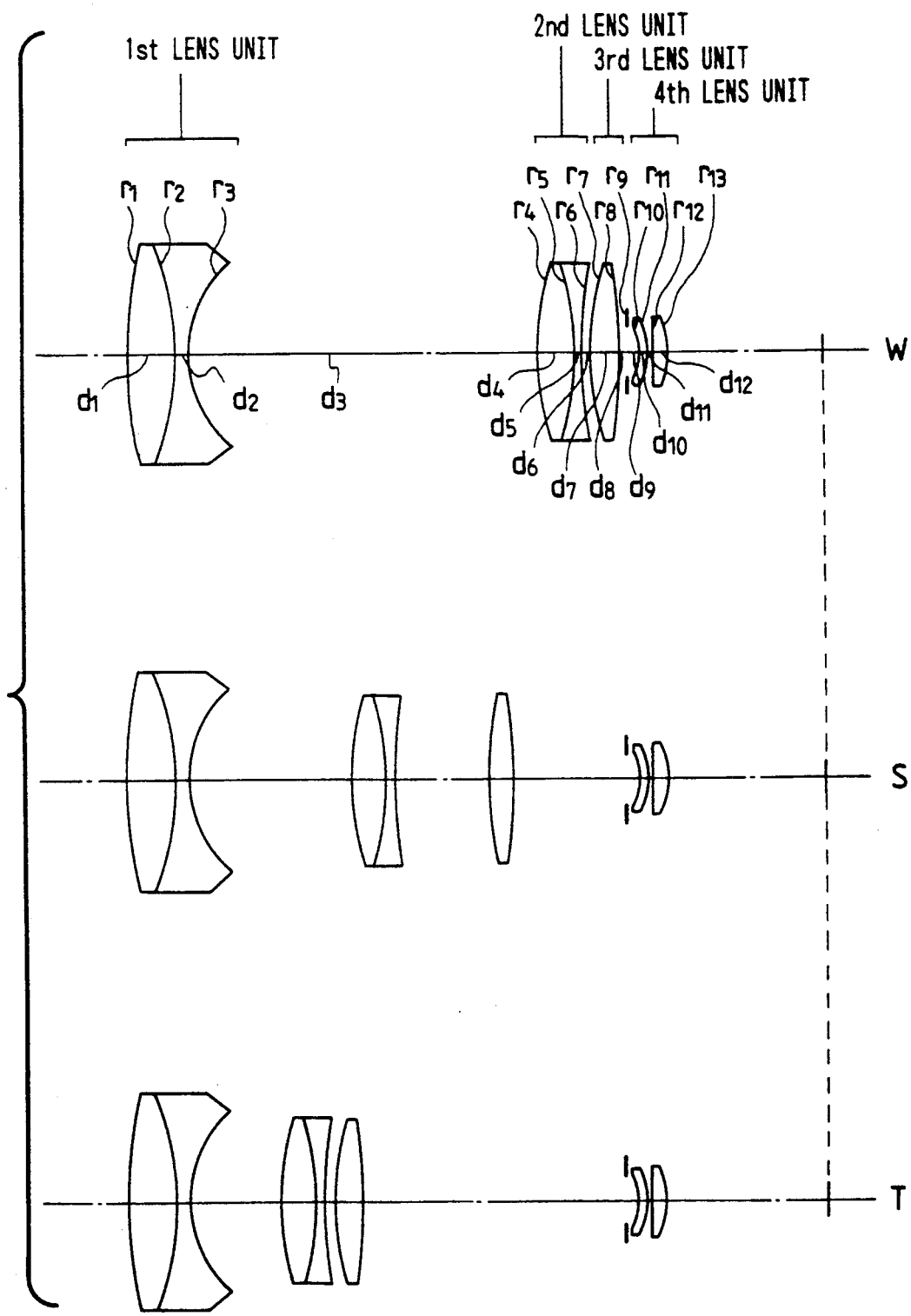

The Embodiment 16 has the composition illustrated in FIG. 16 wherein the lens component arranged on the most image side in the fourth lens unit is designed as an axial GRIN lens component which has a refractive index distribution satisfying the condition (9) and serves for correcting astigmatism favorably at the wide position. Further, the first surface ($r_1$) is designed as an aspherical surface satisfying the condition (10). The total length, the location of the aperture stop and the F number of the vari-focal lens system are kept fixed in the Embodiment 16.

Figure 74:
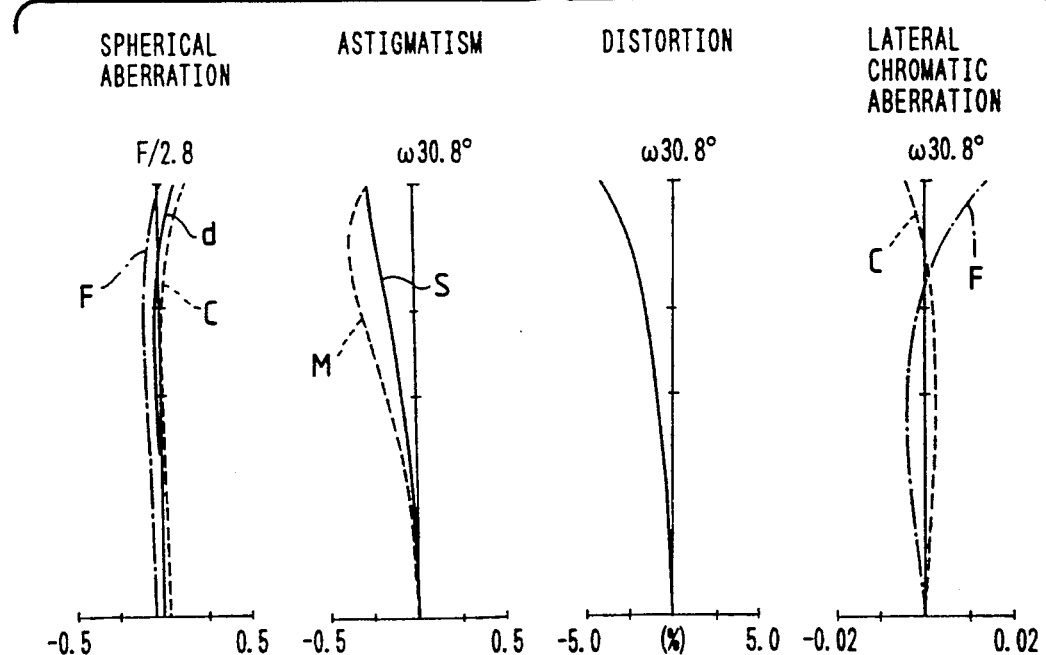
FIG. 74 through FIG. 76 show curves illustrating aberration characteristics of the Embodiment 16 of the present invention.
Figure 75:
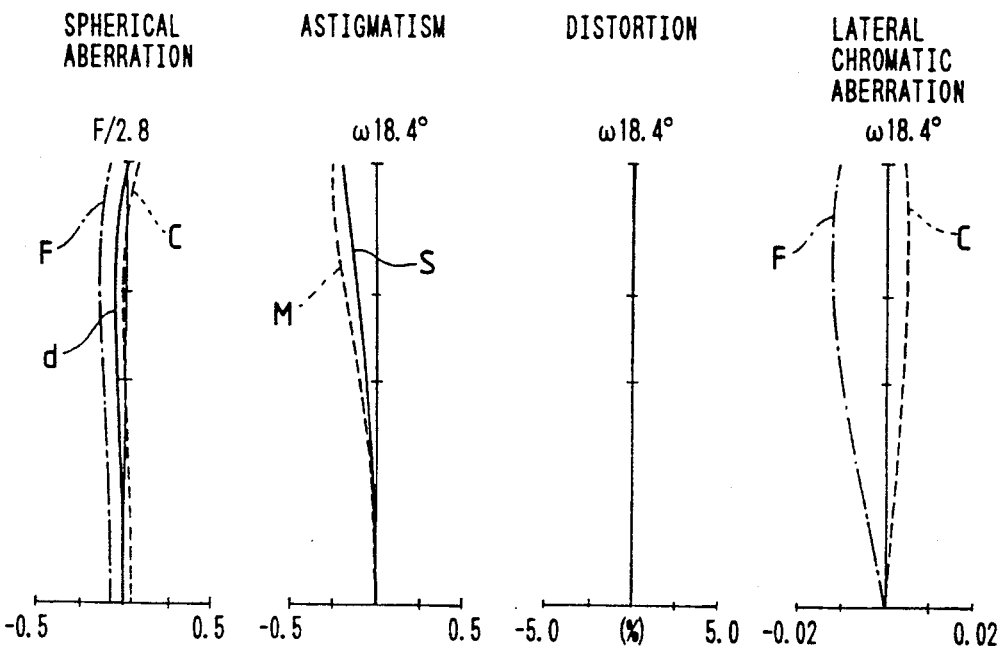
Figure 76:
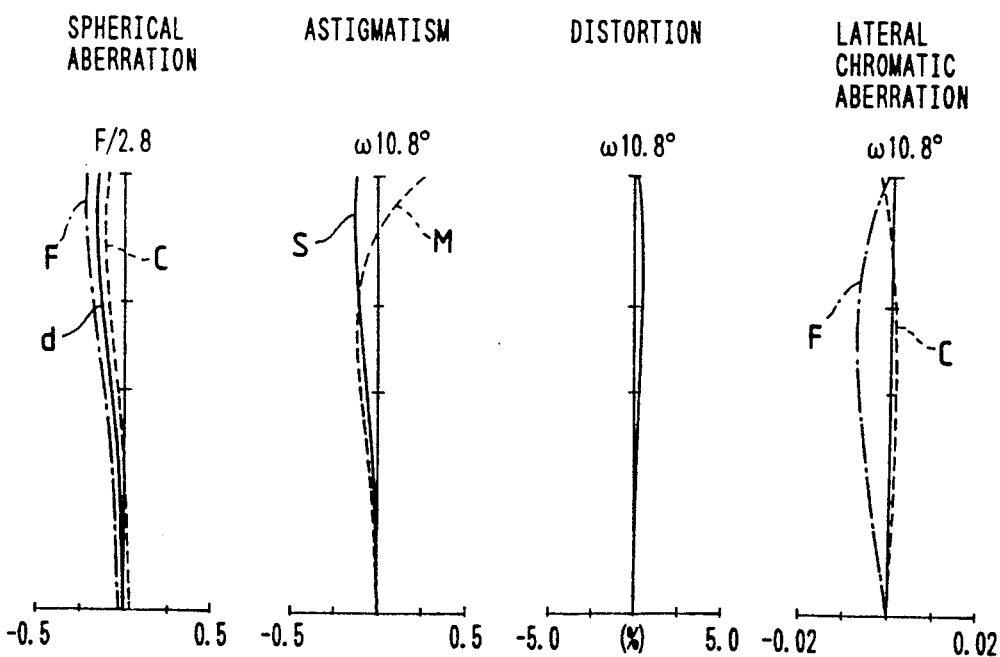

Aberration characteristics at the wide position, intermediate focal length and tele position of the Embodiment 16 are illustrated in FIG. 74, FIG. 75 and FIG. 76 respectively.

Figure 17:
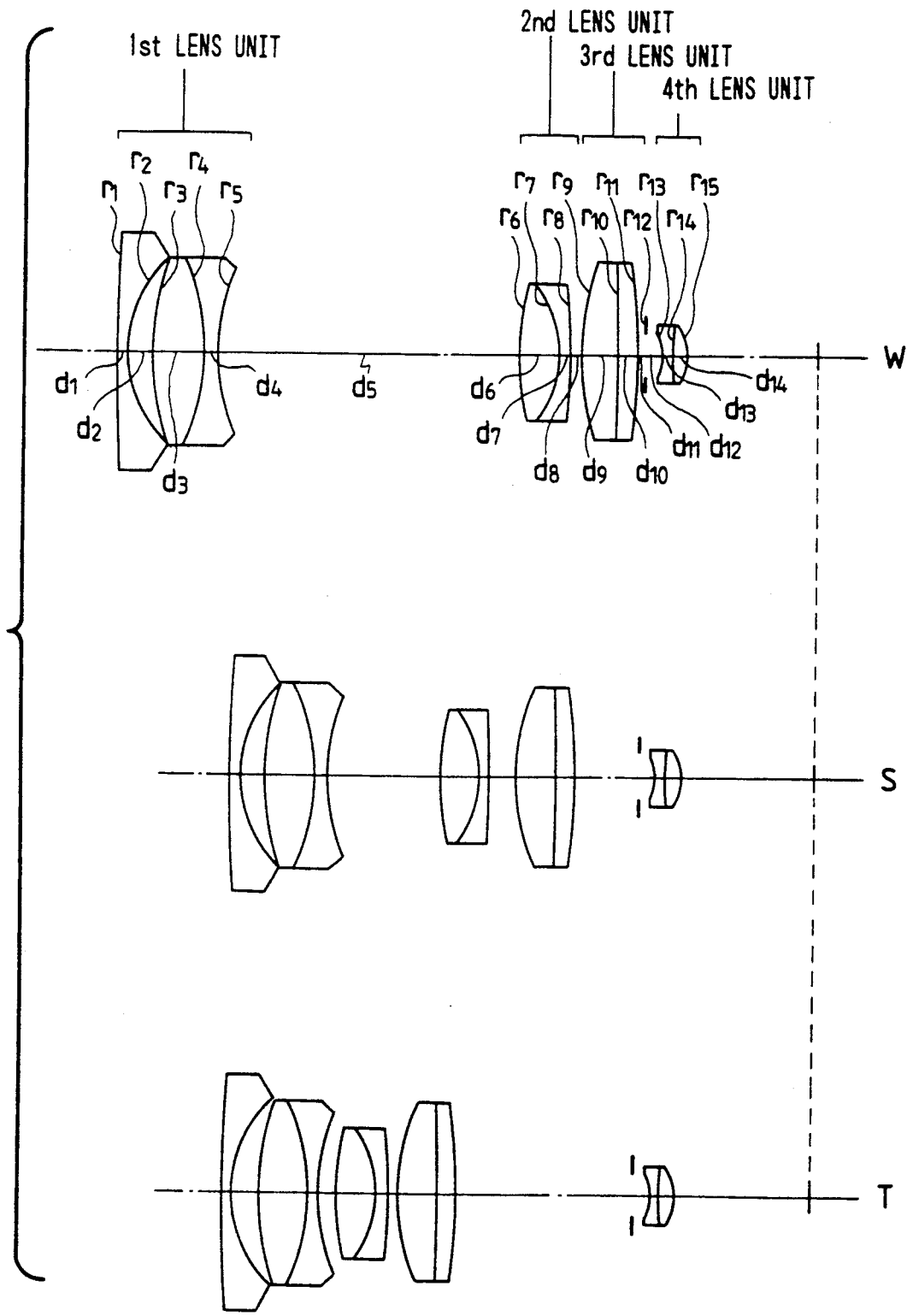

The Embodiment 17 has the composition shown in FIG. 17 wherein the lens component arranged on the most image side in the first lens unit is designed as an axial GRIN lens component which has a refractive index distribution on the image side surface thereof satisfying the condition (7). Further, the second surface ($r_2$) is designed as an aspherical surface satisfying the condition (10). Furthermore, the fifteenth surface (the final surface $r_{15}$) is designed as an aspherical surface satisfying the condition (12) and serves for correcting spherical aberration over the entire range from the wide position to the tele position. In this embodiment, the location of the aperture stop and F number are kept fixed, whereas the first lens unit is not fixed, thereby allowing the total length of the vari-focal lens system to be varied along with variation of focal length thereof. Owing to this design to allow the total length of the vari-focal lens system to be varied along with variation of focal length, flexibility for correction of aberrations is enhanced and aberrations are corrected more favorably in the Embodiment 17.

Figure 77:
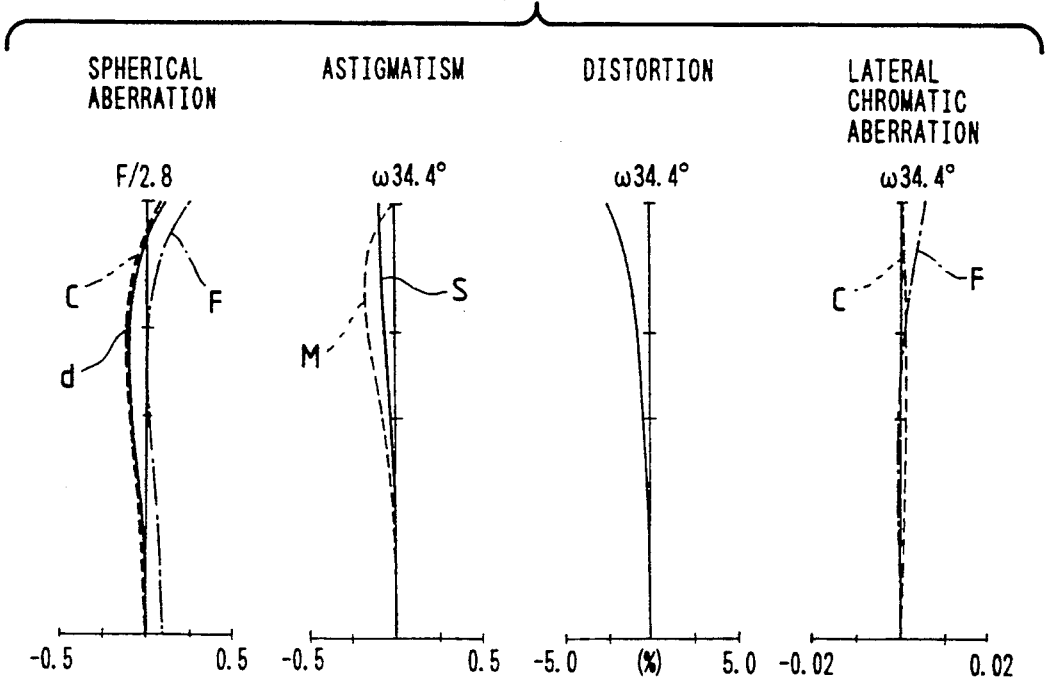
FIG. 77 through FIG. 79 show graphs illustrating aberration characteristics of the Embodiment 17 of the present invention.
Figure 78:
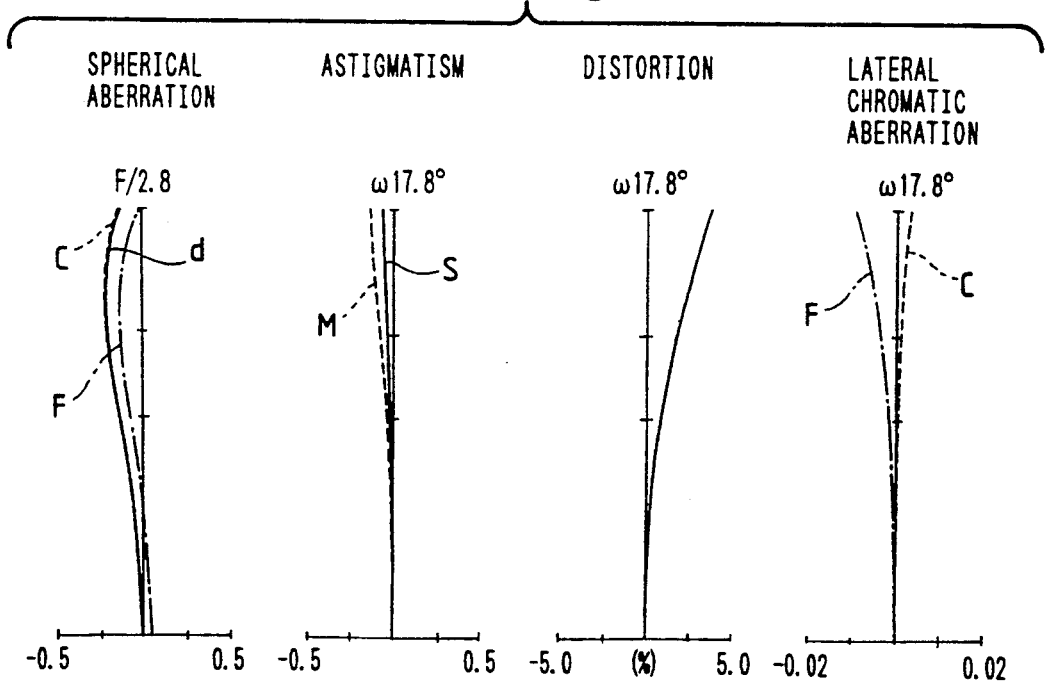
Figure 79:
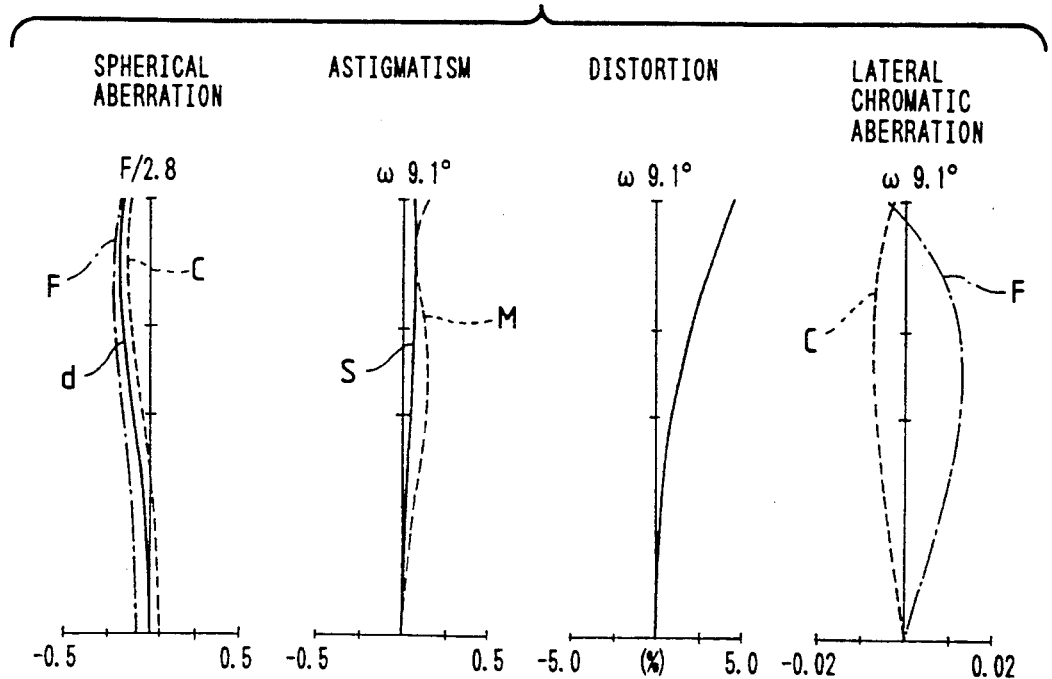

Aberration characteristics at the wide position, intermediate focal length and tele position of the Embodiment 17 are visualized in FIG. 77, FIG. 78 and FIG. 79 respectively.

Figure 18:
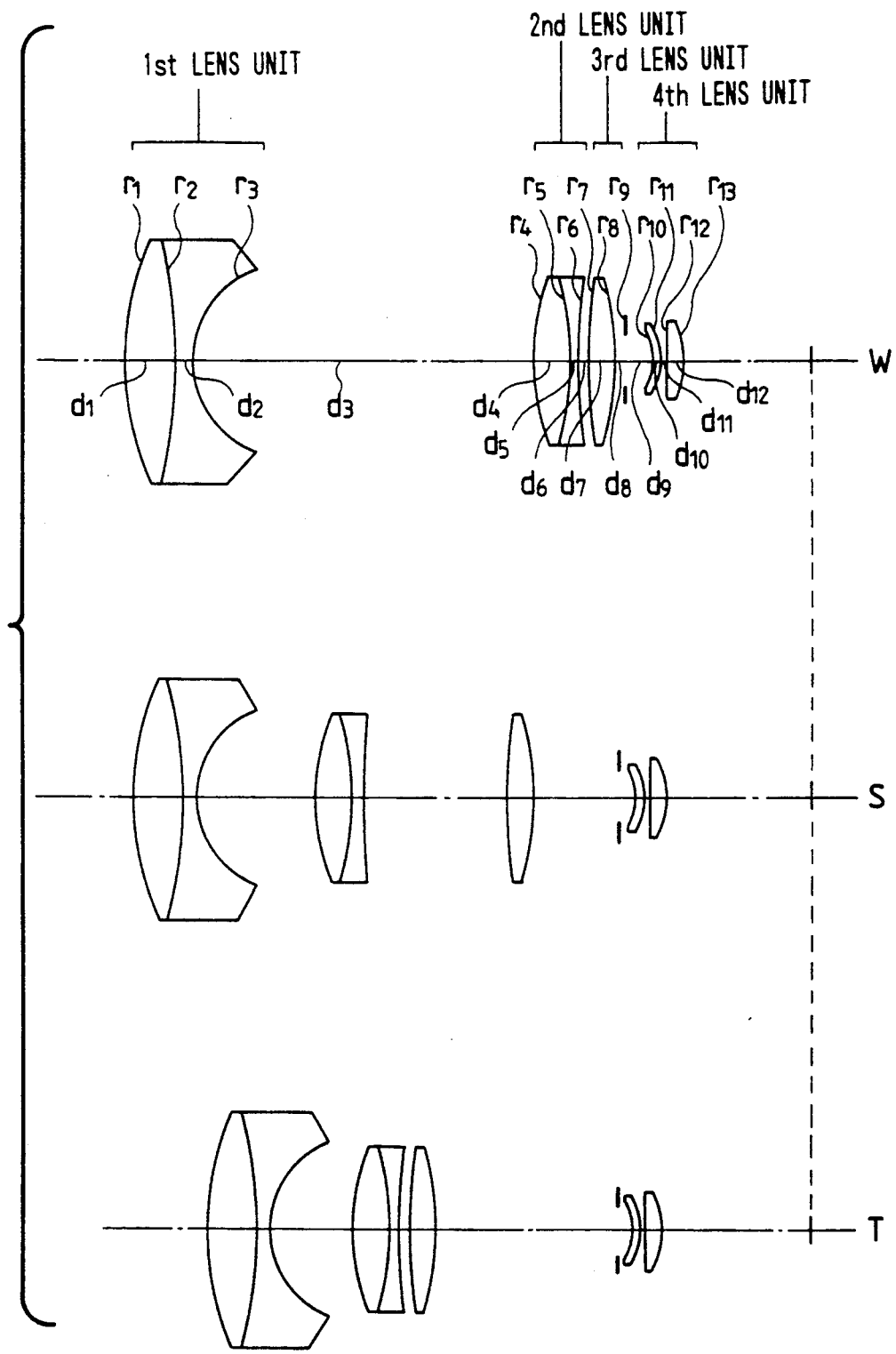

The Embodiment 18 has the composition shown in FIG. 18 wherein the lens component arranged on the most image side in the fourth lens unit is designed as an axial GRIN lens component which has a refractive index distribution satisfying the condition (9) and serves for favorably correcting astigmatism at the wide position. Further, the first surface ($r_1$) is designed as an aspherical surface satisfying the condition (10). In the Embodiment 18 also, the first lens unit as well as the fourth lens unit is movable for enhancing flexibility for correction of aberrations, whereby aberrations are corrected favorably in the vari-focal lens system. Diameter of the aperture stop is variable along with variation of focal length to make F number invariable in the Embodiment 18. The F number will be varied if the diameter of the aperture stop is not varied along with variation of focal length.

Figure 80:
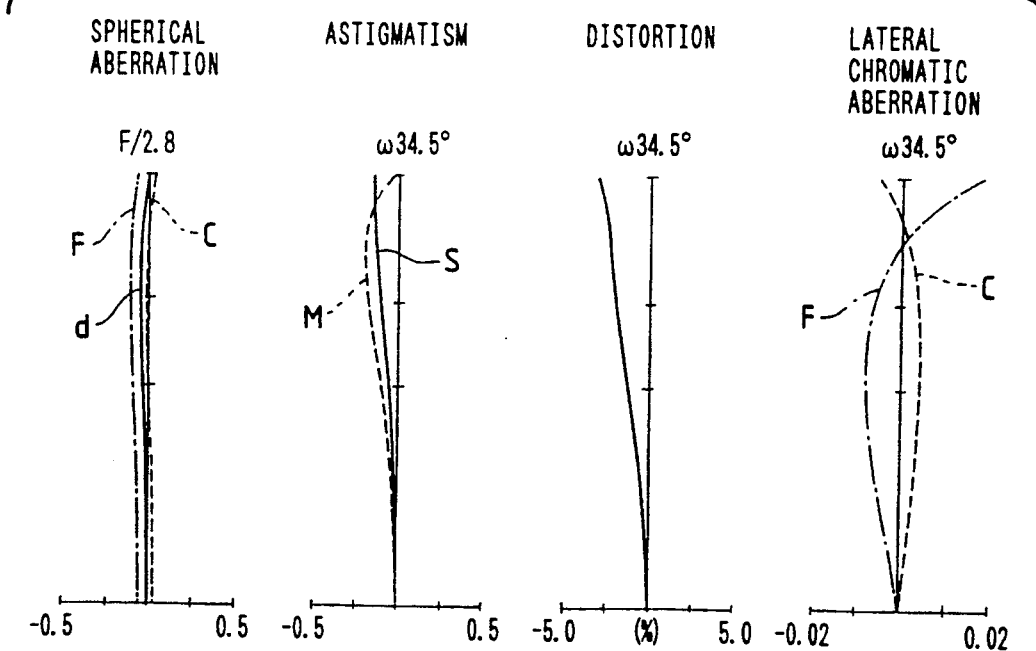
FIG. 80 through FIG. 82 show graphs visualizing aberration characteristics of the Embodiment 18 of the present invention.
Figure 81:
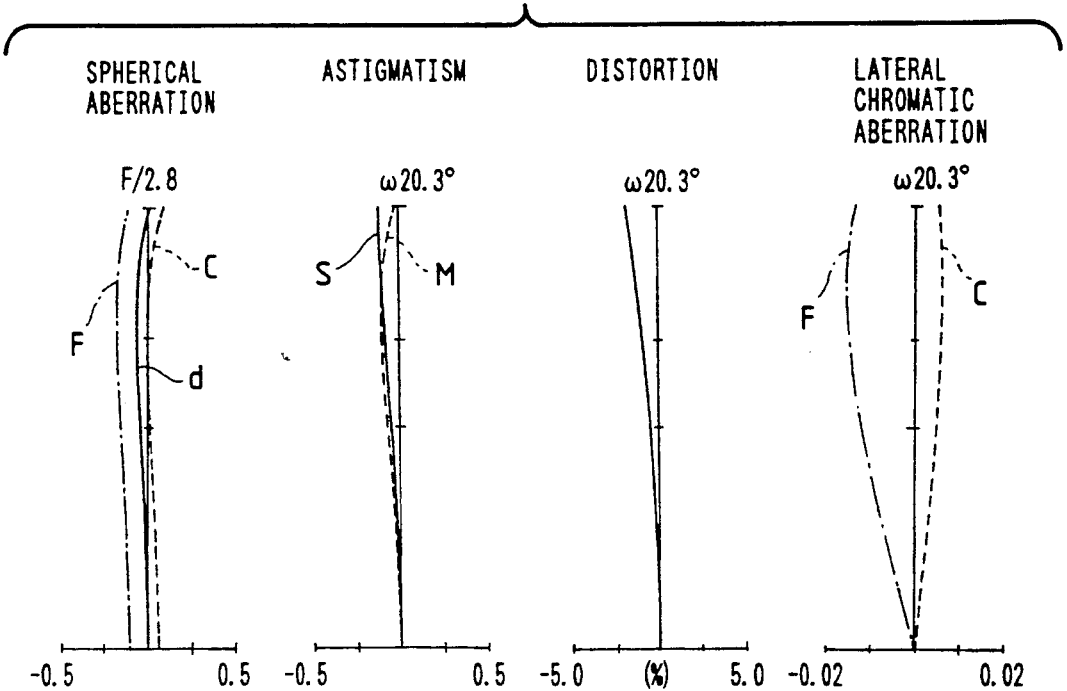
Figure 82:
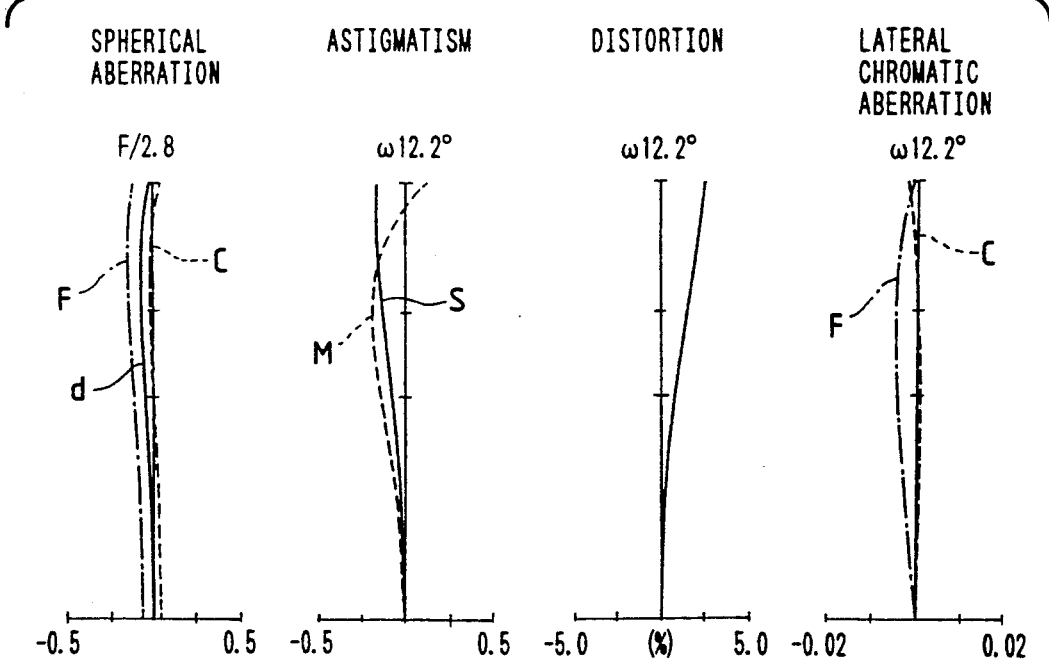

Aberration characteristics at the wide position, intermediate focal length and tele position of the Embodiment 18 are illustrated in FIG. 80, FIG. 81 and FIG. 82 respectively.

Figure 19:
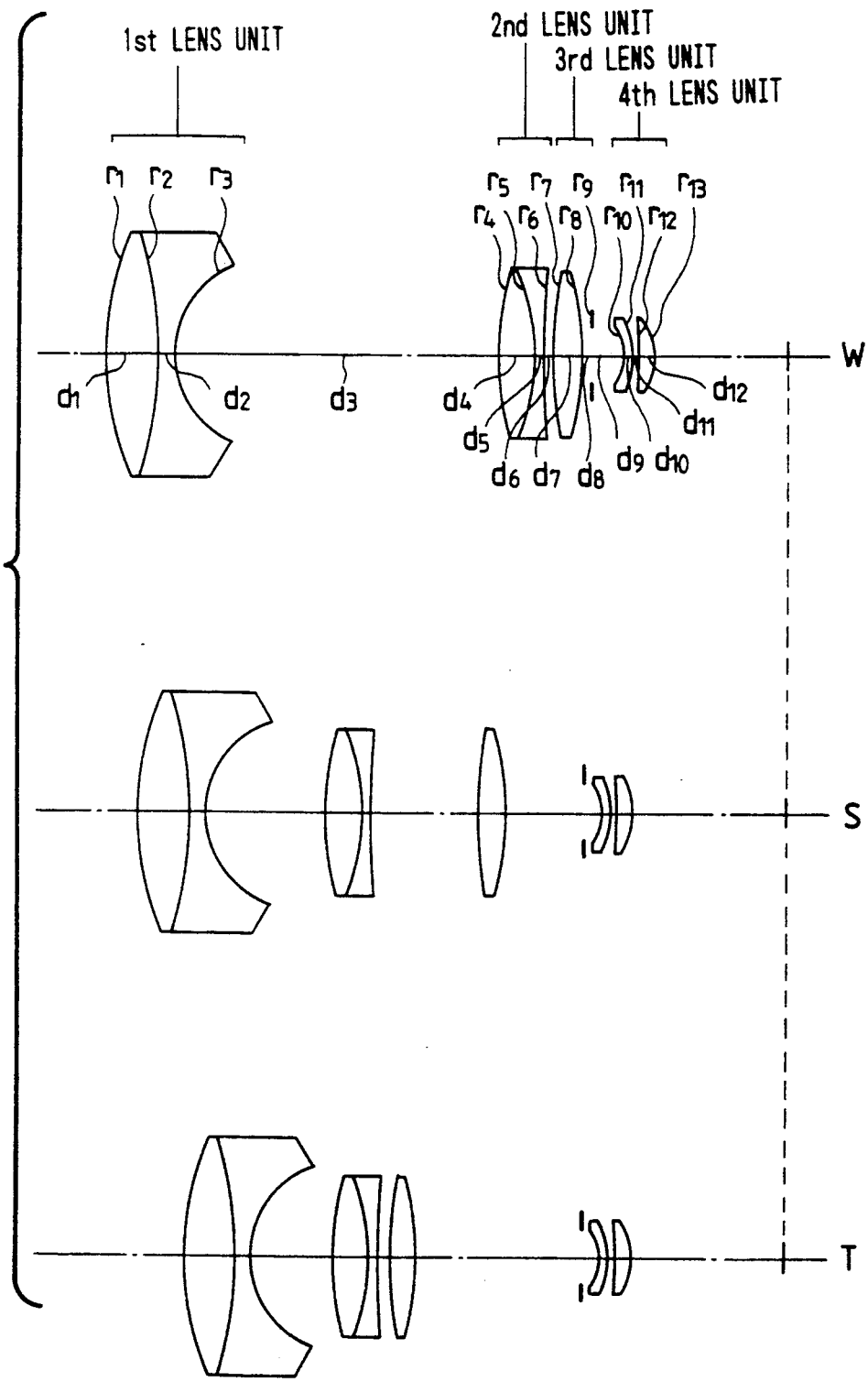

The Embodiment 19 has the composition shown in FIG. 19 wherein the first surface ($r_1$) is designed as an aspherical surface which satisfies the condition (10) and serves for correcting distortion, etc. at the wide position. Further, the thirteenth surface (the final surface ($r_{13}$) is designed as an aspherical surface which satisfies the condition (12) and serves for correcting spherical aberration over the entire range from the wide position to the tele position. In this embodiment, all of the first, second, third and fourth lens units are movable for enhancing flexibility for correction of aberrations, whereby the vari-focal lens system has favorably corrected in the vari-focal lens system. Furthermore, diameter of the aperture stop is varied along with variation of focal length for keeping the F number of the lens system fixed, which will be varied if the diameter of the aperture stop is not varied. The Embodiment 19 exemplifies a case wherein aberrations are corrected favorably with the two aspherical surfaces and no axial GRIN lens component.

Figure 83:
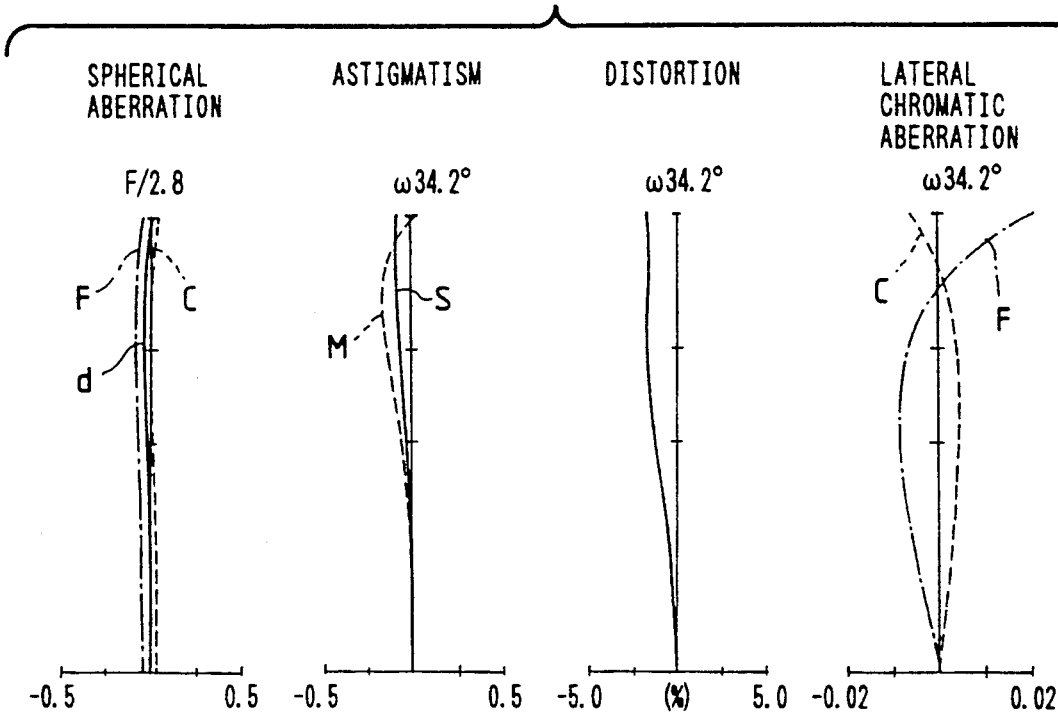
FIG. 83 through FIG. 85 show curves visualizing aberration characteristics of the Embodiment 19 of the present invention.
Figure 84:
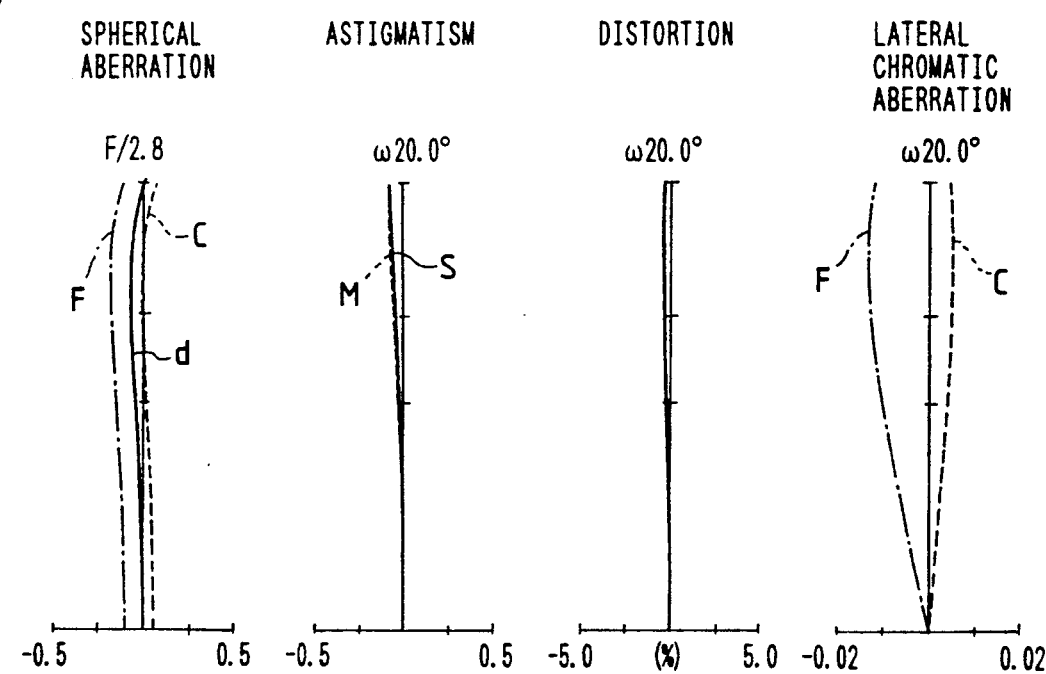
Figure 85:
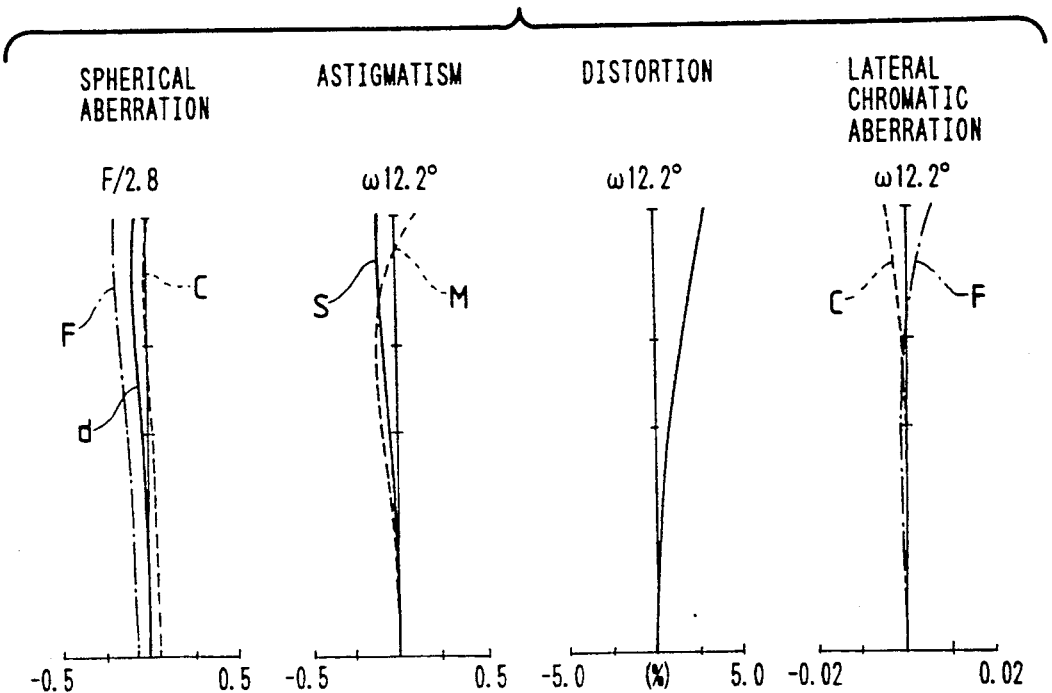

Aberration characteristics at the wide position, intermediate focal length and tele position of the Embodiment 19 are illustrated in FIG. 83, FIG. 84 and FIG. 85 respectively.

Figure 20:
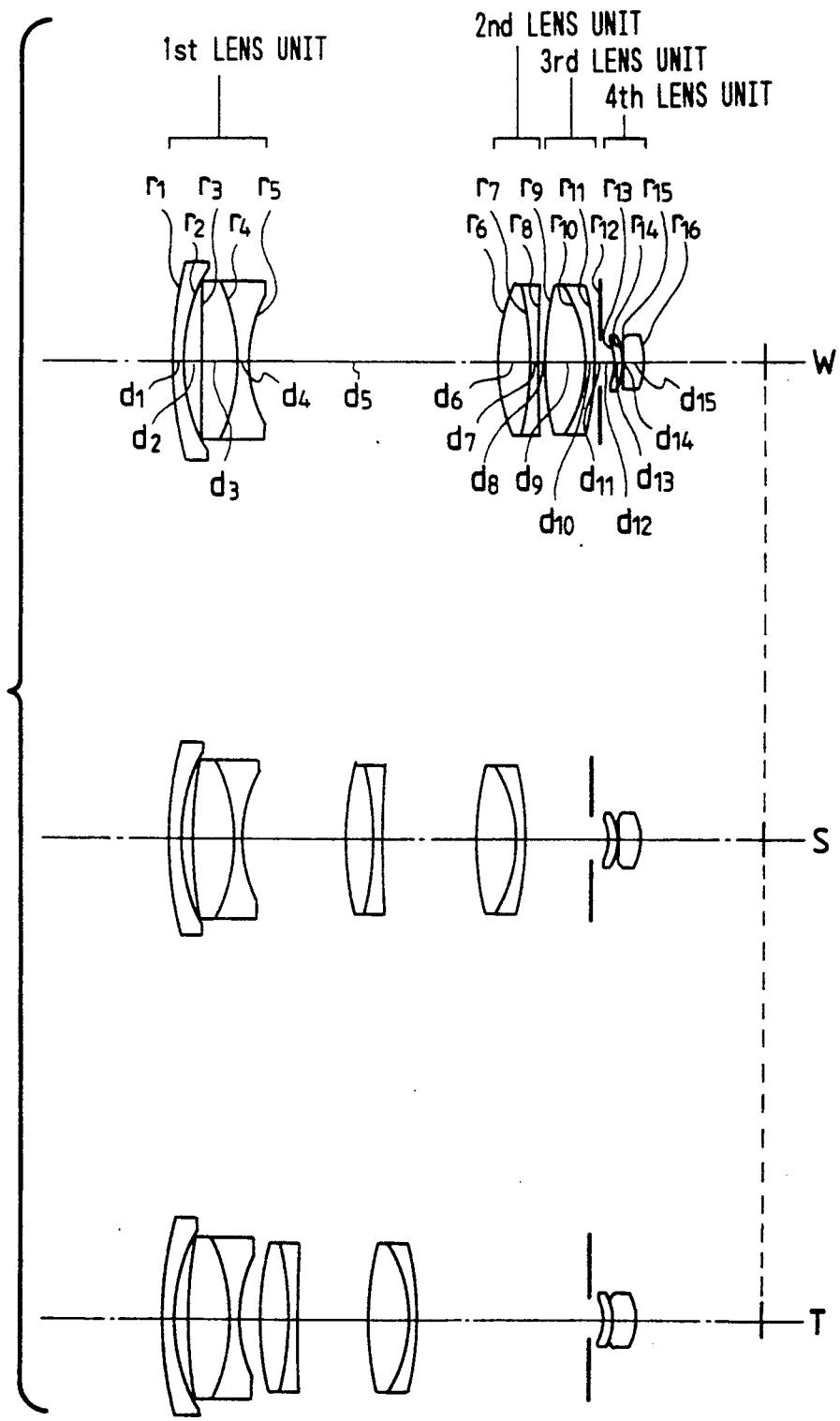

The Embodiment 20 has the composition shown in FIG. 20 wherein the first lens unit is composed of a negative lens component and a cemented doublet consisting of a positive lens element and a negative lens element, the second lens unit is composed of a cemented doublet consisting of a positive lens element and a negative lens element, the third lens unit is composed of a cemented doublet consisting of a positive lens element and a negative lens element, the fourth lens unit is composed of a negative lens component and a positive lens component, and the aperture stop is arranged on the objective side of the fourth lens unit. The most image side surface of the first lens unit and the most image side surface of the fourth lens unit are designed as aspherical surfaces. For variation of focal length, the second lens unit and the third lens unit are moved, whereas the other lens units and the aperture stop are kept fixed.

Figure 86:
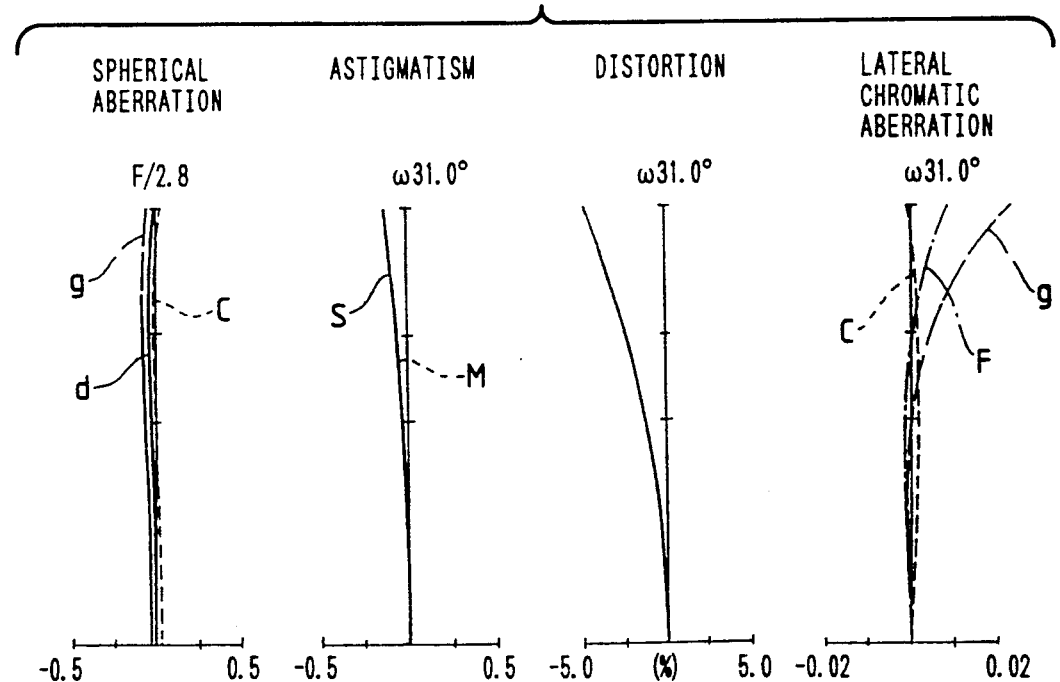

Aberration characteristics at the wide position, intermediate focal length and tele position of the Embodiment 20 are illustrated in FIG. 86, FIG. 87 and FIG. 88 respectively.

Figure 21:
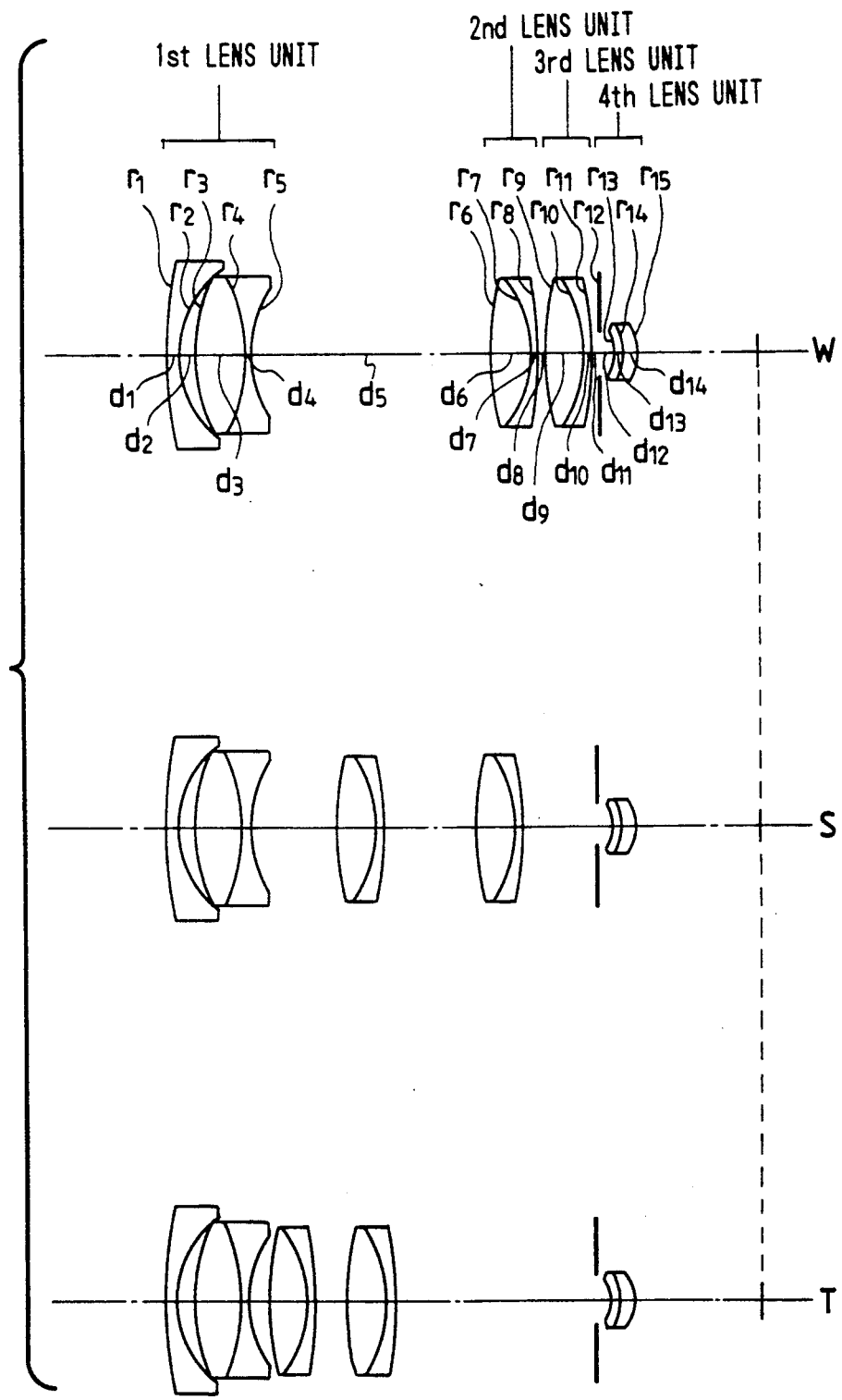
Figure 22:
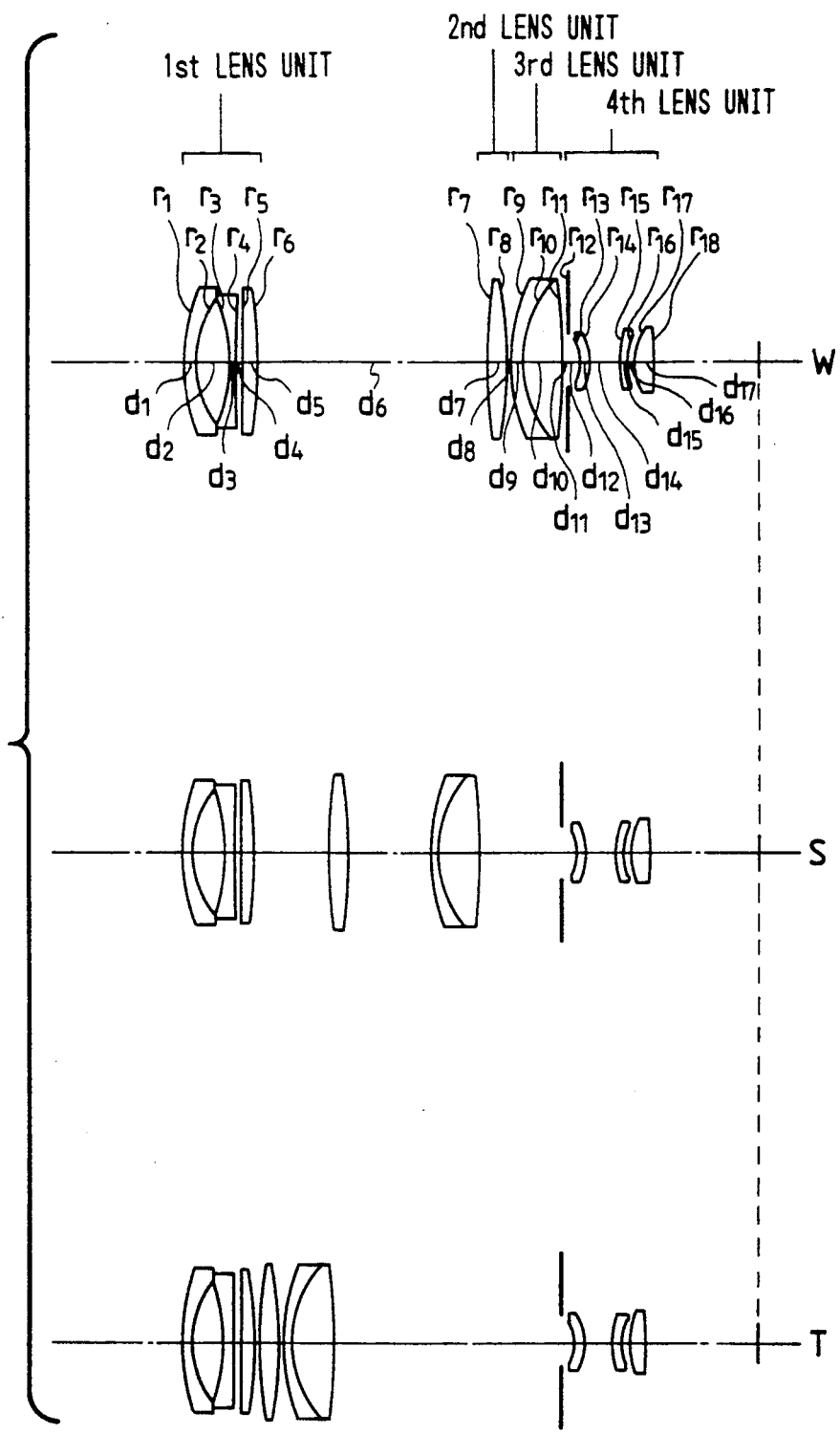

The Embodiment 21 has the composition shown in FIG. 21 wherein the first lens unit is composed of a negative lens component and a cemented doublet consisting of a positive lens element and a negative lens element, the second lens unit is composed of a cemented doublet consisting of a positive lens element and a negative lens element, the third lens unit is composed of a cemented doublet consisting of a positive lens element and a negative lens element, the fourth lens unit is composed of a cemented doublet consisting of a negative lens element and a positive lens elemenet, and the aperture stop is arranged on the object side of the fourth lens unit. The second surface ($r_2$) and the final surface ($r_5$) of the first lens unit as well as the final surface ($r_{15}$) of the fourth lens unit are designed as aspherical surfaces respectively. The Embodiment 21 has a very wide field angle of 70.3° at the wide position thereof.

Figure 89:
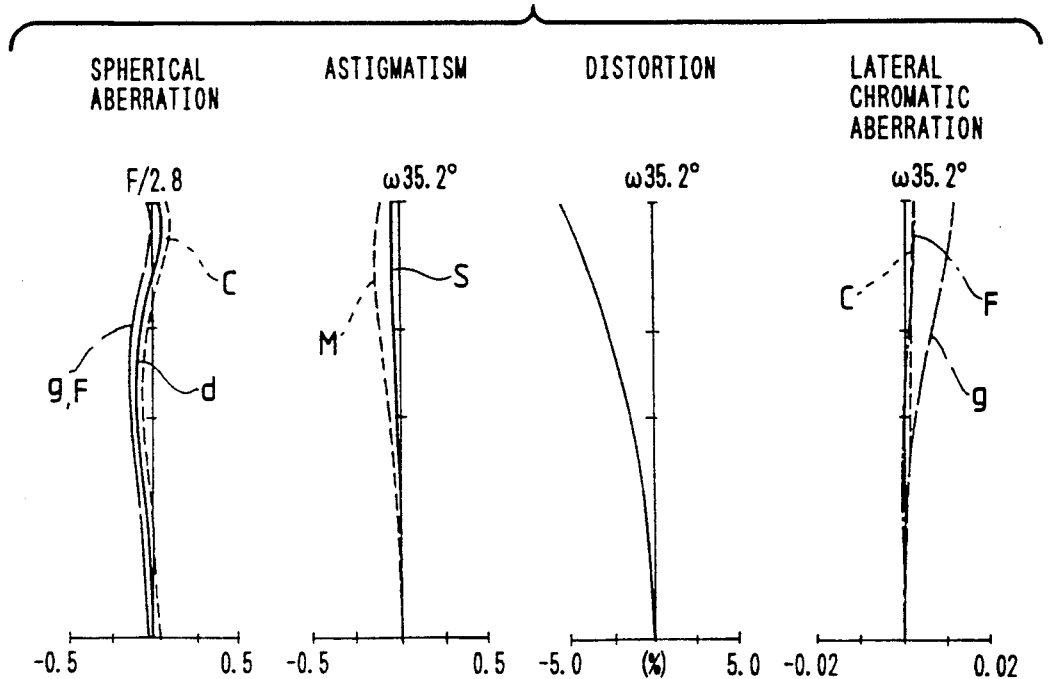
FIG. 89 through FIG. 91 show graphs illustrating aberration characteristics of the Embodiment 21 of the present invention.
Figure 90:
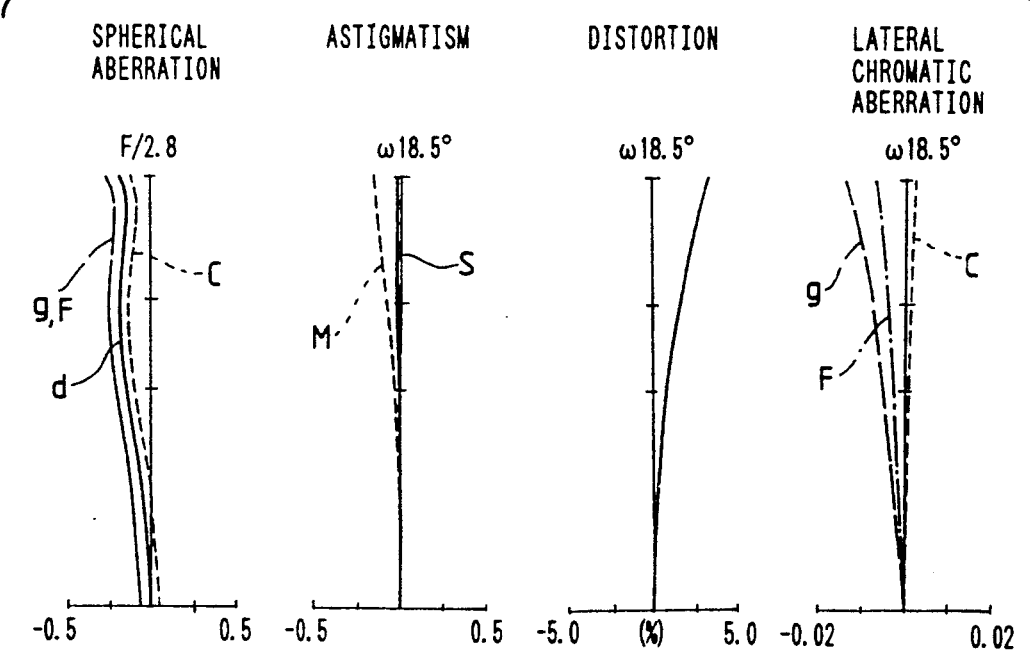
Figure 91:
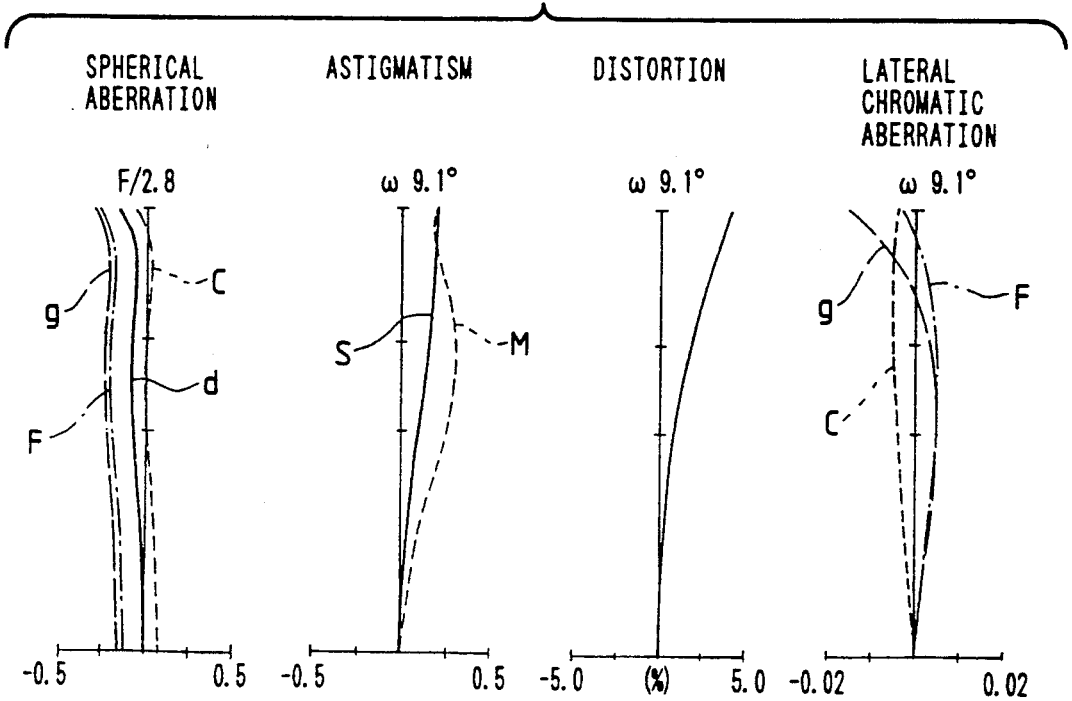

Aberration characteristics at the wide position, intermediate focal length and tele position of the Embodiment 21 are visualized in FIG. 89, FIG. 90 and FIG. 91 respectively.

The Embodiment 21 has the composition illustrated in FIG. 21 wherein the first lens unit is composed of a negative lens component, a negative lens component and a positive lens component, the second lens unit is composed of a positive lens component, the third lens unit is composed of a cemented doublet consisting of a negative lens element and a positive lens element, the fourth lens unit is composed of a negative lens component, a negative lens component and a positive lens component, and the aperture stop is arranged on the object side of the fourth lens unit. The second surface ($r_2$) and the fifteenth surface (the third surface $r_{15}$ of the fourth lens unit) are designed as aspherical surfaces respectively. The lens component arranged on the most object side in the fourth lens unit is a meniscus lens component concave toward the object side and having nearly no power, which permits controlling the axial aberrations without varying the offaxial aberrations and is effective for correcting the axial aberrations over the entire range from the wide position to the tele position. Further, this meniscus lens component serves also for enhancing the axial ray and prolonging back focal length of the vari-focal lens system.

Figure 92:
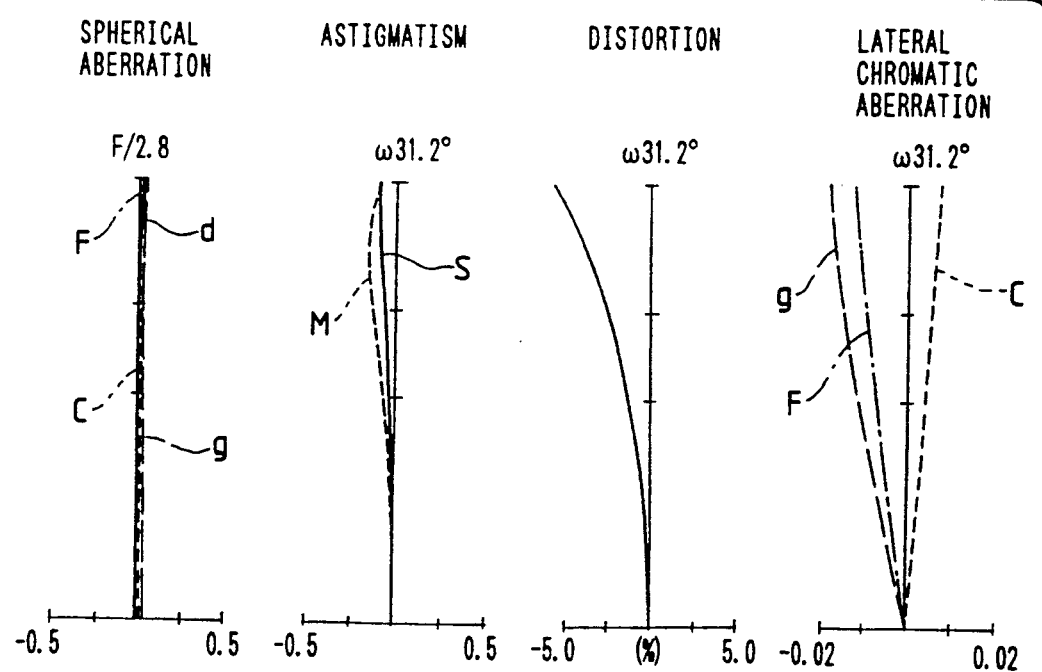

Aberration characteristics at the wide position, intermediate focal length and tele position of the Embodiment 22 are illustrated in FIG. 92, FIG. 93 and FIG. 94 respectively.

Figure 23:
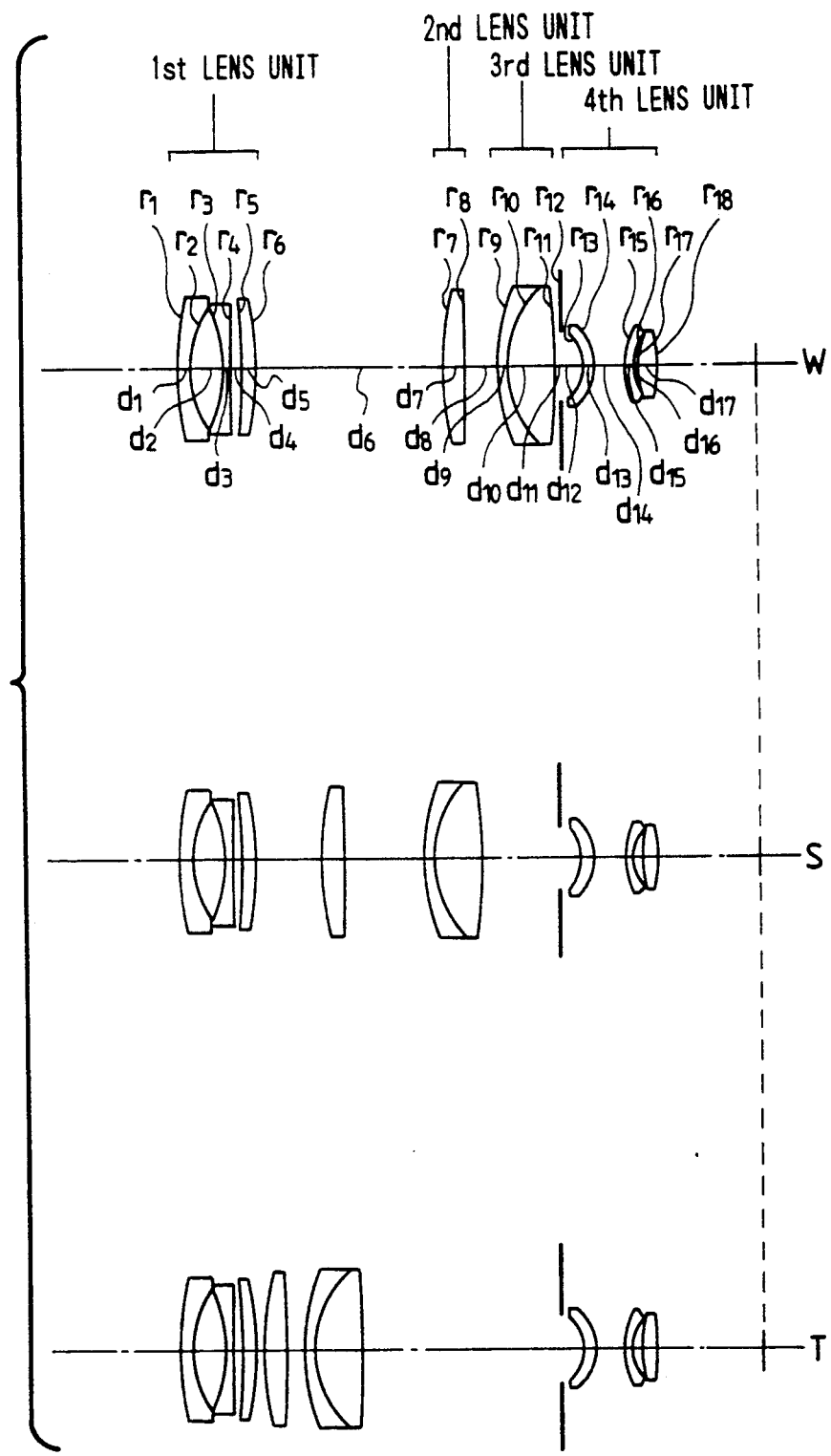

The Embodiment 23 has the composition shown in FIG. 23 wherein the first lens unit is composed of a negative lens component, a negative lens component and a positive lens component, the second lens unit is composed of a positive lens component, the third lens unit is composed of a cemented doublet consisting of a negative lens element and a positive lens element, the fourth lens unit is composed of a negative lens component, a negative lens component and a positive lens component, and the aperture stop is arranged on the object side of the fourth lens component. In this embodiment also, the lens component arranged on the most object side in the fourth lens unit is designed as a meniscus lens component for obtaining the same effects as those in the Embodiment 22. This embodiment has a large aperture of F/2.0.

Figure 95:
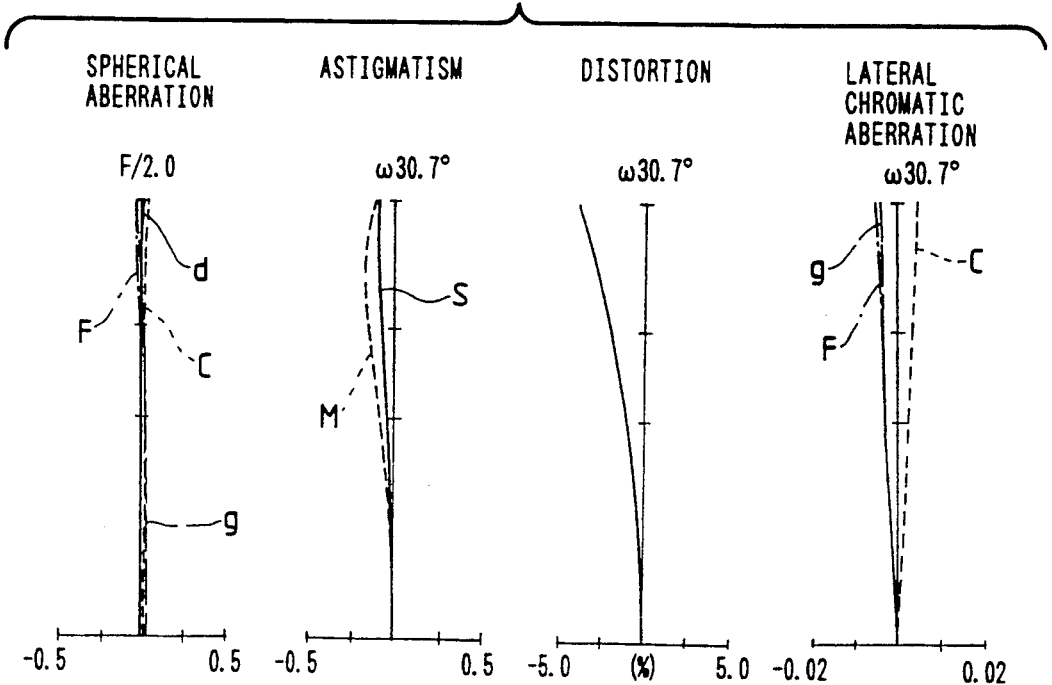
FIG. 95 through FIG. 97 show curves illustrating aberration characteristics of the Embodiment 23 of the present invention.
Figure 96:
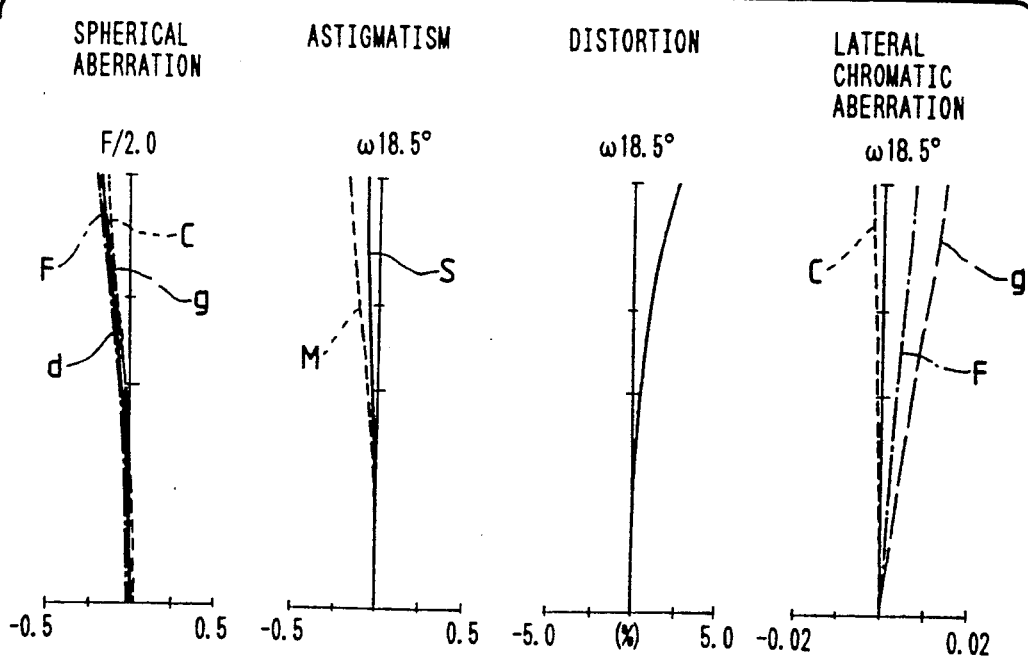
Figure 97:
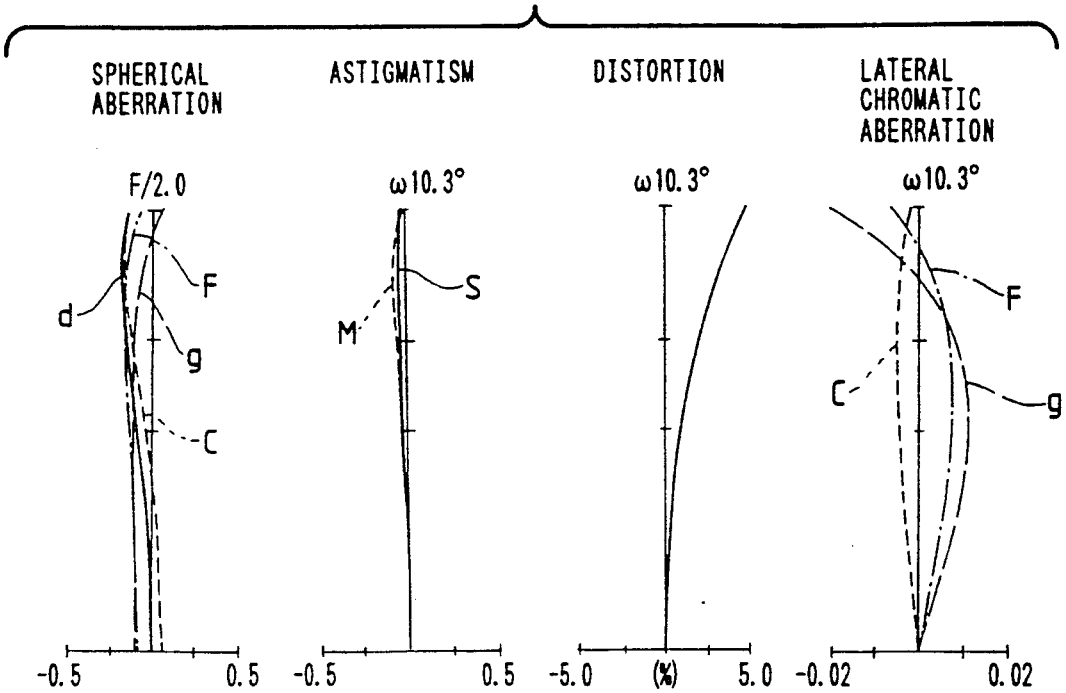

Aberration characteristics at the wide position, intermediate focal length and tele position of the Embodiment 23 are illustrated in FIG. 95, FIG. 96 and FIG. 97 respectively.

Figure 24:
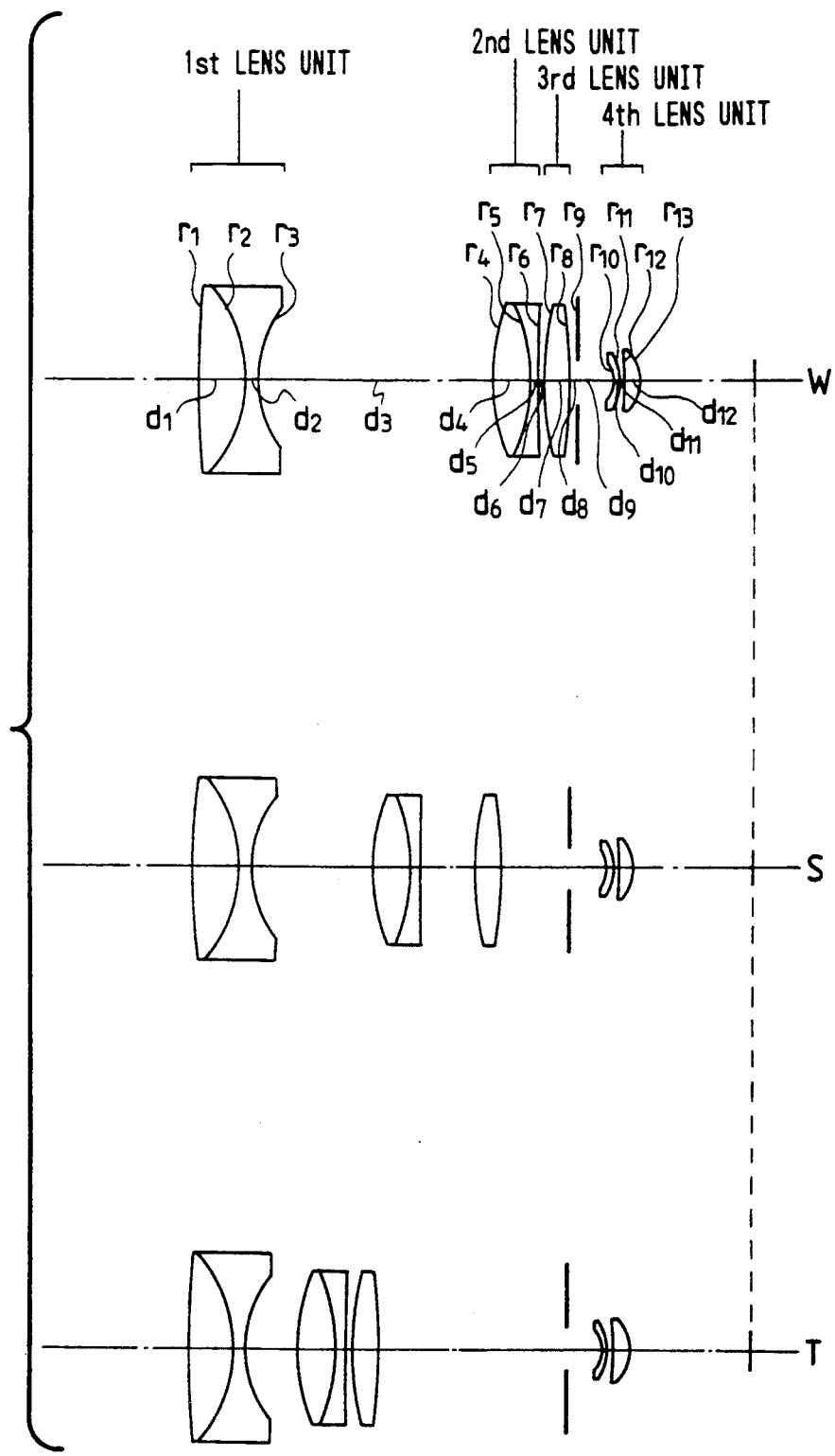

The Embodiment 24 has the composition shown in FIG. 24 wherein the first lens unit is composed of a cemented doublet consisting of a positive lens element and a negative lens element, the second lens unit is composed of a cemented doublet consisting of a positive lens element and a negative lens element, the third lens unit is composed of a positive lens component, the fourth lens unit is composed of a negative lens component and a positive lens component, and the aperture stop is arranged on the object side of the fourth lens unit. The first surface ($r_1$) and the thirteenth surface (the most image side surface $r_{13}$ of the fourth lens unit) are designed as aspherical surfaces respectively. The Embodiment 24 consists of the lens elements in a number as small as 7.

Figure 98:
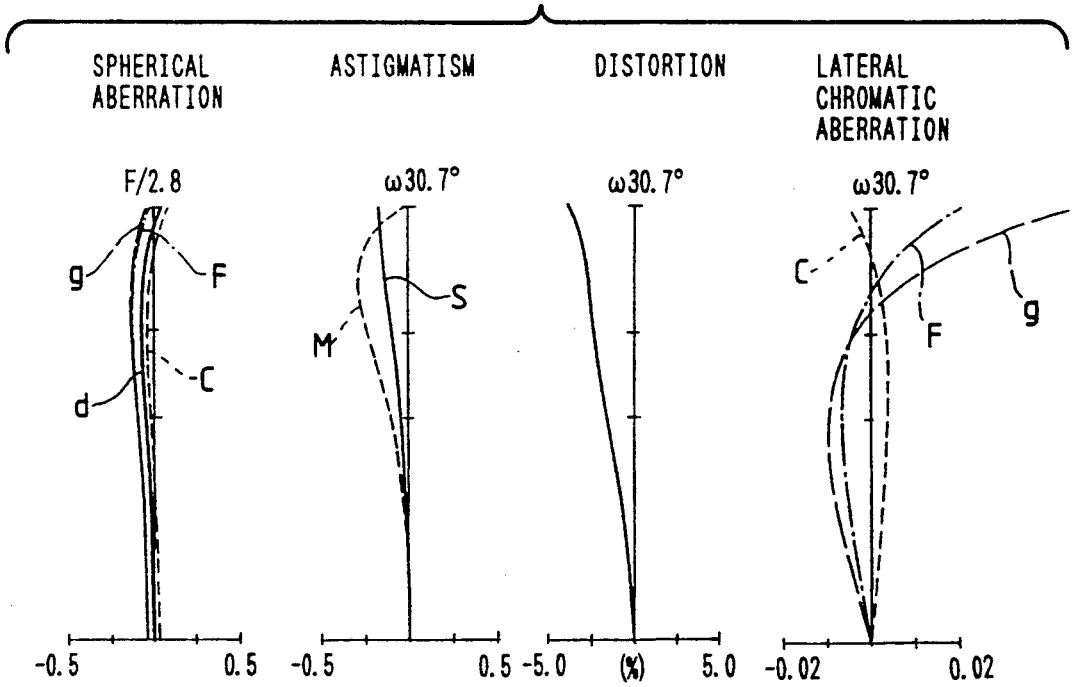
FIG. 98 through FIG. 100 show graphs illustrating aberration characteristics of the Embodiment 24 of the present invention.
Figure 99:
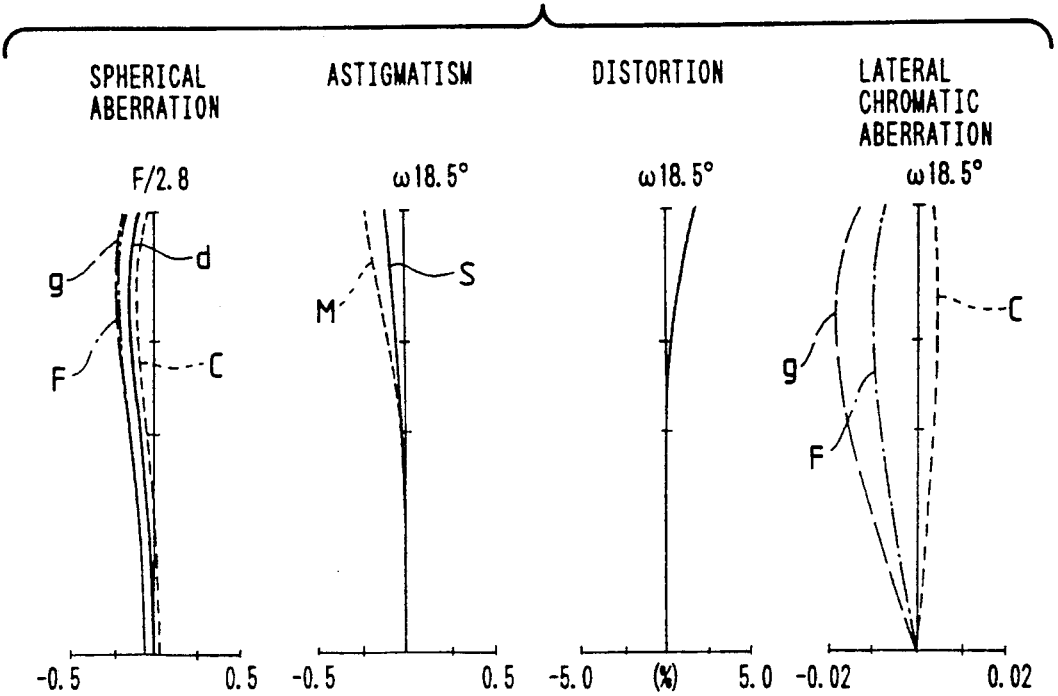
Figure 100:
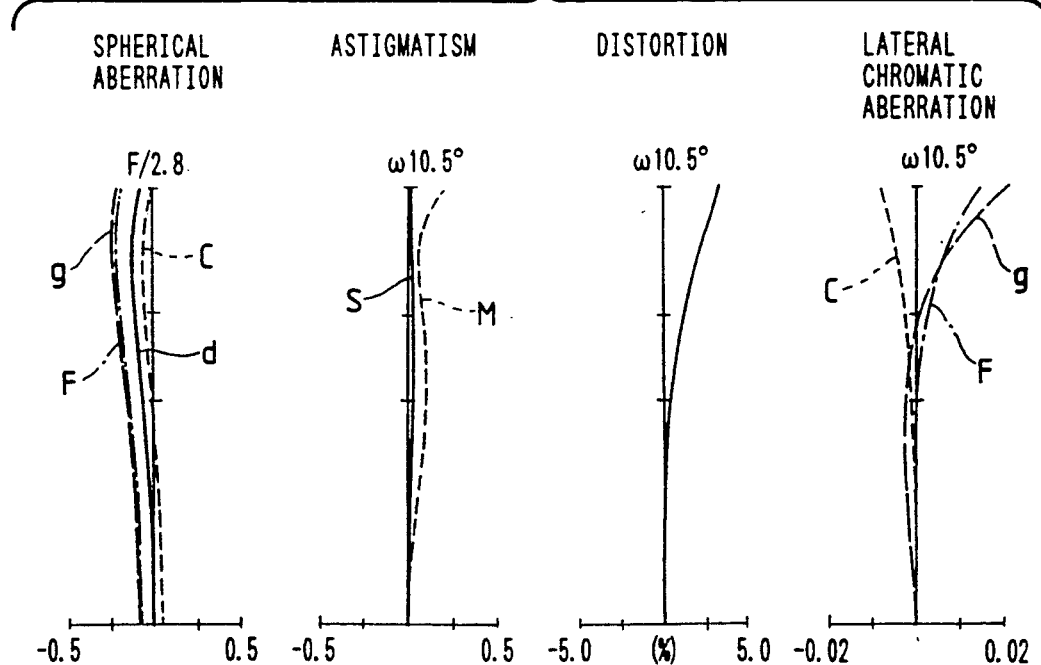

Aberration characteristics at the wide position, intermediate focal length and tele position of the Embodiment 24 are visualized in FIG. 98, FIG. 99 and FIG. 100 respectively.

Figure 25:
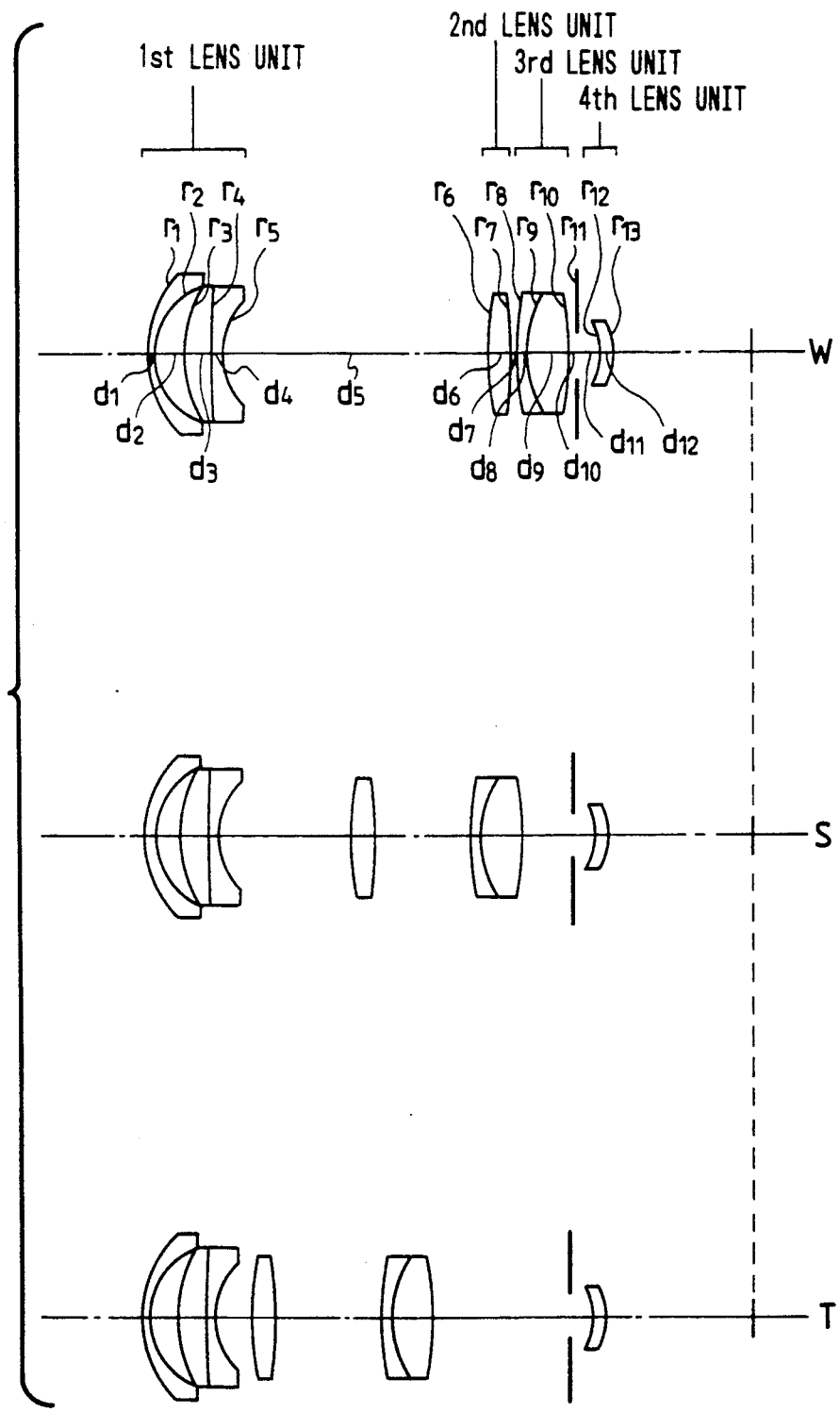

The Embodiment 25 has the composition illustrated in FIG. 25 wherein the first lens unit is composed of a positive lens component and a cemented doublet consisting of a positive lens element and a negative lens element, the second lens unit is composed of a positive lens component, the third lens unit is composed of a cemented doublet consisting of a negative lens element and a positive lens element, the fourth lens unit is composed of a negative lens component, and the aperture stop is arranged on the object side of the fourth lens unit. The third surface ($r_3$) is designed as an aspherical surface. The aberrations to be produced in the fourth lens unit can be reduced by weakening the power of this lens unit. In the Embodiment 25, the fourth lens unit is composed of a single negative lens component so as to have a weakened power and has a meniscus shape similar to that selected in the Embodiment 22.

Figure 101:
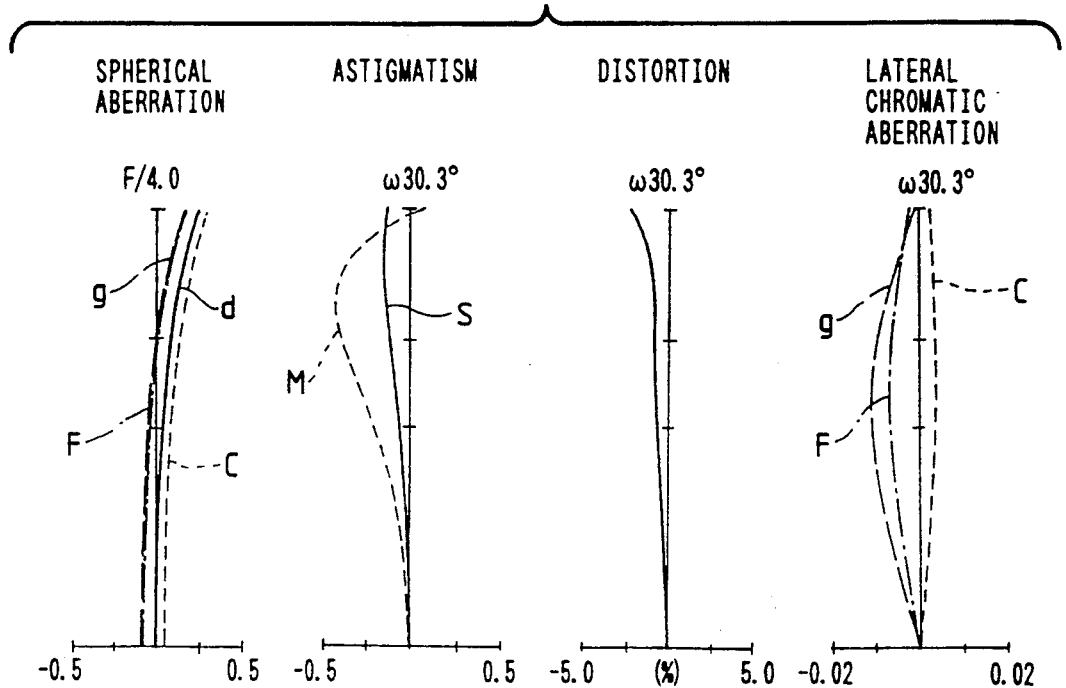
FIG. 101 through FIG. 103 show graphs illustrating aberration characteristics of the Embodiment 25 of the present invention.
Figure 102:
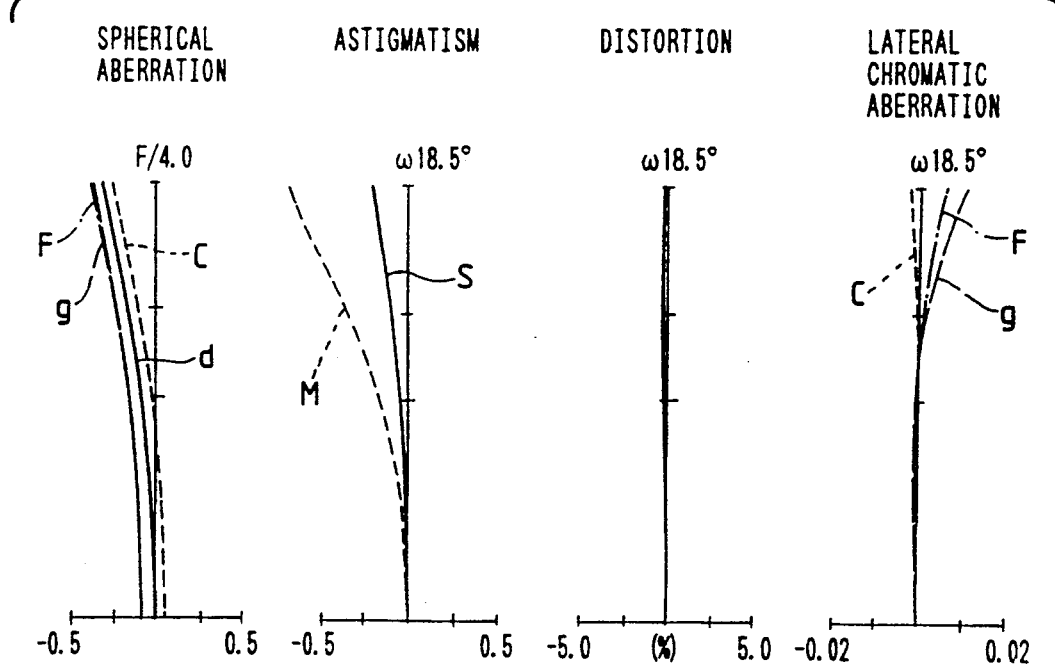
Figure 103:
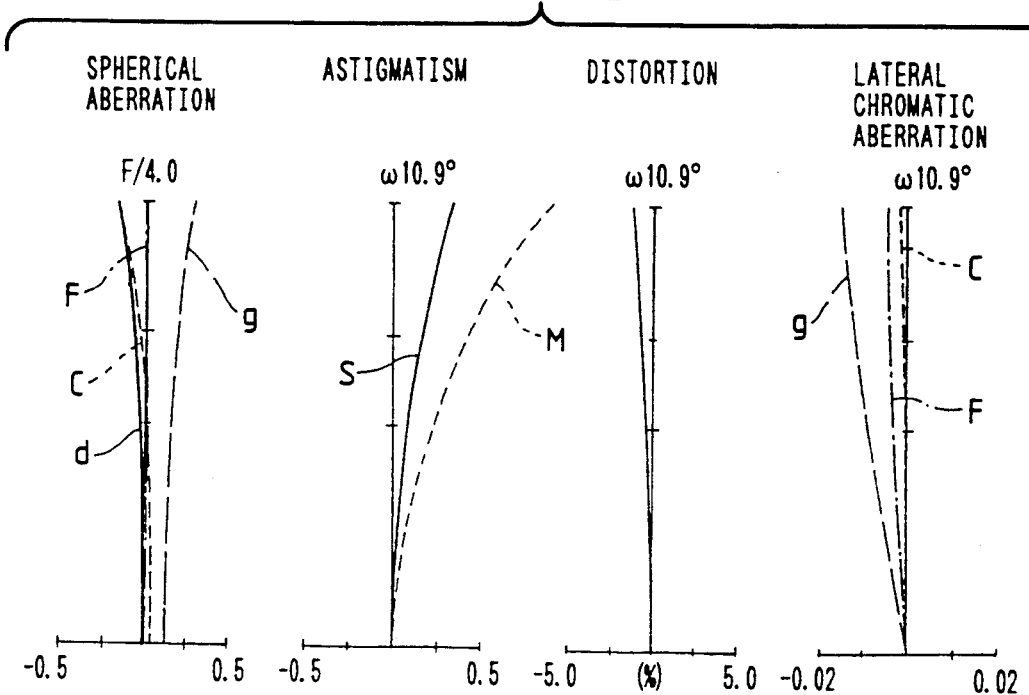

Aberration characteristics at the wide position, intermediate focal length and tele position of the Embodiment 25 are shown in FIG. 101, FIG. 102 and FIG. 103 respectively.

Figure 26:
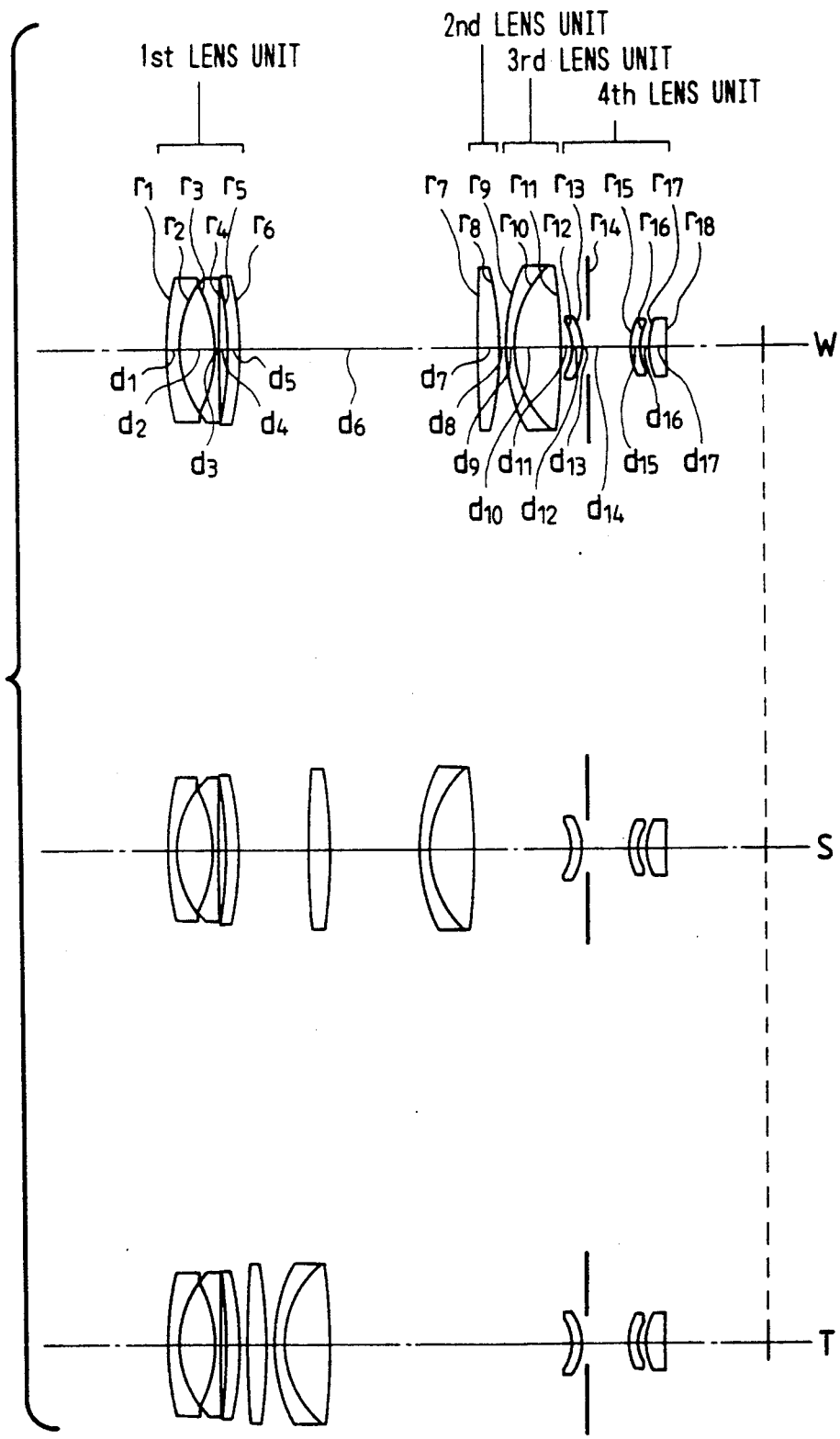

The Embodiment 26 has the composition shown in FIG. 26 wherein the first lens unit is composed of a negative lens component, a negative lens component and a positive lens component, the second lens unit is composed of a positive lens component, the third lens unit is composed of a cemented doublet consisting of a negative lens element and a positive lens element, and the fourth lens unit is composed of a negative lens component, a negative lens component and a positive lens component. The aperture stop is located in the fourth lens unit. Further, the lens component arranged on the most object side in the fourth lens unit is designed as a meniscus lens component which is concave toward the object side and has nearly no power. This meniscus lens component has a function which is similar to the meniscus lens component used in the Embodiment 22. The Embodiment 26 has a vari-focal ratio as high as 4.

Figure 104:
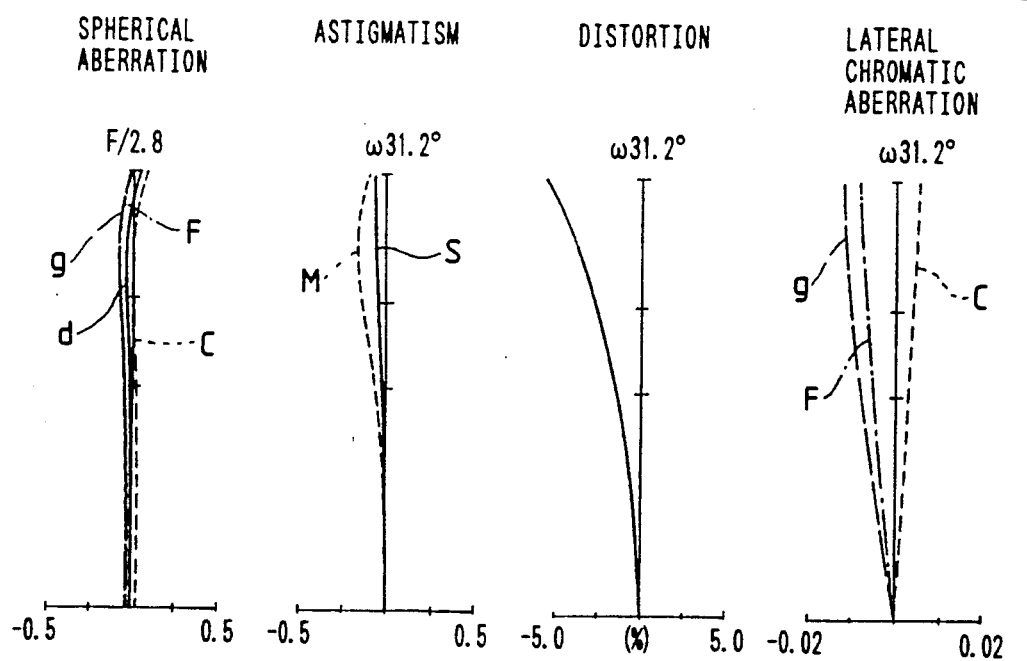
FIG. 104 through FIG. 106 show curves visualizing aberration characteristics of the Embodiment 26 of the present invention.
Figure 105:
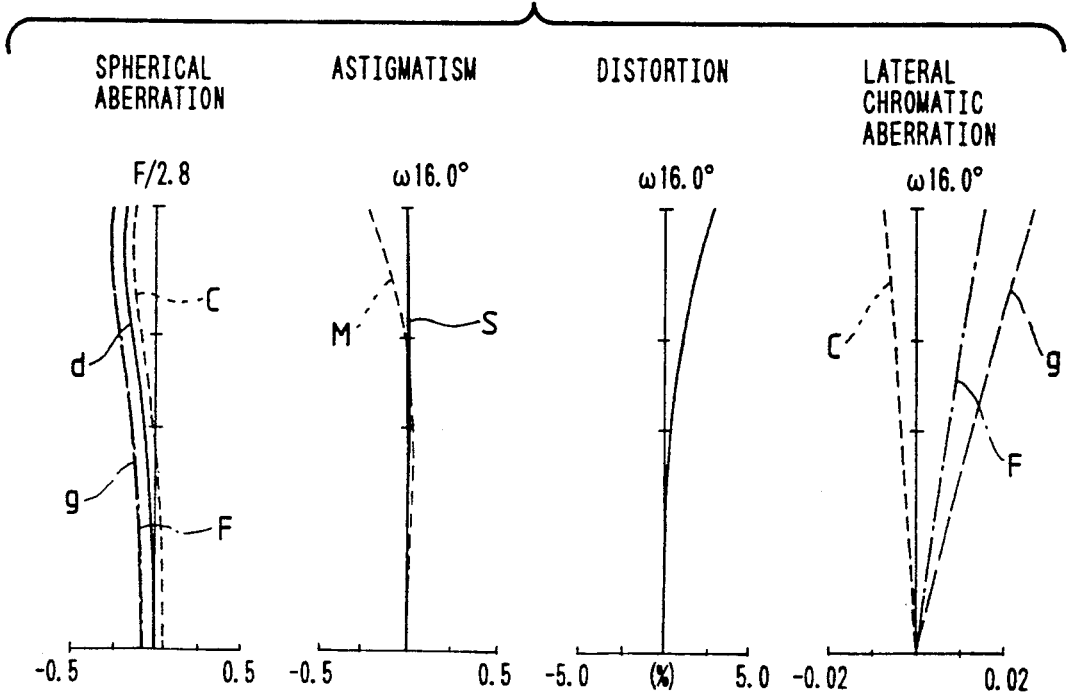
Figure 106:
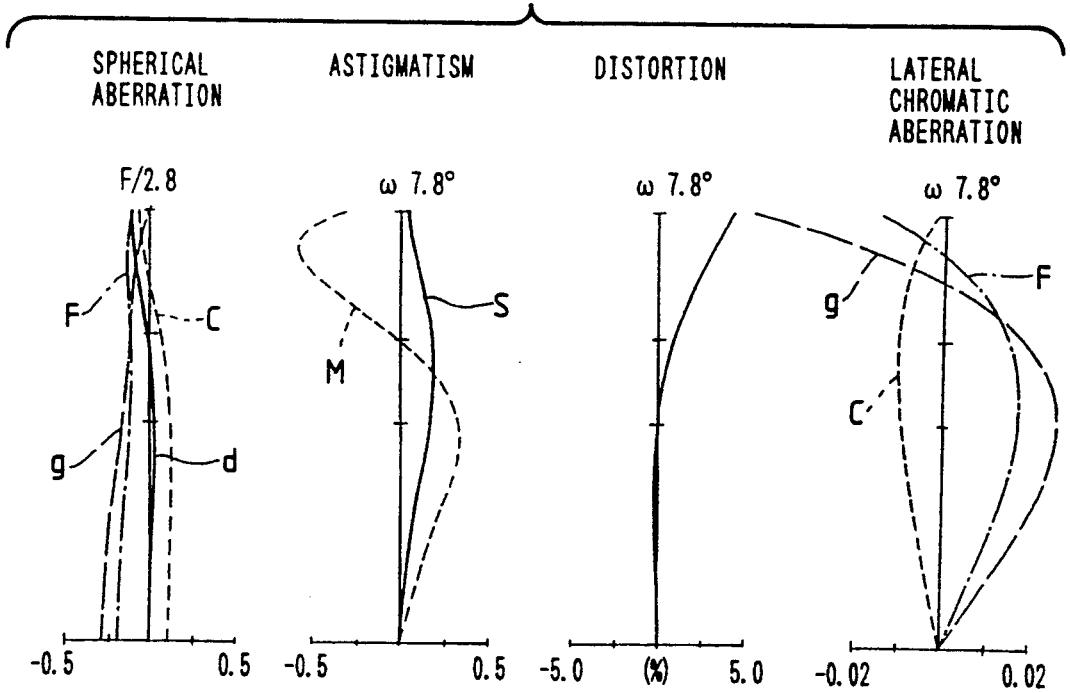

Aberration characteristics at the wide position, intermediate focal length and tele position of the Embodiment 26 are illustrated in FIG. 104, FIG. 105 and FIG. 106 respectively.

Figure 27:
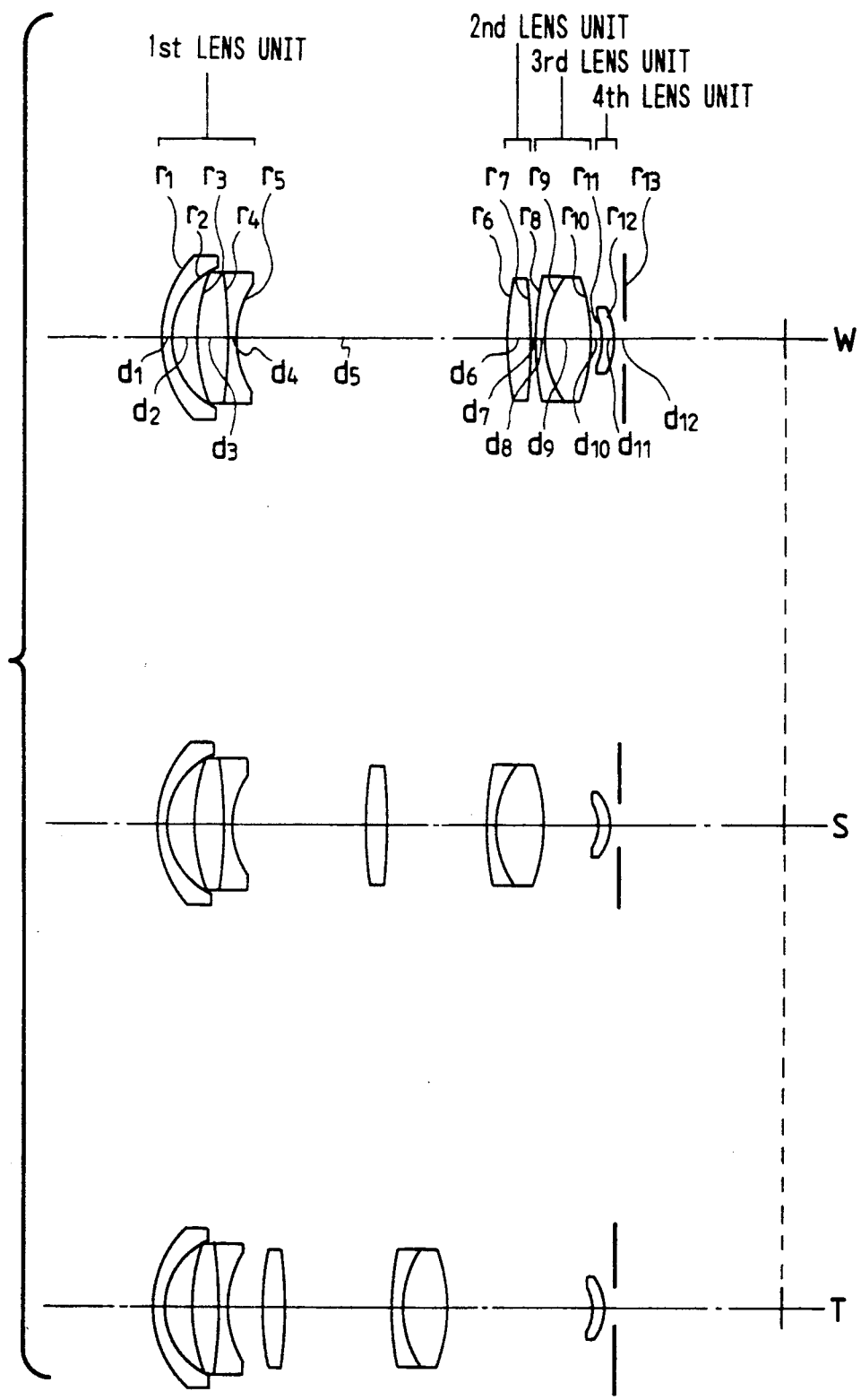

The Embodiment 27 has the composition illustrated in FIG. 27 wherein the first lens unit is composed of a negative lens component and a cemented doublet consisting of a positive lens element and a negative lens element, the second lens unit is composed of a positive lens component, the third lens unit is composed of a cemented doublet consisting of a negative lens element and a positive lens element, and the fourth lens unit is composed of a negative lens component. The aperture stop is located on the image side of the fourth lens unit. The third surface ($r_3$) is designed as an aspherical surface. In this embodiment, the fourth lens unit is composed of a single lens component so as to have a very weak negative power and produce aberrations in reduced amounts. The lens component composing the fourth lens unit is designed as a meniscus lens component which is similar to that used in the Embodiment 22.

Figure 107:
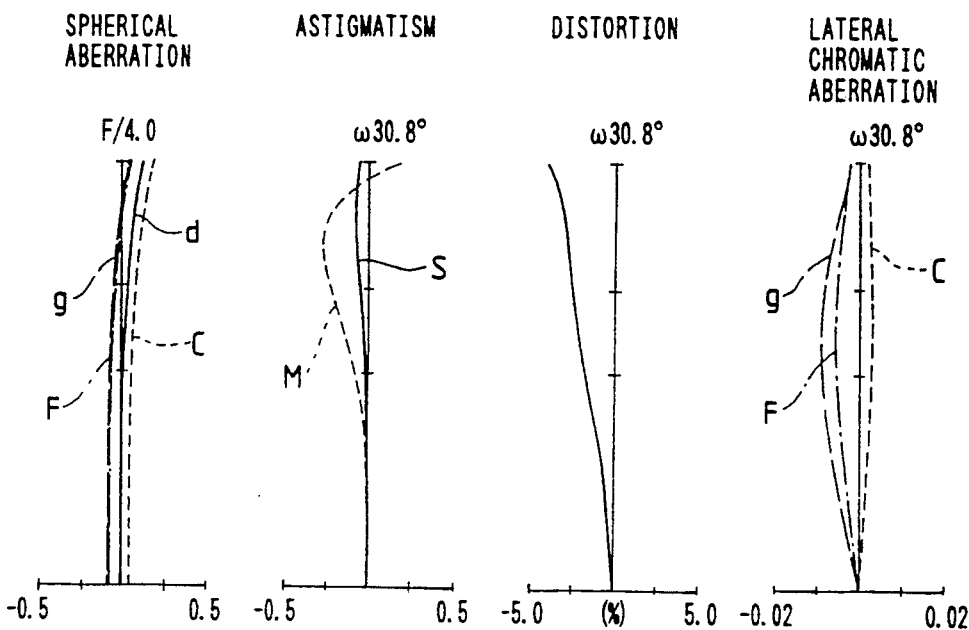
FIG. 107 through FIG. 109 show curves visualizing aberration characteristics of the Embodiment 27 of the present invention.
Figure 108:
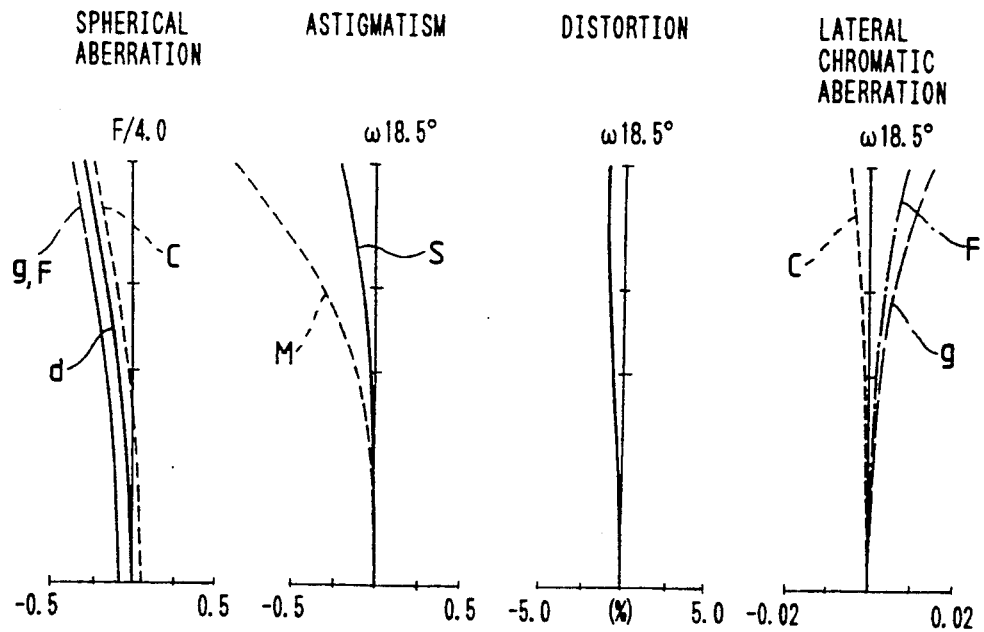
Figure 109:
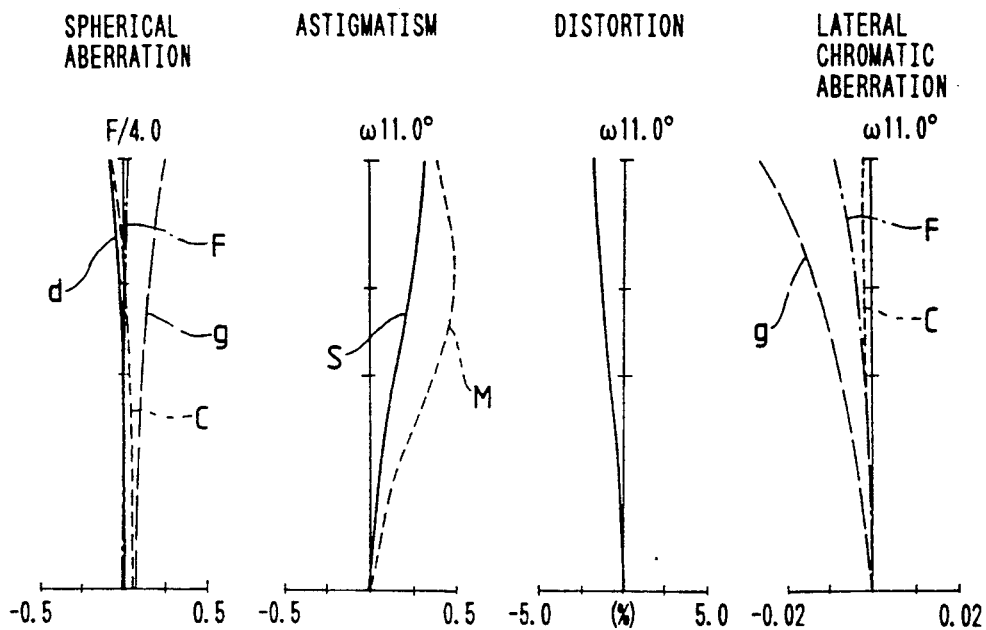

Aberration characteristics at the wide position, intermediate focal length and tele position of the Embodiment 27 are shown in FIG. 107, FIG. 108 and FIG. 109 respectively.

Figure 28:
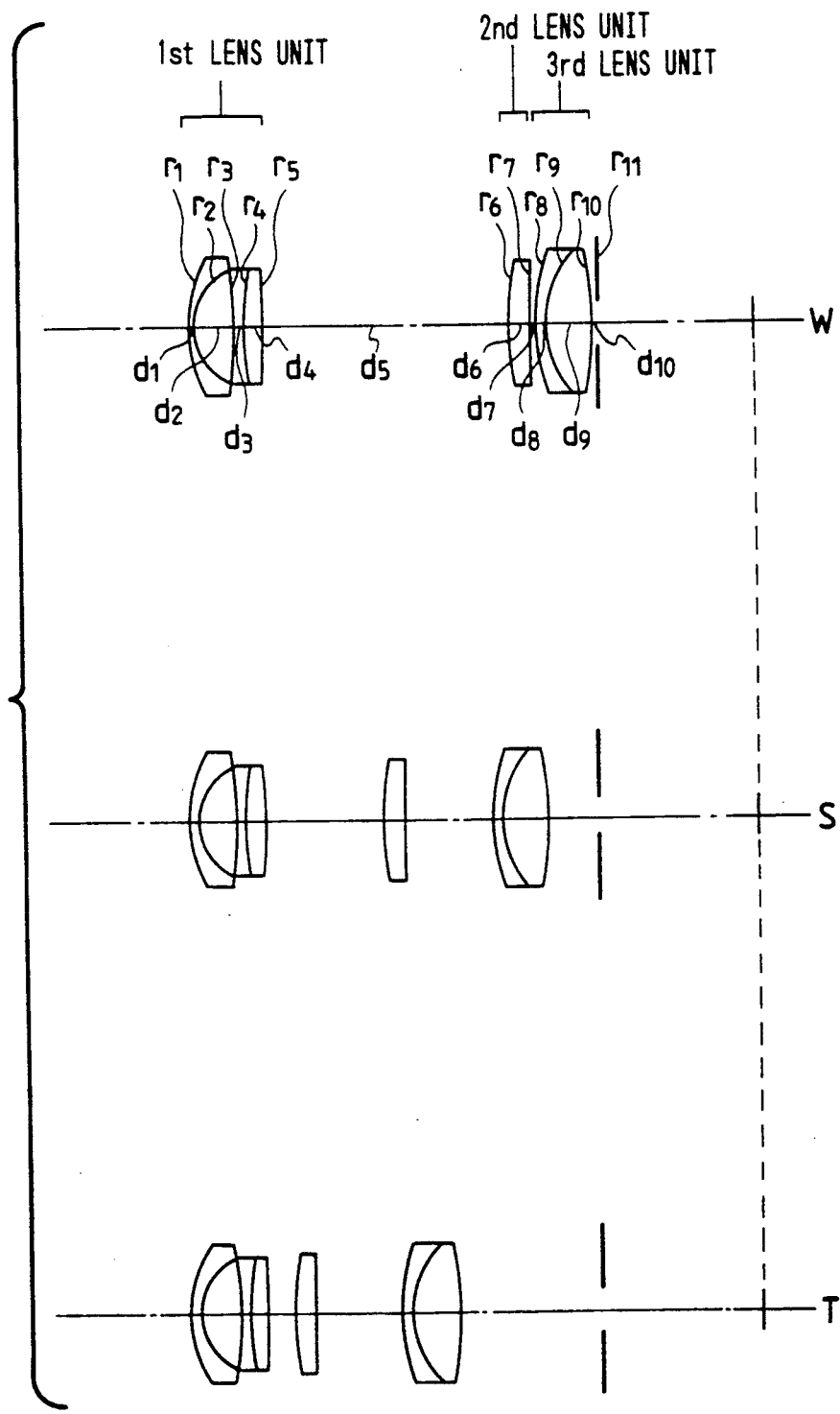

The Embodiment 28 has the composition illustrated in FIG. 28 wherein the vari-focal lens system is composed of three lens units. The first lens unit is composed of a negative lens component and a cemented doublet consisting of a negative lens element and a positive lens element, the second lens unit is composed of a positive lens component, and the third lens unit is composed of a cemented doublet consisting of a negative lens element and a positive lens element. The third surface ($r_3$), the fifth surface (the most image side surface $r_5$ of the first lens unit) and the eighth surface (the object side surface r₈ of the third lens unit) are designed as aspherical surfaces respectively.

In the Embodiment 28, the fourth lens unit is omitted to compose the vari-focal lens system of only three lens units or a reduced number of lens elements.

Figure 110:
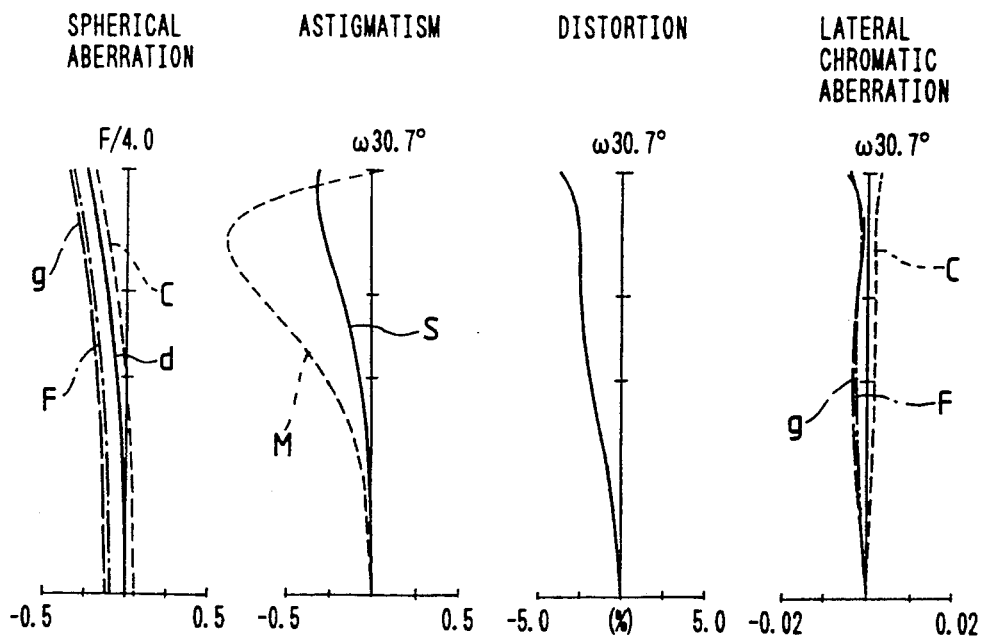
FIG. 110 through FIG. 112 show graphs visualizing aberration characteristics of the Embodiment 28 of the present invention.
Figure 111:
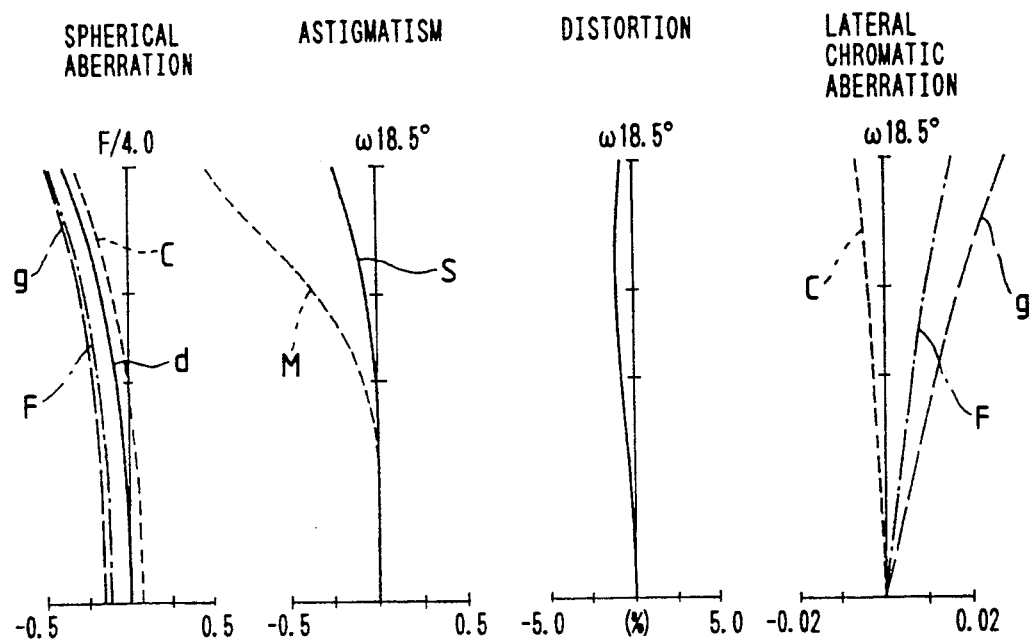
Figure 112:
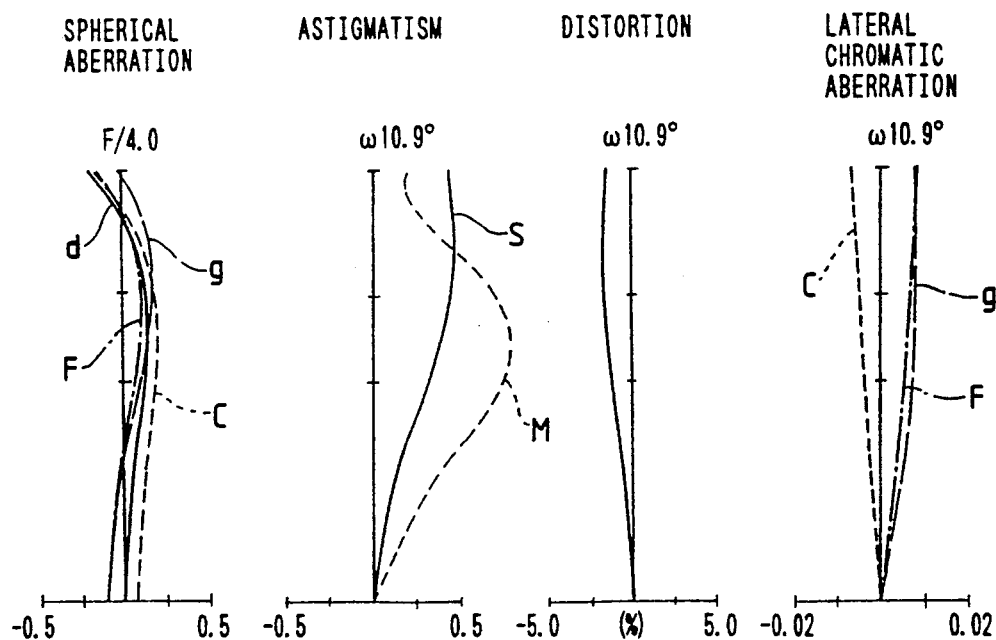
Figure 113:
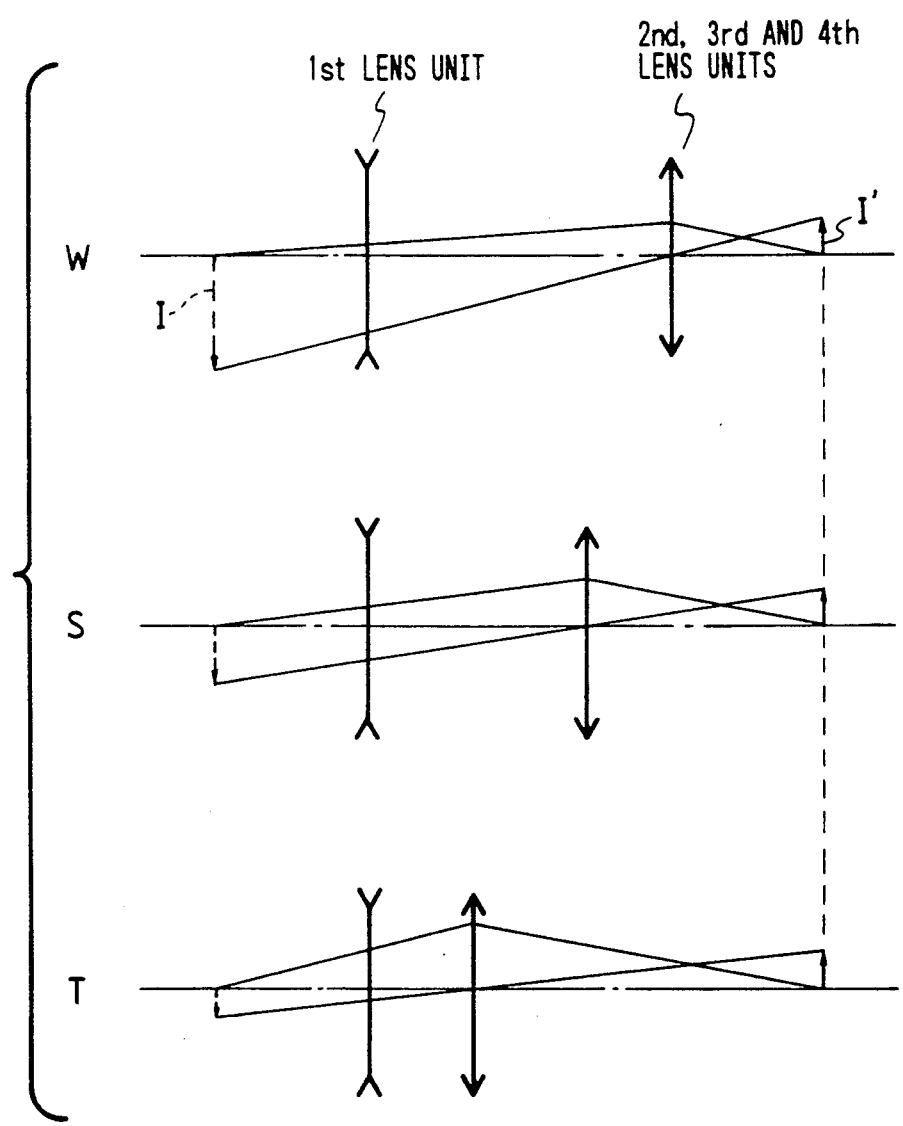
FIG. 113 shows a schematic diagram illustrating the composition of the vari-focal lens system according to the present invention wherein the second through the fourth lens units are regarded as a single lens unit.
Figure 114:
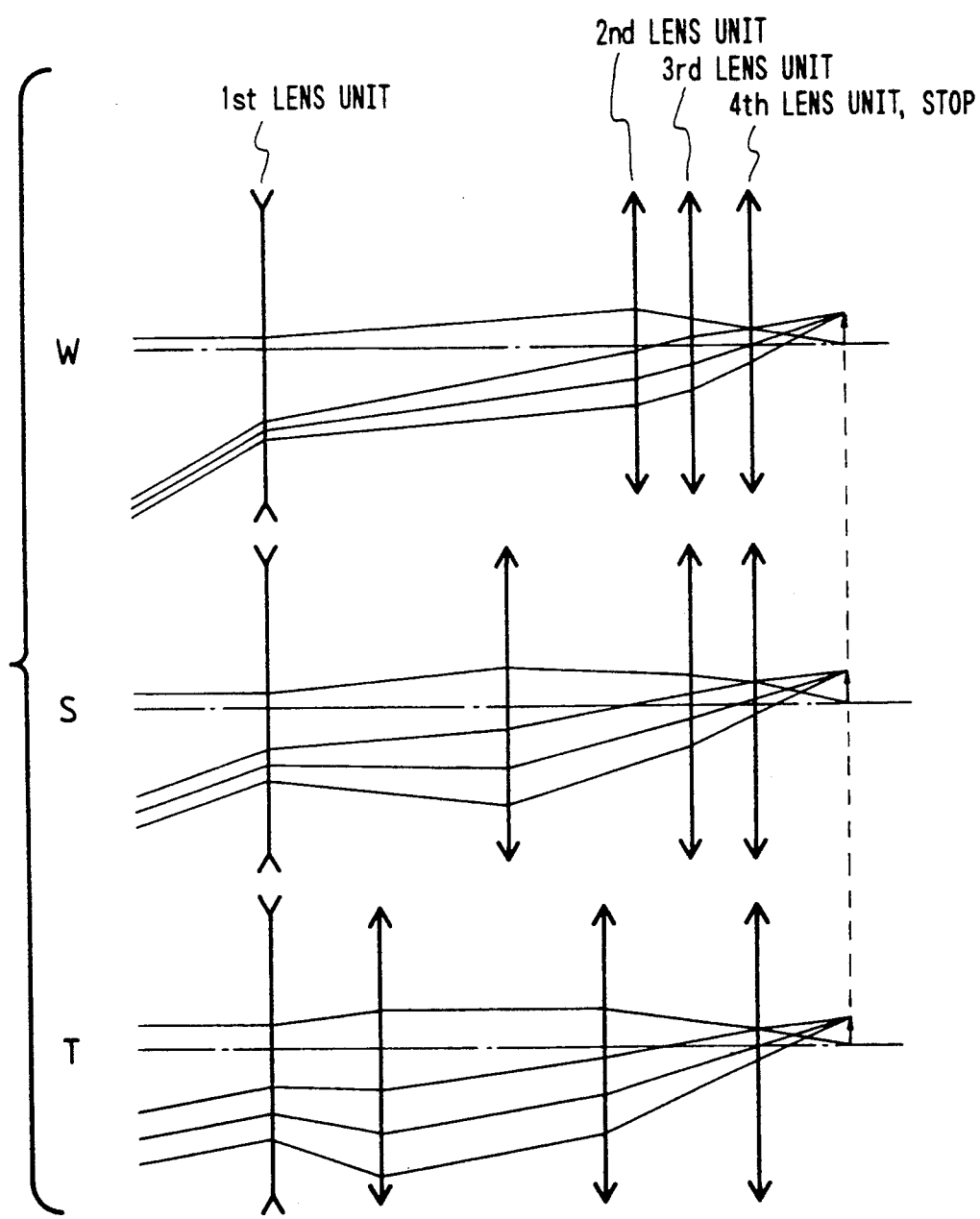
FIG. 114 shows a schematic diagram illustrating the composition of the vari-focal lens system according to the present invention wherein the first lens unit, the fourth lens unit and the aperture stop are fixed.

Aberration characteristics at the wide position, intermediate focal length and tele position of the Embodiment 28 are visualized in FIG. 110, FIG. 111 and FIG. 112 respectively.

The vari-focal lens system according to the present invention is capable of satisfying the specifications of a wide field angle of 60° to 70° at the wide position, a vari-focal ratio of 3 to 5 and an aperture ratio of F/2.8 or higher by selecting an adequate power distribution for each of the lens units and using graded refractive index lens elements or the aspherical surfaces. Further, the present invention makes it possible, by fixing the total length, the location of the aperture stop and so on, to simplify the mechanism for varying focal length of lens systems and maintain favorably corrected aberrations.

We claim:

1. A vari-focal lens system comprising, in the order from the object side, a first lens unit having a negative refractive power, a second lens unit having a positive refractive power, a third lens unit having a positive refractive power, a fourth lens unit having a positive refractive power and an aperture stop arranged on the image side of said third lens unit, said system being adapted so as to vary focal length of said lens system by varying the airspaces reserved between said lens units, and wherein the lens system includes at least one graded refractive index lens having a refractive index distribution in the direction perpendicular to the optical axis.

2. A vari-focal lens system according to claim 1, wherein said at least one graded refractive index lens is disposed in at least one of the second and third lens units.

3. A vari-focal lens system according to claim 1 wherein said graded refractive index lens is arranged in the fourth lens unit.

4. A vari-focal lens system according to claim 3 wherein said graded refractive index lens satisfies the following condition (2):

$$|N_{1(4)}| \cdot f_w^2 < 1.0 \qquad (2)$$

wherein the reference symbol $f_w$ represents the focal length of the lens system as a whole at the wide position thereof and the reference symbol $N_{1(4)}$ designates the refractive index distribution coefficient of the second order for said graded refractive index lens.

5. A vari-focal lens system according to claim 1 wherein said graded refractive index lens is arranged in the first lens unit.

6. A vari-focal lens system according to claim 1 wherein said first lens unit comprises an aspherical surface having the shape expressed by the formula shown below and satisfying the following condition (5) when the optical axis is taken as the x axis and the direction perpendicular to the optical axis is taken as the y axis:

$$x = \frac{y^2/r}{1 + \sqrt{1 - p(y/r)^2}} + \sum_{i=2}^{n} A_{2i} y^{2i} \qquad (5)$$

$$\Sigma |\Delta x_1|/h < 0.4 \; (y = y_{EC})$$

wherein the reference symbol r represents the radius of curvature on the reference sphere of said aspherical surface, the reference symbol p designates the conical constant, the reference symbol $A_{2i}$ denotes the aspherical surface coefficient, the reference symbol $\Delta x_1$ represents the departure of the aspherical surface from the reference sphere thereof, the reference symbol h designates the maximum image height and the reference symbol $y_{EC}$ denotes the height, as measured on the aspherical surface, of the principal ray having the maximum field angle at the wide position.

7. A vari-focal lens system according to claim 1 wherein said at least one graded refractive index lens is disposed in the second lens unit.

8. A vari-focal lens system according to claim 1 wherein said at least one graded refractive index lens is disposed in the third lens unit.

9. A vari-focal lens system according to claim 2, 7 or 8 wherein said graded refractive index lens satisfies the following condition (1):

$$-1.0 < N_{1p} f_w^2 < 0 \qquad (1)$$

wherein the reference symbol $f_w$ represents the focal length of said lens system as a whole at the wide position thereof and the reference symbol $N_{1p}$ designates the refractive index distribution coefficient of the second order for said graded refractive index lens.

10. A vari-focal lens system comprising, in the order from the object side, a first lens unit having a negative refractive power, a second lens unit having a positive refractive power, a third lens unit having a positive refractive power, a fourth lens unit having a positive refractive power and an aperture stop arranged after said third lens unit, said system being adapted so as to perform variation of focal length by varying the airspaces reserved between the lens units, and wherein the lens system includes at least one graded refractive index lens having a refractive index distribution in the direction along the optical axis.

11. A vari-focal lens system according to claim 10 wherein said first lens unit comprises a graded refractive index lens having negative refractive power of surface weakened as the surface portions are farther from the optical axis.

12. A vari-focal lens system according to claim 11 wherein said graded refractive index lens satisfies the following condition (7):

$$|N_{1(1)} f_w| < 0.1 \qquad (7)$$

wherein the reference symbol $N_{1(1)}$ represents the refractive index distribution coefficient of the second order for the graded refractive index lens comprised in said first lens unit and the reference symbol $f_w$ designates the focal length of the lens system as a whole at the wide position thereof.

13. A vari-focal lens system according to claim 10 wherein at least one of said second lens unit and third lens unit comprise at least one graded refractive index lens having positive refractive power of surface weakened as the surface portions are farther from the optical axis.

14. A vari-focal lens system according to claim 10 wherein said fourth lens unit comprises a graded refractive index lens.

15. A vari-focal lens system according to claim 14 wherein said graded refractive index lens satisfies the following condition (9):

$$|N_{1(4)} f_w| < 1.0 \tag{9}$$

wherein the reference symbol $N_{1(4)}$ represents the refractive index distribution coefficient of the second order for said graded refractive index lens and the reference symbol $f_w$ designates the focal length of the lens system as a whole at the wide position thereof.

16. A vari-focal lens system according to claim 10 wherein the first lens unit comprises an aspherical surface having negative refractive power lowered as the surafce portions are farther from the optical axis.

17. A vari-focal lens system according to claim 10 wherein at least one of the second lens unit and third lens unit comprise at least one aspherical surface having positive refractive power weakened as the surface portions are farther from the optical axis.

18. A vari-focal lens system according to claim 10 wherein said fourth lens unit comprises a lens having an aspherical surface having positive refractive power weakened as the surface portions are farther from the optical axis.

19. A vari-focal lens system according to claim 10 wherein said second lens unit comprises a graded refractive index lens having a positive refractive power of surface that is weakened as surface portions become farther from the optical axis.

20. A vari-focal lens system according to claim 10 wherein said third lens unit comprises a graded refractive index lens having a positive refractive power of surface that is weakened as surface portions become farther from the optical axis.

21. A vari-focal lens system according to claim 10 wherein the second lens unit comprises at least one aspherical surface having a positive refractive power that is weakened as surface portions become farther from the optical axis.

22. A vari-focal lens system according to claim 10 wherein the third lens unit comprises at least one aspherical surface having a positive refractive power that is weakened as surface having a positive refractive power that is weakened as surface portions become farther from the optical axis.

23. A vari-focal lens system according to claim 13, 19 or 20 wherein said at least one graded refractive index lens used in the second lens unit and/or third lens unit satisfies the following condition (8):

$$|N_{1(23)} f_w| < 0.5 \tag{8}$$

wherein the reference symbol $N_{1(23)}$ represents the refractive index distribution coefficient of the second order for said graded refractive index lens and the reference symbol $f_w$ designates the focal length of the lens system as a whole at the wide position thereof.

24. A vari-focal lens system according to claim 13, 19 or 20 wherein said graded refractive index lens used in the second lens unit satisfies the following condition (8):

$$|N_{1(23)} f_w| < 0.5 \tag{8}$$

wherein the reference symbol $N_{1(23)}$ represents the refractive index distribution coefficient of the second order for said graded refractive index lens and the reference symbol $f_w$ designates the focal length of the lens system as a whole at the wide position thereof.

25. A vari-focal lens system according to claim 13, 8 or 19 wherein said at least one graded refractive index lens used in the third lens unit satisfies the following condition (8):

$$|N_{1(23)} f_w| < 0.5 \tag{8}$$

wherein the reference symbol ($N1_{(23)}$) represent the refractive index lens and the reference symbol $f_w$ designates the focal length of the lens system as a whole at the wide position thereof.

26. A vari-focal lens system comprising, in the order from the object side, a first lens unit having a negative refractive power, a second lens unit having a positive refractive power, a third lens unit having a positive refractive power, a fourth lens unit having a positive refractive power and an aperture stop arranged after said third lens unit, said system being adapted so as to perform variation of focal length by varying the airspaces reserved between said lens units, and wherein the lens system includes at least one aspherical surface.

27. A vari-focal lens system according to claim 1, 10 or 26 wherein said aperture stop is kept fixed on the optical axis for variation of the focal length of the lens system.

28. A vari-focal lens system according to claim 27 satisfying the following conditions (3) and (4):

$$-0.6 < \beta < -0.2 \tag{3}$$

$$0 < f_w/f_4 < 0.5 \tag{4}$$

wherein the reference symbol $\beta$ represents the magnification of the system composed of the second, third and fourth lens units at the wide position of the lens system, the reference symbol $f_4$ designates the focal length of the fourth lens unit and the reference symbol $f_W$ denotes the focal length of the lens system as a whole at the wide position thereof.

29. A vari-focal lens system according to claim 1, 10 or 26 wherein the lens component arranged right after said aperture stop is designed as a meniscus lens component having a concave surface on the object side.

30. A vari-focal lens system according to claim 29 wherein said meniscus lens component satisfies the following condition (6):

$$0.1 < r_a/r_b < 2.0 \tag{6}$$

wherein the reference symbols $r_a$ and $r_b$ represent the radii of curvature on the object side surface and the image side surface of said meniscus lens component.

31. A vari-focal lens system according to claim 26 wherein the first lens unit comprises an aspherical surface having a negative refractive power that is lowered as surface portions become farther from the optical axis.

32. A vari-focal lens system according to claim 16 or 31 wherein said aspherical surface is expressed by the formula shown below and satisfied the following condition (10) when the optical axis is taken as the x axis and the direction perpendicular to the optical axis is taken as the y axis:

$$\Sigma|\Delta x_1|/h < 0.4 \quad (y=y_{EC}) \quad (10)$$

wherein the reference symbol $\Delta s_1$ represents the departure of the aspherical surface from the reference sphere thereof, the reference symbol h designates the maximum image height, the reference symbol y denotes the height of the surface portion of interest as measured from the optical axis and the reference symbol $y_{EC}$ represents the height, as measured on the aspherical surface, of the principal ray having the maximum field angle at the wide position.

33. A vari-focal lens system according to claim 26 wherein the second lens unit and third lens unit comprise at least one aspherical surface having a positive refractive power that is weakened as surface portions become farther from the optical axis.

34. A vari-focal lens system according to claim 26 wherein the second lens unit comprises at least one aspherical surface having a positive refractive power that is weakened as surface portions become farther from the optical axis.

35. A vari-focal lens system according to claim 26 wherein the third lens unit comprises at least one aspherical surface having positive refractive power weakened as surface portions are farther from the optical axis.

36. A vari-focal lens system according to claim 17, 21, 22, 33, 34 or 35, wherein said aspherical surface satisfies the following condition (11):

$$\Sigma|\Delta s_{23}|/h < 0.5 \quad (y=y_{EC}) \quad (11)$$

wherein the reference symbol $\Delta s_{23}$ represents the departure of said aspherical surface from the reference sphere thereof, the reference symbol h designates the maximum image height, the reference symbol y denotes the height of the surface portion of interest as measured from the optical axis and the reference symbol $y_{EC}$ represents the height, as measured on the aspherical surface, of the principal ray having the maximum field angel at the wide position.

37. A vari-focal lens system according to claim 26 wherein said fourth lens unit comprises a lens having an aspherical surface with a positive refractive power that is weakened as surface portions are farther from the optical axis.

38. A vari-focal lens system according to claim 18 or 37 wherein the aspherical surface lens arranged in said fourth lens unit satisfies the following condition (12):

$$\Sigma|\Delta s_4|/h < 0.1 \quad (y=y_{EC}) \quad (12)$$

wherein the reference symbol $\Delta s_4$ represents the departure of said aspherical surface from the reference sphere thereof, the reference symbol h designates the maximum image height, the reference symbol y denotes the height of the surface portion of interest as measured from the optical axis and the reference symbol $y_{EC}$ represents the height, as measured on the aspherical surface, of the principal ray having the maximum field angle at the wide position.

39. A vari-focal lens system comprising, in the order from the object side, a first lens unit having a negative refractive power, a second lens unit having a positive refractive power, a third lens unit having a positive refractive power, a fourth lens unit having a positive refractive power and an aperture stop arranged on the image side of said third lens unit, and wherein said system is adapted so as to perform variation of focal length by varying the airspaces reserved between the lens units, said first lens unit, said fourth lens unit and said aperture stop being kept fixed for the variation of focal length.

40. A vari-focal lens system according to claim 39 satisfying the following conditions (13) and (14):

$$-0.6 < \beta_{234} < -0.2 \quad (13)$$

$$-0.1 < f_w/f_4 < 0.5 \quad (14)$$

wherein the reference symbol $\oplus_{234}$ represents the magnification of the system composed of the first, second and third lens units, the reference symbol $f_4$ designates the focal length of the fourth lens unit and the reference symbol $f_w$ denotes the focal length of the lens system as a whole at the wide position thereof.

41. A vari-focal lens system according to claim 40 wherein the second lens unit comprises a negative lens component satisfying the following condition (15):

$$v_n < 50 \quad (15)$$

wherein the reference symbol $v_n$ represents the Abbe's number of said negative lens component.

42. A vari-focal lens system according to claim 40 wherein the third lens unit comprises a negative lens component satisfying the following condition (15):

$$v_n < 50 \quad (15)$$

wherein the reference symbol $v_n$ represents the Abbe's number of said negative lens component.

43. A vari-focal lens system according to claim 40 wherein said first lens unit comprises a lens compoennt having an aspherical surface having negative refractive power weakened as the surface portions are farther from the optical axis.

44. A vari-focal lens system according to claim 43 wherein said aspherical surface satisfies the following condition (16):

$$\Sigma|\Delta s|/h < 0.2 \quad (y=y_{EC}) \quad (16)$$

wherein the reference symbol $\Delta s$ represents the departure of the aspherical surface from the reference sphere thereof, the reference symbol h designates the maximum height of ray, the reference symbol y denotes the height of the surface portion of interest as meassured from the optical axis and the reference symbol $y_{EC}$ represents the height, as measured on the aspherical surface, of the principal ray having the maximum field angle at the wide position.

45. A vari-focal lens system according to claim 1, 10, 26 or 39 adapted so as to perform focusing by moving said first lens unit along the optical axis.

46. A vari-focal lens system according to claim 1, 10, 26 or 39 adapted so as to perform focusing by moving some or all of the lens components arranged in said fourth lens unit.

47. A vari-focal lens system comprising, in the order from the object side, a first lens unit having a negative refractive power, a second lens unit having a positive refractive power, a third lens unit having a positive refractive power and an aperture stop, and wherein said system is adapted so as to perform variation of focal length thereof by varying the airspaces reserved between the lens units, said first lens unit and said aperture stop being kept fixed for the variation of focal length.

48. A vari-focal lens system according to claim 47 wherein at least one of the second lens unit and the third lens unit comprise at least one negative lens component satisfying the following condition (17) and are designed so as to satisfy the following condition (18):

$$-0.6 < \beta_{23} < -0.2 \tag{17}$$

$$\nu_n < 50 \tag{18}$$

wherein the reference symbol $\beta_{23}$ represents the total magnification of the system composed of the second lens unit and the third lens unit, and the reference symbol $\nu_n$ designates the Abbe's number of said negative lens component.

49. A vari-focal lens system according to claim 47 wherein the second lens unit comprises at least one negative lens component satisfying the following condition (17) and satisfying the following condition (18):

$$-0.6 < \beta_{23} < -0.2 \tag{17}$$

$$\nu_n < 50 \tag{18}$$

wherein the reference symbol $\beta_{23}$ represents the total magnification of the system composed of the second lens unit and the third lens unit, and the reference symbol $\nu_n$ designates the Abbe's number of said negative lens component.

50. A vari-focal lens system according to claim 47 wherein the third lens unit comprise at least one negative lens component satisfying the following condition (17) and satisfying the following condition (18):

$$-0.6 < \beta_{23} < -0.2 \tag{17}$$

$$\nu_n < 50 \tag{18}$$

wherein the reference symbol $\beta_{23}$ represents the total magnification of the system composed of the second lens unit and the third lens unit, and the reference symbol $\nu_n$ designates the Abbe's number of said negative lens component.

51. A vari-focal lens system comprising, in the order from the object side, a first lens unit having a negative refractive power, a second lens unit having a positive refractive power, a third lens unit having a positive refractive power, a fourth lens unit having a positive refractive power and an aperture stop arranged on the image side of said third lens unit, and wherein said system is adapted so as to perform variation of focal length thereof by varying the airspaces reserved between the lens units.

* * * * *